US010264029B2

(12) United States Patent
Lajoie et al.

(10) Patent No.: US 10,264,029 B2
(45) Date of Patent: Apr. 16, 2019

(54) METHODS AND APPARATUS FOR PACKETIZED CONTENT DELIVERY OVER A CONTENT DELIVERY NETWORK

(75) Inventors: Michael L. Lajoie, Stamford, CT (US); Louis Williamson, Denver, CO (US); Wilfrid Aissi, Boyds, MD (US); Chris Cholas, Frederick, CO (US); Jason Gaedtke, Evergreen, CO (US); Kenneth Gould, Reston, VA (US); Glen Hardin, Charlotte, NC (US); Charles Hasek, Broomfield, CO (US); Vedavati Hegde, Great Falls, VA (US); Jeffery P. Markley, Superior, CO (US); Vipul Patel, Upper Holland, PA (US); Howard Pfeffer, Reston, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 885 days.

(21) Appl. No.: 12/764,746

(22) Filed: Apr. 21, 2010

(65) Prior Publication Data

US 2011/0103374 A1  May 5, 2011

Related U.S. Application Data

(60) Provisional application No. 61/256,903, filed on Oct. 30, 2009.

(51) Int. Cl.
*H04J 1/00* (2006.01)
*H04N 21/234* (2011.01)
(Continued)

(52) U.S. Cl.
CPC ...... *H04L 65/1016* (2013.01); *H04L 65/1023* (2013.01); *H04L 65/4076* (2013.01);
(Continued)

(58) Field of Classification Search
CPC ......... H04N 21/2387; H04N 21/64322; H04N 21/2389; H04J 1/00
See application file for complete search history.

(56) References Cited

U.S. PATENT DOCUMENTS

| | | | |
|---|---|---|---|
| 5,410,344 A | 4/1995 | Graves et al. | |
| 5,528,284 A | 6/1996 | Iwami et al. | |

(Continued)

FOREIGN PATENT DOCUMENTS

| | | | |
|---|---|---|---|
| EP | 1821459 A1 | 8/2007 | |
| EP | 2081361 A1 | 7/2009 | |

(Continued)

OTHER PUBLICATIONS

DLNA (Digital Living Network Alliance) protocols described in DLNA Networked Device Interoperability Guidelines Expanded, Mar. 2006 and subsequent expanded version dated Oct. 2006.

(Continued)

*Primary Examiner* — Asad M Nawaz
*Assistant Examiner* — Jason A Harley
(74) *Attorney, Agent, or Firm* — Gazdzinski & Associates, PC

(57) ABSTRACT

Methods and apparatus for delivery of packetized content (e.g., video, audio, data, etc.) over a content delivery network. In one embodiment, the content is packetized using an Internet Protocol (IP), and delivered by a service provider over both managed and unmanaged networks to subscribers of the provider, so as to provide delivery at any time, at any location, and via any designated user device. The delivered content may originate from the service provider, third-party content sources (e.g., networks or studios), the subscriber(s) themselves, or other sources including the Internet. Use of a common control and service functions within the network afford the ability to integrate or blend services together, (Continued)

thereby affording the service provider and subscriber new service and economic opportunities. Content delivery sessions may also be migrated from one device to another. A network-based user interface infrastructure, and gateway-based client-side architecture, are also disclosed.

27 Claims, 50 Drawing Sheets

(51) Int. Cl.
  *H04N 21/239* (2011.01)
  *H04L 29/06* (2006.01)
  *H04L 29/08* (2006.01)

(52) U.S. Cl.
  CPC ........ *H04L 65/4084* (2013.01); *H04L 67/148* (2013.01); *H04L 67/306* (2013.01)

(56) References Cited

U.S. PATENT DOCUMENTS

| | | |
|---|---|---|
| 5,534,911 A | 7/1996 | Levitan |
| 5,557,319 A | 9/1996 | Gurusami et al. |
| 5,628,284 A | 5/1997 | Sheen et al. |
| 5,708,961 A | 1/1998 | Hylton et al. |
| 5,745,837 A | 4/1998 | Fuhrmann |
| 5,758,257 A | 5/1998 | Herz et al. |
| 5,818,438 A | 10/1998 | Howe et al. |
| 5,822,530 A | 10/1998 | Brown |
| 5,838,921 A | 11/1998 | Speeter |
| 5,897,635 A | 4/1999 | Torres et al. |
| 5,940,738 A | 8/1999 | Rao |
| 5,999,535 A | 12/1999 | Wang et al. |
| 6,125,397 A | 9/2000 | Yoshimura et al. |
| 6,167,432 A | 12/2000 | Jiang |
| 6,181,697 B1 | 1/2001 | Nurenberg et al. |
| 6,219,710 B1 | 4/2001 | Gray et al. |
| 6,233,389 B1 | 5/2001 | Barton et al. |
| 6,259,701 B1 | 7/2001 | Shur et al. |
| 6,286,049 B1 | 9/2001 | Rajakarunanayake et al. |
| 6,317,884 B1 | 11/2001 | Eames et al. |
| 6,345,038 B1 | 2/2002 | Selinger |
| 6,389,538 B1 | 5/2002 | Gruse et al. |
| 6,396,531 B1 | 5/2002 | Gerszberg et al. |
| 6,473,793 B1 | 10/2002 | Dillon et al. |
| 6,519,062 B1 | 2/2003 | Yoo |
| 6,523,696 B1 * | 2/2003 | Saito et al. ................. 709/223 |
| 6,546,016 B1 | 4/2003 | Gerszberg et al. |
| 6,564,381 B1 | 5/2003 | Hodge et al. |
| 6,640,145 B2 | 10/2003 | Hoffberg et al. |
| 6,642,938 B1 | 11/2003 | Gilboy |
| 6,642,939 B1 | 11/2003 | Vallone et al. |
| 6,643,262 B1 | 11/2003 | Larsson et al. |
| 6,694,145 B2 | 2/2004 | Riikonen et al. |
| 6,711,742 B1 | 3/2004 | Kishi et al. |
| 6,718,552 B1 | 4/2004 | Goode |
| 6,748,395 B1 | 6/2004 | Picker et al. |
| 6,754,904 B1 | 6/2004 | Cooper et al. |
| 6,757,906 B1 | 6/2004 | Look et al. |
| 6,774,926 B1 | 8/2004 | Ellis et al. |
| 6,788,676 B2 | 9/2004 | Partanen et al. |
| 6,847,778 B1 | 1/2005 | Vallone et al. |
| 6,865,746 B1 | 3/2005 | Herrington et al. |
| 6,909,726 B1 | 6/2005 | Sheeran |
| 6,918,131 B1 | 7/2005 | Rautila et al. |
| 6,925,257 B2 | 8/2005 | Yoo |
| 6,931,018 B1 | 8/2005 | Fisher |
| 6,934,964 B1 | 8/2005 | Schaffer et al. |
| 6,944,150 B1 | 9/2005 | McConnell et al. |
| 6,978,474 B1 | 12/2005 | Sheppard et al. |
| 7,003,670 B2 | 2/2006 | Heaven et al. |
| 7,006,881 B1 | 2/2006 | Hoffberg et al. |
| 7,009,972 B2 | 3/2006 | Maher et al. |
| 7,013,290 B2 | 3/2006 | Ananian |
| 7,020,652 B2 | 3/2006 | Matz et al. |
| 7,027,460 B2 | 4/2006 | Iyer et al. |
| 7,039,048 B1 | 5/2006 | Monta et al. |
| 7,051,352 B1 | 5/2006 | Schaffer |
| 7,054,902 B2 | 5/2006 | Toporek et al. |
| 7,055,031 B2 | 5/2006 | Platt |
| 7,055,165 B2 | 5/2006 | Connelly |
| 7,068,639 B1 | 6/2006 | Varma et al. |
| 7,096,483 B2 | 8/2006 | Johnson |
| 7,099,308 B2 | 8/2006 | Merrill et al. |
| 7,100,183 B2 | 8/2006 | Kunkel et al. |
| 7,103,905 B2 | 9/2006 | Novak |
| 7,106,382 B2 | 9/2006 | Shiotsu |
| 7,146,627 B1 | 12/2006 | Ismail et al. |
| 7,149,772 B1 | 12/2006 | Kalavade |
| 7,167,895 B1 | 1/2007 | Connelly |
| 7,174,126 B2 | 2/2007 | McElhatten et al. |
| 7,174,127 B2 | 2/2007 | Otten et al. |
| 7,174,385 B2 | 2/2007 | Li |
| 7,185,355 B1 | 2/2007 | Ellis et al. |
| 7,206,775 B2 | 4/2007 | Kaiser et al. |
| 7,207,055 B1 | 4/2007 | Hendricks et al. |
| 7,209,458 B2 | 4/2007 | Ahvonen et al. |
| 7,213,036 B2 | 5/2007 | Apparao et al. |
| 7,228,556 B2 | 6/2007 | Beach et al. |
| 7,242,960 B2 | 7/2007 | Van Rooyen |
| 7,242,988 B1 | 7/2007 | Hoffberg et al. |
| 7,254,608 B2 | 8/2007 | Yeager et al. |
| 7,257,106 B2 | 8/2007 | Chen et al. |
| 7,260,823 B2 | 8/2007 | Schlack et al. |
| 7,293,276 B2 | 11/2007 | Phillips et al. |
| 7,312,391 B2 | 12/2007 | Kaiser et al. |
| 7,325,043 B1 | 1/2008 | Rosenberg et al. |
| 7,325,073 B2 | 2/2008 | Shao et al. |
| 7,330,483 B1 | 2/2008 | Peters et al. |
| 7,330,510 B2 | 2/2008 | Castillo et al. |
| 7,333,483 B2 | 2/2008 | Zhao et al. |
| 7,336,787 B2 | 2/2008 | Unger et al. |
| 7,337,458 B2 | 2/2008 | Michelitsch et al. |
| 7,340,762 B2 | 3/2008 | Kim |
| 7,359,375 B2 * | 4/2008 | Lipsanen et al. ............. 370/355 |
| 7,363,643 B2 | 4/2008 | Drake et al. |
| 7,376,386 B2 | 5/2008 | Phillips et al. |
| 7,382,786 B2 | 6/2008 | Chen et al. |
| 7,406,515 B1 | 7/2008 | Joyce et al. |
| 7,444,655 B2 | 10/2008 | Sardera |
| 7,457,520 B2 | 11/2008 | Rosetti et al. |
| 7,486,869 B2 | 2/2009 | Alexander |
| 7,487,523 B1 | 2/2009 | Hendricks |
| 7,532,712 B2 | 5/2009 | Gonder et al. |
| 7,548,562 B2 | 6/2009 | Ward et al. |
| 7,567,983 B2 | 7/2009 | Pickelsimer |
| 7,571,452 B2 | 8/2009 | Gutta |
| 7,592,912 B2 | 9/2009 | Hasek |
| 7,602,820 B2 | 10/2009 | Helms et al. |
| 7,609,637 B2 | 10/2009 | Doshi et al. |
| 7,624,337 B2 | 11/2009 | Sull et al. |
| 7,650,319 B2 | 1/2010 | Hoffberg et al. |
| 7,690,020 B2 | 3/2010 | Lebar |
| 7,693,171 B2 | 4/2010 | Gould |
| 7,721,314 B2 | 5/2010 | Sincaglia |
| 7,725,553 B2 | 5/2010 | Rang et al. |
| 7,742,074 B2 | 6/2010 | Minatogawa |
| 7,770,200 B2 | 8/2010 | Brooks et al. |
| 7,809,942 B2 | 10/2010 | Baran et al. |
| 7,870,245 B2 | 1/2011 | Butler |
| 7,893,171 B2 | 2/2011 | Le et al. |
| 7,900,052 B2 | 3/2011 | Jonas et al. |
| 7,908,626 B2 | 3/2011 | Williamson et al. |
| 7,916,755 B2 | 3/2011 | Hasek et al. |
| 7,936,775 B2 | 5/2011 | Iwamura |
| 7,954,131 B2 | 5/2011 | Cholas et al. |
| 8,042,054 B2 | 10/2011 | White et al. |
| 8,095,610 B2 | 1/2012 | Gould et al. |
| 8,166,126 B2 | 4/2012 | Bristow et al. |
| 8,170,065 B2 | 5/2012 | Hasek et al. |
| 8,219,134 B2 | 7/2012 | Maharajh et al. |
| 8,249,497 B2 | 8/2012 | Ingrassia et al. |
| 8,281,352 B2 | 10/2012 | Brooks et al. |

(56) References Cited

U.S. PATENT DOCUMENTS

| | | |
|---|---|---|
| 8,341,242 B2 | 12/2012 | Dillon et al. |
| 8,347,341 B2 | 1/2013 | Markley et al. |
| 8,429,702 B2 | 4/2013 | Yasrebi et al. |
| 8,484,511 B2 | 7/2013 | Engel et al. |
| 8,516,529 B2 | 8/2013 | LaJoie et al. |
| 8,520,850 B2 | 8/2013 | Helms et al. |
| 8,583,758 B2 | 11/2013 | Casey et al. |
| 8,738,607 B2 | 5/2014 | Dettinger et al. |
| 8,750,490 B2 | 6/2014 | Murtagh et al. |
| 8,750,909 B2 | 6/2014 | Fan et al. |
| 8,805,270 B2 | 8/2014 | Maharajh et al. |
| 8,949,919 B2 | 2/2015 | Cholas et al. |
| 8,995,815 B2 | 3/2015 | Maharajh et al. |
| 9,124,608 B2 | 9/2015 | Jin et al. |
| 9,124,650 B2 | 9/2015 | Maharajh et al. |
| 9,215,423 B2 | 12/2015 | Kimble et al. |
| 2001/0004768 A1 | 6/2001 | Hodge et al. |
| 2001/0043613 A1 | 11/2001 | Wibowo et al. |
| 2001/0050945 A1 | 12/2001 | Lindsey |
| 2002/0002688 A1 | 1/2002 | Gregg et al. |
| 2002/0024943 A1* | 2/2002 | Karaul ............... H04L 29/06 370/338 |
| 2002/0027883 A1* | 3/2002 | Belaiche ............... 370/252 |
| 2002/0032754 A1 | 3/2002 | Logston et al. |
| 2002/0042921 A1 | 4/2002 | Ellis |
| 2002/0053076 A1 | 5/2002 | Landesmann |
| 2002/0056125 A1 | 5/2002 | Hodge et al. |
| 2002/0059218 A1 | 5/2002 | August et al. |
| 2002/0059619 A1 | 5/2002 | Lebar |
| 2002/0066033 A1 | 5/2002 | Dobbins et al. |
| 2002/0083451 A1 | 6/2002 | Gill et al. |
| 2002/0087995 A1 | 7/2002 | Pedlow et al. |
| 2002/0095689 A1* | 7/2002 | Novak ............... H04N 21/4104 725/151 |
| 2002/0123931 A1 | 9/2002 | Splaver et al. |
| 2002/0131511 A1 | 9/2002 | Zenoni |
| 2002/0144267 A1 | 10/2002 | Gutta et al. |
| 2002/0147771 A1 | 10/2002 | Traversat et al. |
| 2002/0152091 A1 | 10/2002 | Nagaoka et al. |
| 2002/0152299 A1 | 10/2002 | Traversat et al. |
| 2002/0178444 A1 | 11/2002 | Trajkovic et al. |
| 2002/0188744 A1 | 12/2002 | Mani |
| 2002/0188869 A1 | 12/2002 | Patrick |
| 2002/0194595 A1 | 12/2002 | Miller et al. |
| 2003/0005453 A1 | 1/2003 | Rodriguez et al. |
| 2003/0012190 A1* | 1/2003 | Kaku ............... H04L 12/18 370/389 |
| 2003/0028451 A1 | 2/2003 | Ananian |
| 2003/0056217 A1 | 3/2003 | Brooks |
| 2003/0093794 A1 | 5/2003 | Thomas et al. |
| 2003/0097574 A1 | 5/2003 | Upton |
| 2003/0115267 A1 | 6/2003 | Hinton et al. |
| 2003/0135628 A1 | 7/2003 | Fletcher et al. |
| 2003/0163443 A1 | 8/2003 | Wang |
| 2003/0165241 A1 | 9/2003 | Fransdonk |
| 2003/0166401 A1* | 9/2003 | Combes et al. ............... 455/427 |
| 2003/0200548 A1* | 10/2003 | Baran ............... H04L 29/06027 725/90 |
| 2003/0208767 A1 | 11/2003 | Williamson et al. |
| 2003/0217137 A1 | 11/2003 | Roese et al. |
| 2003/0217365 A1 | 11/2003 | Caputo |
| 2003/0220100 A1 | 11/2003 | McElhatten et al. |
| 2004/0034677 A1 | 2/2004 | Davey et al. |
| 2004/0034877 A1 | 2/2004 | Nogues |
| 2004/0045032 A1 | 3/2004 | Cummings et al. |
| 2004/0045035 A1 | 3/2004 | Cummings et al. |
| 2004/0045037 A1 | 3/2004 | Cummings et al. |
| 2004/0117254 A1 | 6/2004 | Nemirofsky et al. |
| 2004/0133923 A1 | 7/2004 | Watson et al. |
| 2004/0137918 A1 | 7/2004 | Varonen et al. |
| 2004/0166832 A1 | 8/2004 | Portman et al. |
| 2004/0230994 A1 | 11/2004 | Urdang et al. |
| 2004/0250273 A1 | 12/2004 | Swix et al. |
| 2005/0034171 A1 | 2/2005 | Benya |
| 2005/0049886 A1 | 3/2005 | Grannan et al. |
| 2005/0055220 A1 | 3/2005 | Lee et al. |
| 2005/0055729 A1 | 3/2005 | Atad et al. |
| 2005/0083921 A1* | 4/2005 | McDermott, III ............... H04Q 11/0005 370/360 |
| 2005/0086334 A1 | 4/2005 | Aaltonen et al. |
| 2005/0086683 A1 | 4/2005 | Meyerson |
| 2005/0108763 A1 | 5/2005 | Baran et al. |
| 2005/0114701 A1 | 5/2005 | Atkins et al. |
| 2005/0114900 A1 | 5/2005 | Ladd et al. |
| 2005/0157731 A1 | 7/2005 | Peters |
| 2005/0165899 A1 | 7/2005 | Mazzola |
| 2005/0177855 A1 | 8/2005 | Maynard et al. |
| 2005/0188415 A1 | 8/2005 | Riley |
| 2005/0223097 A1 | 10/2005 | Ramsayer et al. |
| 2005/0228725 A1 | 10/2005 | Rao et al. |
| 2005/0289616 A1 | 12/2005 | Horiuchi et al. |
| 2005/0289618 A1 | 12/2005 | Hardin |
| 2006/0020786 A1 | 1/2006 | Helms |
| 2006/0021004 A1 | 1/2006 | Moran et al. |
| 2006/0021019 A1 | 1/2006 | Hinton et al. |
| 2006/0041905 A1 | 2/2006 | Wasilewski |
| 2006/0041915 A1 | 2/2006 | Dimitrova et al. |
| 2006/0047957 A1 | 3/2006 | Helms et al. |
| 2006/0053463 A1 | 3/2006 | Choi |
| 2006/0088030 A1* | 4/2006 | Beeson ............... H04L 29/06027 370/389 |
| 2006/0095940 A1 | 5/2006 | Yearwood |
| 2006/0117379 A1 | 6/2006 | Bennett et al. |
| 2006/0130099 A1 | 6/2006 | Rooyen |
| 2006/0130101 A1* | 6/2006 | Wessel van Rooyen ..... 725/100 |
| 2006/0130107 A1 | 6/2006 | Gonder |
| 2006/0130113 A1 | 6/2006 | Carlucci |
| 2006/0136964 A1 | 6/2006 | Diez et al. |
| 2006/0136968 A1 | 6/2006 | Han et al. |
| 2006/0149850 A1 | 7/2006 | Bowman |
| 2006/0156392 A1 | 7/2006 | Baugher et al. |
| 2006/0161635 A1 | 7/2006 | Lamkin et al. |
| 2006/0171423 A1 | 8/2006 | Helms et al. |
| 2006/0187900 A1 | 8/2006 | Akbar |
| 2006/0206712 A1 | 9/2006 | Dillaway et al. |
| 2006/0209799 A1* | 9/2006 | Gallagher et al. ............ 370/352 |
| 2006/0218604 A1 | 9/2006 | Riedl et al. |
| 2006/0221246 A1 | 10/2006 | Yoo |
| 2006/0238656 A1 | 10/2006 | Chen et al. |
| 2006/0248553 A1 | 11/2006 | Mikkelson et al. |
| 2006/0259927 A1 | 11/2006 | Acharya et al. |
| 2006/0291506 A1 | 12/2006 | Cain |
| 2007/0019645 A1 | 1/2007 | Menon |
| 2007/0022459 A1 | 1/2007 | Gaebel et al. |
| 2007/0022469 A1 | 1/2007 | Cooper et al. |
| 2007/0025372 A1 | 2/2007 | Brenes et al. |
| 2007/0033531 A1 | 2/2007 | Marsh |
| 2007/0049245 A1 | 3/2007 | Lipman |
| 2007/0053513 A1 | 3/2007 | Hoffberg et al. |
| 2007/0061023 A1 | 3/2007 | Hoffberg et al. |
| 2007/0067851 A1 | 3/2007 | Fernando et al. |
| 2007/0073704 A1 | 3/2007 | Bowden et al. |
| 2007/0076728 A1 | 4/2007 | Rieger et al. |
| 2007/0081537 A1* | 4/2007 | Wheelock ............... H04L 47/15 370/392 |
| 2007/0094691 A1 | 4/2007 | Gazdzinski |
| 2007/0118848 A1 | 5/2007 | Schwesinger et al. |
| 2007/0121578 A1 | 5/2007 | Annadata et al. |
| 2007/0121678 A1 | 5/2007 | Brooks |
| 2007/0124488 A1 | 5/2007 | Baum et al. |
| 2007/0124769 A1 | 5/2007 | Casey et al. |
| 2007/0124781 A1 | 5/2007 | Casey et al. |
| 2007/0150920 A1* | 6/2007 | Lee ............... H04H 20/82 725/54 |
| 2007/0153820 A1 | 7/2007 | Gould |
| 2007/0154041 A1 | 7/2007 | Beauchamp |
| 2007/0157234 A1 | 7/2007 | Walker |
| 2007/0157262 A1 | 7/2007 | Ramaswamy et al. |
| 2007/0180230 A1 | 8/2007 | Cortez |
| 2007/0204300 A1 | 8/2007 | Markley et al. |
| 2007/0204314 A1 | 8/2007 | Hasek et al. |
| 2007/0209054 A1 | 9/2007 | Cassanova |
| 2007/0209059 A1* | 9/2007 | Moore et al. ............... 726/2 |

(56) References Cited

U.S. PATENT DOCUMENTS

| | | |
|---|---|---|
| 2007/0217436 A1 | 9/2007 | Markley et al. |
| 2007/0219910 A1 | 9/2007 | Martinez |
| 2007/0226365 A1 | 9/2007 | Hildreth et al. |
| 2007/0245376 A1 | 10/2007 | Svendsen |
| 2007/0250880 A1 | 10/2007 | Hainline |
| 2007/0261116 A1 | 11/2007 | Prafullchandra et al. |
| 2007/0276925 A1 | 11/2007 | La Joie et al. |
| 2007/0276926 A1 | 11/2007 | LaJoie |
| 2007/0280298 A1 | 12/2007 | Hearn et al. |
| 2007/0288637 A1 | 12/2007 | Layton et al. |
| 2007/0288715 A1 | 12/2007 | Boswell et al. |
| 2007/0294717 A1 | 12/2007 | Hill et al. |
| 2007/0294738 A1 | 12/2007 | Kuo et al. |
| 2007/0299728 A1 | 12/2007 | Nemirofsky et al. |
| 2008/0021836 A1 | 1/2008 | Lao |
| 2008/0022012 A1 | 1/2008 | Wang |
| 2008/0059804 A1 | 3/2008 | Shah et al. |
| 2008/0066112 A1 | 3/2008 | Bailey et al. |
| 2008/0086750 A1 | 4/2008 | Yasrebi et al. |
| 2008/0091805 A1 | 4/2008 | Malaby et al. |
| 2008/0091807 A1 | 4/2008 | Strub et al. |
| 2008/0092163 A1* | 4/2008 | Song .............. H04H 20/16 725/39 |
| 2008/0092181 A1 | 4/2008 | Britt |
| 2008/0098212 A1 | 4/2008 | Helms et al. |
| 2008/0098450 A1 | 4/2008 | Wu et al. |
| 2008/0112405 A1 | 5/2008 | Cholas et al. |
| 2008/0133551 A1 | 6/2008 | Wensley et al. |
| 2008/0137541 A1 | 6/2008 | Agarwal et al. |
| 2008/0155059 A1 | 6/2008 | Hardin |
| 2008/0162353 A1 | 7/2008 | Tom et al. |
| 2008/0170530 A1* | 7/2008 | Connors .............. H04H 20/67 370/312 |
| 2008/0170551 A1 | 7/2008 | Zaks |
| 2008/0177998 A1 | 7/2008 | Apsangi et al. |
| 2008/0192820 A1 | 8/2008 | Brooks et al. |
| 2008/0201386 A1 | 8/2008 | Maharajh et al. |
| 2008/0201748 A1 | 8/2008 | Hasek et al. |
| 2008/0222684 A1 | 9/2008 | Mukraj et al. |
| 2008/0235746 A1 | 9/2008 | Peters |
| 2008/0273591 A1 | 11/2008 | Brooks |
| 2008/0279534 A1 | 11/2008 | Buttars |
| 2008/0281971 A1 | 11/2008 | Leppanen et al. |
| 2008/0282299 A1 | 11/2008 | Koat et al. |
| 2008/0297669 A1 | 12/2008 | Zalewski et al. |
| 2008/0306903 A1 | 12/2008 | Larson et al. |
| 2008/0320523 A1 | 12/2008 | Morris et al. |
| 2009/0013356 A1* | 1/2009 | Doerr .............. H03M 13/29 725/62 |
| 2009/0030802 A1 | 1/2009 | Plotnick et al. |
| 2009/0031335 A1 | 1/2009 | Hendricks et al. |
| 2009/0064221 A1 | 3/2009 | Stevens |
| 2009/0083279 A1 | 3/2009 | Hasek |
| 2009/0083811 A1 | 3/2009 | Dolce et al. |
| 2009/0083813 A1* | 3/2009 | Dolce et al. .............. 725/93 |
| 2009/0086643 A1 | 4/2009 | Kotrla et al. |
| 2009/0086722 A1 | 4/2009 | Kaji |
| 2009/0098861 A1 | 4/2009 | Kalliola et al. |
| 2009/0100459 A1 | 4/2009 | Riedl |
| 2009/0100493 A1 | 4/2009 | Jones et al. |
| 2009/0133048 A1 | 5/2009 | Gibbs et al. |
| 2009/0141696 A1 | 6/2009 | Chou et al. |
| 2009/0150917 A1 | 6/2009 | Huffman et al. |
| 2009/0151006 A1 | 6/2009 | Saeki et al. |
| 2009/0158311 A1 | 6/2009 | Hon et al. |
| 2009/0172776 A1 | 7/2009 | Makagon et al. |
| 2009/0175218 A1* | 7/2009 | Song .............. H03M 13/271 370/328 |
| 2009/0185576 A1 | 7/2009 | Kisel et al. |
| 2009/0187939 A1 | 7/2009 | Lajoie |
| 2009/0193486 A1 | 7/2009 | Patel et al. |
| 2009/0201917 A1 | 8/2009 | Maes et al. |
| 2009/0210899 A1 | 8/2009 | Lawrence-Apfelbaum et al. |
| 2009/0210912 A1 | 8/2009 | Cholas |
| 2009/0225760 A1 | 9/2009 | Foti |
| 2009/0235308 A1 | 9/2009 | Ehlers et al. |
| 2009/0282241 A1 | 11/2009 | Prafullchandra et al. |
| 2009/0282449 A1 | 11/2009 | Lee |
| 2009/0293101 A1 | 11/2009 | Carter et al. |
| 2009/0296621 A1 | 12/2009 | Park et al. |
| 2010/0012568 A1 | 1/2010 | Strasters |
| 2010/0027560 A1 | 2/2010 | Yang et al. |
| 2010/0030578 A1 | 2/2010 | Siddique et al. |
| 2010/0031299 A1 | 2/2010 | Harrang et al. |
| 2010/0042478 A1 | 2/2010 | Reisman |
| 2010/0043030 A1 | 2/2010 | White |
| 2010/0083329 A1 | 4/2010 | Joyce et al. |
| 2010/0083362 A1 | 4/2010 | Francisco et al. |
| 2010/0106846 A1 | 4/2010 | Noldus et al. |
| 2010/0115091 A1 | 5/2010 | Park et al. |
| 2010/0115113 A1 | 5/2010 | Short et al. |
| 2010/0122274 A1 | 5/2010 | Gillies et al. |
| 2010/0122276 A1 | 5/2010 | Chen |
| 2010/0125658 A1 | 5/2010 | Strasters |
| 2010/0131973 A1 | 5/2010 | Dillon |
| 2010/0138900 A1 | 6/2010 | Peterka et al. |
| 2010/0169977 A1 | 7/2010 | Dasher et al. |
| 2010/0199299 A1 | 8/2010 | Chang et al. |
| 2010/0199312 A1 | 8/2010 | Chang et al. |
| 2010/0217613 A1 | 8/2010 | Kelly |
| 2010/0218231 A1 | 8/2010 | Frink et al. |
| 2010/0219613 A1 | 9/2010 | Zaloom et al. |
| 2010/0251304 A1 | 9/2010 | Donoghue et al. |
| 2010/0251305 A1 | 9/2010 | Kimble et al. |
| 2010/0269144 A1 | 10/2010 | Forsman et al. |
| 2010/0280641 A1 | 11/2010 | Harkness et al. |
| 2010/0287609 A1* | 11/2010 | Gonzalez .............. G06F 21/10 726/14 |
| 2010/0313225 A1 | 12/2010 | Cholas |
| 2010/0325547 A1 | 12/2010 | Keng et al. |
| 2011/0015989 A1 | 1/2011 | Tidwell et al. |
| 2011/0016479 A1 | 1/2011 | Tidwell et al. |
| 2011/0016482 A1 | 1/2011 | Tidwell et al. |
| 2011/0071841 A1 | 3/2011 | Fomenko et al. |
| 2011/0090898 A1 | 4/2011 | Patel et al. |
| 2011/0093900 A1 | 4/2011 | Patel et al. |
| 2011/0099017 A1 | 4/2011 | Ure |
| 2011/0102600 A1 | 5/2011 | Todd |
| 2011/0107379 A1 | 5/2011 | Lajoie et al. |
| 2011/0110515 A1 | 5/2011 | Tidwell et al. |
| 2011/0126018 A1 | 5/2011 | Narsinh et al. |
| 2011/0138064 A1 | 6/2011 | Rieger et al. |
| 2011/0145049 A1 | 6/2011 | Hertel et al. |
| 2011/0166932 A1 | 7/2011 | Smith et al. |
| 2011/0173053 A1 | 7/2011 | Aaltonen et al. |
| 2011/0173095 A1 | 7/2011 | Kassaei et al. |
| 2011/0178943 A1 | 7/2011 | Motahari et al. |
| 2011/0191801 A1 | 8/2011 | Vytheeswaran |
| 2011/0213688 A1 | 9/2011 | Santos et al. |
| 2011/0219229 A1 | 9/2011 | Cholas et al. |
| 2011/0265116 A1 | 10/2011 | Stern et al. |
| 2011/0276881 A1 | 11/2011 | Keng et al. |
| 2012/0005527 A1 | 1/2012 | Engel et al. |
| 2012/0008786 A1 | 1/2012 | Cronk et al. |
| 2012/0011567 A1 | 1/2012 | Cronk et al. |
| 2012/0023535 A1 | 1/2012 | Brooks et al. |
| 2012/0030363 A1 | 2/2012 | Conrad |
| 2012/0124606 A1 | 5/2012 | Tidwell et al. |
| 2012/0144416 A1 | 6/2012 | Wetzer et al. |
| 2012/0185899 A1 | 7/2012 | Riedl et al. |
| 2013/0014140 A1 | 1/2013 | Ye et al. |
| 2013/0014171 A1 | 1/2013 | Sansom et al. |
| 2013/0024888 A1 | 1/2013 | Sivertsen |
| 2013/0046849 A1 | 2/2013 | Wolf et al. |
| 2013/0097647 A1 | 4/2013 | Brooks et al. |
| 2013/0117692 A1 | 5/2013 | Padmanabhan et al. |
| 2014/0074855 A1 | 3/2014 | Zhao et al. |
| 2015/0040176 A1 | 2/2015 | Hybertson et al. |
| 2015/0095932 A1 | 4/2015 | Ren |

FOREIGN PATENT DOCUMENTS

| | | |
|---|---|---|
| JP | 2001275090 A | 10/2001 |
| JP | 2005519365 A | 6/2005 |

(56) References Cited

FOREIGN PATENT DOCUMENTS

| | | |
|---|---|---|
| JP | 2005519501 A | 6/2005 |
| JP | 2005339093 A | 12/2005 |
| JP | 2008015936 A | 1/2008 |
| JP | 2009211632 A | 9/2009 |
| JP | 2010502109 A | 1/2010 |
| JP | 2010079902 A | 4/2010 |
| JP | 2012505436 A | 3/2012 |
| JP | 2012523614 A | 10/2012 |
| WO | WO 2001/010125 | 2/2001 |
| WO | WO-2005015422 A1 | 2/2005 |
| WO | WO-2005031524 A2 | 4/2005 |
| WO | WO-2007060451 A2 | 5/2007 |
| WO | WO-2012021245 A1 | 2/2012 |
| WO | WO-2012114140 A1 | 8/2012 |

OTHER PUBLICATIONS

Cantor, et al., Bindings for the OASIS Security Assertion Markup Language (SAML) V2.0, OASIS Standard, Mar. 2005 (http://docs.oasis-open.org/security/saml/v2.0/).

Enhanced TV Binary Interchange, Format 1.0 OC-SP-ETV-BIF1.0-104-070921, Sep. 21, 2007, 420 pages.

Screenshot from http://www.redux.com, "Select a channel to start watching" © 2014 Redux, Inc.

Siebenlist, F., et al., "Global Grid Forum Specification Roadmap towards a Secure OGSA," Jul. 2002, pp. 1-22.

UTF-32, IBM, retrieved from http://publib.boulder.ibm.com/infocenter/iseries/v5r3/index.jsp?topic=%2Fnls%2Frbagsutf32.htm on Aug. 28, 2013.

Florin L., et al., "Content Delivery and Management in Networked MPEG-4 System," 2000 10th European Signal Processing Conference, IEEE, Sep. 4, 2000 (Sep. 4, 2000), pp. 1-4, XP032755920, ISBN: 978-952-15-0443-3 [retrieved on Mar. 31, 2015].

Pantjiaros C.A. P., et al., "Broadband Service Delivery: CY.T.A. ADSL Field Trial Experience", Electrotechnical Conference, 2000 MELECON, 2000 10th Mediterranean, May 29-31, 2000, Piscataway, NJ, USA,IEEE, vol. 1, May 29, 2000 (May 29, 2000), pp. 221-224, XP010518859, ISBN: 978-0-7803-6290-1.

Alcatel: "Delivering True Triple Play—Common Capabilities for the Delivery of Composite Services", Internet Citation, Jun. 2006 (Jun. 2006), XP002418653, Retrieved from the Internet: URL:http://www.alcatel-lucent.com/tripleplay [retrieved on Feb. 6, 2007].

\* cited by examiner

| | RESOLUTION | PIXEL DEPTH | ENCODING LEVEL | ENCODING PROFILE | FRAME RATE (FPS) | AUDIO CODEC | TRANSPORT CONTAINER | TRANSPORT BIT-RATE-VIDEO AND AUDIO) |
|---|---|---|---|---|---|---|---|---|
| HD* | 1080p | 1920x1080 | 4 | HIGH | 30 | AC3 (DOLBY DIGITAL)/ AAC+ | MPEG-2 TS | 12 Mbps (?) |
| HD* | 1080p | 1920x1080 | 4 | HIGH | 24 | AC3 (DOLBY DIGITAL)/ AAC+ | MPEG-2 TS | 12 Mbps (?) |
| HD* | 1080i | 1920x1080 | 4/3 | MAIN | 30 | AC3 (DOLBY DIGITAL)/ AAC+ | MPEG-2 TS | 8 Mbps |
| HD* | 720p | 1280x720 | 4/3 | MAIN | 30 | AC3 (DOLBY DIGITAL)/ AAC+ | MPEG-2 TS | 7 Mbps |
| SD* | 480i | 640x480 | 3 | MAIN | 30 | AC3 (DOLBY DIGITAL)/ AAC+ | MPEG-2 TS | 1.375 Mbps |
| PC/WEB ("HD" ON-NET) | WVGA | 800x480 | 3 | MAIN | 30 | AAC+ | MP4/ FRAGMENTED MP4 | 1 - 1.25 Mbps |
| PC/WEB ("SD" ON-NET) | VGA | 640x480 | 3 | MAIN | 30 | AAC+ | MP4/ FRAGMENTED MP4 | 768 kbps 1 Mbps |
| PC/WEB ("SD" OFF-NET) | QVGA | 320x240 | 3 | MAIN/BASE | 30 | AAC | MP4/ FRAGMENTED MP4 | 512 kbps |
| PORTABLE | CIF | 352x288 | 3 | BASE | 15 | AAC | 3GP | 384 kbps |
| MOBILE | QCIF | 176x144 | 2 | SIMPLE | 15 | AAC | 3GP | 192 kbps |
| MOBILE | SQCIF | 128x96 | 1 | SIMPLE | 15 | AAC | 3GP | 64 kbps |
| * ENCODING SHOULD FOLLOW THE SCTE-128 STANDARD FOR AVC ENCODING | | | | | | | | |

*FIG. 4A*

TV TELEPHONY

CALLER ID ON TV
AS THE NAME IMPLIES, CALLER ID ON TV ALLOWS A VIEWER TO SEE INFORMATION ABOUT AN INCOMING CALL. AT A MINIMUM, THIS IS THE PHONE NUMBER OR CALLER NAME PROVIDED BY THE CALLER ID SERVICE. THIS CAN BE CUSTOMIZED TO DISPLAY CUSTOMIZED INFORMATION ("DAD" INSTEAD OF "JOHN SMITH") OR A PICTURE OF THE CALLER.

CALL ROUTING
CALL ROUTING ALLOWS THE SUBSCRIBER TO PREDEFINE ACTIONS. EXAMPLES INCLUDE:
SELECTIVE DO NOT DISTURB AUTOMATICALLY FORWARDING CALLS TO VOICE MAIL. THIS CAN APPLY TO ALL CALLS, SELECTED CALLERS OR GENERAL CATEGORIES SUCH AS CALLS FROM 800 NUMBERS.
ALLOW CALLER PERMITS ONLY SPECIFIED CALLS TO RING THROUGH. THIS OPTION MAY BE DESIRABLE WHILE WATCHING A FAVORITE TV SHOW, FOR EXAMPLE.
CALL REJECT AUTOMATICALLY "HANGS UP" ON CALLS FROM UNDESIRABLE CALLERS, SUCH AS "BLOCKED" CALLS.

CALL DISPOSITION
CALL DISPOSITION IS SIMILAR TO CALL ROUTING, ALTHOUGH DECISIONS ARE MADE DYNAMICALLY USING THE REMOTE CONTROL RATHER THAN AHEAD OF TIME. AT THE CLICK OF A BUTTON, THE TV VIEWER CAN REJECT A CALL OR FORWARD THE CALL TO VOICE MAIL. IN ADDITION, CALL ROUTING ACTIONS DESCRIBED ABOVE CAN BE ENABLED OR DISABLED.

CLICK-TO-CALL
CLICK-TO-CALL ALLOWS THE SUBSCRIBER TO INITIATE A CALL FROM AN ON-SCREEN LIST. THIS LIST CAN BE A CALL LOG, WHICH IS AUTOMATICALLY MAINTAINED BY THE SYSTEM, OR A USER-CREATED ADDRESS BOOK.

VIDEO CALLING AND CONFERENCING
VIDEO CALLING APPEALS TO BOTH CONSUMER AND BUSINESS CUSTOMERS. GRANDPARENTS CAN SEE THEIR GRANDCHILDREN, AND BUSINESS CAN BE CONDUCTED MORE EFFECTIVELY. VIDEO CONFERENCING EXTENDS THIS BY ALLOWING THREE OR MORE PARTIES TO COMMUNICATE.
VIDEO CALLING CAN BE DONE USING ANY OF THREE DEVICES TO VIEW THE OTHER PARTIES: A PERSONAL COMPUTER, DEDICATED VIDEOPHONE OR TELEVISION SET WITH CAMERA. THE TELEVISION IS AN EXCELLENT PLATFORM CHOICE BECAUSE OF ITS LARGE SCREEN AND LOW INCREMENTAL COST (YOU ALREADY HAVE IT).

DVR INTEGRATION
DVR INTEGRATION AUTOMATICALLY BEGINS RECORDING THE VIEWED PROGRAM WHEN YOU PICK UP THE TELEPHONE.

*FIG. 31*

IPTV DATA SERVICES.

SMS WEB AND E-MAIL ON TV
ADDING A WIRELESS KEYBOARD ALLOWS YOUR SUBSCRIBERS TO SEND AND RECEIVE SMS, TO EASILY SURF THE WEB, ON A LARGE SCREEN, WITHOUT THE NEED TO OWN A COMPUTER.
THIS SERVICE CAN INCLUDE E-MAIL. OF COURSE, THIS INCLUDES THE ABILITY TO VIEW AND RESPOND, USING THE TELEVISION AS A MONITOR.

IM AND ADVANCED PRESENCE
TV-BASED PRESENCE BUILDS ON CURRENT CAPABILITIES. IN ADDITION TO SENDING INSTANT MESSAGES (IM) AND KNOWING WHETHER BUDDIES ARE ONLINE, IT ALLOWS YOU TO MONITOR WHAT YOUR FRIEND IS WATCHING AND AUTOMATICALLY CALL THE FRIEND WHEN THE RECIPTIENT'S PHONE IS FREE.

*FIG. 32*

TIME: 6:55PM-JOAN TURNS ON TV IN THE FAMILY ROOM.

- WHEN TURNS ON TV IN FAMILY ROOM, THERE IS AN OPTION TO SELECT THE USER. (FAMILY, MOM, DAD, KELLY)
- JOAN SELECTS MOM FROM THE LIST. JOAN IS PROMPTED TO ENTER PASSWORD AND SHE ENTERS THE PASSWORD WITH THE TV REMOTE. (THIS MAY BE SAVED SO THAT SHE DOES NOT NEED TO ENTER IT EVERY TIME). JOAN IS LOGGED INTO TWC IMS VIA HOME GATEWAY.
- JOAN'S PERSONALIZED APPLICATION LIST SHOWS UP ON THE SCREEN- IPTV, VOD, FACEBOOK, DLNA...
- JOAN SELECTS IPTV.
- JOAN'S PERSONALIZED CONFIGURATION AND ALSO JOAN'S NETWORK ADDRESS BOOK IS LOADED.
- WHEN JOAN SELECTS EPG, THERE IS AN OPTION TO VIEW FULL EPG AND PERSONIZED EPG.
- JOAN SELECTS PERSONALIZED EPG AND SELECTS HER FAVORITE CHANNEL FROM THE LIST.
- JOAN SELECTS NAB AND CHECKS TO SEE WHICH OF HER FRIENDS ARE WATCHING TV AND THE SAME CHANNEL. MAY BE SHE CAN CHAT WITH THE FRIEND WHILE WATCHING TV.

IMS ENABLERS: PRESENCE, XDMS
OTHER ENABLERS: NAB

FIG. 33

TIME: 6:55PM-JOAN'S DAUGHTER, KELLY TURNS ON HER DESKTOP COMPUTER IN HER ROOM AND SELECTS MyTV APPLICATION

- WHEN KELLY LAUNCHES MyTV APPLICATION FROM HER COMPUTER, KELLY GETS THE LIST USERS TO SELECT FROM KELLY SELECTS HER NAME.
- JOAN HAS CONFIGURED KELLY'S ACCOUNT WITH ONLY CERTAIN APPLICATIONS SUCH AS IPTV, INSTANT MESSAGE. WITHIN IPTV, JOAN HAS CONFIGURED KELLY'S ACCOUNT TO VIEW ONLY CERTAIN TYPE OF CHANNELS AND CERTAIN TYPE OF ADVERTISEMENTS.
- WHEN KELLY SELECTS HER NAME FROM THE LIST, SHE CAN ONLY SELECT IPTV FROM THE APPLICATION LIST. REST OF THEM ARE EITHER GRAYED OUT OR INVISIBLE.
- WHEN KELLY SELECTS IPTV, SHE DOES NOT HAVE ACCESS TO FULL EPG AND HER PERSONALIZED EPG HAS CNN STUDENT NEWS (INSTEAD OF REGULAR CNN CHANNEL), SPORTS CHANNELS, AND OTHER CHILDREN'S CHANNELS SUCH AS DISNEY, CARTOON, NICK, ANIMAL PLANET, DISCOVERY KIDS.
- KELLY SELECT DISNEY FROM THE EPG AND STARTS WATCHING DISNEY CHANNEL ON HER DESKTOP COMPUTER IN FULL SCREEN MODE.
- KELLY SELECTS NAB AND NOTICES THAT HER FRIEND IS ALSO WATCHING DISNEY SO SHE CAN CHAT WITH HER.
- JOAN MAY DECIDE TO CONFIGURE KELLY'S ACCOUNT TO CHANGE THE AMOUNT OF TIME KELLY CAN WATCH IPTV AND AMOUNT OF TIME KELLY CAN BE ON CHAT SESSIONS.

IMS ENABLERS:
OTHER ENABLERS: NAB

FIG. 34

```
TIME: 7:00PM-KELLY IS WATCHING TV ON HER DESKTOP COMPUTER IN HER ROOM

• KELLY LIKES TO PLAY TENNIS AND WATCH TENNIS AND SHE IS ONLY 10 YEARS OLD.
• KELLY IS WATCHING AUSTRALIAN OPEN.
• JOAN HAS CONFIGURED KELLY'S ACCOUNT TO BE ABLE TO VIEW ADS THAT ARE APPROPRIATE FOR CHILDREN.
• BASED ON KELLY'S USER PROFILE, TWC's IPTV SERVER COMMUNICATES WITH AD INSERTION SERVER TO REPLACE REGULAR ADS WITH CHILDREN'S
  ADVERTISEMENT.
• PERSONALIZED TENNIS CHANNEL IS STREAMED TO KELLY'S DESKTOP
• KELLY CAN PROVIDE A FEEDBACK BY ENTERING ON THE REMOTE "1" FOR GREAT "2" FOR FAIR OR "3" FOR BAD.
```

FIG. 35

```
TIME: 7:00PM-JOAN IS WATCHING TV IN FAMILY ROOM

• JOAN IS PLANNING TO REMODELING HER KITCHEN. SHE IS SHOPPING FOR BEST CONTRACTOR, BEST MATERIAL AND NEW DESIGNS.
• BEFORE SHE STARTS WATCHING TV, SHE SELECTS THE CATEGORY OF ADS SHE WOULD LIKE TO VIEW WHILE WATCHING TV. IN THIS CASE, HOME IMPROVEMENT.
• BASED ON JOAN'S PREFERENCE, TWC's IPTV SERVER COMMUNICATES WITH AD INSERTION SERVER TO REPLACE REGULAR ADS WITH HOME IMPROVEMENT
  ADVERTISEMENT.
• PERSONALIZED TV CHANNEL WITH HOME IMPROVEMENT ADS IS STREAMED TO JOAN'S TV.
• JOAN CAN PROVIDE A FEEDBACK BY ENTERING ON THE REMOTE "1" FOR GREAT "2" FOR FAIR OR "3" FOR BAD
```

FIG. 36

```
TIME: 7:00PM-JOAN WATCHING TV- HER DAUGHTER
KELLY IS WATCHING TV IN HER ROOM.

JOAN AND KELLY ARE REGISTERED TO TWC's IMS. JOAN CONFIGURES HER
NETWORK ADDRESS BOOK (NAB) USING HER TV REMOTE AS FOLLOWS:
FAMILY: "ENABLE" WITH AVAILABILITY FOR EACH FAMILY MEMBER WITH
EVERY COMMUNICATION PLATFORM (VOICE, SMS, EMAIL)
FRIEND: "ENABLE" WITH AVAILABILITY FOR SELECTED FRIENDS OVER SELECTED
COMMUNICATION PLATFORMS
OFFICE: "NOT TO DISTURB"

IMS ENABLERS: PRESENCE, XDMS
OTHER ENABLERS: NAB
```

FIG. 38

|         | AVAILABILITY |       |        |
|---------|-------|-------|--------|
|         | VOICE | SMS   | E-MAIL |
| FAMILY  | ENABLE |||
| • DAD   | Y | Y | Y |
| • MUM   | Y | Y | Y |
| • JOHN  | Y | Y | Y |
| FRIENDS | ENABLE |||
| • KIM   | N | Y | Y |
| • BOB   | N | N | Y |
| • TODD  | N | Y | Y |
| OFFICE  | DND |||
| • HOWARD | N | N | Y |
| • VEDA  | N | N | Y |
| • JIM   | N | N | Y |

FIG. 39

| TIME: 8:00PM-JOAN'S FRIEND, KIM AND ALSO HER DAD TRY TO CALL HER PHONES |
|---|
| AS JOAN IS OFF-LINE FOR FRIENDS CALLING, KIM'S CALL IS SET UP AS A CHAT SESSION OR SMS SESSION DEPENDING ON KIM'S DEVICE CAPABILITY. (IF KIM HAS PRESENCE ENABLED DEVICE, KIM CAN ALSO SEE JOAN'S AVAILABILITY FOR ONLY EMAIL AND SMS.)<br>• JOAN'S STARTS A CHAT SESSION OVER THE SETOP BOX WITH HER FRIEND KIM WHILE SHE IS TALKING TO HER DAD OVER HER HOME PHONE.<br><br>IMS ENABLERS: PRESENCE, XDMS, SMSC<br>OTHER ENABLERS: NAB, E-MAIL |

FIG. 40

| TIME: 8:30PM-JOAN HAS TO GO PICK HER HUSBAND UP AT THE METRO |
|---|
| JOAN HAS TO RUSH TO THE METRO STATION TO PICKUP HER HUSBAND JIM.<br>JOAN'S CELL PHONE AND HER LAPTOP ARE IMS ENABLED.<br>• BEFORE LEAVING HER HOUSE, SHE TRANSFERS HER VOICE CALL TO HER CELL PHONE.<br>• SHE PAUSES HER DAUGHTER'S VIDEO AND RESTARTS IT ON HER LAPTOP<br>WHILE TRAVELING TO THE METRO STATION, SHE CONTINUES TALKING TO HER DAD<br>WHILE HER DAUGHTER IS WATCHING HER VIDEO.<br><br>IMS ENABLERS: PRESENCE, XDMS, FMC, DEVICE<br>CONVERGENCE AND NETWORK CONVERGENCE<br>OTHER ENABLERS: NAB, E-MAIL |

FIG. 41

METHODS AND APPARATUS FOR PACKETIZED CONTENT DELIVERY OVER A CONTENT DELIVERY NETWORK

PRIORITY

This application claims priority to U.S. Provisional Patent Application Ser. No. 61/256,903 of the same title filed Oct. 30, 2009, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The invention relates generally to the fields of video and/or data transmission. In one exemplary aspect, the invention relates to the use of a network architecture for providing content in content-based (e.g., cable) networks using a packetized protocol.

2. Description of Related Technology

The provision of content to a plurality of subscribers in a content-based network is well known in the prior art. In a typical configuration, the content is distributed to the subscribers devices over any number of different topologies including for example: (i) Hybrid Fiber Coaxial (HFC) network, which may include e.g., dense wave division multiplexed (DWDM) optical portions, coaxial cable portions, and other types of bearer media; (ii) satellite network (e.g., from an orbital entity to a user's STB via a satellite dish); (iii) optical fiber distribution networks such as e.g., "Fiber to the X" or FTTx (which may include for example FTTH, FTTC, FTTN, and FTTB variants thereof); (iv) Hybrid Fiber/copper or "HFCu" networks (e.g., a fiber-optic distribution network, with node or last-mile delivery being over installed POTS/PSTN phone wiring or CAT-5 cabling); (v) microwave/millimeter wave systems; etc.

Various types of content delivery services are utilized in providing content to subscribers. For example, certain content may be provided according to a broadcast schedule (aka "linear" content). Content may also be provided on-demand (such as via video on-demand or VOD, free video on-demand, near video on-demand, etc.). Content may also be provided to users from a recording device located at a user premises (such as via a DVR) or elsewhere (such as via a personal video recorder or network personal video recorder disposed at a network location) or via a "startover" paradigm, which also affords the user increased control over the playback of the content ("non-linear").

Just as different varieties of content delivery services have evolved over time, several different network architectures have also evolved for deploying these services. These architectures range from fully centralized (e.g., using one or more centralized servers to provide content to all consumers) to fully distributed (e.g., multiple copies of content distributed on servers very close to the customer premises, at the "edge" of the distribution network), as well as various other configurations. Some distribution architectures (e.g., HFC cable, HFCu, etc.) consist of optical fiber towards the "core" of the network, which is in data communication with a different medium (coaxial cable radio frequency, copper POTS/PSTN wiring) distribution networks towards the edge.

Satellite networks similarly use a radio frequency physical layer (i.e., satellite transceiver and associated settop box and satellite dish located at each of the consumer's premises) to transmit digital television and data signals.

HFCu networks utilize existing copper (e.g., POTS/PSTN or CAT-5) cabling within the premises for the "last mile"; however, one salient downside to this approach is severe bandwidth constraints (e.g., on the order of 25-30 mbps). At 25 mbps, roughly 6 mbps is allocated for Internet access, leaving the remaining 19 mbps for HD/SD video and voice (e.g., VoIP). VoIP bandwidth is effectively trivial for both upstream and downstream bandwidth, but video (especially HD quality) consumes great amounts of bandwidth. Hence, the user of an HFCu system rapidly becomes bandwidth-limited for next-generation/commonly required technologies such as HD video provided with high-speed broadband data service.

An emerging technology for broadband MAN (Metropolitan area network) content delivery is so-called "WiMAX" technology, specified in inter alia IEEE-Std. 802.16e. WiMAX offers the promise of high data rate, wireless access and content delivery to network subscribers at literally any location, fixed or mobile. This technology ostensibly provides MSOs and other service providers a flexible and high-bandwidth means of delivering content to their subscribers, and is especially well suited to both fixed and mobility applications due to its comparatively long range (much greater than WLAN technologies such as Wi-Fi), and wireless (air) interface.

While the details of how video is transported in the network can be different for each architecture, many architectures will have a transition point where the video signals are modulated, upconverted to the appropriate RF channel and sent over the coaxial segment(s), copper wiring, (or air interface) of the network. For example, content (e.g., audio, video, etc.) is provided via a plurality of downstream ("in-band") RF QAM channels over a cable or satellite network. Depending on the topology of the individual plant, the modulation and upconversion may be performed at a node, hub or a headend. In many optical networks, nodes receive optical signals which are then converted to the electrical domain via an optical networking unit (ONU) for compatibility with the end-user's telephony, networking, and other "electrical" systems.

In U.S. cable systems for example, downstream RF channels used for transmission of television programs are 6 MHz wide, and occupy a 6 MHz spectral slot between 54 MHz and 860 MHz. Within a given cable plant, all homes that are electrically connected to the same cable feed running through a neighborhood will receive the same downstream signal. For the purpose of managing services, these homes are aggregated into logical groups typically called service groups. Homes belonging to the same service group receive their services on the same set of in-band RF channels.

Cable and satellite signals are transmitted using a QAM scheme and often use MPEG (e.g., MPEG-2) audio/video compression. Hence, available payload bitrate for typical modulation rates (QAM-256) used on HFC systems is roughly 38 Mbps. A typical rate of 3.75 Mbps is used to send one video program at resolution and quality equivalent to NTSC broadcast signals (so-called "Standard Definition (SD)" television resolution). Use of MPEG-2 and QAM modulation enables carriage of 10 SD sessions on one RF channel (10×3.75=37.5 Mbps<38 Mbps). Since a typical service group consists of 4 RF channels, 40 simultaneous SD sessions can be accommodated within a service group. These numbers work out very well for many deployment scenarios, such as the following example. A typical "service area" neighborhood served by a coaxial cable drop from the cable network consists of 2000 homes, of which about two-thirds are cable subscribers, of which about one-third are digital cable subscribers, of which about 10% peak simultaneous use is expected. Hence, the bandwidth required to meet service requirements is 2000×(⅔)×(⅓)× 0.1=approximately 40 peak sessions–the exact number supported by a 4 QAM service group. Since high-definition (HD) sessions require a greater bandwidth (typically 15 Mbps), less of these sessions can be accommodated.

Broadband data carriage in such networks is often accomplished using other (typically dedicated) QAM channels. For instance, the well known DOCSIS specifications provide for high-speed data transport over such RF channels in parallel with the video content transmission on other QAMs carried on the same RF medium (i.e., coaxial cable). A cable modem is used to interface with a network counterpart (CMTS) so as to permit two-way broadband data service between the network and users within a given service group.

Out-of-band (OOB) channels (and associated protocols) may be used to deliver metadata files to a subscriber device, as well as to provide communication between the headend of the content-based network and the subscriber devices.

Other systems and methods may also be used for delivering media content to a plurality of subscribers. For example, so-called "Internet Protocol Television" or "IPTV" is a system through which services are delivered to subscribers using the architecture and networking methods of an Internet Protocol Suite over a packet-switched network infrastructure (such as e.g., the Internet and broadband Internet access networks), instead of being delivered through traditional radio frequency broadcast, satellite signal, or cable television (CATV) formats. These services may include, for example, Live TV, Video On-Demand (VOD), and Interactive TV (iTV). IPTV delivers services (including video, audio, text, graphics, data, and control signals) across an access agnostic, packet switched network that employs the IP protocol. IPTV is managed in a way so as to provide the required level of quality of service (QoS), quality of experience (QoE), security, interactivity, and reliability via intelligent terminals such as PCs, STBs, handhelds, TV, and other terminals. IPTV service is usually delivered over a complex and heavy "walled garden" network, which is carefully engineered to ensure sufficient bandwidth for delivery of vast amounts of multicast video traffic.

IPTV uses standard networking protocols for the delivery of content. This is accomplished by using consumer devices having broadband Internet connections for video streaming. Home networks based on standards such as "next generation" home network technology can be used to deliver IPTV content to subscriber devices in a home.

So-called "Internet TV", on the other hand, generally refers to transport streams sent over IP networks (normally the Internet) from outside the network (e.g., cable, HFCu, satellite, etc.) that connects to the user's premises. An Internet TV provider has no control over the final delivery, and so broadcasts on a "best effort" basis, notably without QoS requirements.

There is also a growing effort to standardize the use of the 3GPP IP Multimedia System (IMS) as an architecture for supporting IPTV services in carriers networks, in order to provide both voice and IPTV services over the same core infrastructure. IMS-based IPTV may be adapted to be compliant with the IPTV solutions specifications issued by many IPTV standards development organizations (SDOs), such as, e.g., Open IPTV Forum, ETSI-TISPAN, ITU-T, etc.

While delivery of packetized content is well known in the prior art, content delivery has to this point not been able to provide delivery of packetized (e.g., IP) media content to a subscriber devices over a content delivery network (e.g., cable television HFC, HFCu, satellite, etc.), other than over the Internet as afforded by virtue of a satellite, cable, or other such modem (i.e., "Internet TV").

Moreover, extant Internet TV and IPTV solutions (regardless of bearer medium) lack several fundamental capabilities now being demanded by users, including: (i) a high degree of personalization (i.e., adaptation to the preferences and attributes of a specific user or group of users); (ii) transportability of a given content session across different devices/locations; (iii) subscriber access to content regardless of location; and (iv) access to a broad variety of content of different types (e.g., from "managed" networks with professional content such as movies, television shows, sporting events, etc., from unmanaged networks such as the Internet/World Wide Web, and from non-professional users such as the subscriber(s) themselves). Users also want to be in control of the timing of delivery (e.g., when it starts, when it can be paused and restarted, etc.). In simple terms, next-generation users want any content they desire, delivered at any time and at any location, and on any device they choose (so-called "four-any" capability). For instance, such a user might want to be able to access a YouTube™ video on their home television set, or their favorite television program on their laptop or mobile smartphone while on the road, or even an HBO™ or Showtime™ movie offered by their service provider at a friend's house (who is not a subscriber of the same service provider), and even seamlessly transport a given content delivery session between locations and/or platforms (e.g., from the PC in the study to the TV in the living room). Such capabilities simply do not exist under the prior art, even under currently envisaged IPTV or IMS-based solutions.

Additionally, next generation subscribers also desire to integrate other functions common in their everyday lives with their access to content. For example, functions or applications such as chat, text/SMS, Twitter™, and Facebook™, as well as voice communications (e.g., cellular, PTT, and VoIP) are now ubiquitous, and in very common use on a daily basis. A given user may wish to talk to a friend on voice, chat/text, or "tweet" while also watching a movie of their favorite show, while also accessing Internet content. Current state-of-the-art requires the user to employ multiple distinct devices for these functions (e.g., a cell phone, DSTB/television, and laptop or PC).

Moreover, there is no real overlap between the "state" of one service and another; delivery of the user's television show or movie is not integrated with their telephony or other systems under the prior art approaches (e.g., the movie does not pause when they receive a phone call or a text message), thereby causing the user to at minimum be distracted, or at worst lose part of the desired content (especially if linear in nature).

Other functions associated with everyday life are also very desirable to integrate into a readily accessible, common medium or portal, such as for example an address book or telephone directory function. Instant and unified access to photos from loved ones or friends, home videos, and other such personalized content, is also highly desirable to next generation users, and not provided by current technology.

Further, the lack of an even marginally effective IPTV solution for cable, HFCu, satellite, wireless, or optical networks (i.e., one that provides even a fraction of the foregoing capabilities desired by next generation users) significantly frustrates attracting new subscribers (and keeping existing ones), since the implementation of new business models and services addressing these needs are extremely slow and severely hampered by the limitations of the underlying content/service delivery infrastructure. Such limitations on "service velocity" (i.e., the speed and ease with which new solutions and applications can be implemented and provided to prospective or existing subscribers), especially in light of the recent migration of traditional "television-watchers" to alternate forums such as Internet-based content delivery or P2P services (e.g., Hulu), exacerbate the difficulty for cable, satellite, HFCu, or other service providers to attract and keep their subscribers. Stated simply, why should one pay a service provider for content or services they can obtain for free on, e.g., the Internet, or via a low-cost movie mail-service (e.g., Netflix)?

What current and next-generation users would pay for, however, is service differentiation; i.e., what they could not get on the Internet or via a mail service. Factors that weigh into this "service differentiation" include (i) the aforementioned level of service integration and transportability (i.e., ability to provide the "four-any's", and do so in a simplified and easy-to-use service environment), (ii) the quality of delivered service (mobility and transportability are of little use when the picture/audio quality are not acceptable), (iii) the reliability and support associated with the service, (iv) the (user) cost associated with providing and maintaining the service(s); (v) the degree of personalization which can be afforded in providing the services; (vi) security considerations (i.e., are my content, personal information and privacy aspects (viewing habits, etc.) safe?); and (vii) how rapidly and seamlessly changes (e.g., service additions, subtractions, modifications) to their service package can be implemented.

As a result of the intense competition for broadband access and other services, some voice and data service providers have recently begun deploying or planning to deploy IPTV services as part of a "bundled" service offering. This is seen as a necessary evolution to retain customers, grow market share and increase the profitability of broadband services. Such bundling is to be distinguished, however, from a true integration or convergence of services as previously described. Bundling merely affords a subscriber some economy of cost and implementation by using a common service provider for what are still fundamentally disparate and heterogeneous services.

Such prior art bundled approaches are also highly vendor and implementation-specific. These vendor-specific implementations can be described as "silo" or "stovepipe" approaches, in that they are highly vertical and generally not amenable to integration or interoperability with other types of services (at least not at any fundamental level).

It also is important to note that simple bundles of services—e.g., providing voice, video and data services in a unified package with a single bill—are typically offered at a lower price than the equivalent services offered separately, resulting in a decrease in Average Revenue Per User (ARPU) to the service provider in the long term. Hence, what are needed are also ways for a service provider to increase the value of its services to generate increased ARPU, and to decrease customer "churn" (turnover) that also reduces service profitability.

Based on the foregoing, improved apparatus and methods are needed to provide content delivery and other services such as voice, SMS/text, broadband access, etc. to consumer devices according to a highly unified and converged service model. Such apparatus methods would ideally provide television content that is highly personalized and flexible as to delivery mode, location, and device, as well as interactive and converged user applications which are useful across several devices (and easily integrated with other services). These improved apparatus and methods would also facilitate a high level of "service velocity" (thereby mitigating or eliminating customer frustration at not getting "what they want, when they want it"), as well as provide significant differentiation over extant service and delivery models by, inter alia, being able to rapidly generate and implement new applications without large investments in capital or man-hours.

SUMMARY OF THE INVENTION

The present invention addresses the foregoing needs by providing improved methods and apparatus for packetized delivery of content over a network.

In a first aspect of the invention, a content delivery network is provided. In one embodiment, the network is configured to provide packetized delivery of at least video, voice and/or data to a plurality of different users using a common packet protocol transport which is agnostic to the underlying network architecture.

In one variant, the network comprises a common service layer.

In another variant, the network comprises a common control layer. The common control layer enables for example blended or cross-service control functionality, including transfer of sessions from "on-network" to "off-network", and vice versa.

In yet another variant, the delivery of at least one of said video, voice and data is performed using: (i) a session-based protocol, and (ii) sessions that are unique to each of said plurality of users. The packet protocol comprises e.g., the Internet protocol (IP), and the session based protocol comprises e.g., the Session Initiation Protocol (SIP).

In still a further variant, the network comprises a radio frequency interface (e.g., satellite or coaxial cable) being adapted to transmit said video, voice and data to said plurality of different users over the common transport using a plurality of Quadrature Amplitude Modulated (QAM) channels.

In yet a further variant, the network comprises an optical/electrical networking unit adapted to convert the video, voice and data from the optical domain to the electrical domain, and transmit the converted signals to a plurality of different users over the common transport.

In yet another variant, at least portions of the network is compliant with 3GPP IP Multimedia System (IMS) standards.

In a second aspect of the invention, a substantially aggregated network headend architecture is disclosed. In one embodiment, the architecture comprises at least one "super" headend (national level) entity which supports a plurality of regional and divisional entities for content delivery. This at least one aggregated headend obviates duplication of records, streamlines management functions, and in one variant employs a common service architecture.

In a third aspect of the invention, a client-side (e.g., premises) network architecture is disclosed. In one embodiment, the architecture comprises a multi-function, converged gateway apparatus that is configured to interface with a plurality of client devices such as DVRs, DSTBs, personal mobile or media devices (PMDs), monitors, and other converged premises devices (CPDs).

In a fourth aspect of the invention, a packet-enabled client device is disclosed. In one embodiment, the device comprises an IP-enabled digital settop box (DSTB). In another embodiment, the device comprises a WiMAX-enabled DOCSIS modem. In yet another embodiment, the device comprises a mobile wireless (e.g., WiMAX) enabled device.

In a fifth aspect of the invention, a computer readable apparatus is disclosed. In one embodiment, the apparatus comprises a storage medium having at least one computer program disposed thereon, the at least one program being adapted to perform IP packet encapsulation of video content and delivery via a transport protocol (e.g., RTP).

In a sixth aspect of the invention, a content security architecture is disclosed. In one embodiment, the architecture comprises selective use of DRM and Conditional Access technologies in conjunction with on-net and off-net packetized content delivery.

In a seventh aspect of the invention, a network server is disclosed. In one embodiment, the server comprises a computerized device adapted to: (i) initiate a unicast or multicast communications session with one or more client devices, and (ii) stream IP-packetized content using a real-time streaming protocol having QoS capability.

In an eighth aspect of the invention, a method of operating a content delivery network is disclosed. In one embodiment, the method comprises: (i) instantiating a plurality of client/server sessions; (ii) delivering requested packetized content over the sessions; and (iii) individually tailoring content delivered via each session to specific user demographics or preferences.

In a ninth aspect of the invention, a method of doing business is disclosed.

In a tenth aspect of the invention, a session management process is disclosed.

In an eleventh aspect of the invention, a user interface (UI) architecture is disclosed. In one embodiment, the UI architecture is substantially centralized and controlled/configured primarily from the network-operator side (versus the client side), thereby allowing for enhanced levels of service adaptation and personalization. The UI for a given user (or even user device) may be rapidly reconfigured by the network operator so as to reflect new or changed services, updates, personal preferences, etc.

In a twelfth aspect of the invention, a method of creating new services is disclosed. In one embodiment, the method comprises utilizing common control plane functionality to allow two or more disparate services to interface so that at least one of the services can control at least a portion of the function of another of the services when the two are utilized simultaneously.

Other features and advantages of the present disclosure will immediately be recognized by persons of ordinary skill in the art with reference to the attached drawings and detailed description of exemplary embodiments as given below.

BRIEF DESCRIPTION OF THE DRAWINGS

FIG. 4 is a functional block diagram illustrating one embodiment of a content acquisition, storage and caching system useful with the network architecture of FIGS. 3 and 3a.

FIG. 4a illustrates an exemplary media (video) encoding formats useful with the system 400 of FIG. 4.

FIG. 11 is a functional block diagram illustrating an exemplary personal mobile device for use with the present invention.

FIGS. 31-32 illustrate a first exemplary service use case according to one embodiment of the invention (IPTV Telephony and Data Services).

FIGS. 33-34 illustrate a second exemplary service use case according to another embodiment of the invention (Parental Control).

FIGS. 35-36 illustrate a third exemplary service use case according to another embodiment of the invention (Targeted Advertisements Using IMS).

FIGS. 38-41 illustrate a fifth exemplary service use case according to another embodiment of the invention (Enhanced Communication)

Figure 1:
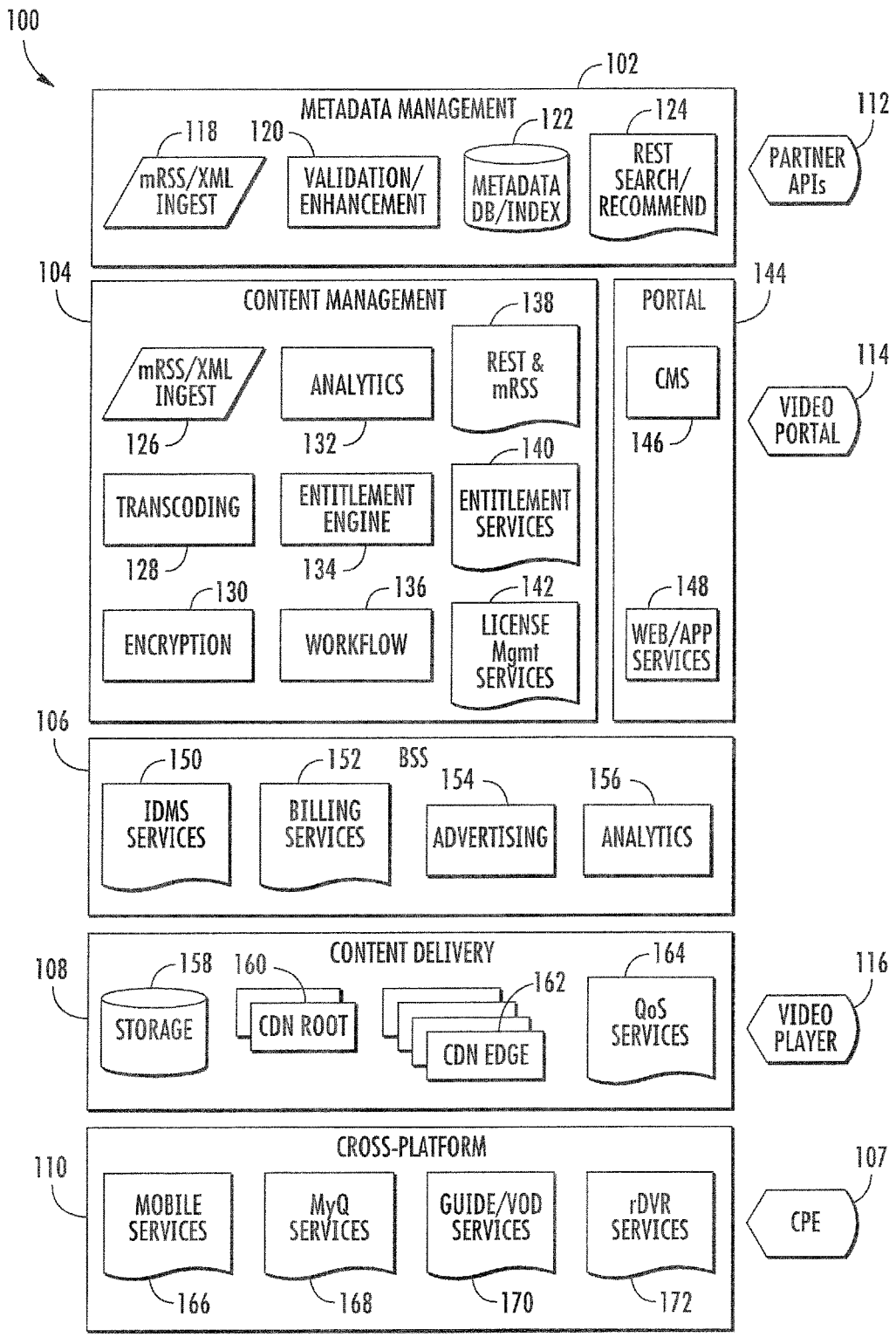
FIG. 1 is a graphical illustration of one embodiment of a generalized packet-based content delivery logical architecture according to the invention.

All Figures © Copyright 2009-2010 Time Warner Cable, Inc. All rights reserved.

DETAILED DESCRIPTION OF THE INVENTION

Reference is now made to the drawings wherein like numerals refer to like parts throughout.

As used herein, the terms "computer program", "routine," and "subroutine" are substantially synonymous, with "computer program" being used typically (but not exclusively) to describe collections or groups of the latter two elements. Such programs and routines/subroutines may be rendered in any language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™, Java Beans, and the like. In general, however, all of the aforementioned terms as used herein are meant to encompass any series of logical steps performed in a sequence to accomplish a given purpose.

As used herein, the term "headend" refers generally to a networked system controlled by an operator (e.g., an MSO or multiple systems operator) that distributes programming to MSO clientele having user or client devices. Such programming may include literally any information source/receiver including, inter alia, free-to-air TV channels, pay TV channels, interactive TV, IP TV, and the Internet.

Similarly, the term "Customer Premises Equipment (CPE)" refers to any type of electronic equipment located within or associated with a customer's or user's premises and connected to a network. The term "host device" refers generally to a terminal device that has access to digital television content via a satellite, cable, wireless or terrestrial network. The host device functionality may be integrated into a digital television (DTV) set. The term "customer premises equipment" (CPE) includes without limitation such electronic equipment such as set-top boxes (including IP-enabled DSTBs), televisions, Digital Video Recorders (DVR), gateways/gateway storage devices (Furnace), converged premises devices (CPDs), and ITV Personal Computers.

As used herein, the term "integrated circuit (IC)" refers to any type of device having any level of integration (including without limitation VLSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the terms "media feature" and "media application" refers without limitation to any application or service which delivers or transmits one or more types of media such as voice, video, audio, SMS/text, data files, or other data types to or from a user.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, wireless, or terrestrial network provider having infrastructure required to deliver services including programming, interactive services, and data over those mediums.

As used herein, the terms "network" and "bearer network" refer generally to any type of telecommunications or data network including, without limitation, hybrid fiber coax (HFC) networks, satellite networks, telco or cellular networks, and data networks (including MANS, WANs, LANs, WLANs, internets, and intranets), whether packet-switched, circuit switched, or otherwise. Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, PON/AON, IEEE Std. 802.3, ATM, TCP/IP, X.25, Frame Relay, 3GPP, 3GPP2, LTE (Long Term Evolution), UMTS, WAP, SIP, UDP, FTP, RTP/RTCP, RTSP, H.323, etc.).

As used herein, the terms "network agent" and "network entity" refers to any network entity (whether software, firmware, and/or hardware based) adapted to perform one or more specific purposes. For example, a network agent or entity may comprise a computer program running in server belonging to a network operator, which is in communication with one or more processes on a CPE or other device.

As used herein, the term "network interface" refers to any signal, data, or software interface with a component, network or process including, without limitation, those of the FireWire (e.g., FW400, FW800, etc.), USB (e.g., USB2 USB on-the-go/OTG, wireless USB), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or out-of band, cable modem, etc.), Wi-Fi (e.g., 802.11a,b,g,n), WiMAX (802.16), MWBA (802.20), PAN (802.15), Hypertext Transfer Protocol (HTTP), FibreChannel, FibreChannel over Ethernet (FCOE), internet Small Computer System Interface (iSCSI), Serial Attached SCSI (SAS), Solid-State Drive (SSD), or IrDA families, whether wireless, wireline, or optical in nature.

As used herein, the term "node" refers without limitation to any location, functional entity, or component within a network.

As used herein, the term "on-demand" or "OD" is meant to include any service that enables real, quasi-real time or even non-real time delivery of content such as audio and/or video programs at any resolution, or data. Such content may be, for example, stored or temporarily cached on a server, or streamed directly from a source, and may be in response to a user-initiated event, service profile or configuration, head-end event, or otherwise.

As used herein, the term "QAM" refers to modulation schemes used for sending signals over cable networks. Such modulation scheme might use any constellation level (e.g. QPSK, QAM-16, QAM-64, QAM-256 etc.) depending on details of a cable network. A QAM may also refer to a physical channel modulated according to the schemes.

As used herein, the term "server" may refer to any computerized component, system or entity regardless of form which is adapted to provide data, files, applications, content, or other services to one or more other devices or entities on a computer or other network.

As used herein, the term "service", "content", "program" and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video-on-demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the terms "personal mobile device" and "PMD" include, but are not limited to, cellular phones, "smartphones", media players, personal digital assistants, handheld computers, personal communicators, "SIP" phones, personal computers (PCs) and minicomputers, whether desktop, laptop, or otherwise, or literally any other device capable of receiving video, audio or data with a network.

As used herein, the term "provisioning" may refer generally to a process whereby a package, content title or other information is provided to a service (such as on-demand download service) so that the information is integrated with other functions and software modules within the service.

As used herein, the term "service group" may refer to either a group of service users (e.g. subscribers) or the resources shared by them in the form of distributed signal, only the channels used to receive the service, or otherwise treated as a single logical unit by the network for resource assignment.

As used herein, the term "storage device" may refer to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the terms "user channel" and "program channel" are all generally synonymous with the concept of a perceived stream of information. For example, a program/user channel might comprise "Channel 3" which carries the content of a given network (e.g., NBC). This is to be distinguished from a physical channel, which is used to physically carry and distribute the content, which may for example comprise one or more QAMs within a given portion of the RF spectrum of a cable system.

As used herein, the term "user interface" may refer to, without limitation, any visual, graphical, tactile, audible, sensory, or other means of providing information to and/or receiving information from a user or other entity.

As used herein, the term "Wi-Fi" refers to, without limitation, any of the variants of IEEE-Std. 802.11 or related standards including 802.11 a/b/g/n.

As used herein, the term "wireless" means any wireless signal, data, communication, or other interface which may include without limitation Wi-Fi, Bluetooth, 3G (e.g., 3GPP, 3GPP2), HSDPA/HSUPA, UMTS, LTE, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

The present invention provides, inter alia, improved apparatus and methods for content delivery (including video, voice, and broadband data) to users. In one aspect, the invention comprises a substantially session-based and packetized content delivery approach (e.g., using the well known Internet Protocol) which allows for temporal, device, and location flexibility in the delivery of the content, and transportability/migration of user sessions (i.e., the "four-anys" previously described), as well as service/content personalization (e.g., on a per-session/user basis) and blending (integration). This approach uses a common or unified delivery architecture in providing what were heretofore heterogeneous services supplied by substantially different, and often vendor-specific, networks.

Moreover, the foregoing improved apparatus and methods provide for enhanced content access, reproduction, and distribution control (via e.g., a DRM-based approach and other security and content control measures), as well as quality-of-service (QoS) guarantees which maintain high media quality and user experience, especially when compared to prior art "Internet TV" paradigms.

In one exemplary implementation, the network is based on an IMS (IP Multimedia System) which includes SIP session protocols, as well as a Service Delivery Platform (SDP). The IMS/SDP also uses a common control plane and service layer, which advantageously provide a high level of service integration, and greatly enhanced opportunities for truly "blended" content delivery and service control.

In another implementation, the network comprises both "managed" and "unmanaged" (or off-network) services, so that a network operator can utilize both its own and external infrastructure to provide content delivery to its subscribers in various locations and use cases. In one variant of this approach, network services are sent "over the top" of other provider's infrastructure, thereby making the service network substantially network-agnostic. In another variant, a cooperative approach between providers is utilized, so that features or capabilities present in one provider's network (e.g., authentication of mobile devices) can be leveraged by another provider operating in cooperation therewith.

In another aspect, the invention leverages so-called "super" headends (which provide a high degree of centralization of functions such as content storage, processing and back-office functions) to allow for more flexible delivery, as well as enhanced "service velocity". In one embodiment, the super headend makes use of substantially aggregated subscriber databases and content stores, so that the burden of maintaining databases current and consistent is greatly reduced, and content delivery is streamlined. The super headend also provides centralization of acquisition of nationally available content which allows an operator to minimize the number of places that video is acquired, and thus the number of transcoders needed to place that content into the correct format for delivery to a rendering device.

The super headend also reduces the number of servers/transcoders that need to be managed and maintained, which is advantageously less expensive and arguably more reliable than replicating the acquisition at each division, as is currently done in prior art networks.

The utilization of a super headend further enables metadata warehousing for linear broadcast (i.e., guide data) and on-demand content (i.e., catalog data). Content management and tracking, including content physical location and/or location URL management, content format management (e.g., standard-definition, high-definition, MPEG-2, MPEG-4, etc.), may also be provided via the super headend of the invention. In addition, the super headend may provide the following functionality: (i) policy and rights management warehousing, (ii) encoding/transcoding/transrating into one or more desired formats, (iii) centralization of channel maps, on-demand offerings, etc., (iv) inexpensive and efficient storage of so-called "long tail" content, and (v) centralized aggregation points for accessing third party content or other libraries.

In another aspect of the invention, a substantially network-based user interface (UI) architecture is employed which permits the network operator (or a designated proxy entity) to manage and rapidly reconfigure the UI for particular premises, subscribers (or even particular devices of that subscriber/premises), thereby greatly aiding personalization and service velocity. For example, a new service selected by a user can be reflected in that user's UI simply based on a download and installation from a network "UI" server, so that no service call or "truck roll" is needed. Moreover, the different UIs of the network operator can be adapted to different device paradigms (e.g., premises DSTB/HDTV monitor, PC, laptop, handheld mobile device, etc.), so that a common user and/or account "theme" and preference set is maintained across the different devices. This UI architecture can also leverage next-generation content display, organization, interactivity, and recommendation engine technologies, thereby providing for a richer and more subscriber-specific (personalized) media experience.

The foregoing components and methods also advantageously provide significant new opportunities for business models and increased revenue/subscriber retention, including for example blended service offerings (i.e., heretofore distinct services being highly integrated with one another both at the application layer and control plane), and unification of device hardware and software environments, including reduction of the different types of hardware/software needed to access the various services.

Detailed Description of Exemplary Embodiments

Exemplary embodiments of the apparatus and methods of the present invention are now described in detail. It will be appreciated that the general principles and features of the invention may be extended to literally any type of network and/or architecture, whether broadband, narrowband, wired or wireless, satellite or cable, optical, hybridized (e.g., HFC, HFCu, etc.) or otherwise, the following therefore being merely exemplary in nature.

It will also be appreciated that while described generally in the context of a network providing service to a customer end user domain, the present invention may be readily adapted to other types of environments including, e.g., commercial/enterprise, and government/military applications. Myriad other applications are possible.

It is further noted that while certain exemplary embodiments are described primarily in the context of 6 MHz RF modulated carriers, the present invention is applicable to literally any frequency/bandwidth, modulation type or medium access scheme, and can be implemented for example using QAM, orthogonal frequency division multiplexing (OFDM), sigma-delta modulation (SDM), time-division multiplexing (TDM), etc. For example, VOD and/or broadcast content may be delivered via an HFCu network utilizing a fiber-optic distribution network, with node or last-mile delivery being over installed POTS/PSTN phone wiring or CAT-5 cabling. Still further, networks utilizing 6 MHz RF modulated carriers within a premises, but having delivery thereto (e.g., to the premises) effected via a different mechanism such as e.g., an optical fiber distribution network, may be utilized consistent with the present invention as well.

Also, while certain aspects are described primarily in the context of the well-known IP or Internet Protocol (described in, inter alia, RFC 791 and 2460) and associated transport control protocol (TCP), it will be appreciated that the present invention may utilize other types of packetization and transport protocols to implement the described functionality.

It will further be appreciated that while the exemplary embodiments presented herein are described in the context of services that may include multicast and unicast sessions, the present invention is applicable to other types of services that include multicast transmission of data delivered over a network having multiple physical channels (or even virtual or logical channels).

I. Generalized Logical Architecture and Topology—

FIG. 1 is a graphical illustration of one embodiment of a generalized packet-based content delivery network logical architecture according to the invention. As shown in FIG. 1, the logical architecture 100 generally comprises a metadata management element or function 102, a content management function 104, a billing services and support (BSS) function 106, a content delivery function 108, and a cross-platform function 110. Interfacing with these functions respectively are various "partner" APIs 112, a video portal 114, a video player (application) 116, and CPE 107. Each of these elements is now described in greater detail.

As illustrated in FIG. 1, the metadata management function 102 comprises a metadata ingest function 118. The metadata ingested by the ingest function 118 may comprise Media RSS data (mRSS) as well as extensible markup language (XML) data. A validation/enhancement function 120 is also optionally provided. In one embodiment, the validation/enhancement function 120 of the metadata management element 102 may be used to inter alia, validate and/or enhance the data received, such as where the metadata is validated as to format, and/or enriched with additional data or functionality. The metadata is then stored at the metadata database/index 122. A Representational State Transfer (REST) search/recommendation entity 124 is also utilized at the metadata management function 102.

In one embodiment, the REST search/recommendation entity 124 may be utilized to provide state transfer capabilities between devices. The REST search/recommendation entity 124 enables a user to "book mark" content at a first device, and have the content moved to a different place in the premises and/or a different device. In other words, the state of the content at the first device is identified and transferred (e.g., as metadata) along with the content, to a second device, not necessarily via the same transport however. The second device may then begin playback of the content according to the state identified in the metadata. Other states may be transferred as well including e.g., a pause, StartOver, etc. function. The state transfer capabilities may be automatic (such as upon teardown) and/or subject to user request. The above-disclosed state transfer capabilities may be effected via a uniform user interface (present on each of the devices), and enable content state transfer across multiple, different platforms and even different networks (e.g., from "on-net" to "off-net" as described subsequently herein).

In one embodiment, the general state transfer concepts are of the type disclosed in co-owned U.S. Pat. No. 7,486,869 issued Feb. 3, 2009 and entitled "System and method for controlling a digital video recorder on a cable network", which is incorporated herein by reference in its entirety. As discussed therein, signaling associated with the answering or initiation of a digital telephone call by a digital telephone subscriber is used to issue commands to a digital video recorder (DVR). For example, a signal is generated by a first device at a first event (such as e.g., a signal is generated when a telephone enters an "off-hook" state), the signal is sent to a second device indicating the event (such as e.g., a DVR). In response to receiving the signal, the second device takes some action with respect to content (e.g., pausing or initiating a recording of the content at the DVR). A second signal received from the first device may, in one embodiment, be generated on the happening of a second event, transferred to the second device and cause a second response at the second device. The aforementioned state messages may be sent over an out-of-band channel/path between the devices.

In another embodiment, the aforementioned state transfer capabilities may be utilized to provide state transfer operations between legacy devices and IP capable devices by e.g., utilizing a VOD-based mechanism to move a state message therebetween.

The content management function 104 of the logical architecture 100 comprises a plurality of functions individual functions for managing content. As shown, a content ingest function 126 is used; the content ingest function in one embodiment is generally similar to that discussed above with respect to the metadata ingest function 118. Accordingly, the content ingest function may ingest mRSS and/or XML associated with the content. The ingested content is transcoded and encrypted at the transcoding 128 and encryption 130 functions, respectively, as required. Various analytics may also be performed at the analytics function 132, which may include e.g., analysis of content parameters or higher-level aspects.

The content management function 104 further comprises an entitlement engine 134 and entitlement services function 140 which cooperate, as discussed below, to ensure content is sent to only those devices and subscribers which are entitled to receive the content. A workflow function 136 and license management service 142 are also illustrated within the content management system 104. The content management function 104 further includes a REST and mRSS entity 138.

The content management function 104 communicates with the video portal 114 via a portal component 144 comprising a content management system (CMS) 146 and web/application services function 148.

As illustrated in FIG. 1, the BSS function 106 generally comprises an identity management apparatus (e.g., IDMS) 150 and billing services function 152. The BSS 106 further incorporates the functionality of advertising functions 154 and analytics functions 156 to support billing and service management.

At the content delivery portion 108 of the architecture 100 of FIG. 1, content may be stored at e.g., the storage entity 158. Content distribution network (CDN) functionality may be included as well, including inter alia, various CDN root functions 160 and CDN edge functions 162. Quality of service (QoS) services 164 may be employed at the content delivery portion 108 to ensure content is delivered according to pre-established priority levels for the various applications, users, and data flows, thereby guaranteeing a particular level of performance to a particular data flow.

The cross-platform functionality 110 incorporates mobile services functions 166 for communication to mobile CPE 107 or PMDs 105 and e.g., so-called "myQ" services 168. The "myQ" services of the exemplary embodiment enable a user to search for on-demand content from the user's personal computer; the searched content may be added to a queue or list. The queue is then updated at the user's CPE 107 so that the user may view the queued content. The CPE 107 receiving content via the cross-platform functionality 110 are able to access guides, such as an electronic program guide (EPG) and video on demand (VOD) services via the Guide/VOD service functionality 170. CPE 107 may also have the benefit of utilizing rDVR services via the remote DVR (rDVR) service functionality 172 of the cross-platform element 110.

Figure 2:
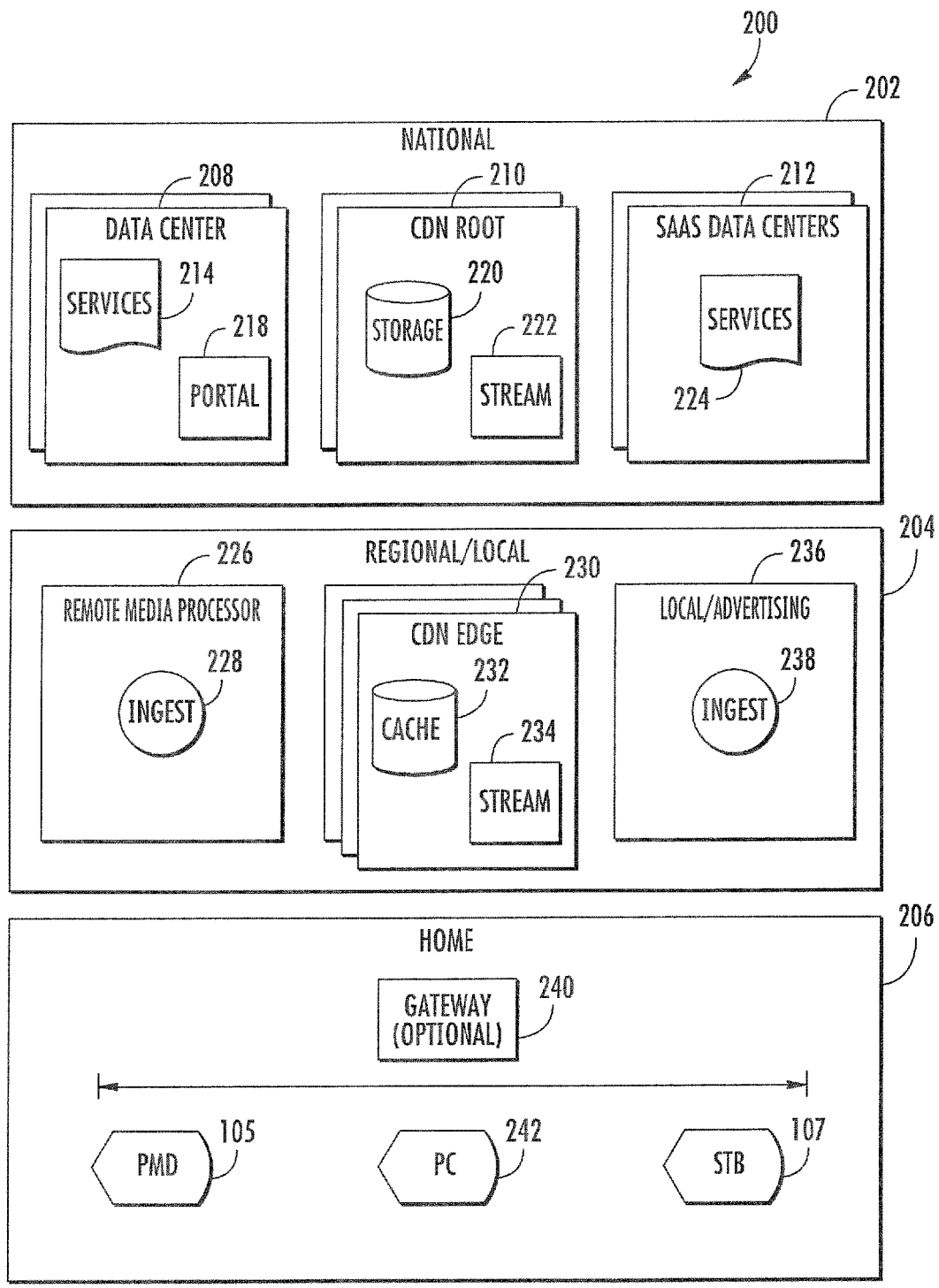
FIG. 2 is a graphical illustration of one embodiment of a generalized packet-based content delivery network topology consistent with the logical architecture of FIG. 1.

FIG. 2 is a graphical illustration of one embodiment of a generalized packet-based content delivery network topology consistent with the logical architecture of FIG. 1. Specifically, as shown in FIG. 2, the topology 200 comprises: (i) a national-level component 202; (ii) a regional/local component 204; and (iii) a premises (e.g., home, enterprise, etc.) component 206. Each of these components is now described in greater detail.

As illustrated, the national-level component generally comprises one or more data centers 208, CDN root services 210, and various software-as-a-service (SAAS) data centers 212. In one embodiment, the data centers 208 each comprise an MSO-managed data center having various services 214 and portals 218 therein.

In another embodiment, the CDN root services 210 are of the type discussed above with respect to FIG. 1 (CDN root element 160). The CDN root services 210 comprise at least one storage entity 220 and a streaming entity 222. The storage entity 220 is used to store content for delivery, via the streaming entity 222, to other entities in the network (including entities at the regional/local component 204 and/ or at the premises 206) or outside the network (as will be discussed below).

The SAAS data centers 224 each comprise in one embodiment various services or applications 224 which are licensed to customers for use as a service on demand.

At the regional/local level 204, illustrated in FIG. 2, the network 200 comprises a remote media processor 226 having at least one ingest function 228, one or more CDN edge entities 230, and a local advertising entity 236. The ingest function 228 of the remote media processor 226 may, in one embodiment, be of the type discussed above with respect to FIG. 1. For example, the ingest function 228 may ingest mRSS and/or XML content and/or metadata in a manner similar to the ingest function 118 of the metadata management component 102 and/or similar to the ingest function 126 of the content management component 104.

The CDN edge entities 230 may also be of the type discussed above with respect to the content delivery function 108 of FIG. 1. Each of the CDN edge entities 230 comprises a data cache 232 for temporarily storing frequently accessed data in order to accommodate rapid access thereof. A streaming, entity 234 is also provided at the CDN edge entities 230 for streaming cached data to other entities.

The local advertising entity 236 also comprises an ingest function 238 for collecting advertisement data and content for eventual presentation to a user. In one embodiment, the ingest function 238 of the advertising entity 236 may be of the type discussed above with respect to FIG. 1; i.e., the ingest function 238 may ingest mRSS and/or XML content and/or metadata in a manner similar to the ingest function 118 of the metadata management component 102 (and/or similar to the ingest function 126 of the content management component 104).

At the premises 206, various user devices, or CPE 107, are present. As will be discussed in greater detail below, the present invention is aimed at providing services to a broad variety of types of CPE 107 including without limitation, e.g., personal mobile devices (PMD) 105, personal (or laptop) computers 242, and set top boxes (STB) 244. In one embodiment, content and data may be transmitted to the various CPE devices 107 of a user premises via a gateway device 240. The gateway device 240 will be discussed in greater detail below.

Figure 3:
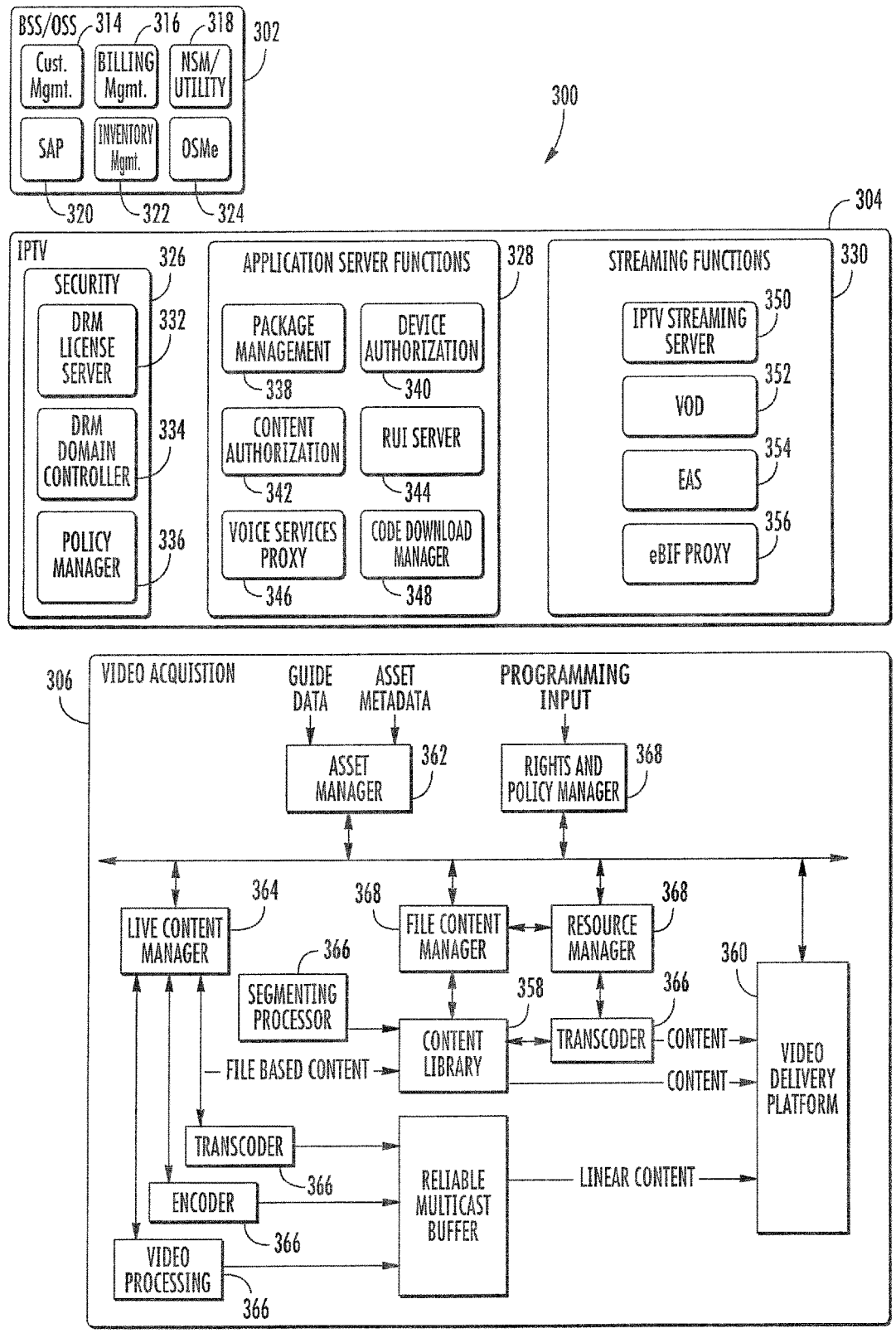
FIG. 3 is a graphical representation of one exemplary implementation (reference architecture) of the logical architecture and topology of FIGS. 1 and 2.
Figure 3:
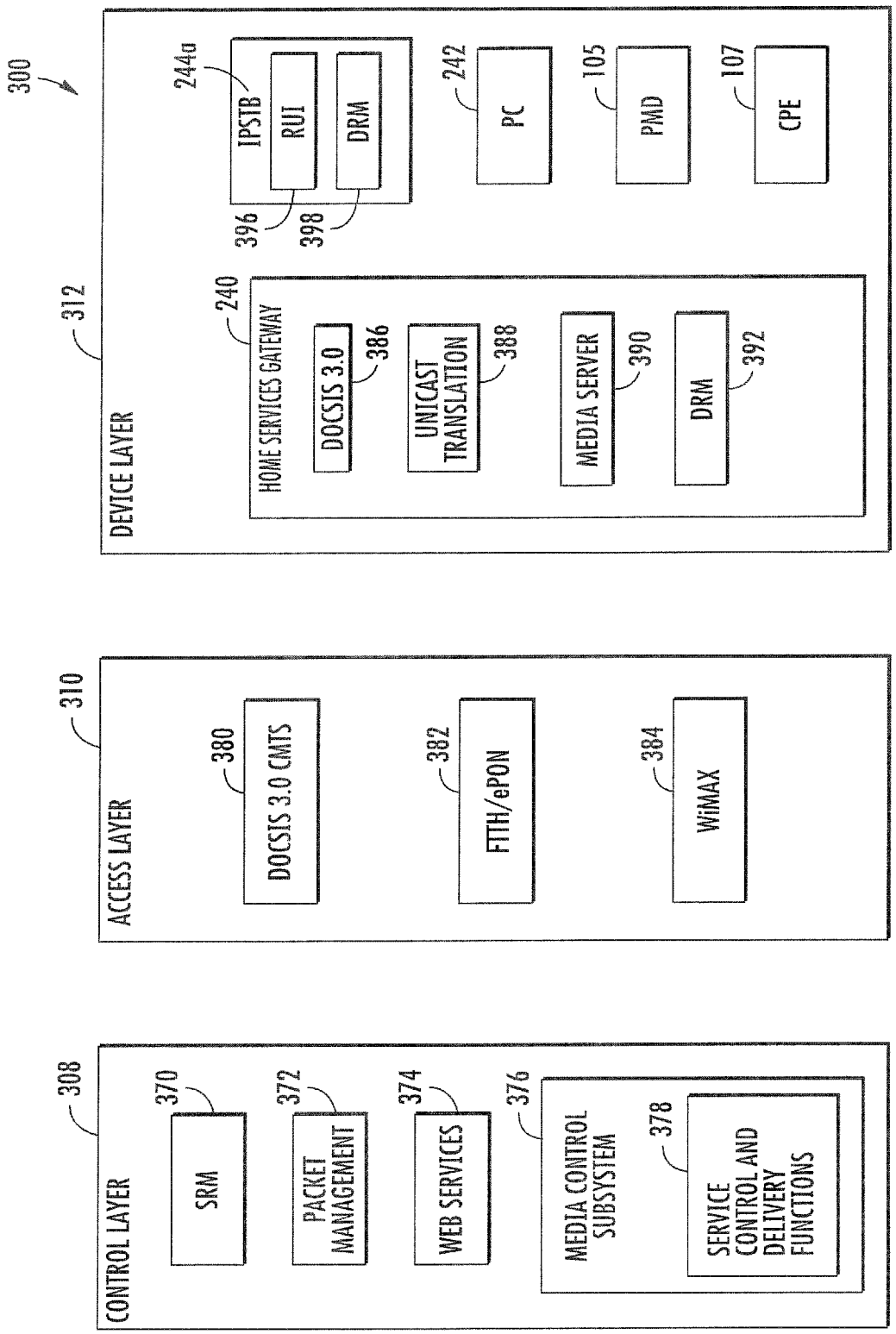

FIG. 3 is a graphical representation of one exemplary implementation (reference architecture) of the logical architecture and topology of FIGS. 1 and 2. The reference architecture 300 of FIG. 3 can be thought of as one more detailed implementation of the more general architecture and topology of FIGS. 1 and 2 respectively, and hence it will be appreciated that the architecture 300 of FIG. 3 (and in fact that 350 of FIG. 3a discussed below) is but one possible way of realizing the functionality reflected in FIGS. 1 and 2.

The BSS/OSS element 302 of FIG. 3 generally comprises a plurality of management entities. A customer management entity 314 is illustrated; the customer management entity 314 facilitates customer interactions. For example, the customer management entity may assist in employee training, so as to ensure quality in handling incoming customer phone calls and email. Information collected by the customer management entity 314 may also be used for promotion, and surveys such as those polling customer satisfaction. In one embodiment, the customer management entity 314 comprises a customer relationship management (CRM) entity (e.g., of the type manufactured by Siebel systems (now Oracle Corporation) and discussed in International Data Corporation (IDC) publication entitled "Oracle Vertical CRM Applications: Realizing Business Benefit Through Industry Best Practices", published March 2008, and incorporated herein by reference in its entirety), although other types of processes may be used as well consistent with the invention.

A billing management entity 316 may also be utilized in conjunction with the present invention. In one embodiment, the billing management entity 316 may comprise a billing and revenue management (BRM) entity, such as that manufactured by Oracle Corporation and discussed in Oracle data sheet entitled "Oracle Communications Billing And Revenue Management Release 7.4 Data Sheet", which is incorporated herein by reference in its entirety.

The network and systems management (NSM)/utility entity 318 of FIG. 3 manages the various system components to ensure the availability and performance of various processes effected thereby. The NSM 318 manages the various network elements, including equipment provisioning within the network. In one embodiment the NSM/utility entity 318 may also consolidate and automate event management across physical and virtual infrastructures. For example, the NSM/utility entity 318 may comprise the suite of network and computer management software, such as that manufactured by Computer Associates (CA) and discussed in "Technology: Brief: Ca Nsm: Unified Messaging Environment: Managing Microsoft® Environments with CA Systems Management Technology" published in 2008, and incorporated herein by reference in its entirety, although other approaches may be used with equal success.

A service activation program (SAP) entity 320 may also be provided at the BSS/OSS element 302. In one embodiment the SAP 320 may comprise an automatic SAP (ASAP) of the type manufactured by Oracle Corporation. An inventory management entity 322 may also be utilized in the present invention to provide management of the content and advertising inventory. The inventory management entity 322 of FIG. 3 may, in one embodiment, comprise a unified inventory management (UIM) entity of the type manufactured by Oracle Corporation and described in Oracle Publication entitled "Enabling OSS Transformation with Data Federation" published in April 2009 and incorporated herein by reference in its entirety.

The BSS/OSS component 302 illustrated in FIG. 3 further comprises an order management (OSMe) entity 324 which, inter alia, manages customer orders.

The illustrated IPTV component 304 of the architecture 300 of FIG. 3 comprises, inter alia, security functions 326, application server functions 328 and streaming functions 330.

The security functions 326 of the IPTV component 304 include a digital rights management (DRM) license server 332 and DRM domain controller 334. The DRM license server 332 and DRM domain controller 334 may be of the type utilized in current distribution networks. For example, Windows Media Player DRM version 10, 11, and 12 (and subsequent versions), Adobe/McAfee DRM, and/or Sony Ericsson DRM, FairPlay, PlayReady, Open Mobile Alliance (OMA) DRM, etc. Also provided at the security functions 326 of the IPTV component 304 is a policy manager 336.

The application server functions 328 illustrated in FIG. 3 include a package management function 338, a device authorization function 340, a content authorization function 342, and a remote user interface (RUI) server 344. In one embodiment, the RUI server 344 may comprise a Web4CE (CEA 2014) for UPnP Remote UI disclosed in Consumer Electronics Association (CEA) document number CEA-2014-A entitled "Web-based Protocol and Framework for Remote User Interface on UNP Networks and the Internet (Web4CE)" published July 2007 and incorporated herein by reference in its entirety; although others may be used with equal success. The application server functions 328 may further include a voice services proxy 346 and a code download manager 348.

The streaming functions 330 of the IPTV component 304 may include an IPTV streaming server function 350 for streaming content and data to CPE 107/PMD 105, and a VOD server 352 for providing VOD content. An emergency alert system (EAS) server function 354 may also be utilized. The EAS server function 354 may be utilized to provide emergency alert data to CPE 107.

An Enhanced TV Binary Interchange Format (eBIF) proxy function 356 may also be given for enabling eBIF applications at the CPE 107/PMD 105. In one embodiment, the eBIF proxy may be utilized in conjunction with the methods and apparatus discussed in co-owned U.S. patent application Ser. No. 12/582,653 filed on Oct. 20, 2009 and entitled "METHODS AND APPARATUS FOR ENABLING MEDIA FUNCTIONALITY IN A CONTENT-BASED NETWORK", and issued as U.S. Pat. No. 8,396,055 on Mar. 12, 2013, which is incorporated herein by reference in its entirety. As discussed therein, methods and apparatus for providing interactive media features or applications in a communications network are given. In one embodiment, the invention provides an integrated premises media delivery system which advantageously enhances the user's convenience and experience in interacting with a variety of different applications such as VoIP phone service, instant messaging service(s), email, calendaring or scheduling services, search engines, address books or other information repositories, etc.

In one particular implementation of the invention, various of the foregoing interactive "media" applications are disposed at one or more headend entities; also provided is a servlet application (such as one resident on the given eBIF proxy function 356) which facilitates communication between the various applications and one or more client applications resident on the user's premises system. Alternatively, a gateway device may be utilized. In this manner, a subscriber using his/her premises or client device may access and interact with various ones of the applications in an integrated fashion. The data and/or content is then processed as required and, via the servlet, delivered to one or more client devices. For example, the content may be de-encapsulated from a first container format, and re-encapsulated into a second format for delivery to the client device. The content may also optionally be transcoded and/or transrated if desired.

The exemplary interactive media applications useful with the present invention may include, inter alia: (i) a search application (which enables a user to search the Internet for data relating to displayed program or advertising content), (ii) a real-time web-based micro-blogging application (which enables a user to post, view and navigate micro-blogs from the user's CPE simultaneously with viewing programming and advertising content), and (iii) a so-called "request for information" or RFI application (which enables the user to select to receive additional information about a product or service).

The video acquisition element 306 of the architecture 300 of FIG. 3 generally comprises a content library 358 and video delivery platform 360. On demand and linear broadcast assets are received at the asset manager 362 and live content manager 364, respectively. The received content is then processed via one or more transcoders, encoders, and processing elements 366 (including e.g., a segmenting processor, which will be discussed in greater detail below). A portion of the processed content is stored at the content library 358 and provided to the users via the delivery platform 360. Linear broadcast content may, alternatively or simultaneously, be provided to the users directly (i.e., not from the library 358). Various management entities 368 may also be given for managing the delivery of content and other functions of the components of the video acquisition component 306.

The control layer 308 of the reference architecture of FIG. 3 generally comprises a session resource manager (SRM) process 370, a packet management process 372, and a web services entity 374. The packet management processes 372 is utilized to, inter alia, reserve bandwidth or set QoS parameters (e.g., minimums or guarantees) for the delivery of some packets that make up a session. The packet management process 372 may be used to reserve bandwidth for e.g., voice calls. The packet management process 372 may further be used to query the CMTS to determine whether there is enough bandwidth to allow a video stream to be delivered through the CMTS. In one embodiment, the packet management process 372 comprises a PacketCable™ Multimedia implementation of the type discussed in Packet-Cable™ Specification entitled "Multimedia Specification" (document number PKT-SP-MM-I04-080522 and released May 22, 2008), which is incorporated herein by reference in its entirety, although other approaches may be used with equal success.

The control layer 308 further comprises a media control subsystem 376 which utilizes a plurality of service control and delivery functions 378 for the provision of content to user CPE 107 and PMD 105. As described below with respect to FIGS. 12-30, this control subsystem 376 may in one embodiment comprise an IP Media System (IMS).

The access layer 310 of the reference architecture of FIG. 3 comprises at least a Data Over Cable Service Interface Specification (DOCSIS) 3.0 cable modem termination system element 380. DOCSIS 3.0 is discussed in Cable Television Laboratories, Inc. publication number CM-SP-OS-SIv3.0-I10-091002 entitled "Data-Over-Cable Service Interface Specifications (DOCSIS) 3.0: Operations Support System Interface Specification" dated Oct. 2, 2009, incorporated herein by reference in its entirety. Fiber-to-the-"X" (FTTx)/Ethernet passive optical network (ePON) capabilities are also given at the access layer 310. In another embodiment, the access layer 310 may utilize WiMAX content delivery functions.

At the device layer 312, a home services gateway device element 240 is provided. The gateway device itself 240 may comprise various components for providing content to other devices in a home network. Exemplary variations of gateway devices 240 will be discussed in greater detail below with respect to FIGS. 8-9.

In the illustrated embodiment, the gateway element 240 of the reference architecture comprises DOCSIS 3.0 capability 386 (as discussed in previously incorporated publication number CM-SP-OSSIv3.0-I10-091002, and in publication number CM-SP-CMCIv3.0-I01-080320 entitled "Data-Over-Cable Service Interface Specifications: Cable Modem to Customer Premise Equipment Interface Specification" dated Mar. 20, 2008 which is also incorporated herein by reference in its entirety). The gateway device 240 further comprises unicast translation capability 388. The unicast translation capability 388 of the gateway 240 is, in one embodiment, utilized to convert a multicast containing video into unicast within a premises. In this manner, the video is precluded from being transmitted through every network in the premises (such as e.g., MoCA, wireless, Ethernet, etc.). The unicast translation capability 388 may be further utilized to simplify network address translation (such as for Internet protocol prior to IPv6).

Still further, the exemplary gateway device 240 may comprise media server functionality 390. In one embodiment, the media server functionality 390 may be rendered by a DLNA (Digital Living Network Alliance)-compliant digital media server (DMS) function as discussed in DLNA Interoperability Guidelines, version 1.5, published March 2006 (expanded October 2006), which is incorporated herein by reference in its entirety.

The gateway device 240 may also implement one or more DRM capabilities 392. As discussed above, the DRM capabilities may comprise any one of the currently available technologies. Alternatively, or in conjunction with the aforementioned DRM capabilities 392, a Digital Transmission Licensing Administrator (DTLA) digital transmission content protection (DTCP) over internet protocol (IP) capability, as discussed in "Digital Transmission Content Protection Specification: Volume 1 (Informational Version)" dated Oct. 1, 2007 (which is incorporated herein by reference in its entirety), may be provided.

It will be appreciated that other components may be utilized within the gateway device 240, the foregoing being merely illustrative.

Also illustrated at the device layer 312 is an IP-capable DSTB element 244a. The IP STB element 244a may comprise remote user interface (RUI) functionality 396. In one embodiment, the RUI functionality 396 may include a Web4CE (CEA 2014) for UPnP RUI as disclosed in previously incorporated CEA document number CEA-2014-A entitled "Web-based Protocol and Framework for Remote User Interface on UPnP Networks and the Internet (Web4CE)". The IP STB 244a may also incorporate DRM functionality 398 as discussed above.

The device layer 312 may further comprise a PC 242 (or laptop, netbook, or other computer device) element, PMD element 105, and/or other CPE 107.

Figure 3A:
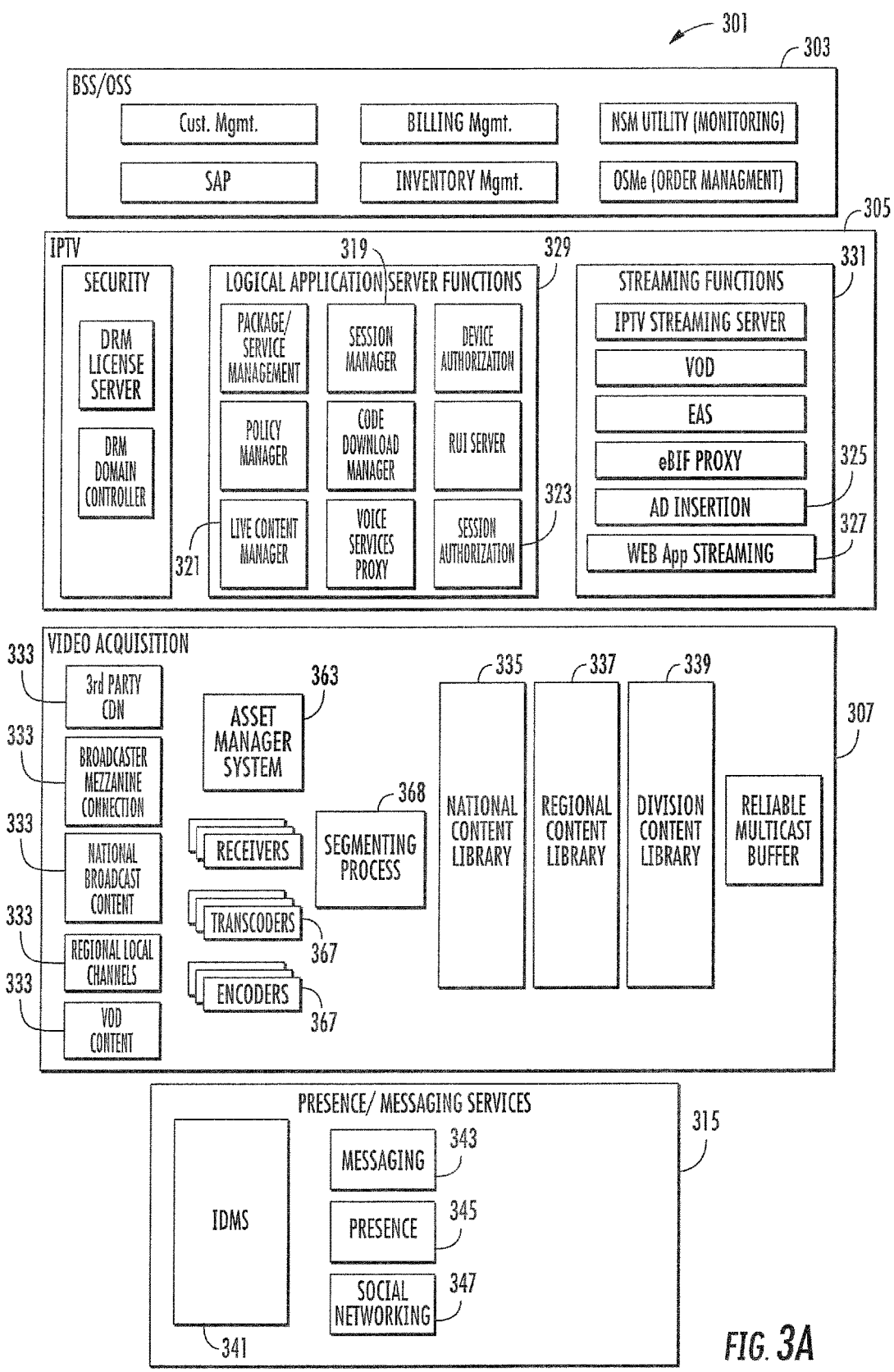
FIG. 3a is a graphical representation of a second exemplary implementation (reference architecture) of the logical architecture and topology of FIGS. 1 and 2.
Figure 3A:
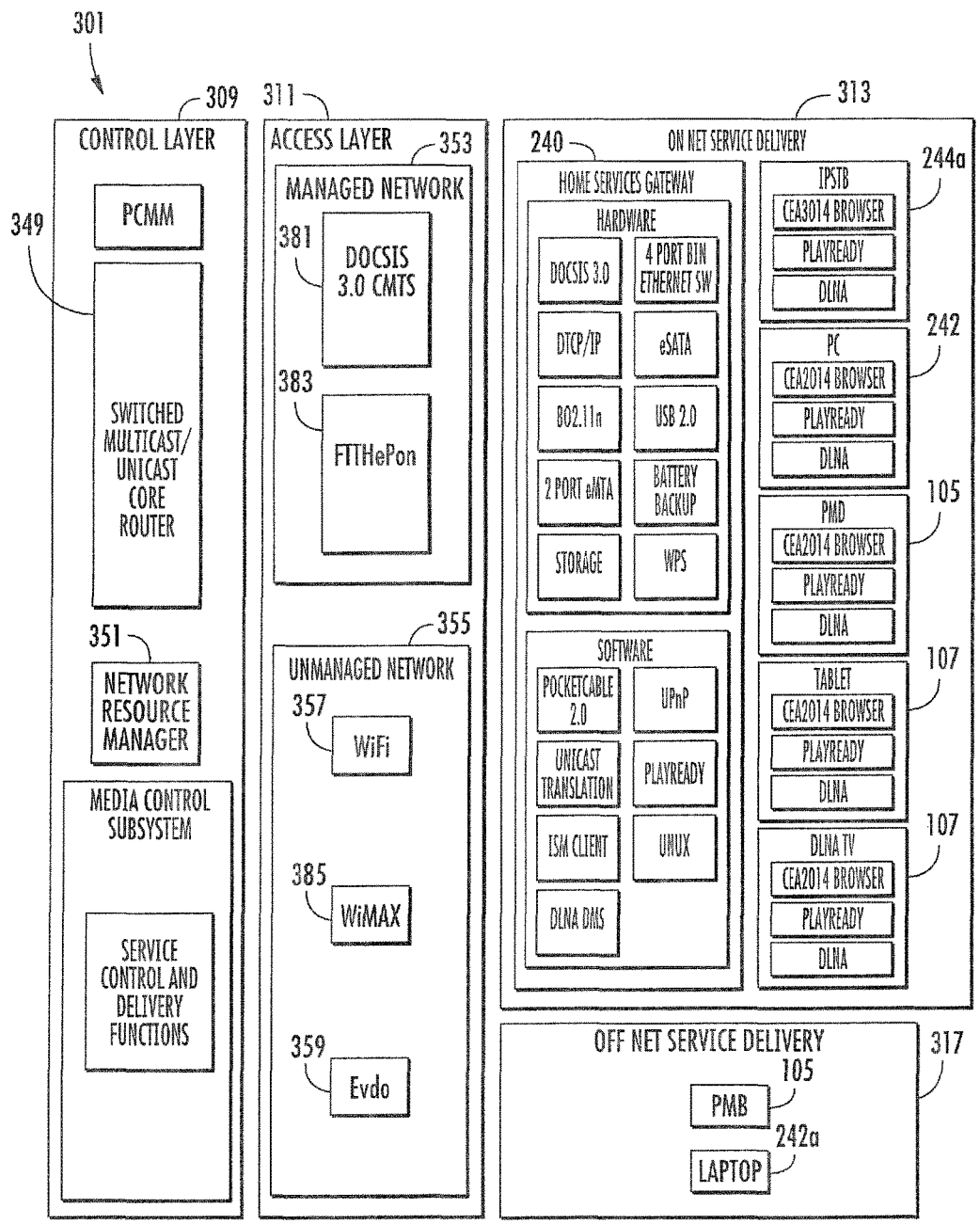

FIG. 3a is a graphical representation of a second exemplary implementation (reference architecture) of the logical architecture and topology of FIGS. 1 and 2. As shown in FIG. 3a, this embodiment of the reference architecture 350 comprises several functional elements which are similar to those discussed above with respect to FIG. 3a. For example, the architecture 301 of FIG. 3a comprises: (i) a BSS/OSS element 303; (ii) an IPTV element 305; (iii) a video acquisition element 307; (iv) a control layer element 309; (v) an access or physical layer element 311; and (vi) an "on-net (work)" management (or device layer) element 313.

It will be noted that in one embodiment, the components of the embodiment of FIG. 3 described above, where similar to those of FIG. 3a may be used interchangeably with those of the embodiment of FIG. 3a.

The architecture of FIG. 3a also comprises various elements and entities not discussed above with respect to FIG. 3. Each of these will now be discussed in turn.

At the IPTV layer 305 of the embodiment of FIG. 3a, the application server functions 329 include a session manager 319, live content manager 321 and a session authorization entity 323. The streaming functions 331 at the IPVT layer 305 also include an advertisement insertion entity 325 and a web application streaming entity 327. In one embodiment, the web application streaming entity 327 may comprise e.g., the Microsoft™ Silverlight product, although others may be used with equal success.

The video acquisition layer 307 of the embodiment of FIG. 3a includes a plurality of content sources 333. Content is received from the various sources 333, and processed via one or more processing elements (including e.g., encoders, transcoders and segmenting processors) 367. The processed content may then be stored at one or more of a national content library 335, a regional content library 337 and/or a division content library 339 prior to being transmitted to a client device 107 or PMD, as discussed in greater detail below with respect to FIGS. 6-6e.

The architecture 301 of FIG. 3a further comprises a "presence"/messaging services element 315. The presence/messaging services element 315 comprises an identity management system (IDMS) 341, which may be similar to that discussed above with respect to FIG. 1 (i.e., IDMS 150). The presence/messaging services element 315 further comprises messaging 343, presence 345, and social networking 347 functionalities. The messaging functionality 343 enables SMS text and/or instant messaging; the presence functionality 345 enables monitoring of a user's activity for e.g., reporting to "friends" of the user; social networking functionality 347 allows a user to interact with various social networking applications. Each of the foregoing functionalities 343, 345, 347 will be discussed in greater detail below.

At the control layer 309, the embodiment of FIG. 3a further includes a switched multicast/unicast core router 349 and a network resource manager 351.

At the access layer 311, the embodiment of FIG. 3a segregates "managed" data networks 353 (e.g., those operated or controlled by the MSO or a proxy) from "unmanaged" networks 355 (those not qualifying as "managed"). The managed data networks 353 include DOCSIS 3.0 CMTS capabilities 381, as well as FTTH/ePON capabilities 383. The unmanaged data networks 355 include e.g., Wi-Fi capability 357, WiMAX capability 385, and Evolution-Data Optimized or Evolution-Data only (EVDO) capabilities 359. EVDO refers to the telecommunications standard for wireless transmission of data through radio signals, typically for broadband Internet access. EVDO uses code division multiple access (CDMA) as well as time division multiple access (TDMA) access to maximize both individual user's throughput and the overall system throughput. In one embodiment, EVDO capabilities 359 conform to the 3rd Generation Partnership Project 2 (3GPP2) as part of the CDMA2000 family of standards as discussed in 3GPP2 document number 3GPP2 SC.R2003-002-0 dated Jan. 15, 2004 and entitled "System Release Guide for the Release of the cdma2000 System Specifications" which is incorporated herein by reference in its entirety.

The "on-net" service delivery layer 313 refers generally to the device layer 312 of the embodiment of FIG. 3. As illustrated therein, a gateway device 240, IP STB 244a, PC 242, PMD 105 and additional CPE 107 (including e.g., a tablet and DLNA compliant television) are given.

The architecture 301 of FIG. 3a further comprises an "off-net(work)" management element 317. The "off-net (work)" management element 317 enables content to be accessed by devices which are not part of the network (e.g., are "off-net"). For example, content may be received at a PMD 105 and/or laptop computer 242a.

II. Content Acquisition, Storage, and Caching System (CASCS)—

Figure 4:
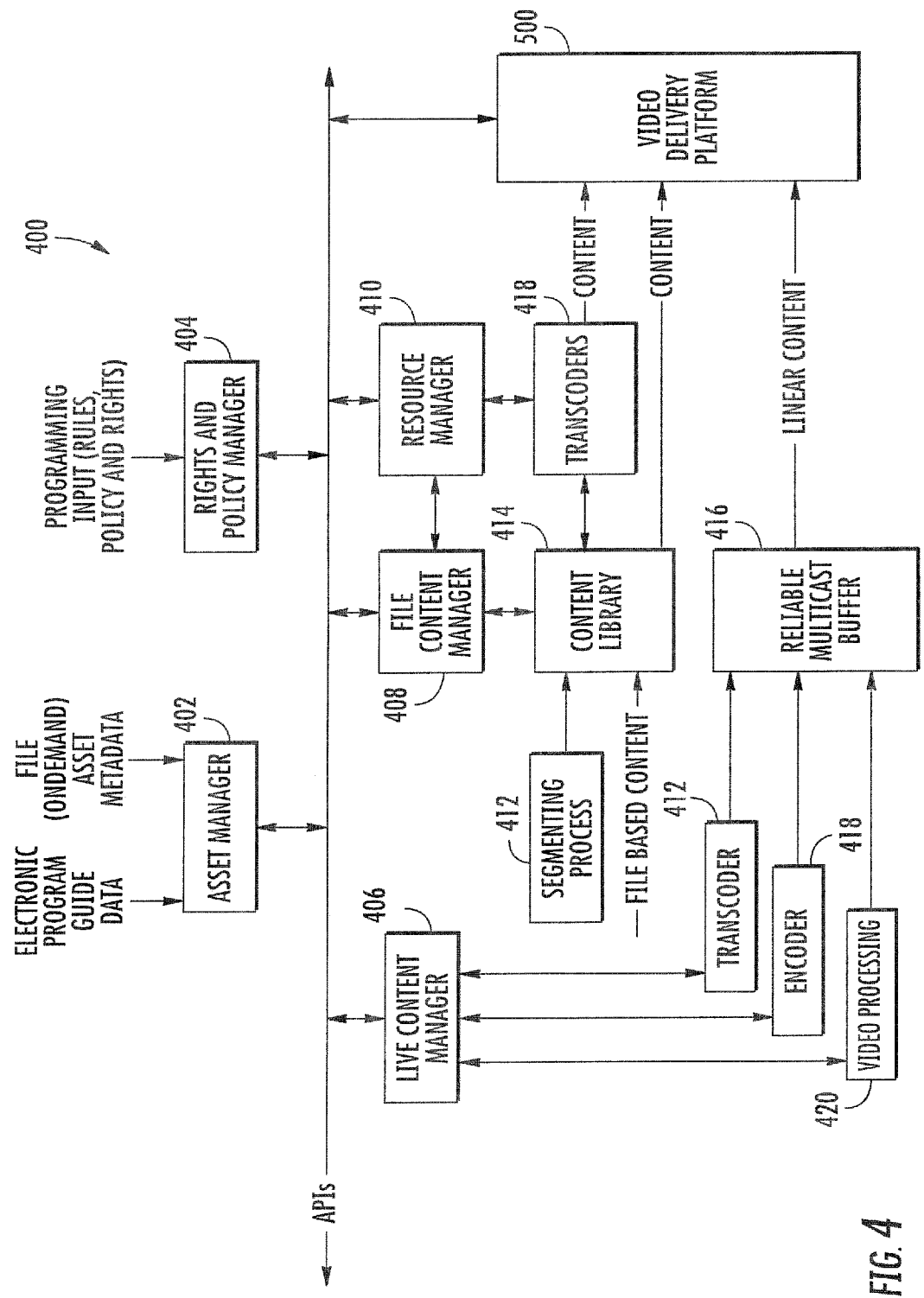

Referring now to FIG. 4, one embodiment of a content acquisition, storage and caching system (CASCS) according to the invention is described.

In one aspect, the CASCS of the embodiment of FIG. 4 provides a centralized content acquisition, storage, and caching system disposed in one or more physical locations for linear and file based assets. It employs inter alia: (i) a single video staging and storage architecture for multiple video delivery platforms, (ii) publishable APIs, and (iii) standardized transport mechanisms. The system also supports legacy ISA video systems, as well as other video delivery platforms (such as web, mobile, etc).

The system of FIG. 4 may further provide asset metadata warehousing for linear broadcast and on-demand content, content management and tracking, policy and rights management warehousing, encoding and transcoding, centralization of channel maps, on-demand offerings, etc., efficient long tail content storage, and centralized aggregation points for accessing third party libraries.

The system of FIG. 4 provides the ability to transcode video at different locations, thereby minimizing transcoding capital expenditures (CAPEX) and operating expenditures (OPEX). It also functions as a centralized location and "warehouse" for: (i) asset metadata, including VOD catalog metadata and channel guide data; (ii) rights and operational/ business policy rules, as they apply to assets and content (e.g., content availability by platform, content formats, etc.); (iii) a media library (providing e.g., linear broadcast origination, on-demand content, advertising/promotional content, and other media files).

In one embodiment, the CASCS may comprise similar components to those discussed above with respect to the video acquisition element 306 of the reference architecture of FIG. 3 (and/or the video acquisition element 307 of the embodiment of FIG. 3a).

As shown in FIG. 4, the CASCS 400 comprises various management entities including, inter alia, (i) an asset manager component 402 (which may comprise e.g., the asset manager 362 of FIG. 3); (ii) a rights and policy manager component 404; (iii) a live content manager 406 (which may comprise e.g., the live content manager 364 of FIG. 3); (iv) a file content manager 408, and a (v) resource manager 410. The management entities 402, 404, 406, 408, 410 manage content processing, storage and distribution. For example, the asset manger 402 manages electronic program guide data and on-demand asset metadata. The electronic program guide data may include linear broadcast asset metadata which is used to populate a guide (such as an electronic program guide). In one embodiment, the electronic program guide data may be provided by one or more server entities such as e.g., those associated with Tribune Media Services (TMS), Inc. The rights and policy manager manages content delivery, storage and processing according to programming input (rules policy and rights inputted by an MSO entity).

Received content is processed via one or more transcoders and/or encoders 418 prior to being streamed to a user via the media (e.g., video) delivery platform 500 (see discussion of FIG. 5 below). Live content, for example, is retrieved processed at e.g., transcoders/encoders 418 and video processors 420 and transmitted to a reliable multicast buffer 416. The content may then be sent to the media delivery platform 500 for eventual presentation to a user. Content may also be stored at one or more content libraries 414 (which may be similar to the content library 358 of FIG. 3 and/or libraries 335, 337, 339 of FIG. 3a), and sent to the media delivery platform 500 therefrom. In one embodiment, content is processed using a segmenting processor 412 prior to storage at the content libraries 414. In one embodiment, the segmenting 412 prepares content for transmission and/or segmenting by processing through various staging processes, or software applications adapted to run on the digital processor associated with the segmenting processor 412, as discussed in greater detail subsequently herein.

FIG. 4a illustrates an exemplary media (video) encoding formats useful with the system 400 of FIG. 4.

III. Media Delivery Platform (MDP)—

Figure 5:
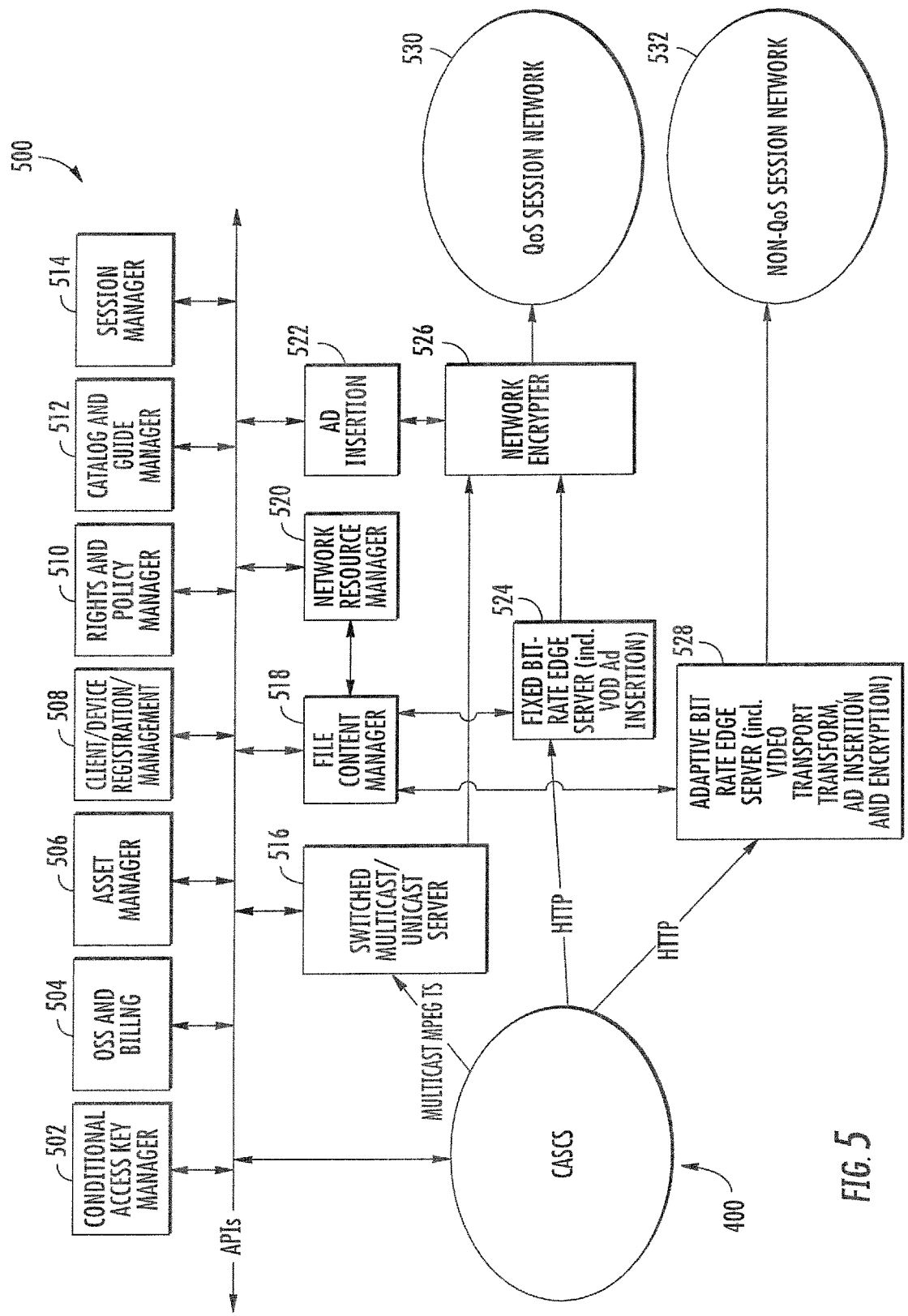
FIG. 5 is a functional block diagram illustrating one embodiment of a media (e.g., video) delivery platform useful with the with the network architecture of FIGS. 3 and 3a, and the content acquisition, storage and caching system of FIG. 4.

Referring now to FIG. 5, one embodiment of a media delivery platform useful within various aspects of the present invention is described in detail.

The media delivery platform of FIG. 5 comprises a purposely modular and scalable video delivery system that can access and receive content from one or more national-level content distribution centers or networks (see discussion of FIGS. 6-6e below). Salient functions and features of the exemplary media (e.g., video) delivery system of FIG. 5 include: (i) client device (e.g., CPE, PMD, gateway) registration and management; (ii) conditional access/encryption/ DRM; (iii) multi-network and client capability; (iv) video rate adaptation (e.g., for non-QoS sessions); (v) video transport adaptation; (vi) web-based capability/server side navigation functions; (vii) edge advertisement insertion capability (including linear and dynamic/appendable playlists); (viii) compliance to the national-level content distribution network (CDN) APIs and transport modalities; (ix) support of current and incipient FCC requirements (where applicable); and (x) client (user) and device-specific metadata transformation.

The media delivery platform may further include a video "chunking" function as used by e.g., Microsoft® Smooth Streaming, Apple® Adaptive Streaming, etc.

The architecture of FIG. 5 is also purposely configured to be flexible in its delivery of media (e.g., video) across any type of network including for example HFC/HFCu, QoS-enabled IP (e.g., IPTV "walled garden" or other architecture which maintains QoS, such as via use of RTP/RTCP), and non-QoS IP-based (such as the Internet). Moreover, the streaming elements of the architecture are enabled for multiple well known and ubiquitous protocols including e.g., SSP/LSCP, RTSP, HTTP, etc.

The use of "open" APIs within the architecture of FIG. 5 also advantageously allows third parties to readily engage in meaningful application development, content delivery and alternate navigation systems (as opposed to use of closed or proprietary interfaces).

As shown in FIG. 5, the platform 500 comprises, inter alia, (i) a switched multicast/unicast server 516, (ii) a fixed bitrate edge server 524, and (iii) an adaptive bitrate edge server 528.

Multicast content (sent on an MPEG transport stream) transmitted from the CASCS 400 is sent to the switched multicast/unicast server 516. In one embodiment, the switched multicast/unicast server 516 may comprise the switched multicast/unicast core router 349 previously discussed with respect to FIG. 3a. Content received at the switched multicast/unicast server 516 is transmitted to a network encrypter 526 for eventual delivery to users via a QoS session network 530.

Hypertext Transfer Protocol (HTTP) content is sent to both the fixed bitrate edge server 524 and the adaptive bitrate edge server 528. At the fixed bitrate edge server 524, content is sent to the network encrypter 526 for delivery to user devices (e.g., CPE 107, PMD 105) via a QoS session network 530. Content delivery and processing is managed via the file content manager 518 and network resource manager 520. In one embodiment, the file content manager 518 comprises the content manager 408 of FIG. 4, and the network resource manager comprises the resource managers 351 and 410, previously discussed at FIGS. 3a and 4, respectively.

Prior to encryption at the network encrypter 526, advertisements may be inserted into the stream via an advertisement insertion entity 522 (which may be for example the advertisement insertion entity 325 of FIG. 3a).

The adaptive bitrate edge server 528 may deliver content to a non-QoS session network 532 for delivery to additional user devices (e.g., CPE 107 and PMD 105).

Various additional management entities are utilized in the architecture of FIG. 5 for the management of content delivery, processing, etc. For example, a conditional access key manager 502, an OSS and billing manager 504, and an asset manager 506 (which may embody the functions of the asset managers 362 and/or 402 of FIGS. 3 and 4, respectively) may be in communication with the aforementioned switched multicast/unicast server 516, fixed bitrate edge server 524, and adaptive bitrate edge server 528.

Also shown are client/device registration management entities 508, and rights and policy managers 510. The rights policy manager may embody the functions of the policy manager 336 and/or 402 discussed above with respect to FIGS. 3 and 4. A catalog and guide manager 512 and session manager 514 (which may comprise the session manager 319 function of FIG. 3) may also be utilized to manage the functioning of the aforementioned switched multicast/unicast server 516, fixed bitrate edge server 524, and adaptive bitrate edge server 528.

IV. National Network Architecture—

Figure 6:
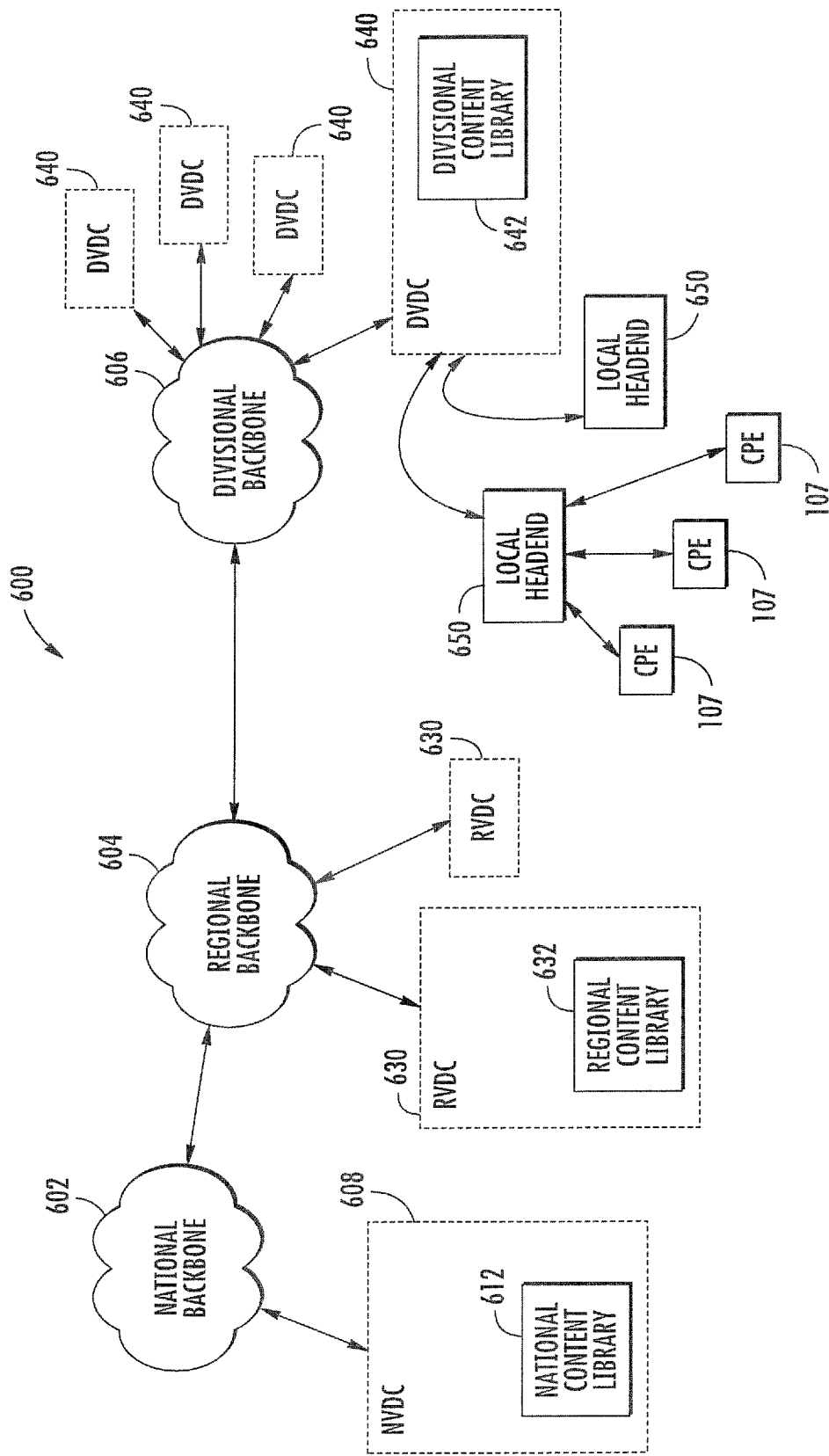
FIG. 6 is a functional block diagram illustrating a simplified network architecture for providing IP and video content to consumer devices.

Referring now to FIG. 6, a high-level representation of one embodiment of a national network architecture useful with the present invention is given. This architecture leverages one or more so-called "super" headends (which provide a high degree of centralization of functions such as content storage, processing and back-office functions) to allow for more flexible delivery. In one embodiment, the super headend makes use of substantially aggregated subscriber databases and content stores, so that the burden of maintaining databases current and consistent is greatly reduced, and content delivery is streamlined.

As shown, the national network 600 generally comprises a national "backbone" network component 602, a regional backbone network component 604, and a divisional backbone network component 606, in data communication with one another. As used herein, the term "backbone" refers generally to a connective link or component of a network which links other networks together (and typically with higher data carrying capacity than the individual networks in aggregate), although other configurations may be used with equal success.

The national backbone component 602 comprises a national video data center (NVDC) 608. Although FIG. 6 illustrates only a single NVDC 608, it is appreciated that several such NVDCs may be utilized in conjunction with the present invention. Furthermore, in one embodiment, the national backbone 602 may be configured to comprise at least two NVDCs 608, both of which having the capability to provide failover and redundancy services. In this way, national services are not affected if one of the NVDCs 608 experiences a total or partial failure (e.g., to catastrophic natural disaster, act of war or terrorism, power failure, etc.). The NVDC 608 further comprises a national content library 612, discussed in greater detail below.

The regional backbone component 604 comprises a plurality of regional video data centers (RVDCs) 630. There are at least two RVDC 630 connected to the backbone in the illustrated embodiment, although any number may be used. A regional content library 632 is associated with each RVDC 630.

The divisional backbone component 606 comprises a plurality of divisional video data centers (DVDCs) 640. The DVDCs 640 are each associated with one or more local headends 650 which are utilized for providing content to a plurality of consumer premises equipment (CPE) 107.

It is via the national 602, regional 604, and divisional backbones 606 that the NVDCs 608, RVDCs 630, and DVDCs 640 are connected together. Content is acquired at the NVDC, and stored at the national content library 612. From the national library 612, the content may be pushed or pulled to one or more of the regional libraries 632 of the RVDCs 630, and/or the divisional libraries 642 of the DVDCs 642. It is further appreciated that content may be acquired at the regional network 604 (and/or divisional network 606) for push or pull therefrom as well.

In one embodiment, the content acquired at the aforementioned national, regional and/or divisional levels comprises audio/video content for distribution to a plurality of user devices (CPE 107) via local headends 650. As will be discussed in greater detail below, the present invention provides for the distribution of packetized or encapsulated (e.g., Internet Protocol (IP)) audio/video content to subscribers, although other types of content may be delivered via the architectures described herein.

Each of the components of the architecture of FIG. 6 will now be discussed in greater detail.

Figure 6A:
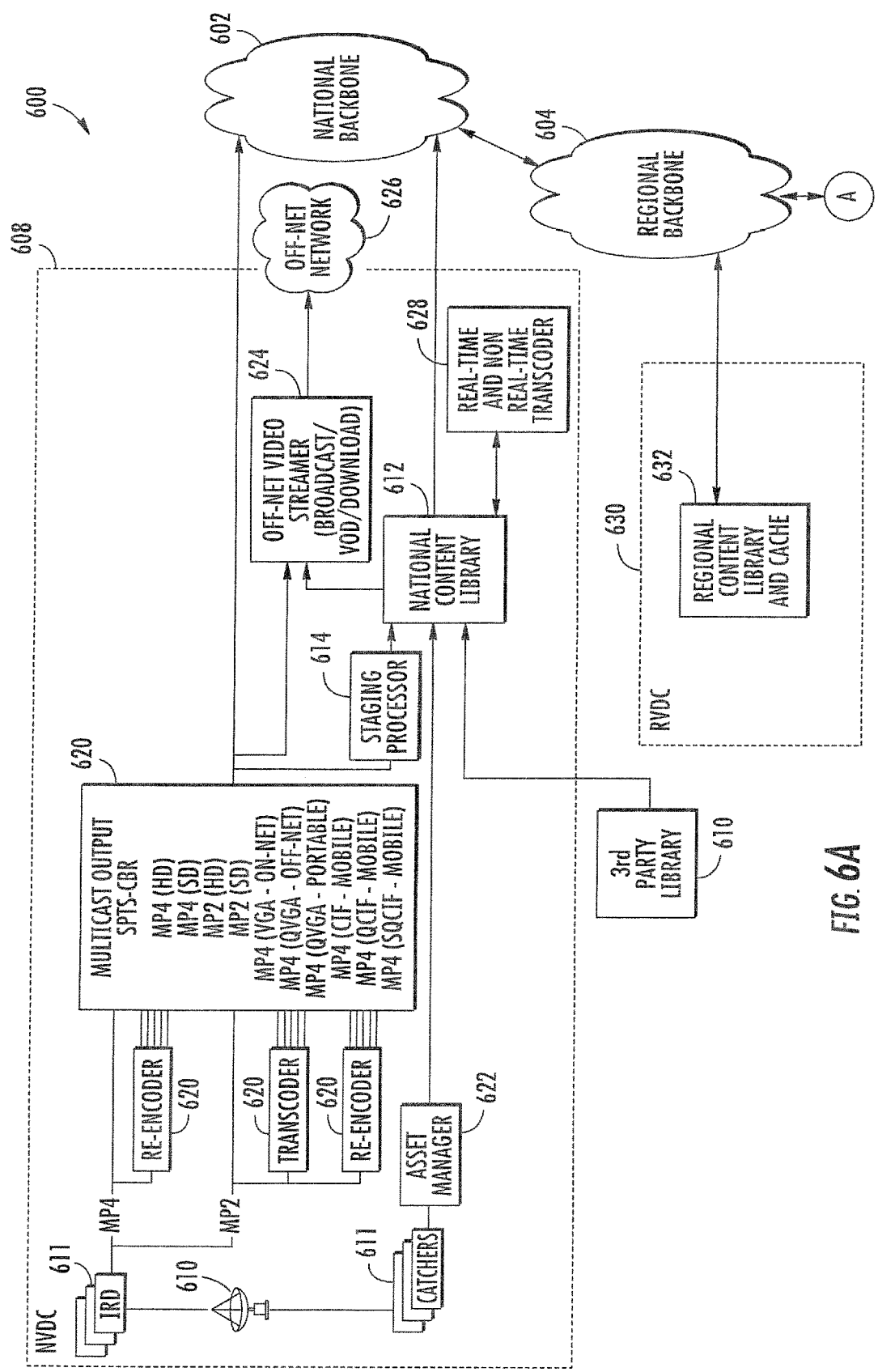
FIG. 6a is a functional block diagram illustrating one embodiment of the network architecture for providing IP and video content to consumer devices of FIG. 6.
Figure 6A:
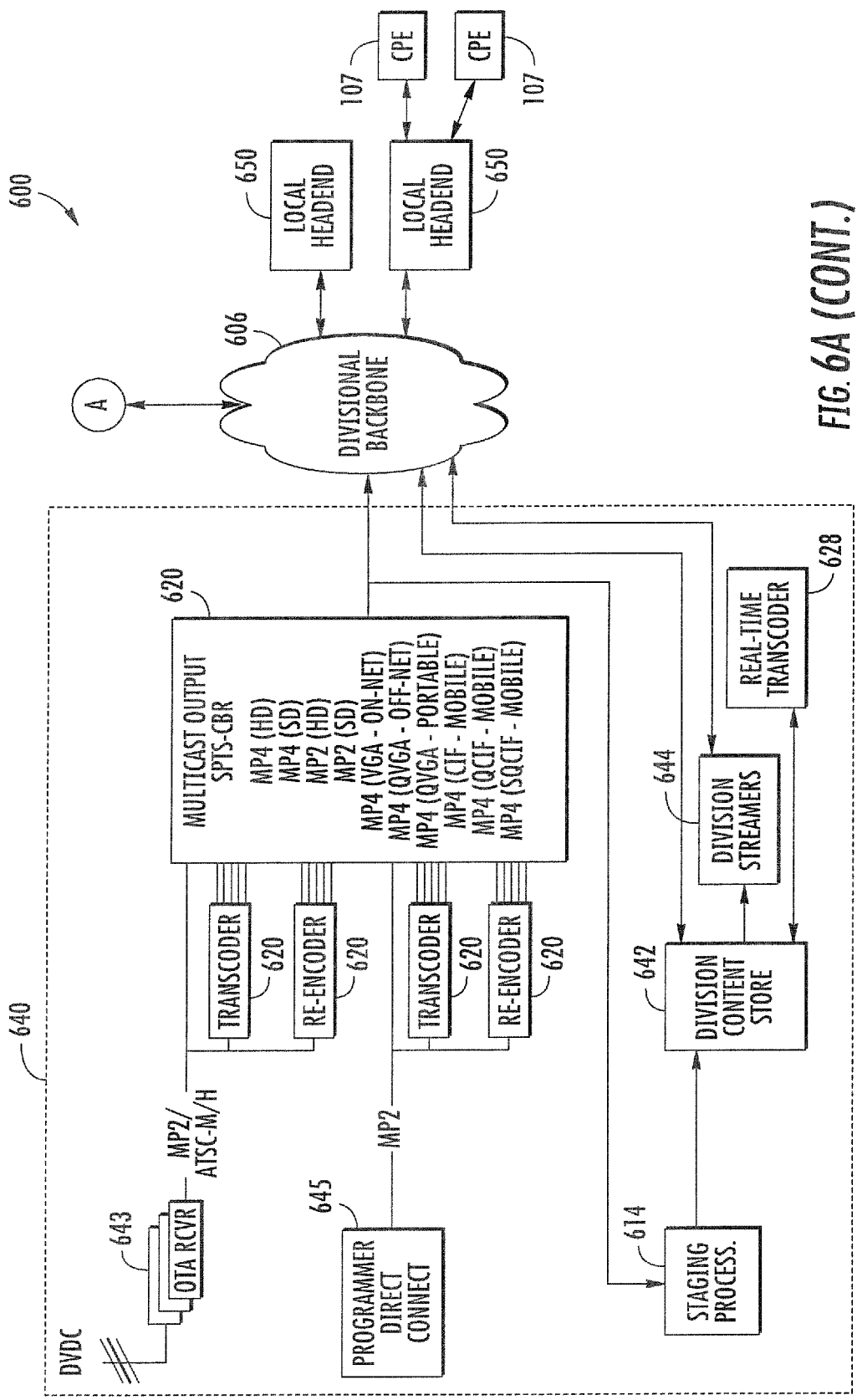

FIG. 6a illustrates one exemplary implementation of the generalized national-level network architecture of FIG. 6. As shown, the NVDC 608 comprises video acquisition elements 610 for receiving broadcast content from fiber and satellite sources, as well as on-demand content, EPG and other metadata. Content may also be received from third party libraries (i.e., from content acquisition elements 610 outside to the NVDC 608), and stored at the national library 612.

The so-called "catchers" 610 are video acquisition elements which capture audio/video content from one or more content sources (not shown). For example, the catchers may catch linear broadcast content, on-demand content, advertising content, etc. The content may be received from third party sources (e.g., studios or repositories), linear feeds (analog and/or digital), content storage facilities, etc. The content may, in one embodiment, be received via a direct link from a content provider; i.e., a Mezzanine feed. Such a connection delivers a high bit-rate pristine (but compressed) version of the linear broadcast which is re-encoded and/or transcoded to the appropriate format (such as e.g., MPEG-2, MPEG-4, JPEG-2000, etc.).

The integrated receiver/decoder (IRD) 611 comprises an entity used for the reception of contribution feeds that are intended for re-broadcasting. The IRD 611 may serve for example as an interface between a receiving satellite or microwave (millimeter wave) dish or other networks, and a broadcasting facility video/audio infrastructure.

Content captured at the catchers 610 and/or IRD 611 is forwarded via the asset manager 622 to the content library 612 (which will be discussed in greater detail below). The asset manager 622 controls the receipt of content from various content sources. The asset manager 622 further validates, transforms, and stages the received content for delivery to the content library 612. In one embodiment, the asset manager 622 comprises the Asset Management System (AMS) product offered by Tandberg Television, Ltd. and described in Tandberg television publication entitled "Asset Management System (AMS)" made available July 2009 and incorporated herein by reference in its entirety. The asset manager 622 allows for temporary warehousing of content before being loaded onto the storage library. In addition, the manager 622 allows for metadata manipulation and normalization. For example, the asset manager 622 may provide metadata in Cable Television Laboratories, Inc. (Cablelabs®) Asset Distribution Interface 2.0 (ADI), to be converted to ADI 1.1.

It is further appreciated that, as illustrated the content received at the content acquisition elements 610 may be forwarded to a transcoder, transrater, and/or a re-encoder.

The received content is transcoded, transrated, and/or re-encoded via one or more of a series of transcoder/transrater/re-encoder entities 620. The content may be processed depending on the service it will be provided under. For example, certain content may be re-encoded for provision under an nPVR service (such as the StartOver service offered by Assignee hereof discussed in co-owned, co-pending U.S. patent application Ser. No. 10/913,064 filed Aug. 6, 2004 and entitled "Technique for delivering programming content based on a modified network personal video recorder service" and published as U.S. Patent Publication No. 2005/0034171, each of which is incorporated by reference herein in its entirety). The content may also be transcoded into the appropriate video formats for distribution to the divisions based on the types of consumer premises equipment (CPE) 107 receiving the content. Such transcoding may include inter alia, formats for consumption by legacy set-top boxes (STBs) (such as SD MPEG-2, SD MPEG-4, HD MPEG-2, and HD MPEG-4/H.264), formats for use on personal computers (PC), as well as formats for use by smartphones and other portable media devices (PMD) 105, etc. (additional formats may be utilized, the foregoing being merely illustrative).

In one embodiment, content is automatically transcoded, transrated, and/or re-encoded according to a predetermined set of formats (e.g., those formats which are most often requested or used by requesting devices). According to this embodiment, the content is received, and immediately transcoded, transrated, and/or re-encoded then stored at the national content library 612. If a request is received for content in a format which is not among the predetermined formats, one or more entities may be responsible for transcoding and/or re-encoding the content "on the fly".

In one embodiment, the transcoded content is "staged" for transmission over the network prior to being placed on the national content library 612. The staging processor 614 is an entity adapted to prepare content for segmenting and/or for transmission to the national library 612 for eventual streaming to one or more users. In one embodiment, the segmenting processor 614 prepares content for transmission and/or segmenting by processing through various staging processes, or software applications adapted to run on the digital processor associated with the staging processor 614, as discussed in co-owned U.S. patent application Ser. No. 12/406,881 filed on Mar. 18, 2009, entitled "Apparatus and Methods for Network Video Recording", and issued as U.S. Pat. No. 9,277,266 on Mar. 1, 2016, which is incorporated herein by reference in its entirety. As discussed therein, the staging processor 614 includes, inter alia, at least one segmenting process which divides the content video feed on valid GOP boundaries, or I-frames. A data file regarding the segmented content is also created which gives metadata regarding the content and "points" to the segmented portions of the content on the library 612.

The transcoded content is then stored at a national library 612. The national library 612 is in the illustrated embodiment a part of a hierarchical library system comprising a national library 612, a regional library 632, and a divisional content store 642. National-level content is stored at the national library 612, and is distributed or cached at regional and local levels (632, 642). In one embodiment, distribution of content to a regional 632 or local library 642 is based solely upon demand and/or usage, such as where the most popular content is distributed/cached to the network edge, but larger catalog available in a national VOD library. For example, when a CPE 107 requests video content that is not resident on the divisional content store 642, the divisional content store 642 requests the content from the regional library 632. If the content is not cached at the regional library 632, it is requested from the national library 612.

The various library entities 612, 632, 642 communicate with one another to transfer information and/or data via a web services interface. The web services interface may provide a listing of content and the locator URLS for the content so that asset metadata may be moved without actually having to move the content file (e.g., MPEG file) until the content is requested. Content may, in one embodiment, be pre-placed at the edge (e.g., the local library 642), with an extended catalog being feed from the national 612 and regional library/cache elements 632 as requested on a per request basis. In an alternative embodiment, all content may be placed at the national level and, as it is needed, the content may be allowed to migrate to the edge based on usage (e.g., percolated down the system to other regional 632 and local 642 libraries). In one variant, the transfer of data between the libraries may be effectuated via so-called "faster-than-real-time" transfer capabilities, such as those utilized by Burstware® Faster Than Real Time™ product.

Data may be loaded to the library entities 612, 632, 642 via e.g., proactive and/or reactive loading. Proactive loading retrieves all the required state, and then caches it for the lifetime of the application or the process. Reactive loading retrieves data when it is requested by the application, and then caches it for future requests. Other methods may be used as well.

There are generally two types of nationally-relevant content received at and distributed from the national backbone 602: (i) on-demand content, and (ii) "live" or broadcast content.

National on-demand content may either be "pitched" to the NVDC 608 acquisition entities 610, or "harvested" (such as occurs for example for the content used in providing the aforementioned StartOver functionality).

Pitched content is captured and stored at the NVDC 608, as discussed above, and any needed transcoding/transrating, re-encoding, metadata augmentation, and QA work is performed. The content is then placed on the national library 612. The national content library 612 in one variant stores all of the nationally-available on-demand pitched content. Content is "harvested" from satellite feeds in real-time is segmented according to program start/stop times. (Other content acquisition entities 610 may also be utilized for capturing the content discussed herein.)

In addition, for programming into which advertisements are inserted, the program is segmented at advertisement insertion breaks. The segmenting functions may be performed by, in one embodiment the aforementioned staging processor 614. The captured and segmented content is then stored on the national content library 612. The content is then provided to a user, upon CPE 107 request, during the original broadcast of the content, or in a window of time before or after the original broadcast time (as discussed in previously referenced co-owned, co-pending U.S. patent application Ser. No. 10/913,064). Specifically, harvested content that is provided to a user CPE 107 during the so called "StartOver" window is segmented in real-time using a scheduling element or SCTE-35 cute tone marker (for ad insertion). The StartOver content may be captured at a local division level (for local StartOver content, etc.)

However, as discussed above, certain on-demand content will be moved for storage on the regional or divisional libraries 632, 642. When on-demand content is selected by a user at his or her CPE 107, the division content store 642 of the divisional video data center (DVDC) 640 serving the CPE 107 is first checked to determine whether the content is cached there, if not, a regional library 632 is queried. The regional library 632 is located at one of the regional video data centers (RVDC) 630. If the content is not located at the regional level 604, it will be searched for at the national library 612 of the NVDC 608. This approach advantageously speeds content delivery (if locally cached), and minimizes the request and other overhead which would otherwise be required if all content were stored at the national level. The content storage facilities 632, 642 of the RVDC 630 and DVDC 640 (as well as other components thereof) will be discussed in greater detail below.

Once the content is located, it is transmitted to the requesting CPE 107 via the national backbone 602, regional backbone 604, and divisional backbone 606. The content is then streamed to a local headend 650 associated with the requesting CPE 107 for provision thereto. In one embodiment, a copy of the requested on-demand content which was not previously stored at the divisional content store 642 is simultaneously sent to the divisional store 642 for storage thereon. A least recently used (LRU), least frequently used (LFU), and/or adaptive replacement caching (ARC)-type caching algorithm may be used for providing content between these entities.

In one embodiment, a tiered content delivery scheme is established as discussed in co-owned, U.S. patent application Ser. No. 09/876,677 filed on Jun. 7, 2001, entitled "Hybrid central/distributed VOD system with tiered content structure", and issued as U.S. Pat. No. 7,690,020 on Mar. 30, 2010, which is incorporated herein by reference in its entirety. As discussed therein, a hybrid central/distributed and tiered video on demand (VOD) service network with tiered content structure is given. In particular, the use of media servers located in both the headend station and the hub stations is discussed. Set-top boxes are supplied VOD services from the high-demand content media servers located in the hub station nearest to the user. The central media server located in the headend would be used as an installed backup to the hub media servers; as the primary source for lower demand VOD services and as the source of the real time, centrally encoded programs with PVR (personal video recorder) capabilities. By distributing the servers to the hub stations, the size of the fiber transport network associated with delivering VOD services from the central headend media server is reduced. Each user has access to several server ports located on at least two servers. Multiple paths and channels are available for content distribution to each user, assuring high system reliability and enhanced asset availability. Substantial cost benefits are derived from the reduced need for a large content distribution network and the reduced storage capacity requirements for hub servers.

In another embodiment, hierarchical content delivery may be utilized for moving content between the libraries 612, 632, 642 according to the methods discussed in co-owned U.S. Patent Application Publication No. 20080155059 filed on Dec. 22, 2006, entitled "Methods And Apparatus For Supporting Content Distribution", and issued as U.S. Pat. No. 8,438,603 on May 7, 2013, which is incorporated herein by reference in its entirety. As discussed therein, content is supplied to temporary storage of a regional or local server used to supply the content to a customer's premises when the requested content is not already available in the regional or local server. A content server hierarchy may be implemented with servers higher up in the hierarchy including more content, e.g., titles, than the number of titles stored in the lower level servers. By storing less frequently accessed content in servers higher in the hierarchy and frequently requested titles lower in the hierarchy, a vast number of titles can be supported without overburdening the storage available at local and regional servers. In addition, a national or other server high in the hierarchy can be used to store, move, and distribute local or other content as part of an on demand service.

With respect to nationally available broadcast content, the broadcast content is acquired from a plurality of nationally available channels at the NVDCs 608 and transcoded/transrated as discussed above in real-time (or near real time) into the appropriate multiple formats needed to the CPE 107 requesting the content. The broadcast video is multicast from the NVDCs across a data backbone to the RVDC 630 of the regional network 604. The broadcast video is, from the regional network 604, multicast around regional rings to the DVDC 640 of each divisional network 606. Broadcast content is, then multicast from the divisional network 606 to local headend or hubs and on to the CPE 107.

A subset of the nationally available programming is advertisement-insertable. The video streams destined for legacy CPE 107 are directed through the linear network advertisement splicer/groomers (not shown) for the appropriate advertisements to be inserted according to a linear advertisement campaign manager (not shown) and via the SCTE-30 cues.

For nationally available broadcast content which is destined for delivery to non-legacy device 107 (PCs, and IP STBs), a content distribution network (CDN) model is utilized. The broadcast content is delivered across the national backbone 602 and regional backbone 604. As will be described below, in one embodiment, the traffic is routed across the divisional networks 606 for delivery to the eQAMs and is simultaneously routed to CDN video servers (not shown) on the divisional area networks 606. The CDN video servers allow the PCs, IP STBs, and mobile video devices within the premises (referred to herein collectively as "IP devices") to request the content, and to join the multicast group.

Although not illustrated, in one embodiment, the architecture 600 further comprises a set of telemetry servers which monitor and manage the backbone transport (i.e., transport between the national backbone 602, regional backbone 604 and divisional backbone 606) to highlight and avoid the introduction of latency or network outages that will affect the video delivery.

FIG. 6a further illustrates that certain content may be transmitted either directly from the transcoding and/or re-encoding entities 620, or from the national content library 612 to an off-net video streamer 624. The off-net video streamer 624 streams the IP content to user mobile devices via the off-net network 626. Here, the "off-net" network 626 refers to any network other than that of the MSO or other entity providing the national 602, regional 604, and divisional networks 606 (i.e., which unmanaged by the MSO). The devices which receive content from the off-net network 626 may include IP-enabled STBs (e.g., with DRM middleware), laptops/PCs (with a DRM client), and other personal mobile devices (PMDs) 105. Thus, via the off net network 626, a client device or PMD 105 may receive IPTV content generated and managed at a first network (e.g., the MSO network) "over the top" of other networks. It is further appreciated that the communication between the first 600 network and the off-net network 626 may be utilized for data transmission as well as content including enabling a user to, via a mobile device or PMD 105 schedule or program a DVR or other home premises device remotely.

In another ("cooperative") model, the manager or operator of the off net network 626 operates in a collaborative capacity with the managed network operator (e.g., MSO) to provide requested information and services. For example, where the subscriber attempting to access content off-net is both an MSO subscriber and a subscriber of a wireless/cellular service provider (WSP/CSP), the MSO and WSP/CSP can collaborate and maintain records showing this correspondence, thereby allowing the CSP/WSP to authenticate and identify the requesting subscriber for the MSO. The MSO under this model in effect "trusts" the CSP/WSP to properly authenticate and identify the subscriber, and pass this information to the MSO so that the MSO can verify that subscriber's MSO account information, personalize the content delivery/UI, etc. Such authentication and identification might consist of for example: 802.1x/RADIUS server authentication, WAP/WEP, authentication via 3G/UMTS mechanisms (e.g., using the SIM card of the subscriber's 3G smartphone), etc. as are well known in the wireless arts.

Referring again to FIG. 6a, certain content from the national library 612 is also pulled to the real-time and non-real time transcoder/transrater 628. The transcoder/transrater 628 is similar in operation to the transcoders/re-encoders 620 discussed above, in that the transcoder/transrater 628 can perform file-based transcoding and/or transrating (for non-real time delivery) or stream-based transcoding and/or transrating (for real time delivery). The formats would be the same as the list provided for the linear broadcast. However, in one embodiment, so-called "long-tail" content may not be transcoded until a first user requests the content. At that time, the content is real-time transcoded, and sent to the client, and then cached back onto the VOD server. In one embodiment, transrating and/or transcoding occurs according to the methods discussed in co-owned U.S. patent application Ser. No. 12/070,560 filed on Feb. 19, 2008 , entitled "Multi-Stream Premises Apparatus and Methods for Use in a Content-Based Network", and issued as U.S. Pat. No. 9,743,142 on Aug. 22, 2017, which is incorporated herein by reference in its entirety. As discussed therein, "intelligent" caching and de-caching of content is given by evaluating the demand for certain content elements and formats within the network, and identifying "duplications" of requests (or alternatively, the "proximity" of one request to another in content/encoding/bitrate/encryption space), the caching controller of the present invention is able to dynamically balance caching of multiple versions of a content element (e.g., movie) and the need for "on the fly" transcoding/transrating/transcryption and associated assets.

In another embodiment, analytical algorithms may be used to move content to the edge of the content delivery network by region based on, e.g., popularity. If a given piece of content is not very popular, it can be delivered from national storage. If it is more popular, it can be delivered from a mid-tier location (e.g., regional storage), or if very popular, it can be stored at a local or divisional node of the network. This approach advantageously enables the MSO (and content providers indirectly) to reduce the transit charges on highly popular content, yet avoid dispersal of all content to the network edge, which can result in greater storage costs.

One or more regional libraries 632 are located at the RVDC 630 of the regional network 604 illustrated in FIG. 6a. In one embodiment, these libraries 632 are not pre-populated with national content, but instead, the libraries 632 request content from the national libraries 612, such as on an as-needed basis. In other words, in the embodiment of FIG. 6a, content is not harvested at the regional level. Accordingly, in this embodiment, the storage capabilities of the regional library 632 need only be on the order of 20-30% the size of the national library 612, thereby reducing CAPEX costs and streamlining operation.

In the embodiment of FIG. 6a, content may be pitched or harvested at the divisional network 606. The content made available at the divisional level may include certain on-demand content and live broadcast content which is only available at the divisional level, either because (i) the content is harvested from off-air or from local fiber feeds, or (ii) it is "pitched" content which is only of interest at the local level (for example, local soccer matches, little league games, local weather, etc). Metadata of the caught or harvested content is then augmented, the content transcoded/transrated, and the content quality assured at the local level, in a manner similar to that discussed above with respect to the nationally-available content at the national level. In one embodiment, quality assurance is accomplished manually to verify the video quality of the content; however, it is appreciated that automatic mechanisms (e.g., software applications) may be utilized as well.

The local content may also be made available to other divisions within the region (as well as to the nation) via a push or pull of the content to the regional library 632.

As illustrated, the DVDC 640 comprises one or more video streamers 644 which act as pumps to provide the IP audio/video content to the appropriate eQAM (for legacy CPE 107 consumption), or any other IP routing device needed for delivery to non-legacy CPE 107 (i.e., via CMTSs, OLT, or to other networks). It is appreciated that the aforementioned streamers 644 may be located at the local headend 650 associated with each DVDC 630, or at yet other locations. The video streamers 644 in the illustrated embodiment are not pre-populated with content, but rather request the content from the regional libraries 632 as needed and keep that content in their own storage. Content may be held in storage at the divisional streamers 644 until the popularity of other content causes it to be "aged out", or according to other business rules (e.g., only kept for a specified period of time, etc.)

Content streamed from the video streamers 644 may, as discussed above, be ingested locally and stored at a divisional content library or store 642. Prior to its storage at the divisional library 642, content may be processed by a staging processor 614 of the type discussed above. The staging processor may process the content by inter alia preparing the content for segmenting and/or for transmission to the library 642 for eventual streaming to one or more users. In one embodiment, the segmenting processor 614 prepares content for transmission and/or segmenting by processing through various staging processes, or software applications adapted to run on the digital processor associated with the staging processor 614 (as discussed in previously incorporated co-owned U.S. patent application Ser. No. 12/406,881). According to this embodiment, the staging processor 614 includes, inter alia, at least one segmenting process which divides the content video feed on valid GOP boundaries, or I-frames and a data file generator to generate a data file regarding the segmented content indicating where the segmented portions of the content are located in the library 642.

The divisional content library 642 may communicate in one embodiment, with a real-time transcoder/transrater 628 for transcoding/transrating received linear broadcast content. The transcoder/transrater 628 is similar to the transcoder/transrater 628 of the national library. In one embodiment, the transcoder/transrater 628 performs file-based transcoding and/or transrating (for non-real time delivery) or stream-based transcoding and/or transrating (for real time delivery). Also as discussed above, transcoding of long-tail content may not occur until a first user requests the content, at which time it is real-time transcoded, sent to the client, and then cached at the VOD server. The methods and apparatus of the previously incorporated co-owned U.S. patent application Ser. No. 12/070,560 may also be utilized as well.

Over the air (OTA) content may be received at an OTA receiver 643 for transcoding/transrating/re-encoding (at transcoders/transraters/re-encoders 620) and provided to a user device as well. OTA content may simultaneously (or alternatively) be provided to the staging processor 614 for storage at the division library 642 as well.

The programmer direct connect 645 provides a direct MP2-based connection to the transcoders/transraters/re-encoders 620 (i.e., the SPTS/CBR multicast output unit shown in FIG. 6a).

The video streamers 644 of the DVDC 640 communicate with one or more advertisement campaign managers (ACMs), as well as one or more advertisement libraries (not shown). The ACMs may be located at the NVDC 608, RVDC 630 and/or DVDC 640. Further, advertisements may be stored at any of the aforementioned content libraries (e.g., national library 612, regional library 632, and/or divisional library 642). In this manner, each time a piece of content is requested from library 612, 632, 642, the associated ACM will control one or more aspects of the advertisements inserted therein, the advertisements being pulled from any of the aforementioned libraries 612, 632, 642. The ACMs determine, inter alia, whether pre- and/or post-roll advertisements are to be provided in the form of a playlist. In one embodiment, rather than storing the advertisements at the same libraries as the stored content (e.g., national 612, regional 632, and/or divisional content library 642), the plurality of advertisements are stored on a separate advertisement library.

In yet another embodiment, advertisements are inserted interstitially into harvested content based on advertisement insertion cue tones (e.g., SCTE-30) detected at the time of harvesting the content. Different advertisements may be inserted into a single harvested asset based upon an ad zone (as defined by an ACM at the divisional network 606).

Figure 6B:
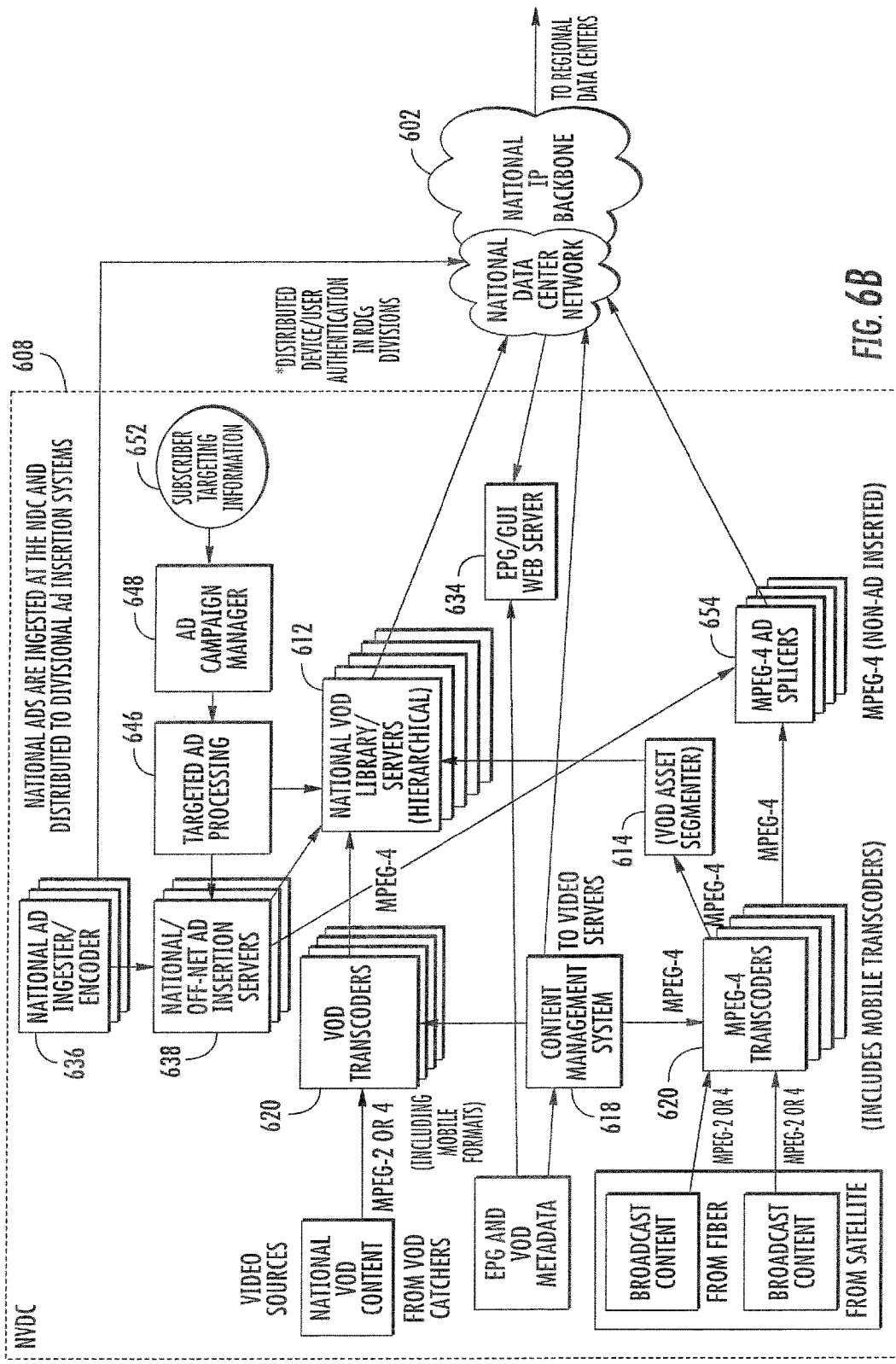
FIG. 6b is a functional block diagram illustrating a portion of the architecture of FIG. 6 in greater detail.

Referring now to FIG. 6b, one exemplary embodiment of an exemplary NVDC 608 is given. The NVDC 608 generally comprises a plurality of content acquisition entities 610, a plurality of transcoders, transraters, and/or re-encoders 620, and a national content library 612. As discussed above, the content acquisition entities 610 may be configured to receive national VOD content (such as from VOD catchers illustrated in FIG. 6a), EPG and VOD metadata, and broadcast content from fiber and satellite.

FIG. 6b illustrates that the VOD content received from the catchers 610 is received in either MPEG-2 or MPEG-4 format, and sent to a series of transcoders, transraters, and/or re-encoders 620 to be transcoded, transrates and/or re-encoded to one or more alternative formats and/or bitrates. The transcoded, transrated and/or re-encoded VOD content is then stored at the national library 612. In one embodiment, the national library further comprises sever functionality so as to enable the content to be transmitted to the RVDC 630 and on to one or more CPE 107 (including e.g., PMD 105) from the national library/server 612. Alternatively, the national library 612 may comprise a database associated with a separate server entity.

Broadcast content received from fiber or satellite in either MPEG-2 or MPEG-4 format is sent to an MPEG-4 transcoder 620. The transcoder, in the case of broadcast content, transcodes and optionally transrates the content (including transcoding the content to formats used by mobile devices (PMD 105). The transcoded, transrated, and/or re-encoded content is forwarded to a staging processor 614 for segmenting, etc. as discussed above. The content is then forwarded for storage at the VOD library 612. In another flow, broadcast content which does not have advertisements inserted therein when received (yet which requires advertisements), rather than being transmitted to the library 612 (via the staging processor 614), is transmitted to an advertisement splicer 654. The advertisement splicer 654 retrieves advertisements from the advertisement insertion server 638 (discussed below) and determines which advertisements are to be inserted into the content based on one or more rules. The selected advertisements are then inserted immediately, and the content may be forwarded on to the RVDC 630. Alternatively, the content may be stored at the national library 612 once advertisements have been inserted.

The content management system (CMS) 618 of FIG. 6*b* is configured to control the output of the transcoders/transraters/re-encoders 620. The CMS is further responsible for keeping track of the content library 612, and interpreting the content metadata and providing information to the user device regarding the content location, permissions, content type, cost for user to download.

The NVDC 608 of FIG. 6*b* further comprises advertisement ingestion/encoder entities 636 which receive and encode national (and divisional) advertisements to an appropriate format. The divisional advertisements ingested at the NVDC 608 are distributed to divisional advertisement systems (discussed below). The NVDC 608 also comprises a subscriber-targeted information database 652, which stores information regarding a plurality of subscribers. The information is utilized, in one embodiment, by an advertisement campaign manager 648 and targeted advertisement processing entity 646 to select advertisements based on one or more subscriber-based criteria.

In one embodiment, the campaign manager disclosed in co-owned U.S. patent application Ser. No. 12/503,772 entitled "Methods and Apparatus for Classifying an Audience in a Content-Based Network," filed on Jul. 15, 2009, and issued as U.S. Pat. No. 8,935,721 on Jan. 13, 2015, which is incorporated herein by reference in its entirety, is utilized in conjunction with the present invention. As discussed therein, methods and apparatus may be provided for identifying, creating and distributing data relating to audience or viewer qualities to an advertisement management system and an advertisement decision maker. An advertising "inventory" is created and related to audiences by combining the audience data with advertisement placement opportunities. Methods and apparatus for measuring and managing such advertising inventory via e.g., a network-based management system may also be provided. Measurement provides inter alia an accounting of sold inventory, and measurement accumulated over time allows the value of the inventory to be realized. These methods and apparatus give a network operator or other entity the ability to offer new inventory with a high degree of confidence that booked orders will meet their audience penetration or "impression" goals or targets. The campaign manager 648 may further be adapted to manage advertising campaigns for one or more advertisement/promotional providers in order to, for example, increase advertising or associated sales revenue for an MSO, as well as to increase the likelihood a particular advertiser will reach its targeted audience as precisely as possible (and within any limitations of an advertiser-MSO defined relationship).

Selection and insertion of targeted advertisements may occur based on any number of different parameters and/or paradigms. For instance, insertion may be user-driven (e.g., based on the user's stated preferences, usage or purchase history, demographics and/or psychographics, location, etc.), advertiser- or MSO-driven (e.g., as part of an advertising campaign), content-driven (e.g., based on the subject matter or other features of the content stream into which it is being inserted), and/or may be based on network or external considerations (e.g., available insertion time, bandwidth, etc.). Accordingly, myriad different schemes for selection and insertion may be used consistent with the invention. See, e.g., to the methods and systems disclosed in co-owned U.S. patent application Ser. No. 11/441,476 entitled "SECONDARY CONTENT INSERTION APPARATUS AND METHODS" and filed on May 24, 2006, and issued as U.S. Pat. No. 9,386,327 on Jul. 5, 2016, which is incorporated herein by reference in its entirety.

Revenue or profit implications associated with various operational or business courses of action may also be considered in the establishment and management of user sessions within the network. In an exemplary embodiment of the invention, the methods and apparatus described in co-owned and co-pending U.S. Patent Application Ser. No. 11/974,700 entitled "Methods And Apparatus For Revenue-Optimized Delivery Of Content In A Network" filed Oct. 15, 2007 and issued as U.S. Pat. No. 8,099,757 on Jan. 17, 2012 incorporated herein by reference in its entirety, may be used in a substantially automated fashion by applying a set of rules via a software process (e.g., Network Optimization Controller, or NOC). The NOC evaluates the various costs and benefits associated with various options for servicing a subscriber content delivery request, and selects the most optimal option based on network operator rules that are programmed into the NOC. For example, the NOC may decide between instantiating a new program stream that is specifically delivered and/or targeted to one or a limited number of subscribers, herein referred to as a "microcast" (and accordingly consuming additional bandwidth), versus steering the new request to an existing session or program stream that has a suitable correlation to the requesting subscriber's demographics or psychographics (and perhaps utilizing the additional bandwidth for other purposes, such as another unicast or multicast session, which may represent a better revenue opportunity).

A user selects available content via accessing and interacting with an electronic program guide (EPG) or other selection mechanism, such as via a graphical user interface (GUI), described in greater detail subsequently herein.

In one embodiment, the user interface is of the type disclosed in co-owned, co-pending U.S. patent application Ser. No. 12/414,554 filed on Mar. 30, 2009 and entitled "Personal Media Channel Apparatus and Methods" which is incorporated herein by reference in its entirety, may be utilized consistent with the present invention. In another embodiment, the UI may utilize one or more mechanisms for providing recommended content such as that disclosed in co-owned U.S. patent application Ser. No. 12/414,576 filed on Mar. 30, 2009 and entitled "Recommendation Engine Apparatus and Methods", and issued as U.S. Pat. No. 9,215,423 on Dec. 15, 2015, which is incorporated herein by reference in its entirety. As discussed therein, a mechanism for particularly selecting content to align with a user's preferences (the latter which the viewer need not enter manually) is given. The content provided to the user is compiled from various distinct sources, including, inter alia, DVR, broadcasts, VOD systems, start-over systems, etc. The present invention provides a mechanism to learn (and unlearn) the user's preferences and which content they are likely to enjoy based on actions taken with regard to the content. The recommended content may be displayed in one embodiment as a list or table of titles (and related information of interest), or alternatively fed to the user as a continuous content stream on a virtual channel. In another embodiment, the compiled content is presented to the user in conjunction with an electronic program guide (EPG) which may be personalized to that user if desired.

The EPG/GUI is populated via information and content retrieved by the content acquisition entities 610. An EPG/GUI web server 634 processes the retrieved information and content and generates the EPG/GUI for display on a CPE 107. The web server 634 advantageously enables the EPG (and user login to an MSO-run website) to be web-based. Device authentication for devices on the unmanaged network occurs via web server 634 and application server (see FIG. 6*c*) of the RVDC 630. As will be discussed below, the CPE 107 may access the EPG/GUI via: (i) a divisional network 606, (ii) a network other than the network providing the content (e.g., a network other than the MSO network), or (iii) from a regional distribution entity (discussed below).

Figure 6C:
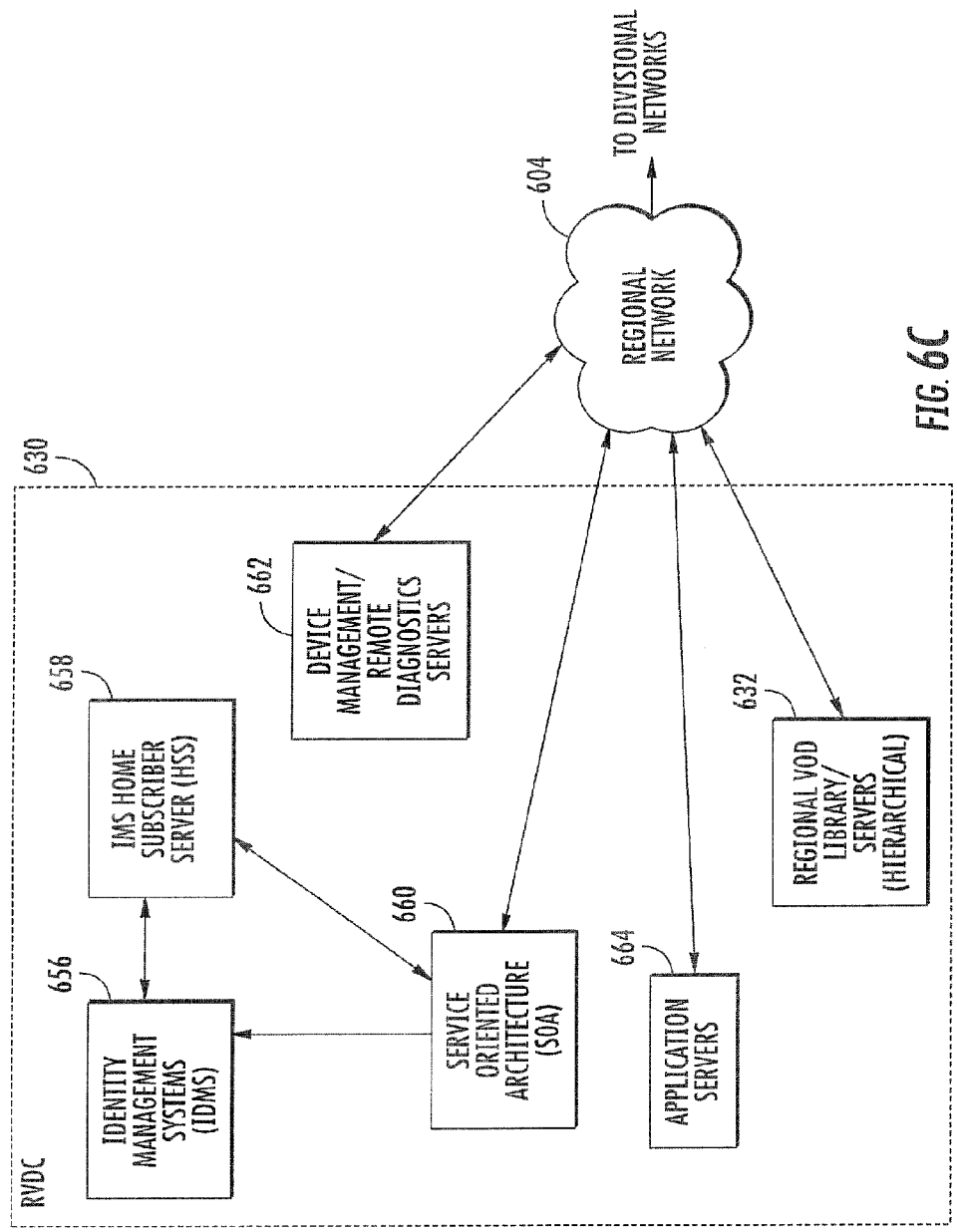
FIG. 6c is a functional block diagram illustrating another portion of the architecture of FIG. 6 in greater detail.

FIG. 6*c* illustrates one exemplary embodiment of the RVDC 630 portion of the network architecture discussed above with respect to FIG. 6. As illustrated, the RVDC 630 comprises a regional library 632, a service-oriented architecture (SOA) 660, device management/remote diagnostics servers 662, and application servers 664 each in communication with the regional network 606.

As discussed above, the regional library 632 is configured to receive and store content from the national network 602 and/or divisional network 606. In one embodiment, the regional library 632 further comprises server functionality so as to service requests for content stored thereon. However, it is appreciated that the regional library 632 may merely serve as a database which is associated with a separate server entity (not shown).

The SOA 660 provides an interface through which the IP video infrastructure may interface with operations, billing and provisioning system entities (e.g., OSS and BSS functions).

The SOA is, in one embodiment, in communication with an identity management apparatus (e.g., Identity Management System or IDMS) 656 and subscriber server (e.g., a home subscriber server (HSS) in the illustrated variant) 658. The IDMS 656 and HSS 658 are in communication with one another; however, it is appreciated that in one embodiment, the functionality of the IDMS 656 may be available in the HSS 658 alone. The HSS 658 serves as a central location for user profiles. It is via the HSS 658 that subscribers on managed networks and unmanaged networks are authenticated. In other words, the subscriber provides credentials or information which is checked against information stored in the HSS 658. Exemplary implementations of the HSS 658 are described subsequently herein with respect to various IMS-based embodiments of the invention.

The device management/remote diagnostics servers 662 are utilized to manage client devices remotely. The device management/remote diagnostics servers 662 may also determine whether a device is entitled to service.

As illustrated in FIG. 6*c*, several application servers 664 are given. In one embodiment, the application server 664 comprises an application server (AS) such as that discussed in co-owned U.S. patent application Ser. No. 11/263,015 filed Oct. 2, 2002, entitled "Network based digital information and entertainment storage and delivery system", now published as U.S. Patent Application Publication No. 2003/0208767, and issued as U.S. Pat. No. 7,908,626 on Mar. 15, 2011, the foregoing incorporated herein by reference in its entirety. In one variant, the AS 664 is a Mystro™ server device of the type utilized by the Assignee hereof, although it will be appreciated that other configurations may be utilized with equal success. According to this embodiment, the server device may be specifically configured to support the aforementioned user interface. The given server device may further provide StartOver content by capturing the content, scheduling it and making the content available to a user. The exemplary Mystro server device also provides aggregation of various additional functions. The AS 664 may be further adapted to perform content processing functions such as e.g., reformatting program streams (transcoding, transrating, etc.), and implementing trick mode functionality.

Figure 6D:
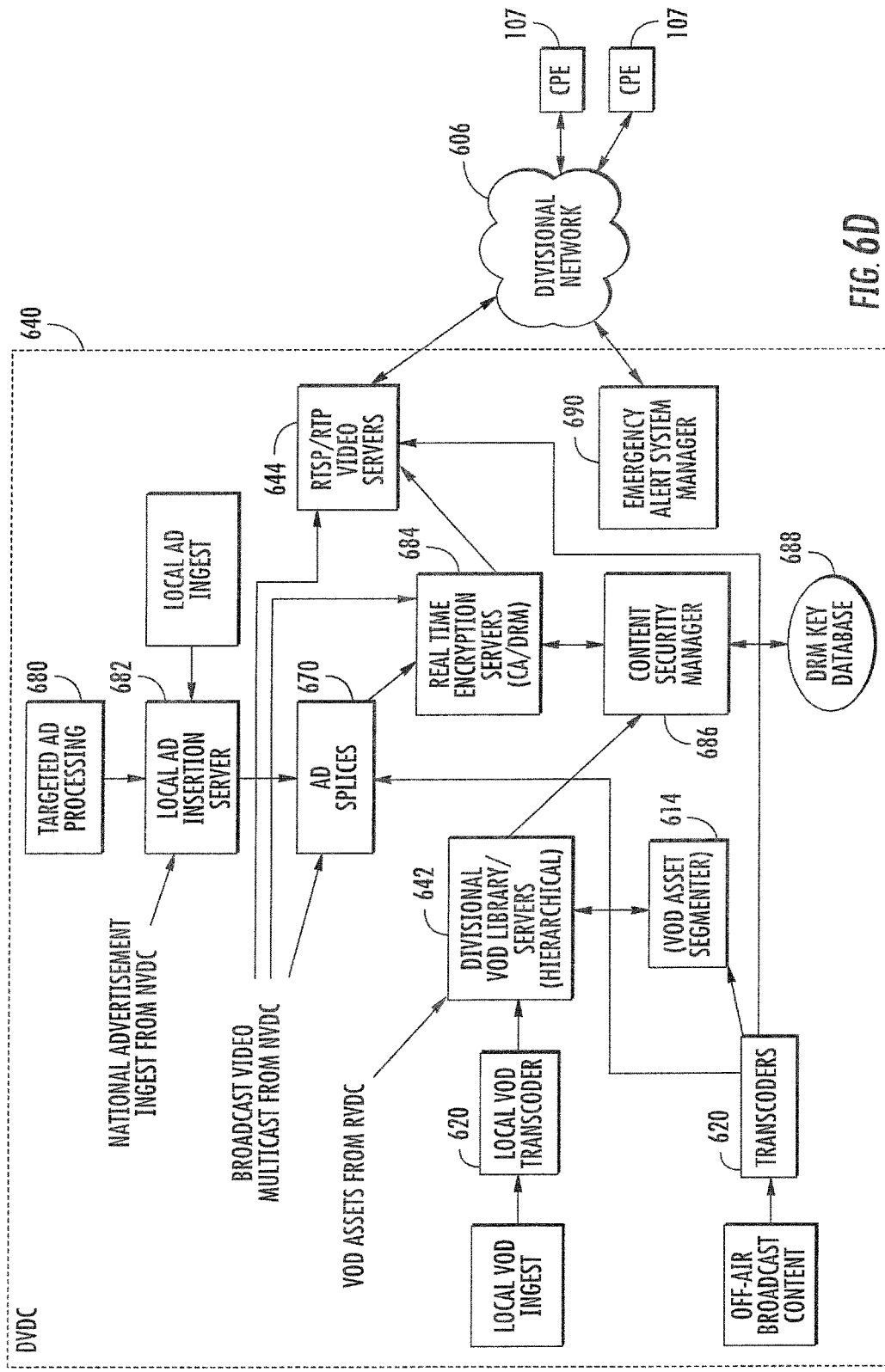
FIG. 6d is a functional block diagram illustrating another portion of the architecture of FIG. 6 in greater detail.

FIG. 6*d* illustrates one exemplary embodiment of a DVDC 606 for use in the architecture of FIG. 6. As shown, the DVDC 606 generally comprises a divisional library 642, one or more video streaming servers 644, advertisement insertion servers 682, and encryption servers 686.

The divisional library 642 receives content from a plurality of sources. In one embodiment, the library 642 may comprise a database for content, and have a separate server entity (not shown) associated therewith.

As illustrated in FIG. 6*d*, the divisional library 642 is configured to store advertising content (such as that received from the local advertisement insertion server 682), as well as local off-air broadcast content, and local on-demand content. However, it will be appreciated that the different types of content may be stored at separate library entities (not show). Content may also be received at the DVDC 606 from the RVDC 606 and the NVDC 608. For example, RVDC 630 may provide on-demand assets to the divisional library 642. Further, broadcast video content may be received via a multicast from the NVDC 608, as well as national advertisements ingested at the NVDC 608. In one embodiment, national-level content is stored at the divisional library 642 (not shown).

Local on-demand content received at the DVDC 606 is transcoded/transrated as required at a local on-demand content transcoder 620 before it is transmitted to the library 642. Off-air broadcast content is also transcoded/transrated as required at a transcoder 620 prior to being sent to the library 642 for storage. In one embodiment, the transcoded off-air broadcast content is processed at a staging processor 614 of the type previously discussed herein.

An advertisement splicer 670 is also illustrated in the DVDC 640 of FIG. 6*d*. The advertisement splicer 670 receives local and national advertisement content. The splicer 670 is responsible for inserting advertisements into broadcast content (whether received from the NVDC 602, or acquired locally). National and local advertising content is ingested and stored at the advertisement insertion server 682, which, in some instances is controlled by a targeted advertisement processor 680. In other words, the targeted advertisement processor 680 may select certain ones of the (local and/or national) advertisements for eventual streaming to a user, based on one or more targeted secondary content insertion rules (as discussed above and in previously incorporated co-owned U.S. patent application Ser. No. 11/441,476.

Off-air broadcast content having advertisements spliced therein as well as content not having advertisements spliced therein (whether broadcast, on demand, or national content from a NVDC 602 multicast) is, in one embodiment, sent to a real-time encryption server 684. The encryption server 684 may utilize conditional access (CA) and/or digital rights management (DRM) mechanisms for the protection of content. Content integrity protection (e.g., generation of a cryptographic residue or hash, steaganographic techniques (e.g., digital watermarking), etc. may also be applied if desired to any content processed by the encryption server.

The CA protection mechanisms may in one variant be of the type disclosed in the Digital Video Broadcasting (DVB)-CA standard entitled "Support for use of scrambling and Conditional Access (CA) within digital broadcasting systems" (ETR 289 V1; October, 1996), DVB-CSA standard entitled "DVB Common Scrambling Algorithm: Distribution Agreements" (DVB BlueBook A011r1; June 1996), and DVB-CI standard entitled "Common Interface Specification for Conditional Access and other Digital Video Broadcasting Decoder Applications" (EN 50221 V1; February 1997) and extensions thereof (TS101 699 V1.1.1; November 1999). Generally, CA protection requires certain criteria to be met before access to content is granted. Specifically, CA uses scrambling and encryption (e.g., public/private key encryption) of a data stream with a control word or key in order to ensure entities receiving the content are authorized to do so.

DRM protection mechanisms may, in one variant, be of the type utilized in current distribution networks. For example, Windows Media Player DRIVE version 10, 11, and 12 (and subsequent versions), Adobe/McAfee DRM, and/or Sony Ericsson DRM, etc. may be utilized in conjunction with the present invention. Multiple DRM approaches may optionally be utilized to increase security and efficiency. It is also appreciated that certain DRM suites (such as e.g., Windows DRM) may be utilized for mobile devices (e.g., the PMD 105 previously referenced) in order to transfer content from DTCP over IP.

CA and DRM may use similar encryption methodology, similar key exchange, entitlement and similar private key derivation and protection; however, CA is more focused on assuring that a given subscriber is entitled to access encrypted content (and the procedures for providing such access), while DRM is more focused on how the content can be used, viewed, distributed, reproduced, etc. Hence, the technologies are largely complementary in many regards. For internet and in-home devices (CPE 107), CA (such as e.g., Cable-cards) and DRM (such as the aforementioned Windows DRM) may be utilized together. For example, a legacy client device may use CA, whereas mobile device or other IP capable device may use DRM. Furthermore, users will be able to impose restrictions on the use of their content.

A content security manager 686 and DRM key database 688 are also illustrated for use by the CA/DRM security mechanisms discussed above. The content security manager 686 is primarily responsible for implementing the aforementioned CA functionality. In one embodiment, the content security manager 686 includes a physical process for automatically and randomly generating control words (e.g., 8-byte secret key) which are used to scramble the data stream. The content security manager 686 may further encrypt the control word in order to protect it during transmission to the receiver. According to this embodiment, decryption of the code word is only permitted when the receiving entity is authorized to do so.

Authorization may be received in the form of an entitlement management message (EMM). Alternatively, the systems and methods discussed in co-owned U.S. patent application Ser. No. 12/536,724, filed on Aug. 6, 2009, entitled "System And Method For Managing Entitlements To Data Over A Network", and issued as U.S. Pat. No. 8,341,242 on Dec. 25, 2012, which is incorporated herein by reference in its entirety. As discussed therein, a request for content is received from the client device 107 at a video streaming server 644 of the DVDC 640. An entity at the DVDC 640 (such as the encryption server 684, the content security manager 686, or another entity) obtains information identifying the user account (such as subscriber identification number, account number, etc.) and uses this information to request entitlements from an entitlements server (not shown) located elsewhere at the DVDC 640 or alternatively at a local headend 650. Based on the results returned from the entitlements server, the streaming server 644 will either grant or deny the request (including by not authorizing the user device 607 to decrypt the code word. In yet another embodiment, the content streaming server 644 or other entity may comprise the functionality of the aforementioned entitlements server.

The DRM key database 688 is responsible for maintaining and providing decryption keys to the various user device 107. The key server 688 may further provide entitlement control messages (ECM), entitlement management messages (EMM), entitlement keys, domain certificates, etc.

As indicated above, the video streaming server 644 provides content OP audio/video) to one or more CPE 107 via the divisional network 606. The video streaming server 644 may, in one embodiment, utilize Real Time Streaming Protocol (RTSP) as discussed in Internet Engineering Task Force (IETF) RFC 2326 entitled "Real Time Streaming Protocol (RTSP)", published in 1998, and incorporated herein by reference in its entirety. As discussed therein, RTSP is used to establish and control media sessions between end points. In the present invention, a user may, via his or her CPE 107, issue "trick mode" or VCR-like commands, such as play and pause, to facilitate real-time control of playback of media files from the video server 644. The video streaming server 644 may further be configured to use Real-time Transport Protocol (RTP) for media stream delivery; however it is appreciated that other transport protocols may be used as well. RTP as used in the present invention may comprise that described in IETF RFC 1889 published in 1996, and incorporated herein by reference in its entirety (superseded by RFC 3550 in 2003, which is also incorporated herein by reference in its entirety). RTP may be utilized to carry media streams established on Session Initiation Protocol (SIP) sessions, etc., advantageously with QoS. RTP (and its associated control protocol RTCP) is discussed in greater detail subsequently herein with respect to exemplary IMS-base implementations of the invention.

The emergency alert system manager 690 of FIG. 6d comprises one or more entities responsible for providing emergency alert data to the user devices 107 via the divisional network 606. The emergency alert system manager 690 retrieves emergency alert data, generates an emergency alert message, determines the devices which are to receive the alert, and provides for the transmission of the emergency alert to the devices.

In one embodiment, the methods and apparatus disclosed in co-owned U.S. Pat. No. 7,592,912 issued Sep. 22, 2009 and entitled "Emergency Alert Data Delivery Apparatus and Methods", which is incorporated herein by reference in its entirety, may be utilized to provide emergency alert data to the subscribers. As discussed therein, data from an incoming EAS feed is passed to an EAS server for formatting and optional localization (targeting based on geography or other parameters). If the data is audio and/or text, then it is formatted into a message to be sent over the network to the client devices. In one embodiment, the network may comprise an IP network, and the client devices comprise IP-enabled DSTB, a personal computer, or PMD. The EAS message may be displayed in a new window and/or overlay of the current video stream being displayed. Furthermore, the audio portion of the received EAS message pre-empts the audio track of the current program stream. The EAS data may also be independent of the program stream.

Figure 6E:
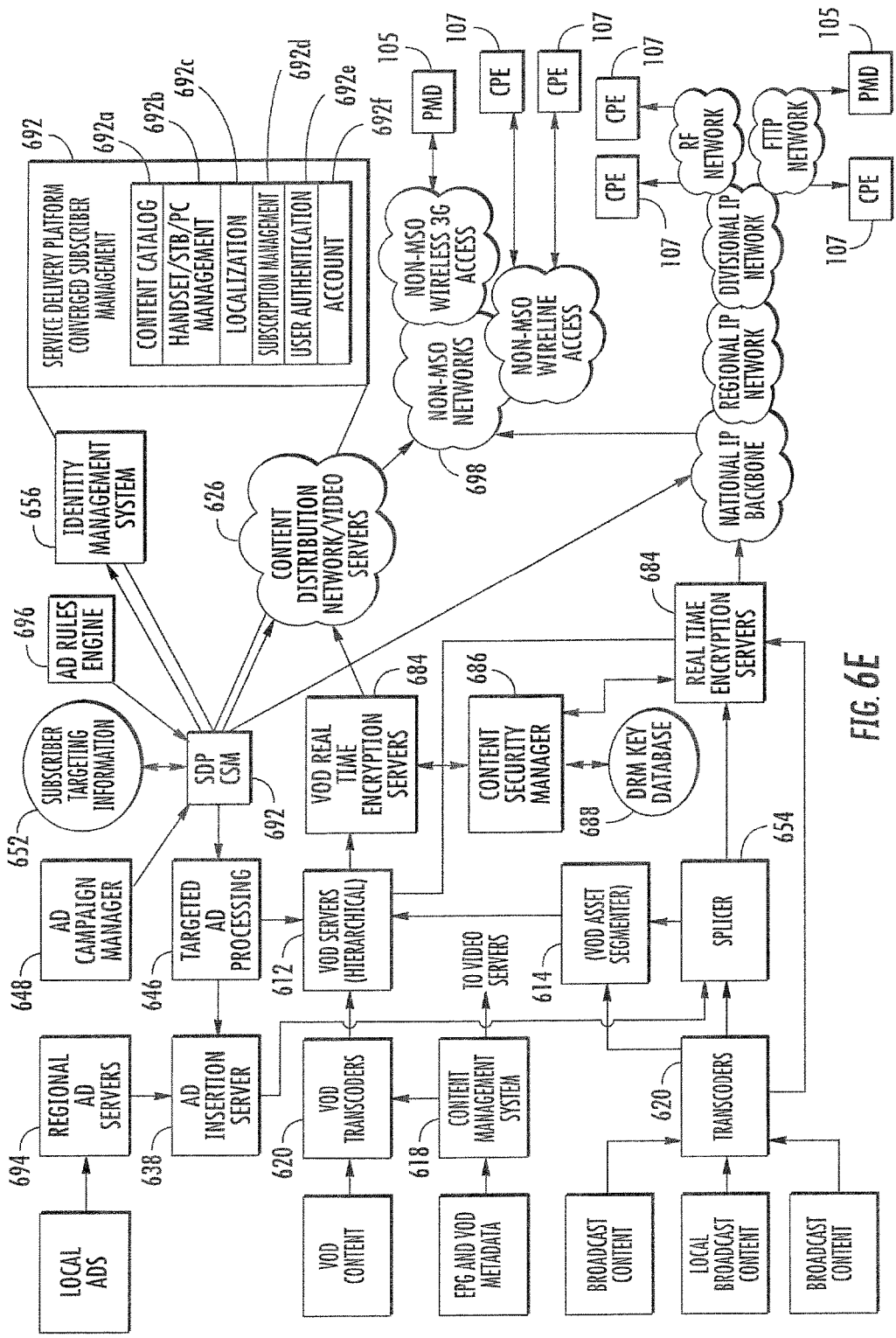
FIG. 6e is a functional block diagram illustrating another embodiment of the network architecture for providing IP and video content to consumer devices of FIG. 6.

Referring now to FIG. 6e, another embodiment of a network architecture useful with the present invention is given. In the embodiment illustrated in FIG. 6e, many of the components previously discussed herein as being located at a the RVDC 604 and/or DVDC 606 are, in the present embodiment, also located at the NVDC 602. In this manner, content may be ingested by an MSO network and distributed to subscribers over networks other than the MSO network (i.e., non-MSO networks 698).

As illustrated, in FIG. 6e, national broadcast content, local broadcast content, on-demand content, local advertisements, EPG data and metadata are ingested at the national level. The ingested content is transcoded and/or transrated (at e.g., transcoders 620) if necessary.

For example, broadcast content ingested at the NVDC 602 is sent to transcoders/transraters/re-encoders 620 for processing. Local broadcast content is also passed to the NVDC 602 from a local ingesting entity (not shown). Once transcoded/transrated/re-encoded, the broadcast content may be processed as an on-demand asset, or may be processed as broadcast content. Content which is to be processed as on-demand content is next sent to a staging processor 614 of the type discussed above (e.g., of the type discussed in co-owned U.S. patent application Ser. No. 12/406,881 filed on Mar. 18, 2009, entitled "Apparatus and Methods for Network Video Recording," and issued as U.S. Pat. No. 9,277,266 on Mar. 1, 2016, previously incorporated herein).

The staging processor 614 utilizes various staging processes or software applications to prepare the content for transmission and/or segmenting. The staging processor 614 may include, inter alia, at least one segmenting process and a data file generator. Content from the staging processor is provided to the national library 612 for storage thereon until the content is selected (e.g., on-demand) for delivery to a user. Content ingested as on-demand content may also be transcoded/transrated/re-encoded and stored at the national library 612.

Broadcast content may alternatively be processed as on-demand content. In this embodiment, the content is spliced at the splicer 654 then transmitted to a content security manager 686 via a real-time encryption server 684. A content security manager 686 and DRM key database 688 enable the processed broadcast content to be provided to users (as will be discussed below).

The real-time encryption servers 684 used in conjunction with a content security manger 686 and DRM key database 688 (as discussed above) securely provide the on-demand content to user PMD 105.

It is noted that the real-time encryption servers 684 (or other servicing entity tasked with session establishment/management for client devices and PMD 105) can be integrated or included within rules or optimization algorithms running on the traditional server processes. For example, the client device/PMD 105 bandwidth and/or session number requirements are anticipated to vary significantly as a function of time or other parameters, as is true of VOD. Hence, these variations, and their potential impact on the larger distribution plant, can be integrated into bandwidth optimization and conservation algorithms, thereby accounting for the client/PMD 105 sessions as if they were merely another VOD session for downstream CPE 107. Exemplary bandwidth management and optimization techniques compatible with various aspects of the present invention are described in, inter alia, co-owned U.S. Patent Application Ser. No. 11/243,720 filed Oct. 4, 2005, entitled "Self-Monitoring And Optimizing Network Apparatus And Methods", and issued as U.S. Pat. No. 8,582,584 on Nov. 12, 2013; U.S. Patent Application Ser. No. 11/291,328 filed Nov. 30, 2005 entitled "Apparatus And Methods For Utilizing Variable Rate Program Streams In A Network", and issued as U.S. Pat. No. 7,889,765 on Feb. 15, 2011; and U.S. Patent Application Ser. No. 11/800,093 filed May 4, 2007, entitled "Methods And Apparatus For Predictive Capacity Allocation", and issued as U.S. Pat. No. 9,398,346 on Jul. 19, 2016, each of the foregoing being incorporated herein by reference in its entirety.

Alternatively, the servers servicing CPE requests can be made "double duty", so as to handle both PMD 105 and CPE 107 session requests and content delivery, thereby further integrating the PMD 105 services with extant plant services, and also including the client/PMD 105 services within bandwidth optimization/conservation processes indigenous to the network. Also, the client/PMD 105 services and sessions can be included within any statistical multiplexing algorithms.

The real-time encryption servers 684 can also be made to support multiple session protocols such as SIP, WAP/WSP, and SSP, thereby allowing the real-time encryption servers 684 to be substantially agnostic to session requests received from heterogeneous types of clients or PMDs 105 (assuming sufficient capabilities are negotiated and present for transfer of the desired content).

Alternatively, PMD 105 services can be kept entirely separate of the extant delivery plant, and separate optimization/multiplexing algorithms employed if necessary.

The content distribution network 626 of the present invention may also be configured with PacketCable or PacketCable Multimedia (PCMM) capability as well. PacketCable and PCMM enables a wide range of applications via DOCSIS 1.1/2.0/3.0 access networks, such as Session Initiation Protocol (SIP) telephony, video telephony, multi-player gaming, and streaming media services. Using PCMM, a client device (e.g., PMD 105 or CPE 107), such as a 3G cellular smartphone, videophone or a game console, registers with a PCMM application manager. Once the device and its services are authorized, the application manager communicates with a PCMM policy server to specify the quality-of-service (QoS) that should be applied. The policy server communicates with the DOCSIS 1.1/2.0/3.0 CMTS, which guarantees that the needed bandwidth and latency are available for the services across the access network.

Other entities useful in providing content to the client or PMD 105 include inter alia a cellular service provider (CSP), Mobile Switching Center (MSC), one or more base stations, and a wireless service provider (WSP).

The CSP provides mobile communication system services to cellular services subscribers. CSPs include such companies as Verizon®, Cingular®, and T Mobile® which carry voice and data over a wireless network which can then deliver this voice and data to a PMD 105, and similarly receive data from mobile units and pass it to its destination (which may be another mobile unit, a POTS based user, a server, Internet gateway, etc.).

An MSC is a sophisticated telephony and data exchange which provides circuit-switched and/or packet-switched calling (i.e., mobility management and services) to the PMD 105 roaming within the area that it serves. For example, this mobility management and services includes such things as voice, data and fax, as well as short message service (SMS)/text and call divert. The MSC routes data and services to the appropriate base station(s) servicing the particular PMD 105 at a given point in time.

Base stations are essentially low-power multi-channel two-way radios which are in a fixed location. They are typically used by low-power, two-way client PMDs 105

(e.g., cellular telephones, smartphones, PDAs, etc.). The base station is the wireless link between a PMD 105 and a land-based network for routing voice and data between the two. Base stations are well understood in the wireless arts, and as such will not be discussed further herein.

A WSP, sometimes also referred to as a WISP (wireless Internet service provider), generally provides wireless access to broadband or similar capabilities through a network of access points (such as the IEEE Std. 802.11 Wi-Fi Access Points) located in areas such as libraries, Internet cafes, and other public gathering locations. Access is provided from a given user's PMD 105 (e.g., laptop computer, smartphone, PDA, etc.) through the access point (gateway) to a local broadband connection, the latter which provides Internet or other desired connectivity. For example, another use of such access point is for enterprise applications, wherein mobile users are able to access a corporate internet or LAN/WAN.

Secondary content (including advertisements and promotions) may also be inserted into the requested content prior to delivery to a PMD user. In one embodiment, the secondary content may be targeted to the requesting user or set of users. As previously noted, the secondary content may for example be targeted based on geographic location of the user, demographics, psychographics, etc., profile information derived from an HSS or user interaction with previous content, as well as information or preferences provided directly by the user.

In one embodiment, the aforementioned methods and apparatus of the previously incorporated co-owned U.S. patent application Ser. No. 11/441,476 may be utilized in to provide targeted advertisement insertion.

In another embodiment, the methods and apparatus disclosed in co-owned U.S. patent application Ser. No. 12/414,576 entitled "Recommendation Engine Apparatus and Methods" and filed on Mar. 30, 2009, and issued as U.S. Pat. No. 9,215,423 on Dec. 15, 2015, which is incorporated herein by reference in its entirety, may be utilized to provide targeted secondary content insertion based on what is known about the requesting user. As discussed therein, methods and apparatus for the identification and recommendation of content targeted to a particular user (or group of users) within a content-based network, such as a cable television, HFCu, or satellite network may be provided. In one salient aspect, a mechanism for particularly selecting content to align with a user's preferences (the latter which the viewer need not enter manually) is used and disposed at e.g., the targeted advertisement processing entity 680 previously described herein. This targeted advertisement processing entity 680 may be used to learn (and unlearn) the user's preferences, and which content they are likely to enjoy based on actions taken with regard to content provided to the user on previous occasion. The recommended content may be displayed in one embodiment as a list or table of titles (and related information of interest), or alternatively fed to the user as a continuous content stream on a "virtual" personalized channel described in co-owned and co-pending U.S. patent application Ser. No. 12/414,554 entitled "Personal Media Channel Apparatus and Methods" filed Mar. 30, 2009, which is incorporated herein by reference in its entirety.

In another embodiment, the compiled content is presented to the user in conjunction with an electronic program guide (EPG) which may be personalized to that user if desired. In another aspect, the client applications discussed above are implemented by a network-based entity such as a hub or headend server adapted to perform the above-described functions for a variety of user profiles (e.g., individual user profiles, or user accounts) simultaneously.

As shown, local advertisements are ingested and stored at regional advertisement servers 694. The advertisements are then passed on to an advertisement insertion sewer 638 (including e.g., those located at the divisional backbone 606) where they may be spliced (via splicer 654) into broadcast content.

The NVDC 602 of the present embodiment further comprises a service delivery platform (SDP)/converged subscriber management (CSM) entity 692. Various aspects of one exemplary implementation of the SDP are described subsequently herein with respect to FIGS. 12-30 (i.e., IMS-based variants).

As shown in FIG. 6e, the advertisement rules engine 696, identity management system 656, advertisement campaign manager 648, and subscriber targeting information 652 are each in communication with the SDP/CSM 692. A plurality of services and/or functions are provided by the SDP/SCM 692 including, inter alia, (i) a content catalog 692a, (ii) CPE management 692b, (iii) localization 692c, (iv) subscription management 692d, (v) user authentication 692e, and (vi) accounting 692f. The SDP/CSM 692 advantageously is configured to provide an open interface accessible by either any service execution environment (SEE), or any other function or service (692a-692f) in the SDP. The service enablers and network control functions of the SDP/CSM 692 may be accessed, which provide an abstract/simplified view (in terms of used protocols and/or exposed functions). Current Intelligent Network SDP's in fixed and mobile networks have very limited interworking beyond basic voice connectivity, and hence the present invention enables operators to access network functionalities through a set of open, standardized interfaces (APIs), even without a common control plane for the underlying networks. However, the introduction of the common transport and common control planes as described in greater detail subsequently herein advantageously provides the full set of network functionalities to the applications in the SDP/CSM 692.

The present invention also provides for different types of SEEs, which may cooperate to deliver services via service logic (at the server-side) deployed thereon. The SDP/CSM 692 further provides a unified view of all data relating to different entities (customers, services, etc.), although the data itself may be stored at different repositories.

It is the SDP/CSM 692 which provides interaction between the MSO national network 602 and third party domains (e.g., off net networks 626, non-MSO networks 698). The SDP/CSM 692 ensures that interaction therebetween is via a single set of functions and a uniform set of interfaces.

At a granular intra-face level within the SDP/CSM 692, the sequence of functional execution is in one embodiment aligned with the TeleManagement Forum (TMF) Business Process Framework (eTOM) Framework Level 3-5, as described in e.g., TMF eTOM publication entitled "GB921 Getting Started with Business Process Framework Release 8.0" dated Nov. 17, 2008, which is incorporated herein by reference in its entirety. This interaction is ideally accomplished via an accepted IT standards trend such as, for example, Business Process Execution Language (BPELs), as disclosed in Organization for the Advancement of Structured Information Standards (OASIS) publication entitled "Web Services Business Process Execution Language Version 2.0" Apr. 11, 2007, although this is not a requirement of practicing the invention.

The data-to-process mapping/transformation between SDP internal subsystems and peripheral systems should also ideally support an Industry accepted Common Information Model (CIM) such as the TMF Shared Information Data (SID) Model, as described in TMF SID publication entitled "GB922 Information Framework (SID) Solution Suite Release 8.0" dated Nov. 17, 2008, which is incorporated herein by reference in its entirety, but again this is not a requirement.

In the embodiment of FIG. 6e, IP content stored at the national content library 612 may be streamed via the real-time encryption server 684 to an unmanaged content distribution network 626 (i.e., off-net network). Broadcast content may also be streamed via a real-time encryption server 684 to the content distribution network 626 (off-net network) as well. Hence, IP-enabled CPE 107 and PMD 105 advantageously may receive content "over the top" of other (e.g., non-MSO) networks, the latter being used effectively only as agnostic bearer networks.

It should be noted that the above-described embodiments of the network 600 topology shown in FIGS. 6-6e are merely exemplary of the broader principles of the invention; many other network configurations and possible topologies can be utilized.

V. Distribution Network Architecture—

Figure 7:
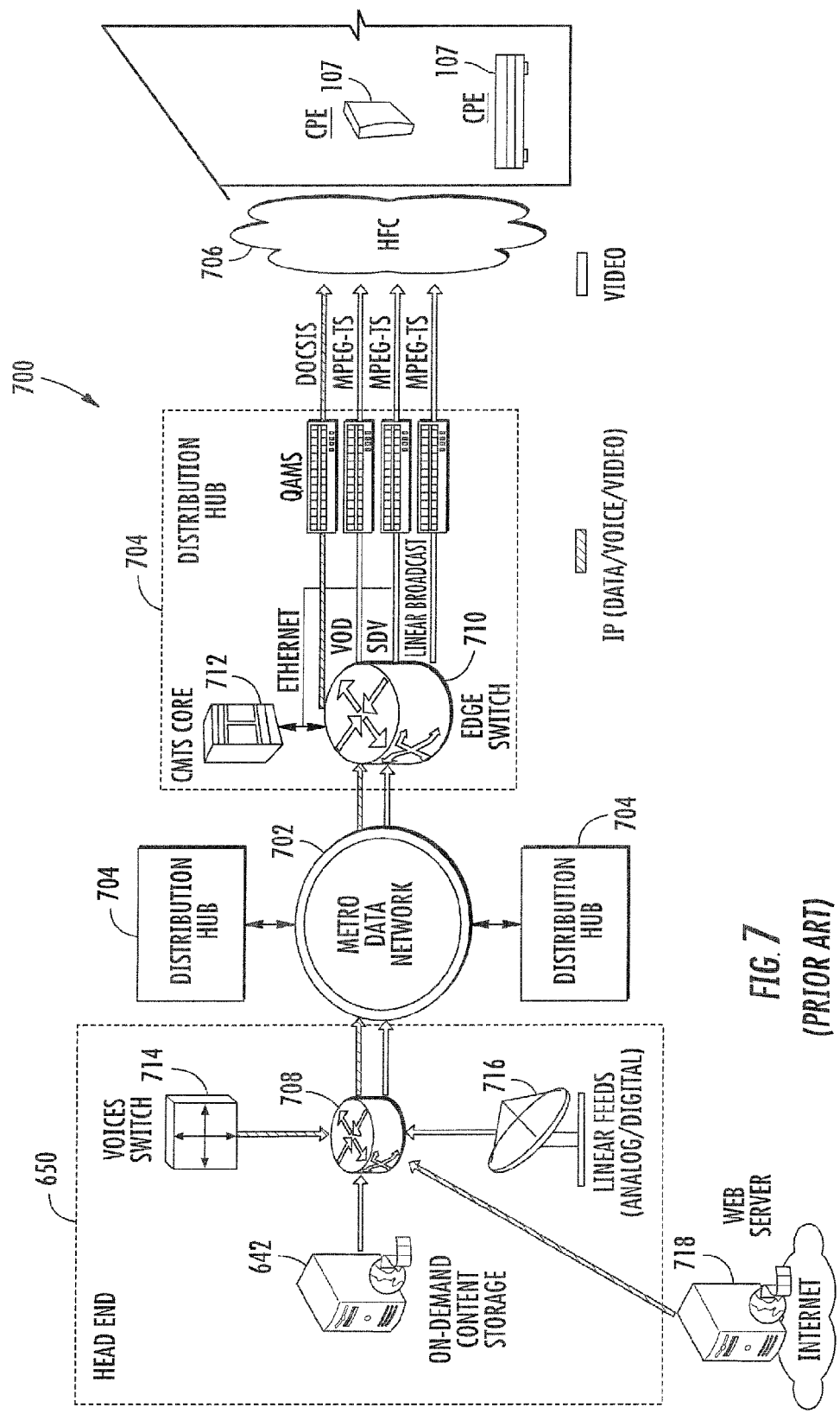
FIG. 7 is a functional block diagram illustrating an exemplary prior art distribution network configuration for providing IP and video content to consumer devices.

FIG. 7 illustrates a typical prior art content-based distribution network 700 configuration for the provision of content. As illustrated, the network 700 generally comprises at least one local headend in communication with an optical ring 702. The optical ring 702 is in communication with a plurality of distribution nodes or hubs 704, which are in communication with user CPE 107 via a network 706.

As illustrated, content is received from various content sources, such as linear feeds (analog and digital) 716, divisional content libraries 642 (as well as national libraries 612 and regional libraries 632), and other sources. The content source may comprise any indigenous (i.e., MSO) or third party provider of content, whether direct or indirect. This content may comprise an MPEG (e.g., MPEG-2) stream, or otherwise. The content may also pass through one or more intermediary nodes or conditioning process before transmission over the network 206 via one or more servers or other devices, as is well understood in the art. The received broadcast and/or on-demand content is multiplexed together into a multi-program transport stream (MPTS) prior to delivery to the distribution hub 704. A voice switch device 714 and web server 718 are also provided for delivery of IP content (such as VoIP and internet content).

In the illustrated prior art network of FIG. 7, on-demand as well as broadcast video content is received at the headend 650 and via a headend switch device 708 transmitted through the optical ring 702 to at least one distribution hub 704. IP data is also received from the data sources to enter the optical ring 702 via the switch apparatus 708. In one embodiment, the switch apparatus 708 comprises a core switching device such as an 802.3z Gigabit Ethernet device.

The on-demand and broadcast video content (as well as IP data) are received at the edge switch device 710 of the distribution hub 704. The switch device 710 causes delivery of the received on-demand and broadcast content to CPE 107 via an MPEG transport stream (MPEG-TS) over an "in-band" QAM channel. The video content (including audio content) is provided in each downstream (in-band) channel associated with the relevant service group. The content may be provided to the CPE 107 as video on demand (VOD) content, linear broadcast content or switched digital video (SDV) content.

IP data received at the edge switch device 710 is processed by, e.g., a DOCSIS 1.x or 2.x, 3.x, or EuroDOCSIS-compliant CMTS (cable modem termination system) 712 or other such device. As is well known, the CMTS 712 comprises devices typically located in the headend or hub site that allows high-speed IP network access via the indigenous subscriber network and CPE/cable modem. The CMTS 712 performs a lower layer translation of sorts between the domain in which the cable modem operates (e.g., 16- or 256-QAM RF channels) and the packet switched network domain, and also facilitates coupling to an internet or IP backbone (such as via an ISP, or directly by the MSO). Typical network layer protocols used by the CMTS 712 and packet switched domains include IP (Internet Protocol), for compatibility between the two domains. Hence, with a cable modem and CMTS 712, a cable subscriber can couple his/her TCP/IP-based computer to the cable modem, and both transmit and receive IP-based packets via the CMTS 712 interface to an external IP backbone (and hence the Internet) or other data network. Quality of Service (QoS) with minimum and maximum rate service levels may also be provided, as well as inter alia link- or other-layer encryption and key management protocol, dynamic load balancing and frequency agility, support of multiple upstream and downstream channels, remote access server (RAS) capability, anti-spoofing functions, per subscriber filters, DHCP assignments, etc.

Since content delivery is often in the form of a packetized protocol (e.g., MPEG2 or the like), the CMTS 712 or other bridge device to the external IP network can also take the packetized content directly from the server (after proper formatting, FEC, etc. as required) and vice versa.

The IP data is then delivered to the CPE 107 via one or more DOCSIS QAMs. The CPE 107 may also communicate with the headend 650 via the OOB or DOCSIS channels and associated protocols. For example, the OCAP 1.0 specification provides for networking protocols both downstream and upstream.

Figure 8:
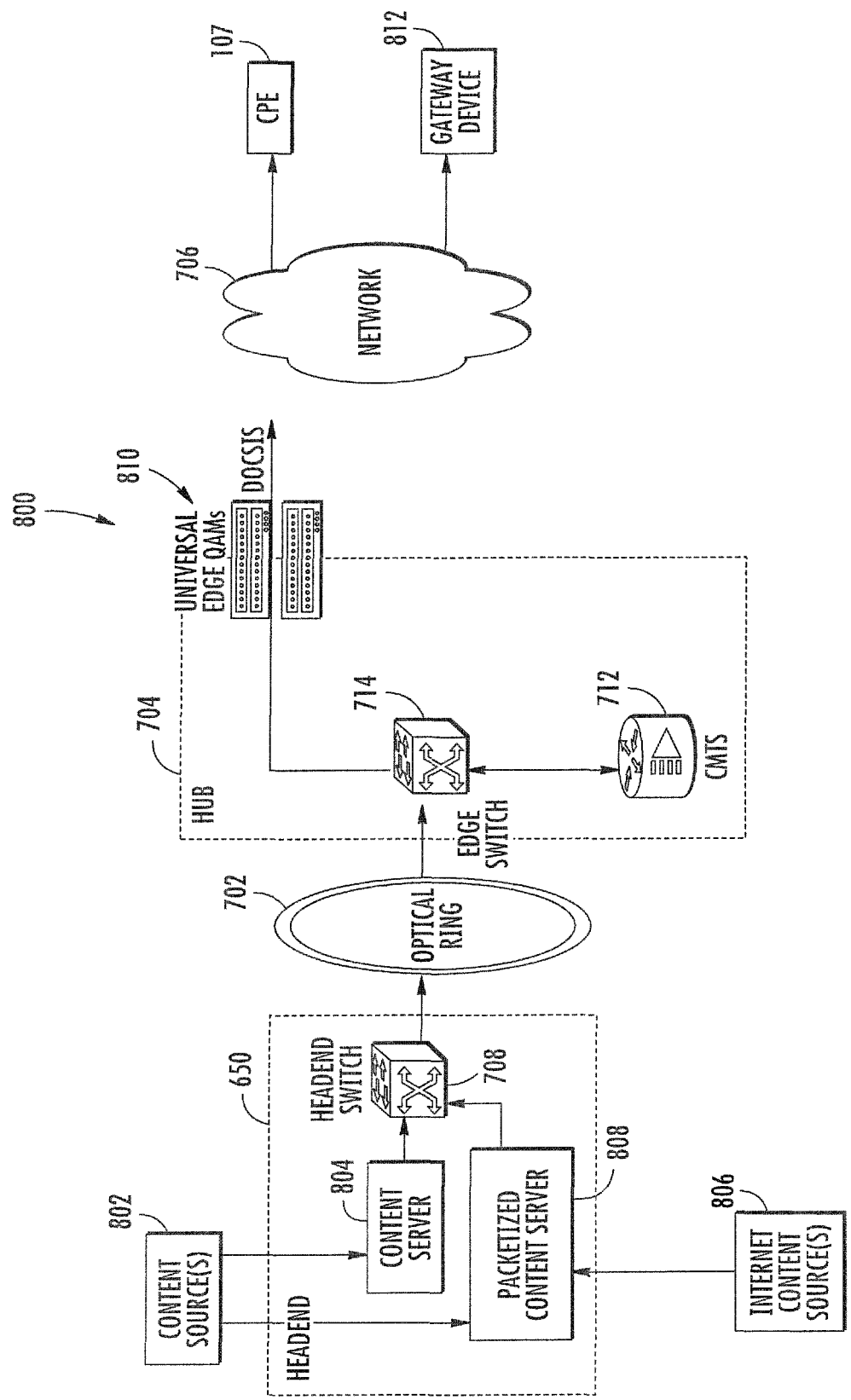
FIG. 8 is a functional block diagram illustrating a distribution network configuration for providing IP and video content to consumer devices in accordance with one embodiment of the present invention.

Referring now to FIG. 8, an exemplary embodiment of a distribution network architecture 800 according to the present invention is given. As shown, the distribution network 800 generally comprises a local headend 650 in communication with at least one hub 704 via an optical ring 702. The distribution hub 704 is able to provide content to various user devices, CPE 107 and gateway device 812, via a network 706.

Various content sources are given 802 for providing content to a content server 804. For example, content may be received from any one of the aforementioned content libraries 612, 632, 642, from linear analog or digital feeds, as well as third party content sources. Internet content sources 806 (such as e.g., a web server 718) provide Internet content to a packetized content server 808. Other IP content may also be received at the packetized content server 808, such as voice over IP (VoIP) and/or IPTV content. Content may also be received from subscriber and non-subscriber PMDs 105 (e.g., a PC or smartphone-originated user made video). In one embodiment, the functionality of both the content server 804 and packetized content server 808 may be integrated into a single server entity.

One exemplary multi-server architecture useful with the present invention is described in co-owned United States Patent Application Publication No. 20020059619 published May 16, 2002, entitled "Hybrid central/distributed VOD system with tiered content structure," and issued as U.S. Pat. No. 7,690,020 on Mar. 30, 2010, which is incorporated herein by reference in its entirety. Specifically, a hybrid central/distributed and tiered video on demand (VOD) service network with tiered content structure is disclosed. In particular, the system uses media servers located in both the headend 650 and hub stations 704. CPE 107 generally would be supplied on-demand services from the high-demand content media (and data) servers located in the hub station 704 nearest to the user (or the gateway 812 discussed below).

A central media server located in the headend 650 may be used as an installed backup to the hub media servers; as the primary source for lower demand services and as the source of the real time, centrally encoded programs with PVR (personal video recorder) capabilities. By distributing the servers to the hub stations 704, the size of the fiber transport network associated with delivering VOD services from the central headend media server is reduced. Hence, each user has access to several server ports located on at least two servers. Multiple paths and channels are available for content and data distribution to each user, assuring high system reliability and enhanced asset availability. Substantial cost benefits are derived from the reduced need for a large content distribution network and the reduced storage capacity requirements for hub servers.

It will also be recognized that a heterogeneous or mixed server approach can be utilized consistent with the invention. For example, one server configuration or architecture may be used for servicing cable, satellite, HFCu, etc. subscriber CPE-based session requests, while a different configuration or architecture may be used for servicing mobile client (PMD 105) requests. Similarly, the content servers 804, 808 can either be single-purpose/dedicated (e.g., where a given server is dedicated only to servicing certain types of requests), or alternatively multi-purpose (e.g., where a given server is capable of servicing requests from multiple different sources).

The architecture 800 of FIG. 8 may further include a legacy multiplexer/encrypter/modulator (MEM) coupled to the network 706 adapted to "condition" content for transmission over the network. In the present context, the content server 804 and packetized content server 808 may be coupled to the aforementioned LAN thereby providing access to the MEM and network 706 via one or more file servers (not shown). The content server 804 and packetized content server 808 are coupled via the LAN to a core switching device 708 such as an 802.3z Gigabit Ethernet device. Video and audio content is multiplexed at the headend 650 and transmitted to the edge switch device 714 (which may also comprise an 802.3z Gigabit Ethernet device).

In one embodiment, both IP data content and IP-packetized audio/video content is delivered to a user via one or more universal edge QAM devices 810. According to this embodiment, all of the content is delivered on DOCSIS channels, which are received by CPE 107 (and/or gateway 812, described subsequently herein) that are able to receive, decrypt and display the transmitted content. As a back-up mechanism, audio/video content may also be provided in downstream (in-band) channels as discussed above; i.e., via traditional "video" in-band QAMs (see FIG. 8a below). In this fashion, a co-enabled DSTB or other CPE could readily tune to the new (in-band) RF video QAM in the event that their IP session over the DOCSIS QAM is for some reason interrupted. This may even be accomplished via appropriate logic within the CPE (e.g., autonomously, or based on signaling received from the headend or other upstream entity).

In another variant, elements in both the headend and CPE 106 are specially adapted to utilize transmission infrastructure to transmit and receive both multiplexed wideband content and legacy content as is described in co-owned, co-pending U.S. patent application Ser. No. 11/013,671 filed on Dec. 15, 2004, entitled "Method and Apparatus for Wideband Distribution of Content", and issued as U.S. Pat. No. 9,723,267 on Aug. 1, 2017, which is incorporated by referenced herein in its entirety. As discussed therein, the CPE 107 or gateway 812 of this embodiment may be configured to contain multiple tuners (or a single wide-band tuner) which allow the device to receive the signals from all of the relevant physical carriers simultaneously. The carriers are demodulated, and channel-based decryption and basic demultiplexing (recombination) is performed. If multiplexed, the streams are then delivered to a transport demultiplexer which demultiplexes all of the streams resident within the statistical multiplex.

A methods and apparatus for the switched delivery of content may also be utilized consistent with the present invention. For example, only that content for which there is at least one request from a user device may be placed on a network segment. In one embodiment, the methods and apparatus disclosed in co-owned U.S. patent application Ser. No. 09/956,688 entitled "Technique For Effectively Providing Program Material In A Cable Television System" and filed on Sep. 20, 2001, and issued as U.S. Pat. No. 8,713,623 on Apr. 29, 2014, which is incorporated herein by reference in its entirety, may be utilized for providing "switched" delivery of the IP content. For example, a mechanism may be employed whereby the delivery of a session is based at least in part on logic to determine whether any users for the session are active; e.g., a multicast with no remaining "viewers" (or session participants) may be collapsed, and the bandwidth reclaimed.

Figure 8A:
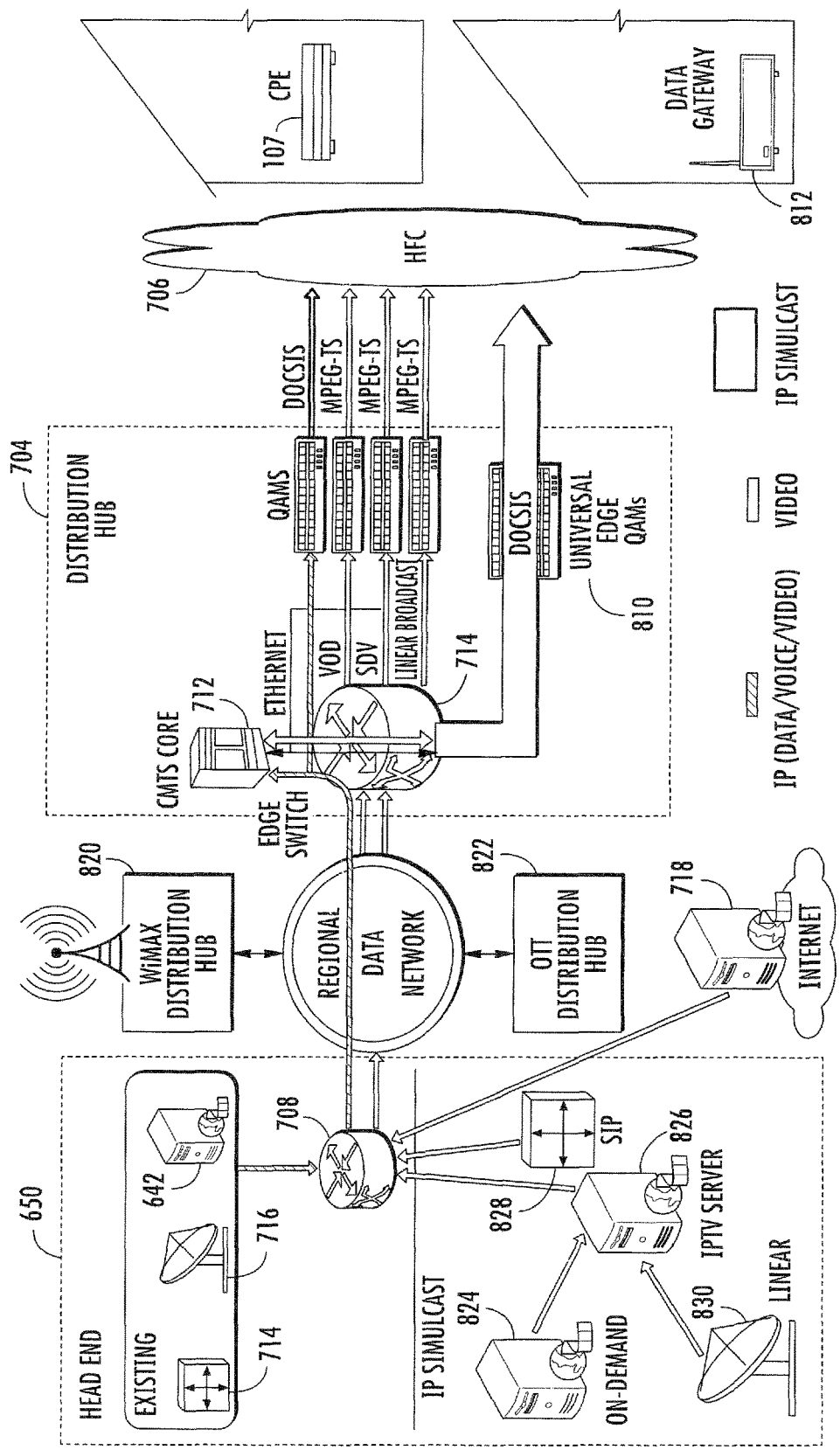
FIG. 8a is a functional block diagram illustrating another embodiment of a distribution network configuration for providing IP and video content to consumer devices in accordance with the present invention.

FIG. 8a illustrates another exemplary embodiment of a distribution network architecture for use with the present invention. As shown, in the illustrated example, existing on-demand 642, voice 714, and broadcast content 716 collectors feed content to a headend switch device 708. The headend switch provides the content to the optical ring 702 for provision to one or more distribution hubs 704.

Simultaneous to the provision of content by the existing content sources 642, 714, 716, IP content is also forwarded to the headend switch device 708. IP simulcast content is retrieved from a plurality of content sources at an IPTV server 826. For example, content may be received from an on-demand content store 824 and/or a linear broadcast feed 830 to the server 826. Alternatively, the content received at the IPTV server 826 may be sent thereto from the existing content library 612, 632, 642 and/or existing linear feeds 716. The IPTV server 826 provides the content to the headend switch 708. Content and web content may also be received at the headend switch 708 via a SIP server 828 and web server 718, respectively.

As discussed above with respect to the provision of existing on-demand, voice and broadcast content, IP content from the IPTV server 826, SIP server 828 and web server 718 are also forwarded to the optical ring 702. The optical ring 702 enables the content received at the headend switch 708 to be transmitted to the edge switch device 714 of at least one distribution hub 704.

The IP-packet content is transmitted to subscriber devices via the universal edge QAM 810 and the network 706. The IP video ("simulcast") content is presented to client devices capable of receiving content over the DOCSIS QAMs. For example, the aforementioned gateway device 812, as well as an advanced CPE (i.e., IP DSTB) may receive the IP simulcast. Legacy CPE 107 may receive content via the gateway device 812, or via an audio/video "back-up" MPEG transport stream as previously described.

Figure 8B:
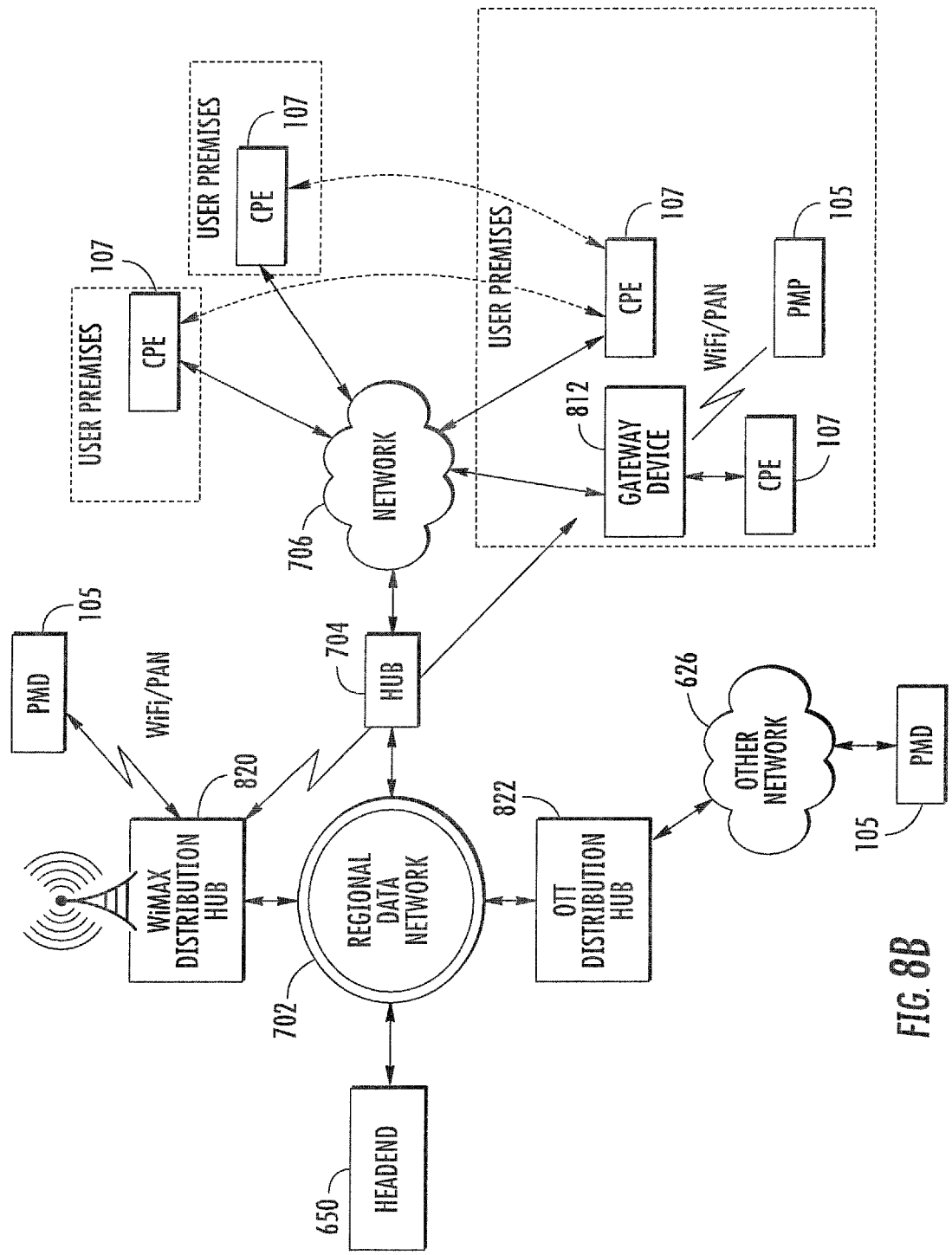
FIG. 8b is a functional block diagram illustrating specific ones of distribution network components useful in providing IP and video content to consumer devices in accordance with the present invention.

FIG. 8*b* illustrates the various distribution schemes which may be used to accomplish delivery of IP packetized content in accordance various implementations of the present invention. As shown, IP content received at the optical ring 702 from the headend 150 is transmitted to various ones of distribution hubs 820, 704, 822. Although only one of each type of hub is illustrated, it will be appreciated that one or more of each may be utilized.

As shown, content may be delivered to various WiMAX-enabled mobile devices (e.g., PMD 105) via a WiMAX distribution hub. "WiMAX" is a wireless technology that provides high-throughput broadband connections over longer distances (as compared to short-range technologies such as Bluetooth or PAN). WiMAX can be used for a number of applications, including "last mile" broadband connections, cellular backhaul, hotspot coverage, and high-speed enterprise connectivity, as well as broadband delivery to mobile devices.

Content and/or data may also be distributed to the PMD 105 (or to a gateway device 812, as discussed below, or a cable modem associated with either the PMD 105 or gateway device 812) via Worldwide Interoperability for Microwave Access (WiMAX) transport; see IEEE Std. 802.16e-2005 entitled "IEEE Standard for Local and metropolitan area networks—Part 16: Air Interface for Fixed and Mobile—Broadband Wireless Access Systems Amendment 2: Physical and Medium Access Control Layers for Combined Fixed and Mobile Operation in Licensed Bands", which is incorporated herein by reference in its entirety. For example, multiple WiMAX base stations (e.g., WiMAX distribution hubs 820) may be established by the MSO or other content provider. One or more of the WiMAX stations 820 transmit programming or other content (including IP-packetized "IPTV" content) and/or data to the PMD 105. This transmission may also include simultaneous transmission (repeating) or retransmission for error correction purposes, so as to ensure a robust signal is received, and to potentially support any QoS requirements over the WIMAX transport. In one embodiment, a PMD 105 (or gateway device 812 having an associated cable modem) may transmit and receive out-of-band data via WiMAX transport. In yet another embodiment, video or other content may also be sent/delivered using the aforementioned WiMAX transport (such as the aforementioned IP content stored at the libraries 612, 632, 642). In this fashion, the WiMAX transport acts as a wireless data "pipe" in parallel to the normal DOCSIS (or in-band RF QAMs if used) transmitted over the distribution network.

At the distribution hub 704, IP content is provided via a network 706 to various devices across multiple user premises. As discussed above, the content may be provided to a gateway device 812, converged premises device (CPD) and/or IP enabled CPE 107.

The gateway device 812 serves as a gateway to the IP content for other client devices (such as other CPE 107 and PMD 105). The gateway device 812 may communicate with one or more connected CPE 107, as well as utilize Wi-Fi capabilities (where so equipped) to communicate wirelessly to other devices (such as PMD 105). It will also be recognized that the present invention may be configured with one or more short-range wireless links such as Bluetooth for lower bandwidth applications (or UWB/PAN for greater bandwidth applications).

In another embodiment, content received at a first user CPE 107 may be transmitted to CPE 107 of other premises in a peer-to-peer (P2P) fashion. For example, first content may be requested and received at a first CPE 107. Then, when a second CPE 107 in the same region or division requests the same content, the request may be examined by a headend entity (not shown), or the gateway 812 acting as a peer proxy, to determine that the requesting second device CPE 107 is entitled to receive the content and that the content is available at the first CPE 107. The headend entity directs a peer-to-peer communication to be established between the authorized second CPE 107 and the CPE 107 having the requested content. It is appreciated that while described herein in the context of a single CPE 107 providing content to a second CPE 107, several CPE 107 having the content thereon may be contacted for simultaneous delivery of the content to one or more second CPE 107.

In one such implementation, the peer-to-peer communication methods and apparatus disclosed in co-owned, co-pending U.S. patent application Ser. No. 11/726,095 entitled "Method and Apparatus for Content Delivery and Replacement In a Network" filed Mar. 20, 2007, which is incorporated herein by reference in its entirety may be utilized in conjunction with the present invention. As discussed therein, these PSP methods and apparatus have as a primary aim improving the "robustness" or capability of the network with respect to ensuring that subscribers or other users can receive and access desired content when they want, as well as seamlessly repairing or reconstituting damaged or missed portions of that content (including even an entire streamed program, broadcast or download).

In one embodiment, a dynamic peer-to-peer (P2P) architecture is used to provide the foregoing functionality. Specifically, one variant of this architecture comprises using customer premises equipment or CPE (e.g., IP-enabled DSTBs and DVRs, or other subscriber premises devices present within the network) to act as peer content providers for one another. This peer relationship may be as simple as one device with certain content (or portions thereof) providing that content to another device. More sophisticated variants of the invention employ the use of multiple source peers (and in some cases multiple requesting or "sink" peers), as controlled by a server process.

This P2P approach has many potential benefits including, for example, the ability to push at least some network bandwidth consumption out to the edge of the network (e.g., hubs or other distribution nodes), thereby conserving bandwidth at the core of the network, the latter which can often be the most critical or bandwidth constrained portion of the system. Moreover, requests outside the MSO network are obviated, thereby conserving resources in this regard. Latency can also be reduced in some cases (e.g., where the network is over-subscribed), since the requested content is acquired and distributed locally versus having to come from the core (or a third-party content source routed through the core or other network infrastructure). It also leverages distributed processing power as well, allowing for inter cilia; use of "thinner" clients. Since each peer is providing only comparatively small portions of the requested content (which may also be capped or restricted based on that peer's capability), it may not require the same processing, storage, and other capabilities it might require if it were sole-sourcing the requested content.

FIG. 8*b* further illustrates the delivery of content from an "off-net" distribution hub 822 to another network 126, not associated with the MSO. In this embodiment, rather than sending content out of network at the national level (as discussed in FIG. 6e above), a requesting device 105, 107 may request content directly from a local headend 650 or divisional server. As previously described, the ability to transfer such content over both MSO-maintained ("on-net") and "off-net" networks advantageously facilitates the provision of "content anywhere" to subscribers, as well as session mobility (i.e., transfer of an existing session from on-net to off-net, and vice versa.

Many other permutations of the foregoing system components, architectures and communication methods may also be used consistent with the present invention, as will be recognized by those of ordinary skill in the field.

VI. Premises Gateway Device—

Figure 9:
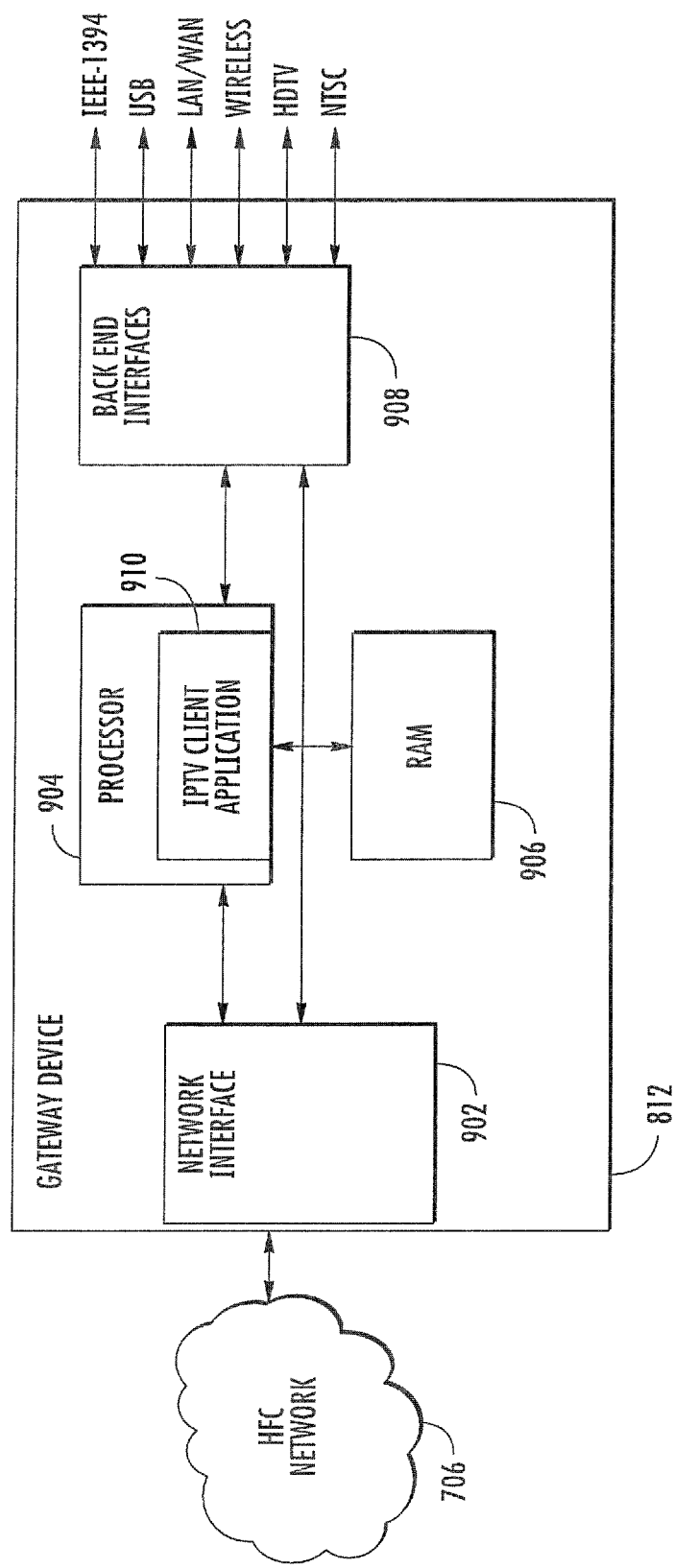
FIG. 9 is a functional block diagram illustrating an exemplary gateway device for use with the present invention.

FIG. 9 illustrates an exemplary gateway device 240, 812 for use with the present invention. As with the CPE 107 described below, the gateway of the present invention may take on any number of forms, including those with various types of wired and wireless interfaces, indigenous recording capabilities (e.g., DVR or MR-DVR capability), etc. The exemplary embodiment is Open IPTV Forum (OIPF) enabled, however this is not a requirement of practicing the invention.

Moreover, it will be recognized that while certain embodiments of the content distribution network of the invention are described as using a gateway (such as those referenced above), the gateway is not an essential component for the delivery of packet-based content over the network according to the invention. For example, in certain variants, an IP-enabled DSTB with a suitable front-end (network) interface for receiving the packetized content (such as that described below with respect to FIG. 10) may obviate use of the gateway.

As shown, the gateway device 812 generally comprises a network interface 902, processor 904 with associated RAM 906, and a plurality of back end interfaces 908. The network interface 902 enables communication between the device 912 and the delivery network 706 (e.g., HFC, HFCu, satellite, etc.). The gateway device 812 network interface 902 is configured to receive IP content over the DOCSIS QAM (and optionally via standard in-band QAM transport if so equipped as a backup or alternate transport) via an RF tuner, demodulator, etc. Additionally, the network interface 902 may be configured to modulate, encrypt, and multiplex as required, and transmit digital information for receipt by upstream entities such as the CMTS or a network server.

As discussed above with respect to FIG. 8b, the gateway device 812 may be configured to provide received content to other devices in a user's network (such as via MoCA network, CAT-5 LAN, and/or other wired or wireless topology such as Wi-Fi). Hence the back end interfaces 908 can include e.g., video/audio interfaces, RJ-45/CAT-5, IEEE-1394 "FireWire", USB, serial/parallel ports, etc.) for interface with other end-user apparatus such as televisions, personal electronics, computers, Wi-Fi, PAN (802.15), or other network hubs/routers, etc. Other components which may be utilized within the device (deleted from FIG. 9 for simplicity) include various processing layers (e.g., DOCSIS MAC or DAVIC OOB channel, MPEG, etc.), as well as media processors and other specialized SoC or ASIC devices. The gateway device 812 may also comprise an integrated HD decoder, thereby relieving any connected monitors or other devices from the requirement of having such a decoder. These additional components and functionality are well known to those of ordinary skill in the cable and embedded system fields, and accordingly not described further herein.

The gateway device 812 also optionally includes a MoCA, retail compliant F-connector for providing data-over-coax capability. The exemplary MoCA port operates in the 1125-1525 MHz band, although other frequencies (MoCA compliant or otherwise) may be used for this purpose if desired. The MoCA frequencies can be multiplexed onto the cable input port of the gateway device 812, or sent over another channel (e.g., dedicated channel or interface). The exemplary MoCA interface (not shown) of the gateway device 812 is compliant with the Media Over Coax. Alliance standard v1.0, September 2005, incorporated herein by reference in its entirety. The MoCA interface of the illustrated gateway 812 also supports a minimum of 8 active nodes on the coax network.

The gateway device 812 may also be made compliant with the Digital Living Network Alliance (DLNA) requirements version 1.5, which is incorporated herein by reference in its entirety. The gateway device 812 can automatically discover all DLNA-capable clients during boot up or other events, and present the available content catalog to one or more clients. The gateway device 812 can also automatically start a DLNA-compatible media servers at boot using only the aforementioned MoCA, wireline, and/or Wi-Fi network interfaces. The gateway device 812 may also be configured to poll once every n (e.g., 300) seconds for newly available content or content variation and propagate the list of available content to the user interface and DLNA clients.

Still further, the gateway device 812 may utilize the HomePlug A/V standard which transmits digital data over power lines in order to communicate with other devices in the user's premises.

It will further be recognized that the present invention can be used in conjunction with a so-called "trusted domain" for content and other data protection if desired. For example, in one embodiment, a trusted domain may be utilized to create an MSO-controlled subnetwork of devices. The trusted domain creates a barrier for permitting content to leave a "trusted" group of devices; within the "trusted" device content may be shared freely. The DRM functionality, as discussed previously herein, may, in one embodiment, be utilized to build a trusted domain for the delivery of content according to the present invention. Alternatively, Digital Transmission Content Protection over IP (DTCP/IP) may be utilized to provide content delivery between devices according to DRM.

Exemplary trusted domain apparatus (and methods) are described in co-owned U.S. Patent Application Ser. No. 11/006,404 filed Dec. 7, 2004, entitled "Technique For Securely Communicating Programming Content", and issued as U.S. Pat. No. 8,312,267 on Nov. 13, 2012, as well as U.S. Patent Application Ser. No. 10/894,884 filed on Jul. 20, 2004 of the same title, issued as U.S. Pat. No. 8,266,429 on Sep. 11, 2012, each of the foregoing being incorporated herein by reference in its entirety. These applications disclose, inter alia, a multi-layered rights arrangement to prevent unauthorized use and transfer of protected content, especially in a home network. For example, the home network may be considered to comprise multiple layers. One such layer may be a "trusted domain," described in aforementioned U.S. application Ser. No. 10/894,884. For example, in a cable TV system, the trusted domain might include not only the system portion where programming content traditionally is secured by, and within total control of, a cable operator, including, e.g., the headend, delivery network, etc., but also user devices, e.g., DSTBs or other CPE, at subscribers' premises which are capable of receiving and securely storing programming content in a prescribed manner. The cable operator can control certain subscriber access and usage with respect to content held within the trusted domain. For example, movie content held within a cable operator's trusted domain (e.g., on a hard drive of an STB or CPE) cannot be distributed over the Internet in viewable form and cannot become a source for duplication of multiple viewable copies. A second layer may be defined as being outside the trusted domain. A device in the second layer is assigned an indicator indicating an extent of security of the device. For example, when the device in the second layer requests transfer of protected content from a device in the first layer, the first layer device authenticates the second layer device to determine legitimacy of the device for receiving the protected content. After the second layer device is authenticated, the first layer device transfers not only the protected content, but also a set of rules associated with the protected content. At least some of the rules in the set are associated with the indicator and applicable to the second layer device with respect to use of the protected content.

So-called "DCAS" systems (downloadable conditional access systems) may also be used consistent with the invention in order to define/enforce trusted domains within the gateway device environment, or other environments in data communication therewith. See, inter alia, co-owned U.S. patent application Ser. No. 11/584,208 entitled "Downloadable Security And Protection Methods And Apparatus" filed Oct. 20, 2006, issued as U.S. Pat. No. 8,520,850 on Aug. 27, 2013, which is incorporated herein by reference in its entirety, for one exemplary DCAS implementation useful with the present invention.

In the illustrated embodiment of FIG. 9, the gateway device further comprises at least one IPTV user interface application 910. The user interface application 910 provides for the display of and interaction with the web-based user interface provided by the web server 634. Exemplary embodiments of the user interface will be discussed in greater detail below.

The processor 904 of the gateway device 812 may be further configured to run additional applications including those useful in determining a user's authority to view requested client. In one embodiment, the methods and apparatus disclosed in co-owned U.S. patent application Ser. No. 12/536,724 filed on Aug. 6, 2009 and entitled "System And Method For Managing Entitlements To Data Over A Network" may be utilized to provide the aforementioned functionality. Specifically, as discussed therein, a request for content is received from a client device at e.g., the processor 904 of the gateway device 812. The processor 904 obtains information identifying the user account (such as subscriber identification number, account number, etc.) and uses this information to request entitlements from an entitlements server (not shown) located elsewhere at the headend. Based on the results returned from the entitlements server, the processor 904 will either grant or deny the request. The entitlements server accesses subscription information in a subscriber and device database to obtain sufficient information to determine the entitlements of the subscriber.

In yet another embodiment, the gateway device 812 may be configured to transmit and/or receive data via WiMAX transport. In the context of the present invention for example, the gateway 812 might transmit content to connected CPE 107 via another connection (e.g., 1394, USB, MoCA, etc.), yet receive the requested content via a WIMAX broadband interface. Alternatively, the WiMAX interface could be used to transmit the requested content to the CPE 107. The WiMAX interface may also be configured as part of a cable modem function, as described elsewhere herein. Various permutations of the foregoing will be recognized by those of ordinary skill given the present disclosure.

In yet another embodiment, the gateway device may be (or incorporate therein) converged premises device (CPD) functionality, such as that described in co-owned U.S. patent application Ser. No. 11/378,129 entitled "METHODS AND APPARATUS FOR CENTRALIZED CONTENT AND DATA DELIVERY" filed Mar. 16, 2006, issued as U.S. Pat. No. 8,347,341 on Jan. 1, 2013, and incorporated herein by reference in its entirety. As discussed therein, the CPD functionality may be leveraged at the gateway device to provide centralized storage of content (such as content stored at other devices in the premises). However, as noted above, the gateway device may further comprise DRM termination functionality as well as DTCP protection.

The gateway may further comply with Digital Living Network Alliance (DLNA) standards. In the present invention, however, the gateway device may utilize DLNA standards for passing metadata to client devices (such as for passing parental control, EPG/guide data, ratings information, etc.). Such functionality may be useful for ensuring, for example, that parental controls are maintained on stored content within a premises. In one embodiment, the foregoing metadata processing and passing functions may be enabled via one or more extensions to the basic DLNA standards discussed above.

VII. CPE—

Figure 10:
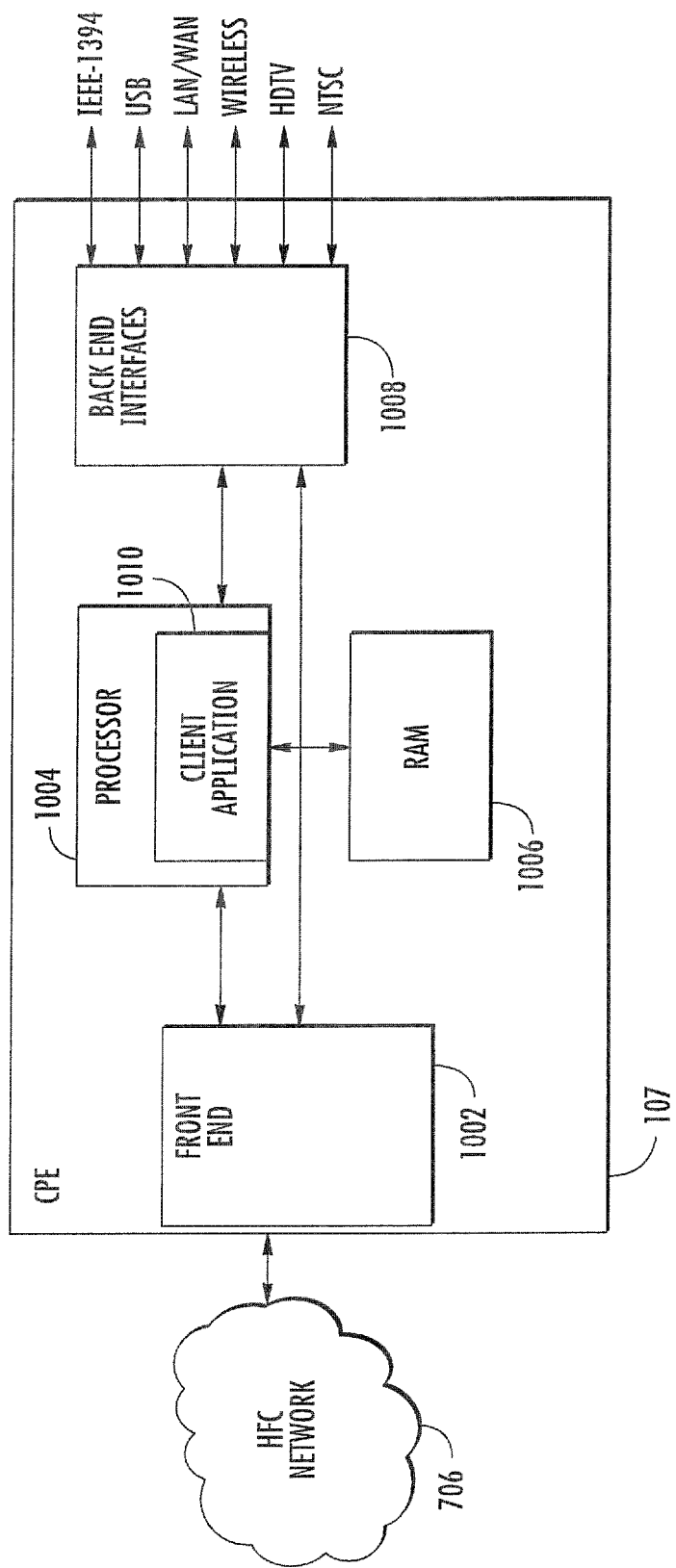
FIG. 10 is a functional block diagram illustrating an exemplary consumer premises device for use with the present invention.

One embodiment of a CPE apparatus 107 according to the invention is illustrated in FIG. 10. As shown, the CPE 107 generally comprises an OIPF-compliant embedded system with a TCP/IP transport/network layer functionality capable of supporting IP-packetized content. The CPE 107 may come in any number of different configurations, depending on the type of distribution network with which it is to interface, and the desired properties of the device 107.

For example, in one configuration, the CPE 107 is an IP-enabled DSTB adapted to interface directly to a cable or satellite delivery network, and hence includes at least one RF-band tuner to capture the IP packet content delivered over one or more QAMs. An RF front end 1002 (including demodulator/decryptors/demux) is also included to process the received RF signal and ultimately extract the IP protocol media packets.

Alternatively, the CPE 107 may be coupled with another device (e.g., a gateway) that has the requisite delivery network 706 interface, thereby alleviating the CPE of such requirements. The CPE 107 merely utilizes a protocol stack with TCP/IP layers to communicate with a like stack in the gateway over a designated PHY (e.g., 1394, USB, Wi-Fi, etc. interface medium).

Or, in yet another configuration, the CPE is coupled to a gateway, but the latter merely acts as a pass-through entity of the network signals does not demodulate, decrypt, or otherwise process the signals delivered over the coaxial drop, satellite dish/receiver, copper wiring, etc.).

The CPE 107 includes one or more digital processor(s) 1004, associated RAM 1006, and a plurality of front/back end interfaces 1008 (e.g., video/audio interfaces, IEEE-1394 "FireWire", USB, serial/parallel ports, etc.) for interface with other end-user apparatus such as DVRs, gateways, televisions, personal electronics, computers, Wi-Fi or other network hubs/routers, etc. Additionally, where so equipped, the network interface 1002 may be configured to modulate, encrypt, and multiplex as required, and transmits digital information for receipt by upstream entities such as the CMTS or a network server.

Other components which may be utilized within the device (deleted from FIG. 10 for simplicity) include various processing layers (e.g., DOCSIS MAC or DAVIC OOB channel, MPEG, etc.) as well as media processors and other specialized SoC or ASIC devices. These additional components and functionality are well known to those of ordinary skill in the content delivery and embedded system fields, and accordingly not described further herein.

The CPE 107 of FIG. 10 may also provided with an OCAP 1.0—or higher compliant application and Java-based middleware which, inter alfa, manages the operation of the device and applications running thereon (including the herein described client application 1010). It will be recognized by those of ordinary skill that myriad different device and software architectures may be used consistent with the functions of the present invention, the device of FIG. 10 being merely exemplary. For example, different middlewares (e.g., MHP, ARIB, or ACAP) may be used in place of the OCAP middleware of the illustrated embodiment.

The exemplary CPE 107 further comprises client applications or process which service EPG, IPTV user interface, and other associated functions necessary to support the various services described herein.

As previously noted, the CPE 107 of FIG. 10 further comprises a client application 1010 which, in one embodiment, is configured to receive, process and display IP-based content received from the gateway device 812, local headend 650, or other entity. This software application may be configured to provide the user with the ability to interact with IP content received thereon, as well as perform additional functions associated with the aforementioned content delivery. For example, the client application 1010 may support and enable web-browsing, video calling, etc., functions of the user interface, as discussed in greater detail below.

"Mover" CPE—

Figure 10A:
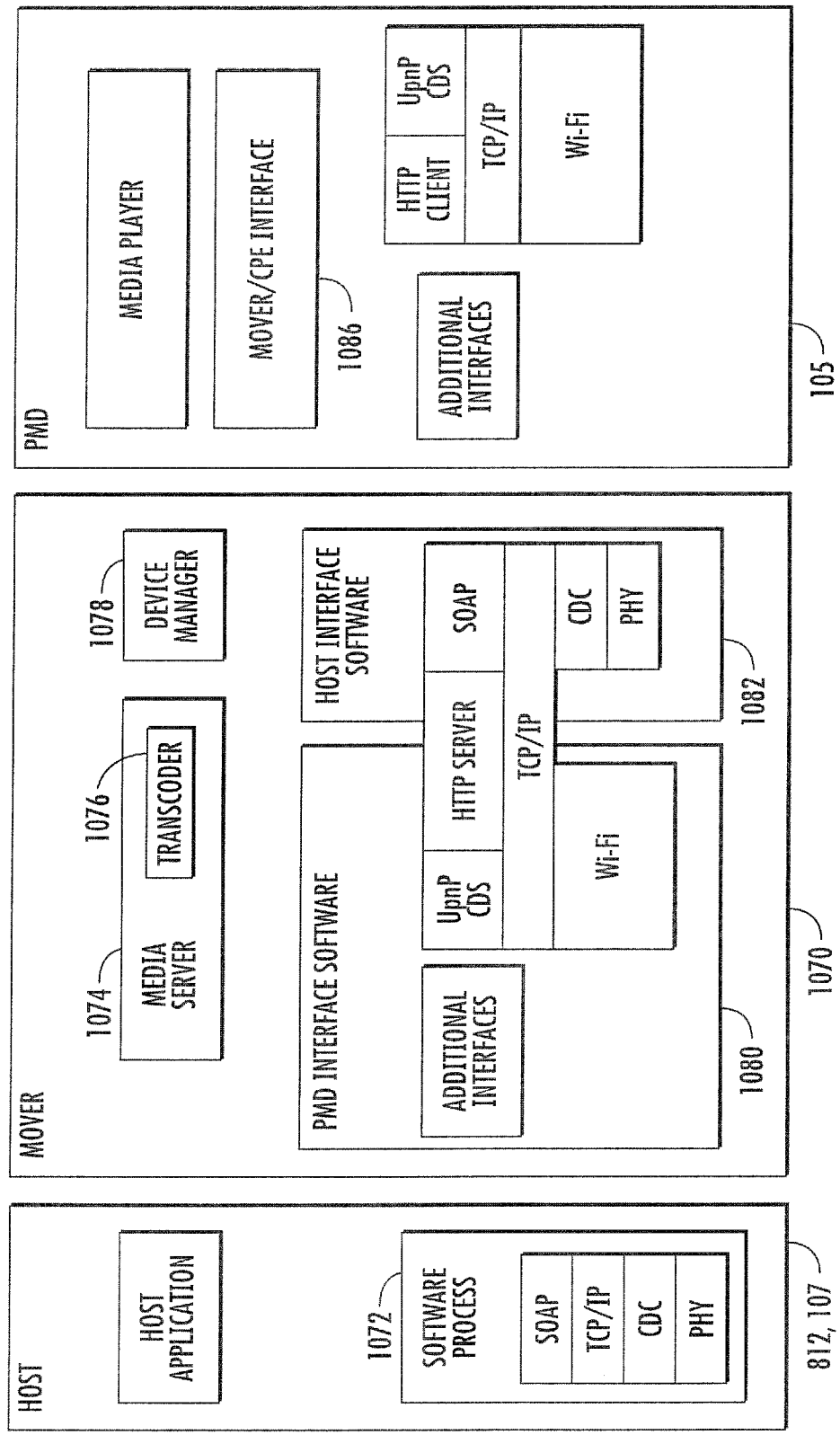
FIG. 10a is a logical block diagram illustrating one embodiment of a "mover" device according to the invention, and its relationship and interfaces with other exemplary premises/user equipment.

In another aspect of the invention, a premises DLNA-based "mover" CPE device is disclosed. As shown in FIG. 10a, this device 1070 is in one embodiment disposed logically between a host device (e.g., the gateway 812 of FIG. 9) and a client device (such as the PMD 105 of FIG. 11), although it will be appreciated that all or parts of the functionality of the mover CPE 1070 may in fact be disposed on or integrated with the aforementioned gateway 812, PMD 105, or in fact other CPE within the subscriber's premises (e.g., CPE or DSTB 107, converged premises device (CPD), or even a DVR. In the illustrated embodiment, the mover device 1070 communicates with a software process 1072 on the host device 812, 107, which comprises a protocol stack including a SOAP layer, TCP/IP transport/network layer, Communication Device Class (CDC) layer, and PHY (e.g., USB or 1394 interface). Other processing and components may be placed at the host device 812, 107 and are removed from the illustrated embodiment.

The mover device 1070 includes inter alia a host interface process 1082 (adapted to communicate with the host process 1072 described above), as well as a portable device interface process 1080 for communication with the PMD 105 (via the PMDs indigenous interface 1086, which may be resident on the device at manufacture, or which may be loaded on at a later time, such as by a service technician or the user via a download). The protocol stack(s) 1084 of the host interface and PMD interface processes 1082, 1080 utilize a common TCP/IP transport/network layer, and UPnP/HTTP/SOAP higher layer functions. SD-Card, Bluetooth, and Wi-Fi PHY interfaces are also included in the PMD interface process 1080 so as to facilitate communications with various types of PMD interfaces (these may also include other types of interfaces, such as USB and 1394 between the mover 1070 and PMD 105).

The illustrated embodiment of the mover device 1070 also includes a media server process 1074 (which includes a transcoding function 1076), as well as a device manager 1078.

In one embodiment, the mover device 1070 comprises a media bridging (MB) apparatus as disclosed in co-owned U.S. patent application Ser. No. 12/480,597 filed Jun. 8, 2009, entitled "Media Bridge Apparatus and Methods", and issued as U.S. Pat. No. 9,602,864 on Mar. 21, 2017, incorporated herein by reference in its entirety. As discussed therein, the MB apparatus acts as a connection between various client devices and a network. This bridging apparatus may be used, for example, to convert content stored on the device to a format capable of being presented on other ones of a user's devices. The bridging apparatus may also be utilized for transmitting content to the client device (such as by converting the content to a format capable of being stored/presented on the device), provided the user of the device is authorized to receive the content.

In operation, the mover device 1070 transcodes/transcrypts content (e.g., that obtained from a multi-room DVR (MR-DVR)) to a designated client device, here the PMD 105. The device connects to a home network via e.g., the Ethernet (IEEE Std. 802.3) protocol, although others may be used.

One salient function of the "mover" device is to stream multi-room DVR content to one or more IP-based client devices or processes. It is also configured to "Synchronize and go" (DVR to Go) as is discussed in the aforementioned U.S. patent application Ser. No. 12/480,597 filed Jun. 8, 2009 and entitled "Media Bridge Apparatus and Methods". The "Synchronize and go" technology enables a user to transfer content stored on a premises device (such as e.g., DVR) to a portable device by one or more transcoding and securing functions. The mover may further protect copied content with approved DTLA DRM functionality. The "Copy Freely" and "Copy One Generation" content stored on the DVR is allowed to be stored, and is marked as "copy no more" or "copy never" when stored on the IP client device 105.

The mover device 1070 is also advantageously configured to interface with many different (now ubiquitous) IP client device profiles such as the well known Apple iTouch™ and iPhone™ products, as well as others (e.g., Android™, PSP, Zune™, PS3 or XBOX 360™), and PC's and laptops.

Table 1 lists exemplary media types, formats, and I/O useful with the exemplary mover device 1072 of FIG. 10a.

TABLE 1

| Media Formats | | | |
|---|---|---|---|
| Media | Category | Input | Output |
| Video | Format | AVC Baseline Profile | AVC Baseline Profile, MPEG-2 |
|  |  | MPEG-2 | AVC Baseline Profile, MPEG-2 |
|  | Resolution | HD (1080p, 1080i, 720p) | HD, ED/SD, VGA, HVGA, QVGA, CIF, HCIF, QCIF |

TABLE 1-continued

Media Formats

| Media | Category | Input | Output |
|---|---|---|---|
| | | ED/SD (480i, 480p, 576i, 576p) | ED/SD, VGA, HVGA, QVGA, CIF, HCIF, QCIF |
| | Bit Rate | up to 20 Mbps | down to 64 Kbps |
| | Frame Rate | Interlaced: 30, 25 fps Progressive: 60, 30, 50, 25, 24 fps | Same as input |
| Audio | Format | AC3, MPEG-2 Audio | MP3, AAC, AAC-HE |
| | Bit Rate | up to 320 Kbps | up to 320 Kbps |
| | Channels | 5.1 2.0 | 5.1, 2.0 2.0 |
| Container | Format | MPEG-2 TS, MP4 | MPEG-2 TS, MP4 |

Figure 10B:
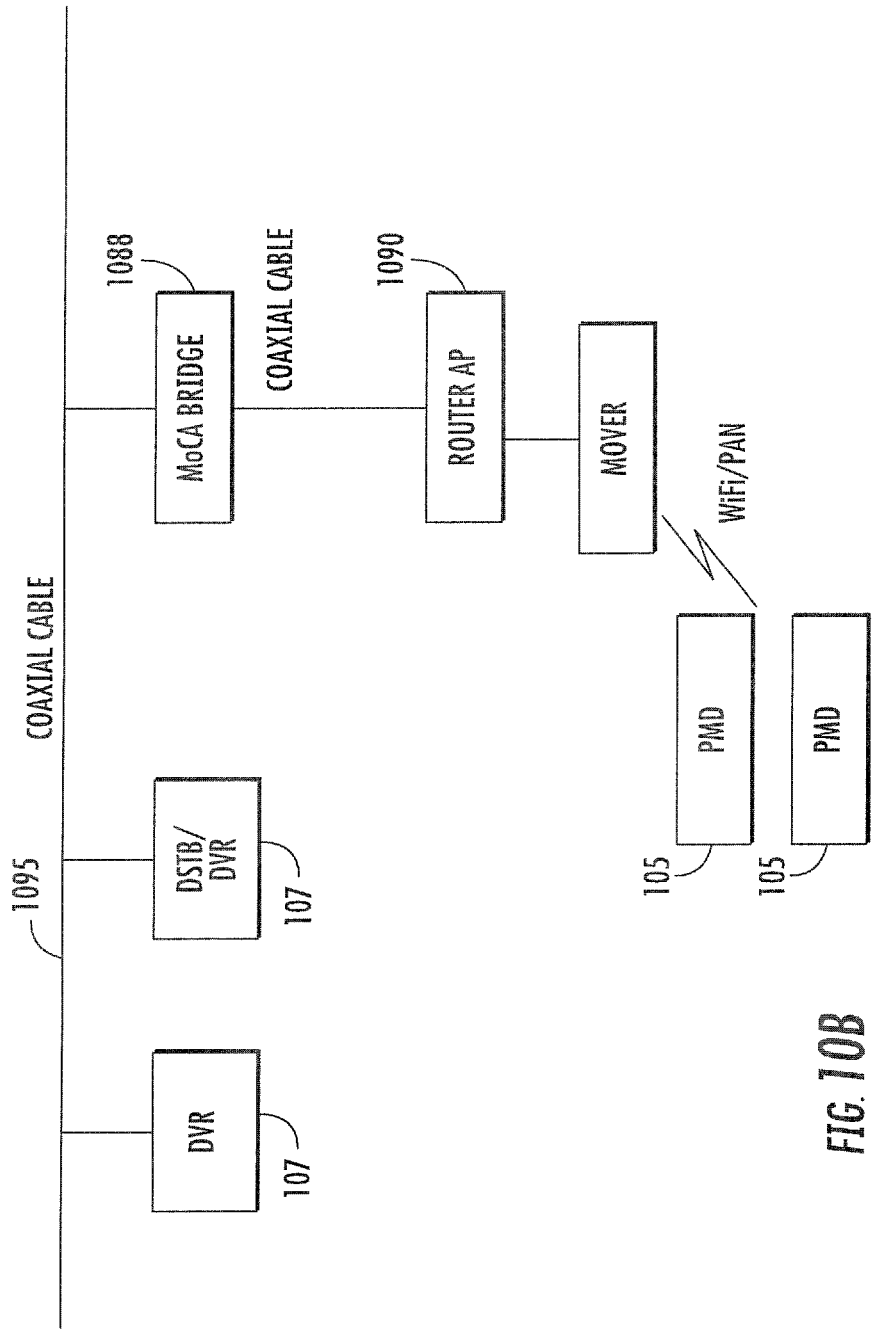
FIG. 10b is a functional block diagram illustrating one embodiment of an implementation of the "mover" device of FIG. 10a (i.e., in a premises "MoCA" cable network).
Figure 71:
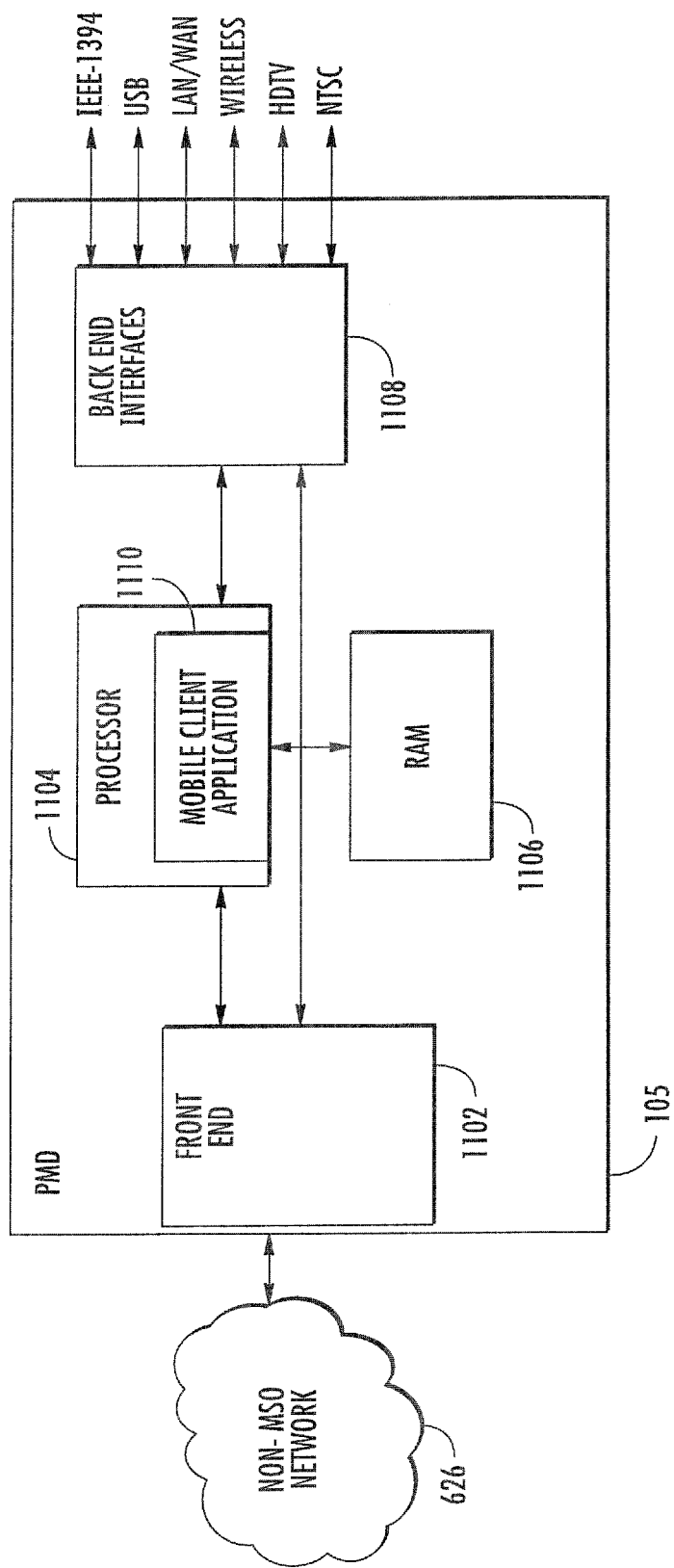
Figure 12:
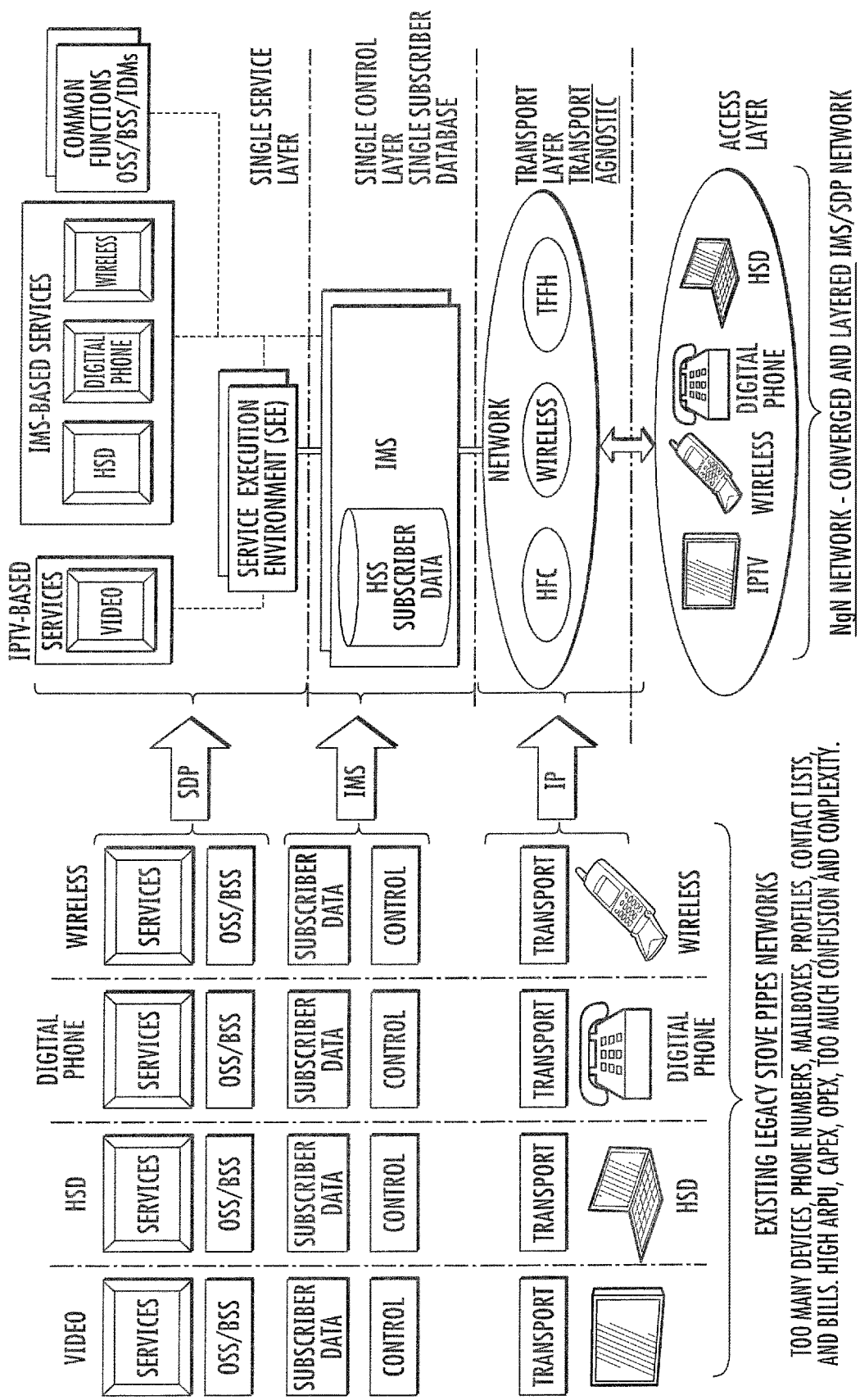
FIG. 12 is a graphical illustration of service integration under two different paradigm i.e., without Service Delivery Platform (SDP), and with SDP.

FIG. 10b illustrates another exemplary implementation of the mover device 1070 within a premises network. In this case, the premises network is based on a coaxial cable 1095 at the premises, and a MoCA bridge 1088 is used to provide networking and bridging functions between the DSTB/DVR devices 107 and an Ethernet-based router/access point 1090 via an Ethernet connection (e.g., CAT-5 cable) 1089 between the bridge 1088 and router/AP 1090. The mover 1070 is in wired (e.g., USB, 1394, etc.) or wireless (e.g., high bandwidth PAN such as UWB) connection with the router/AP 1090, so as to receive content from the CPE 107 via the bridge 1088 and router/AP. The PMD is shown in wireless (Wi-Fi) communication with the mover Wi-Fi interface/stack, so that the PMD can receive content from the mover 1070, including for example in a manner disclosed in the previously incorporated U.S. patent application Ser. No. 12/480,597 filed Jun. 8, 2009 and entitled "Media Bridge Apparatus and Methods".

VIII. Portable Media Device (PMD)—

Referring now to FIG. 11, an exemplary PMD 105 is illustrated. As previously described, the PMD may take on any number of different form factors, including for example a personal media player (e.g., MP3 player), cellular smartphone, PDA, handheld or minicomputer, laptop, and so forth.

As shown in FIG. 11, the PMD 105 generally comprises one or more "front end" communications interfaces 1102 for communication with a non-MSO network, such as a Wi-Fi based WLAN, premises network (e.g., MoCA network), cellular network (e.g., 3G UNITS), FLO network (e.g., Qualcomm MediaFLO technology for forward link only broadcast to mobile devices), etc. It will further be appreciated that in the context of the present invention, one or more these interfaces 1102 may be further configured to communicate with an MSO network 706, and/or one or more devices therein (such as the gateway apparatus 812). For example, the front-end of the PMD might include satellite, DSL, or other modem capability or the like.

In another implementation (see FIG. 8b), content and/or data may be distributed to the PMD 105 via a front-end WiMAX interface 1102, as discussed above. For example, one or more WiMAX base stations 820 may be established by the MSO or other content provider to transmit programming or other content and/or data to the PMD 105 directly.

The illustrated PMD 105 further comprises a plurality of "back end" interfaces (e.g., IEEE-1394, USB, LAN/WLAN, short-range wireless, HDTV, DisplayPort, and/or National Television System Committee connections). These connections enable the PMD 105 to communicate with other devices wired or wirelessly, such as to transmit or receive data files, media, electrical power, composite video signals, etc.

It is noted that in the present context, the terms "front end" and "back end" have no particular connotation or meaning, but rather merely refer to different portals for data to be used in different operational scenarios or use cases. For instance, in one such case, data received over a "back end" interface (e.g., USB connector) might be streamed over the "front end" interface (e.g., 3G cellular data service), or vice versa. Alternatively, two "back end" interfaces may be used to move data in and out of the PMD. Myriad such combinations will be recognized by those of ordinary skill given the present disclosure.

A mobile client application 1110 is also run on the processor 1104 of the illustrated PMD 105. The mobile client application 1110, similar to the client application 1010 of the CPE 107 of FIG. 10, enables various user-based functions within the PMD, including display and user interactivity with the user interface (UI). Various other user interface functionality, as will be discussed below, may also be provided via the mobile client application 610.

It will also be recognized that the device configuration shown is essentially for illustrative purposes, and various other configurations of the PMD 105 are consistent with other embodiments of the invention. For example, the PMD 105 in FIG. 11 may not include all of the elements shown, and/or may include additional elements and interfaces such as for example an interface for a PAN (e.g., 802.15), Bluetooth, or other short-range wireless interface for localized data communication, etc.

IX. User Interface (CI)—

In one embodiment, a network controlled, web-based navigational user interface is delivered to the user device, such as the CPE 107 (whether leased from the MSO or retail), PMD 105, and/or gateway devices 812. This network controlled, web-based interface advantageously allows for rapid user personalization and customization, as well as service addition, replacement, and augmentation. It also permits the MSO a greater degree of control over the "look and feel" of the UI (which may be tied to the MSO's differentiation and value proposition).

Content made available to the user may be presented in the form of an electronic program guide (EPG) or other guide/interface having both MSO-based content and off-net content (e.g., internet content, uploaded user-originated content, etc.) listed therein. In one embodiment, the interfaces are made open to developers and MSO-partners in order to increase speed and ease of integration of new interfaces, services, applications, and functionality.

In one exemplary configuration, the user interface is served to the client premises from the network; i.e., the UI is network-based versus CPE-based as in many prior art implementations. This approach advantageously provides the ability for the network operator (e.g., MSO) to rapidly control and reconfigure the UI depending on the particular application or user (i.e., personalization). For instance, in one variant, a network server disposed at the headend (whether regional, divisional, or national) is used to preserve individual subscriber/account UI features and preferences, and serve these to the CPE during operation. It can also maintain these features and preferences consistent across the population of devices associated with a given subscriber account (or even individual users within a multi-user account such as that of a family). This "theme" approach adds familiarity and ease of use for the individual user, in that their UI always appears the same (or substantially similar, within the limits of heterogeneous device capability), and they do not have to remember or relearn the idiosyncrasies of each different device. Features such as "favorites", "friends/buddies", look-and-feel, menu or screen configurations, preferences, etc. can all be readily replicated and distributed across each of the user's platforms using the network-based UI approach of the illustrated embodiments herein.

The use of a server-based UI model also allows the MSO the opportunity to rapidly reconfigure each UI for new services, available content, or applications available to that particular user (or the subscriber pool as a whole). For example, where a new application is launched by the MSO, the supporting UI features (menus, icons, etc.) can be rapidly implemented and served to the various CPE without any service call or "truck roll". Moreover, the new application can be selectively applied to individual customers based on e.g., subscriber level, status of their bill payments, parental controls, etc.

The user interface of the present invention may, in one embodiment may utilize web-based development and design which facilitate interactive information sharing, interoperability, user-centered design, and collaboration on the World Wide Web such as is categorized as "Web 2.0". Web 2.0 is a term commonly associated with web development/design that facilitates interactive information sharing, interoperability, user-centered design and collaboration on the Web. Some examples of Web 2.0 include web-based communities, web applications, social-networking sites, user video sharing sites, wilds, blogs, and mashups. For instance, a typical Web 2.0 site might allow its users to interact with others, or to change website content (versus non-interactive or static websites).

For example, an STB 107 may, via the gateway 812, receive various forms of TP-based content to be presented to the user, including on-net content (e.g., video), Internet content, SMS/text, chat, e-mail, voice (e.g., VoIP), and so forth. In this manner, various traditionally "PC" and smartphone applications may be accessible to the STB. In other words, a user may via his or her STB participate in interactive caller ID features, chat (via instant message, text message, voice message, and "web cam") with contacts, retrieve and perform playback, erase, storage, etc. functions with respect to voice mail, retrieve and update contacts (including email addresses, phone numbers, etc.) and calendars (including enabling reminders), and receive converged video and video telephony services. See the discussion of various service use scenarios provided subsequently herein.

In one embodiment, the user interface may offer caller identification on television (Caller ID on TV). Caller ID on TV allows a viewer to see information about an incoming call. At a minimum, this is a phone number or caller name provided by the Caller ID service. This can be customized to display customized information ("Dad" instead of "John Smith"), and/or a picture of the caller. Call routing functionality may also be provided, which allows a subscriber to predefine actions. For example, selective "do not disturb" may be selected to automatically forward certain or all calls to voice mail. An "allow caller" function permits only specified calls to ring through and may be set to apply only during specified times during the day (so as to enable a subscriber to have uninterrupted viewing of his or her favorite shows etc.). "Call reject" hangs up on calls from undesirable callers; i.e., "blocked callers". In another embodiment, a user may via his or her remote control select a disposition for an incoming call (so called "caller disposition"). In this manner, rather than predetermining callers to be blocked, sent to voice mail, etc., decisions are made dynamically. A "click-to-call" function allows a subscriber to initiate a call from an on-screen list. This list can be a call log, which is automatically maintained by the system, and/or a user-created address book.

Video calling and conferencing may also be enabled. Video calling, allows parties to see each other as they talk, and video conferencing allows the addition of multiple parties to a video call. Video calling can be provided to mobile devices (such as PMD 105), personal and laptop computers, dedicated videophones, and/or television sets with a camera either built in or purchased separately.

DVR integration further allows a subscriber's DVR to automatically begin recording a viewed program when the subscriber chooses to participate in a telephone call or other activity (e.g., chat session). Furthermore, addition of a wired or wireless keyboard to the subscriber's CPE 107 (or reconfiguration of the remote unit) may enable the user to send and receive SMS text messages, instant messages to the subscriber's television. The subscriber's television may function as a computer in the sense that the user may surf the web, access and receive email, review lists of "buddies" which are currently online, network address book functions, etc.

In addition, an advanced presence feature may be given so as to allow friends to monitor what programs each other are currently viewing (or scheduled to view in the future, such as via a program reservation or recording function). Further, the advanced presence feature may provide information regarding whether one's friend is currently involved in a telephone conversation or chat session, and notify the subscriber when his or her friend is available for a telephone call/chat.

Further, at a subscriber mobile device (such as a smartphone, PDA, etc.), "PC" type applications and audio/video applications may be delivered. In other words, the user interface, when accessed by a user of a PMD 105 via the indigenous client application 1110 referenced above, will provide the user with options to have audio/video content streamed thereto, as well as provide interactive caller ID, chat (via instant message and multimedia messaging), converged video and video telephony, and provide access to contacts (including email addresses, phone numbers, etc.) and calendars (including enabling reminders). Advantageously, the aggregation and distribution of this information is controlled by way of the network "UI" server, as opposed to being delegated to the client device or PMD itself (and its "stovepipe" service and supporting infrastructure) as under the prior art.

At a user personal computer or laptop device, phone applications and audio/video applications may be delivered. It is via these applications that users are able to utilize interactive caller ID services, participate in chats (via instant message, text message, multimedia message, and voice message), retrieve and perform playback, erase, storage, etc. functions with respect to voice mail, retrieve and update contacts (including email addresses, phone numbers, etc.) and calendars (including enabling reminders), and receive converged video and video telephony services.

In another embodiment, the methods and apparatus disclosed in co-owned U.S. patent application Ser. No. 12/414, 576 entitled "Recommendation Engine Apparatus and Methods" previously incorporated herein, may be utilized to provide supporting data and recommendations to help populate the user interface. As discussed therein, the recommendation engine can provide a mechanism for particularly selecting content to align with a user's preferences (the latter which the viewer need not enter manually) and display this recommended content via the aforementioned network-based UI functions. Moreover, the recommended content can be fed to the user as a continuous content stream on a "virtual" personalized channel as described in co-owned and co-pending U.S. patent application Ser. No. 12/414,554 entitled "Personal Media Channel Apparatus and Methods", previously incorporated herein.

X. Other Enabling Technologies—

Video Compression Technology—

Raw video signals occupy huge bandwidth. Delivery of them without compression over IP networks would in many cases not be feasible. The Moving Pictures Experts Group (MPEG) has developed a number of compression systems that are widely used in many IPTV implementations today. Among these systems, the most common ones are MPEG-2, MPEG-4 Part 2, and MPEG-4 Part 10. MPEG-4 Part 10 is jointly developed by ITU-T and MPEG and is commonly referred to as H.264 or AVC (Advanced Video Coding). MPEG-4 Part 10 defines a different format than MPEG-4 Part 2, and the two are not to be confused. Another popular format is VC-1 (generic name "Windows Media Video 9 (WMV9)"), developed by Microsoft Corporation.

Typically, MPEG-2 requires 2-3 Mbit/s for a SD (standard definition) TV channel and 12-19 Mbit/s for an HD TV channel H.264 incorporates new technologies for video compression developed in the past decade, and it is possible to provide good video quality at half the bit rate of MPEG-2, typically 6-9 Mbit/s for HDTV. But this lower bitrate comes at the cost of more complex and costly codec. Yet, H.264 is becoming increasingly popular. VC-1 is similar in performance to H.264. Many vendors have designed codec supporting both H.264 and VC-1.

Among the compression formats described above, IPTV providers may in one implementation choose one format for all video content. This helps simplify overall management of the IPTV system. Moreover, the video can be compressed into a common bit rate, usually one bit rate for SDTV and another for HDTV. This simplifies bandwidth management and the process of channel switching. However, in other variants, multiple codecs are supported, and the use of a "common" bitrate is not required.

It is also noted that the broader principles of the present invention are in no way limited to the codecs or technologies listed above, and in fact it is anticipated that increasingly lower bitrate codecs (or those with other properties well suited to IPTV applications) will be developed in the near term, thereby further reducing bandwidth requirements.

Protocols—

In addition to IP itself, and the well-known transport protocols Transmission Control Protocol (TCP) and User Datagram Protocol (UDP), the following protocols developed by the Internet Engineering Task Force (IETF) are used in various portions of the exemplary IPTV system described herein (although in no way required to practice the broader principles of the invention, in that other network and transport layer protocols, among others, may be used consistent with the invention).

1. Session Establishment Protocols

Session Initiation Protocol (SIP)—

SIP is a signaling protocol, widely used for controlling multimedia streaming and communication sessions over Internet Protocol (IP). Other applications include video conferencing, instant messaging, presence information, and gaming. SIP can be used for creating, modifying and terminating two-party (unicast) or multiparty (multicast) sessions consisting of one or several media streams. SIP is a TCP/IP-based Application Layer protocol. SIP is designed to be independent of the underlying transport layer; it can run on TCP) User Datagram Protocol (UDP), or Stream Control Transmission Protocol (SCTP).

SIP has been accepted as a 3GPP signaling protocol and permanent element of the IP Multimedia Subsystem (IMS) architecture for IP-based streaming multimedia services in wireless systems, discussed subsequently herein.

2. Transport Protocols

Real-time Transport Protocol (RTP)—

RTP is a transport layer protocol intended for carrying real-time multimedia contents. RTP operates on top of UDP. It adds functions of time stamping, packet sequencing, etc., to ensure packets carrying audio and video content are delivered to the end-users in proper temporal order and in synchronization.

3. Streaming and Control Protocols

Real-time Transport Control Protocol (RTCP)—

RTCP is a control protocol associated with RTP described above. One function of RTCP is to provide feedback on the quality of RTP distribution for the network provider to diagnose network problems. RTCP uses a UDP connection for communication, which is separate from the UDP connection used by RTP.

Internet Group Management Protocol (IGMP)—

IGMP is used to report multicast group memberships to multicast routers in the core networks to allow multicasting of broadcast TV content to the multicast group participants. IGMP uses IP to carry messages.

Real Time Streaming Protocol (RTSP)—

RTSP is used in, inter alia, VOD services for control purposes. It allows a client to remotely control a VOD server, issuing VCR-like commands like play, pause, forward, rewind, record, etc.

Internet Content Adaptation Protocol (ICAP)—

ICAP is designed to off-load the video content from the video headend to the cache servers in the content distribution networks (CDNs).

XI. Exemplary IMS-Based Implementations—

Referring now to FIGS. 12-30, various aspects of one exemplary IMS-based implementation of the packetized content delivery network architecture of the invention are shown and described in greater detail. It is recognized that while the following embodiments are described in terms of the known IMS technology, use of this technology is by no means a requirement of practicing the broader principles of the invention previously described herein. Rather, IMS is but one of several possible existing packet-based multimedia technologies which can be leveraged within the present invention to provide many of the services and functions thereof, including service integration.

Two primary components are associated with the exemplary IMS-based implementations described herein: (i) the IMS (IP Multimedia System), and (ii) the Service Delivery Platform (SDP). Each of these components, and their interrelationships with each other (and other components of the packet-based network architecture of the IMS-based implementation referenced above) are now described in greater detail.

IMS may be viewed as a tool for building additional applications including e.g., a network side user interface control for the various CPE. Still further, IMS techniques may be used to provide reconfigurability and/or personalization of the UI. For example, if the gateway has knowledge of content on a user's DVR that content will be populated to a list which may be viewed on the user's UI via e.g., a web page.

A. IMS and SDP Overview—

IPTV session management advantageously can re-use existing IMS procedures with very few adaptations. Because these procedures are identical or similar to those used in support of voice and other services, this solution facilitates offering advanced services by combining features from the two worlds. Moreover, this type of solution benefits from mobility management procedures that are inherent to IMS (per its 3GPP and related lineage), and also facilitates IPTV service continuity when moving from one network access to another.

SDP is largely complementary to IMS; it enables blending of services as opposed to simply bundling them. Blending IPTV functionality with location, messaging, and presence services creates a potential for services well beyond mere video streaming. One salient benefit of the SDP is to create an integration point between IPTV Services and IPTV business processes. SDP can help establish common interfaces to centralize OSS/BSS by serving as an abstraction layer between different OSS/BSS components and the service execution environments.

With IMS and SDP, the in-premises television (e.g., a DSTB with monitor) becomes another class of IMS-enabled device, much like mobile phones, PDAs, and laptop computers. Hence, an MSO or other service provider can extend advanced, multimedia IPTV services to IMS and non-IMS enabled devices, and provide any content on any device, thereby converging voice, data and video services into a differentiated service offering.

B. IMS & SDP as Parts of Network Convergence—

The exemplary IMS-based architecture described herein advantageously enables an entity (e.g., MSO) to build intelligence into its network, and inter alia, share information with any client device (see, e.g., discussion of the "three screens" (e.g., the PC, TV, and wireless/mobile device) presented below with respect to various business methods). Convergence is a key aspect of this capability.

IMS—

IMS is an architectural framework for delivering IP multimedia to fixed and mobile users over a single network. This network "convergence" facilitates the blending of "quad-play" services (i.e., voice, video, TV and mobility), as well as other desirable features such as chat/text/SMS, collaboration, "mashup", etc.) in interactive and highly personalized ways. Specifically, various types of convergence are addressed by the IMS:

1. Service Layer Convergence—

Many of the capabilities required to support IPTV services for blending of new services are, in extant prior art implementations, scattered across various data repositories and different service execution environments; e.g., location and presence information, group list management, calling capabilities, video streaming, content management, real-time payment, video on demand, billing, and authentication. A Service Delivery Platform (SDP) architecture based on a Service Oriented Architecture (SOA) provides the integration "glue" by combining the aforementioned elements into a single, substantially unified service platform.

In the SOA environment, applications and service enablers usually expose the aforementioned capabilities through Web services interfaces. Once exposed, these capabilities can be re-used across different new and existing services. For example, instead of creating a new group list feature for a new IP TV service, the existing group list management of, for example, an IMS service can be re-used. The user gets a consistent experience, and services are developed and implemented faster, thereby positively impacting "service velocity".

2. Control Platform Convergence—

The subscriber data that is sometimes duplicated and spread across various networks under prior art approaches advantageously can be combined into a single subscriber database, and stored in e.g., the HSS (described in greater detail subsequently herein). Moreover, multiple control networks are converged into a single control network, the IMS platform.

3. Transport Network Convergence—

Multiple transport technologies communicate at the IP (network) layer (and associated transport layer via TCP). Communication at the IP layer provides transport-agnostic network functions. The transport layer is compatible with and addresses several main principles, including: (i) optimization for data traffic—data traffic predominates over voice traffic, a predominance that is set to increase over the coming years; and (ii) support different service types, which require different traffic characteristics, such as different bandwidths and different QoS.

4. User Equipment Convergence—

Multiple heterogeneous or dedicated user devices needed under the prior art can be replaced by a single user device (or reduced number of devices) that supports a unified client experience, converging voice, data, and video technologies onto a flexible communications and collaboration platform. This obviates having to purchase, learn and use multiple different devices at the same time for different functions, thereby also greatly simplifying the user experience. Ideally, a user may have a very limited number of devices which are multi-functioned, and between which services can be transferred if desired.

IMS allows fixed and mobile subscribers to roam seamlessly between fixed and mobile networks, interacting via applications such as VoIP, video/picture sharing, instant messaging/text/SMS, and P2P gaming. IMS ensures that multimedia sessions between IMS users, between IMS and Internet users, and between Internet users, are all established with the same protocols. IMS is designed to support the orchestration of interactions based on the Session Initiation Protocol (SIP), a standard for initiating, modifying, and terminating interactive multimedia user sessions. It is a technology framework for delivering and maintaining fixed-mobile service sessions.

IMS includes a core network foundation that allows a service provider to deliver a personalized multimedia experience beyond basic video streaming over IP. With TMS, the in-home television/CPE (e.g., DSTB) becomes another class of IMS-enabled device, much like mobile phones, PDAs, and laptop computers. Advanced, multimedia IPTV services can be extended to IMS-enabled devices ("any content on any device"), achieving convergence and service "blending" as described elsewhere herein.

Besides its ability to ease the design and implementation of combined services, the IMS based approach brings additional inherent benefits:

1. Common infrastructure—The IMS-based approach leverages investment in extant infrastructure by enabling the support of IPTV services on the same network infrastructure as digital telephone services and wireless (mobility) services, thereby relieving much of the inefficiency associated with prior art heterogeneous delivery infrastructure (aka "stovepipes").

2. Common identity and authentication mechanisms—IMS identification and authentication frameworks provide an opportunity to extend the features of existing IPTV services with multi-user subscription capabilities, including:

Allocation of different public identities and service profiles to different users sharing the same subscription to, inter alia, manage different lists of subscribed channels associated to different users in the same family (e.g., parental control) and provide personalization; and Single subscriber authentication that enables a user to log on to a service using one device and continue the session on another device without having to sign in again. This capability is made possible in one embodiment by a "master" database managed through a home subscriber server (HSS) element in the IMS core network; see FIG. 6c above.

3. Common resource management—The IMS relieves IPTV application servers from the task of interacting with transport control functions for the purpose of reserving transport resources such as QoS. This ensures that the required resources for a service are established among different access types. This IMS element manages policies for service by access type, and makes sure the specific access network can deliver the required attributes.

4. Multi-access solution—IMS is designed to be access-independent. Using the IMS as a control plane therefore allows users to access their IPTV services irrespective or the access they are connected to. Moreover, the multi-access capability provided by IMS comes with the support of service roaming and service continuity when moving from one access to another.

5. Common charging mechanisms—As a result of using the IMS for session control, IPTV services can benefit from generic charging mechanisms and interfaces applicable to other types of multimedia services. This facilitates unified billing for, e.g., multi-play solutions.

6. Services and Control—IMS adds call session control to the packet network. It enables peer-to-peer real-time services, such as voice and video, over a packet-switched domain. A scalable common service control (based on SIP) gives the ability to efficiently manage and integrate parallel user services.

7. Media Mixing—IMS provides the ability to pick and mix various multimedia flows in single or multiple sessions (e.g., "mashup"), and can handle real-time voice, video, data.

8. Connectivity Network Independence—IMS provides access to IP-based services independent of the underlying connectivity technology (whether mobile or fixed). The IMS architecture and SIP may also be easily extended to provide for new services ("extensibility").

9. Common Service enablers—Service enablers such as subscriber/device "presence" and network buddy lists can be extended to any network device via the IMS core network, enabling features to be delivered in the same manner to e.g., a PC, mobile device, or IP-enabled STB.

10. Application ubiquity—The IMS application layer applies to multiple access networks. New applications and services can be extended from one access or device type to another with relative ease.

11. Support for mobility—Enabling interaction with existing (e.g., mobile) service enablers, service personalization, and media adaptation as well as providing converged applications, integrated voice, data, video, and mobile services.

SDP—

When implementing new network elements that are required by the IPTV solutions described herein, network operators generally must take the approach of either (i) building out effectively new "back office" applications to accommodate IPTV usage and billing, or (ii) adding on IPTV customizations to its existing billing and other back office systems. This can become extremely complex: processing existing customer service usage for broadband, VoIP, HSD, Wireless, and IPTV in separate applications, and then assimilating or combing that data together at the end of the month to create a single customer bill is highly laborious, and potentially fraught with error. See FIG. 12 herein.

Moreover, any effective IPTV-specific billing and subscriber management functionality should be correlated to broadband, VoIP, wireless, HSD and value-added service usage in order to create a meaningful and accurate picture of the consumer and their broadband consumption.

With SDP, however, the IPTV network operator can obviate much of the foregoing conversion/customization. Rather than have to build out specific IPTV back office functions, the operator is able to layer IPTV on top of existing broadband services, and easily manage subscriptions, bundling, blending, and service usage, to quickly roll out IPTV services, bundling/blending and promoting them on a single application together with VoIP and broadband, and to manage a single set of back office business processes for all IP services and revenues.

Figure 13:
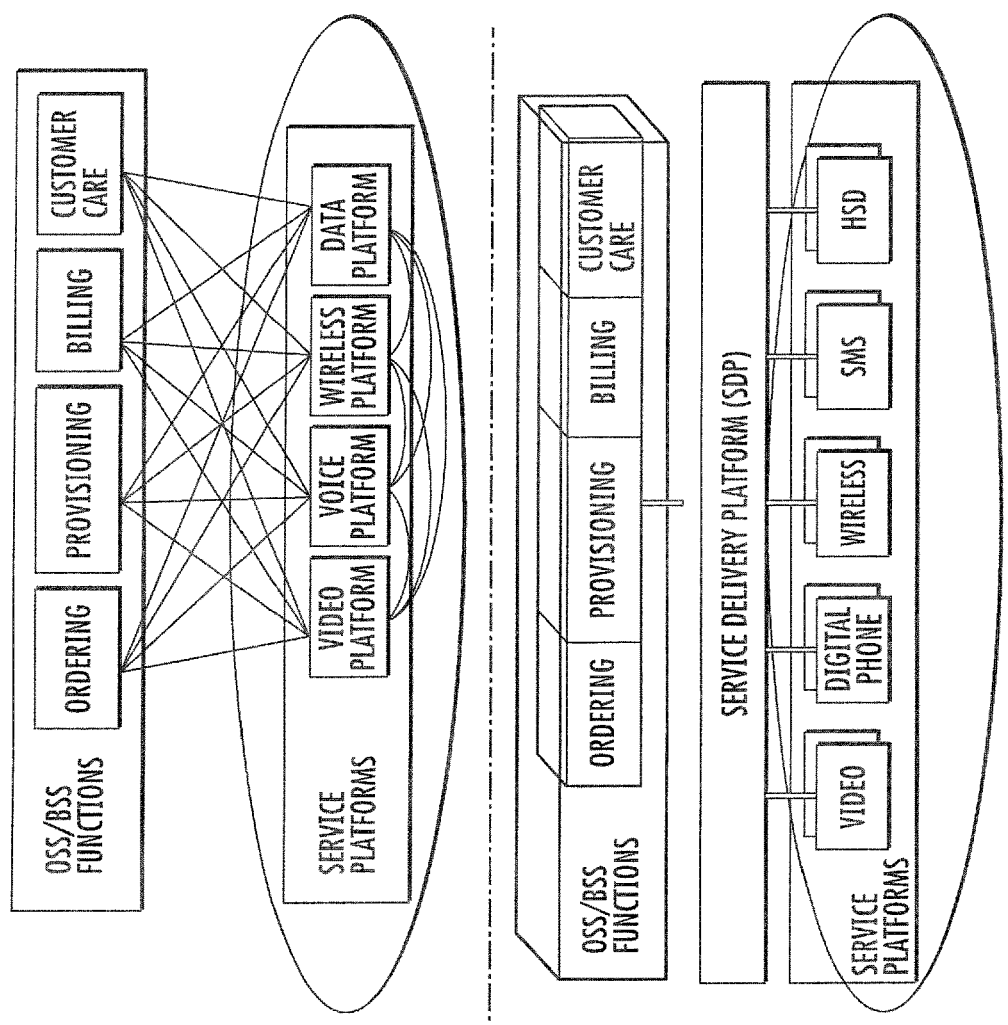
FIG. 13 is graphical illustration of a "silo" or "stovepipe" prior art delivery network; versus a common control and service layer network according to the invention.
Figure 14:
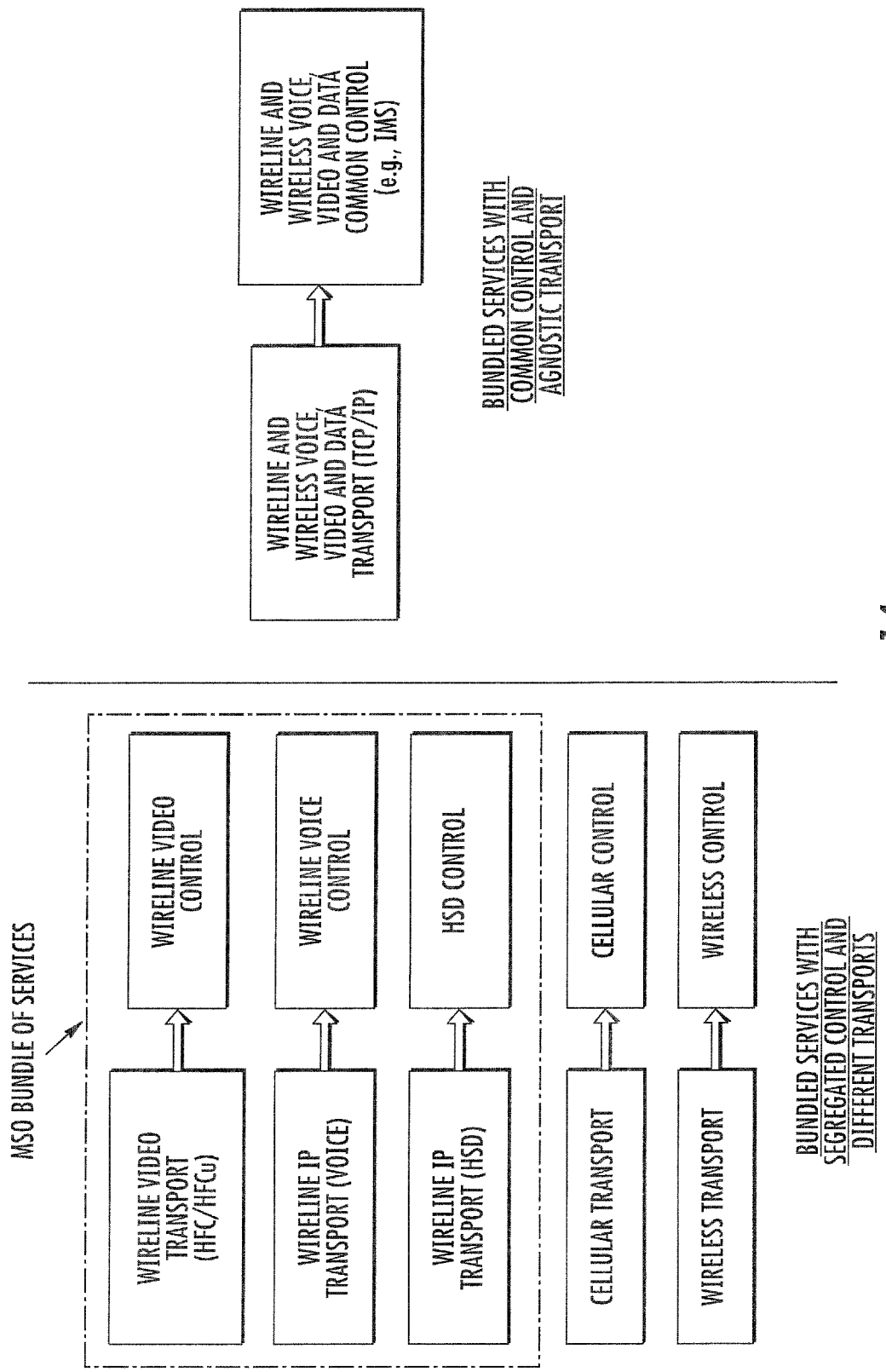
FIG. 14 is a graphical illustration of a prior art service "bundling" arrangement, versus a service "blending" arrangement according to one embodiment of the invention.

FIG. 13 illustrates graphically the difference between a prior art "stove pipe" (so named for the highly vertical and differentiated hardware and service environments for each different service (such as voice, data, and video), and the TMS/SDP integrated approach of one embodiment of the present invention. Note especially the (i) common transport used for all different services; (ii) the convergence into a single user database; (iii) the convergence into a single service layer; and (iv) the convergence into a single control layer; afforded by the IMS/SDP implementation.

Service Bundling Vs. Service Blending—

As previously discussed, well-known prior art "service bundling" (i.e., aggregation of services) offers unified ordering and billing, and limited interaction for otherwise separate services. It is only a first, very limited form of service convergence. Bundling relies on separate networks/transports for each type of service, and does not provide the desired unified control and device environments previously described.

In contrast, the IMS-based architecture of the present embodiment of the invention provides what can be termed as "service blending", which inter alia enables different applications to control and be substantially integrated with one another. It enables for example the web or the phone to control the TV, and vice versa (see e.g., FIG. 14).

For example, if a user receives a call on his Digital Phone (e.g., VoIP) while watching TV, the caller can be overlaid on the TV screen using relatively simple technology. While this application provides a very limited form of convergence, it is still fundamentally only a bundled service.

However, in the case of blended service, individual services interwork and control and integrate with each other. One such blended service might automatically record and/or pause the currently viewed TV program when the user picks up the phone to answer the incoming call. Later, when the user disconnects the call, an option to replay the TV program from where the user left off can be provided in the form of an alert message on the TV screen. The seamless interplay of voice services (Caller ID) with TV viewing, video storage, and messaging (the replay alert) represent a converged service.

Service Blending Capabilities for IPTV—

One compelling service blending capability provided by SDP of the present invention is "Web 2.0" and "mashup".

As previously noted, Web 2.0 is a term commonly associated with web development/design that facilitates interactive information sharing, interoperability, user-centered design and collaboration on the Web. Some examples of Web 2.0 include web-based communities, web applications, social-networking sites, user video sharing sites, wilds, blogs, and mashups. For instance, a typical Web 2.0 site might allow its users to interact with others, or to change website content (versus non-interactive or static websites).

A mashup as used in the present context is the result of taking a piece of information that has been exposed as a web service, and combining it with another piece of information exposed as a web service, to come up with an entirely new service not contemplated by either of the constituents.

In one variant, this level of interactivity requires a subscription in order to authenticate the user in the IPTV network, and store some profile information to permit offering of a more personalized service. Subscriber authentication in IPTV is layered, and can be divided into several levels, including for example: (i) terminal equipment level, (ii) network access level, and (iii) service application level.

The exemplary network architecture described herein enables delivery of video over IP for dynamically composing video streams (including video mashup) to support the delivery of personalized and value-added video services across multiple network and devices. The widespread use of camera phones and video phones, and the success of user-generated content services such as YouTube, are fueling demand from "prosumers" (producers and consumers) for video-based services offering intuitive and compelling visual experiences. Many existing video services are optimized for a single device or single delivery channel; e.g., Web 2.0 content for users, or professional content for IPTV customers.

Below are examples of various other types of multimedia communications services "blending" enabled by the IPTV architecture of the present invention:

Caller ID on TV
Call-accept/ignore control from CPE 107 remote control unit
Ringing/alerting suppression
Calendar alerts sent to TV
Call initiation (from calendar alert) control from CPE 107 remote
Picture (e.g., JPEG) share to TV
SMS/text/email sent to TV
Custom alerts sent to TV
Video share to TV
Video pause during call
Parental notification/permission for TV shows
Network address book (NAB)

IPTV Reference Architecture

Figure 15:
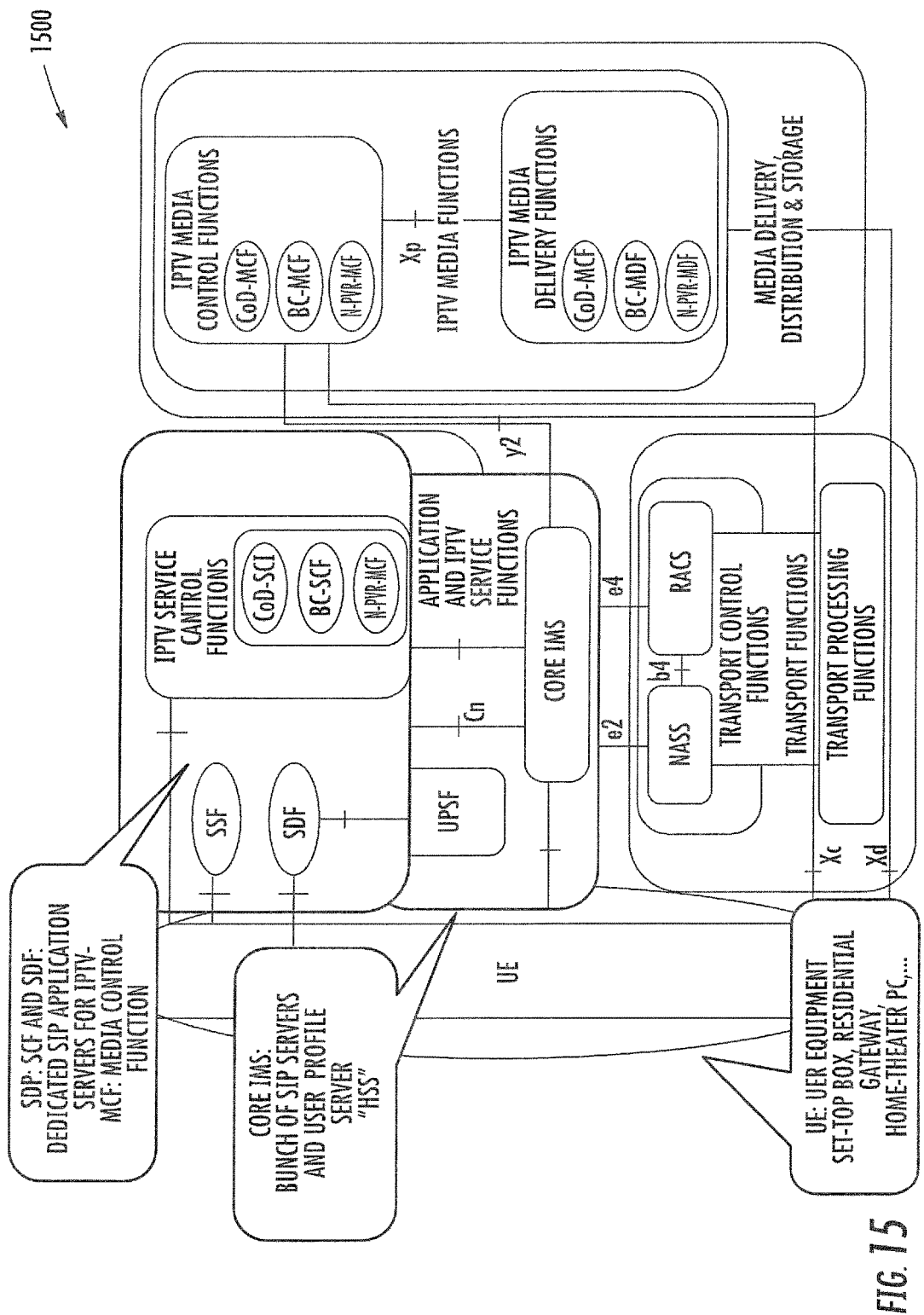
FIG. 15 is a block diagram of a prior art IMS-based IPTV reference architecture defined by ETSI-TISPAN TS 182 027.

In one embodiment, the network architecture of the invention is "mapped" onto the IPTV reference architecture 1500 defined by ETSI-TISPAN TS 182 027, as shown in FIG. 15 herein. This reference architecture specifies various generalized components and functions, as follows:

1. SDP Components:
   SCF and SDF: dedicated SIP application servers for IPTV.
   SCF: Service Control Function—Set up an IPTV session using SW-based session control, select media.
   SDF: Service Discovery Function—Addresses "what are my IPTV services", "where can I change my user profile", "where can I select my service", and the address of the service portal.
2. Core IMS:
   xCSCF servers, and
   User Profile Server Function (UPSF) is the HSS
3. UE (User Equipment):
   Set-top box, Residential Gateway, Home-Theater PC, mobile device (PMD), etc.
4. NASS (Network Attachment Subsystem):
   DHCP server
5. RACS (Resource & Admission Control Subsystem):
   Policy Server
6. Xc interface: RTSP protocol for media control: Broadcast trick modes, Content on Demand and Network PVR.
7. Xd interface: IGMP protocol for control of plain Broadcast Television Media control and delivery, e.g. video-on-demand jukebox
8. EPG: SSF: Service Selection Function, getting an Electronic Program Guide, "what programs are available."

Figure 16:
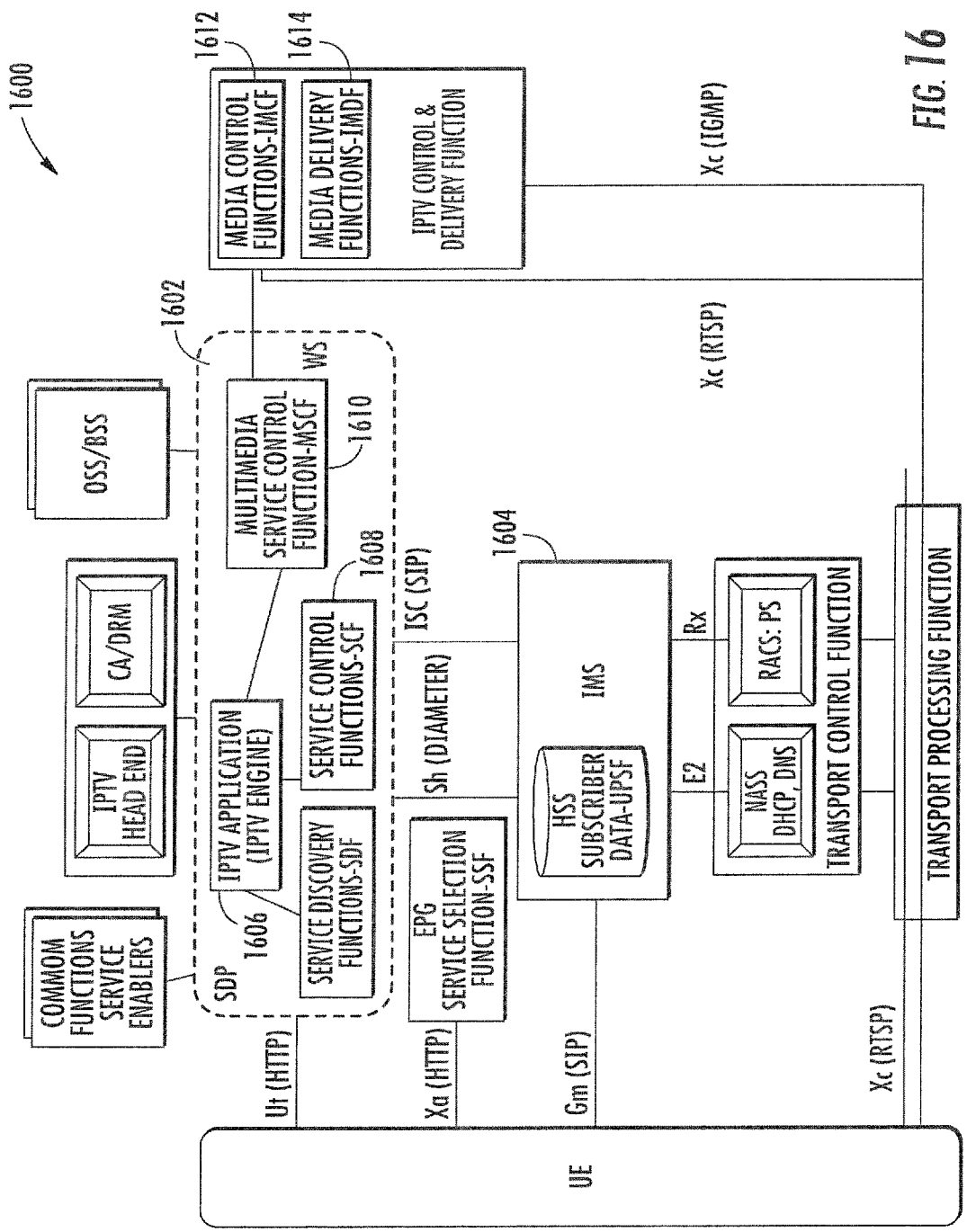
FIG. 16 is a block diagram of an IMS-based IPTV architecture according to the invention, mapped onto the reference architecture of FIG. 15.

FIG. 16 illustrates one embodiment of the reference architecture 1600 of the present invention, which is mapped onto the ETSI-TISPAN architecture of FIG. 16 discussed above. The following functional features are incorporated into the architecture 1600 of the present embodiment:

Support for the delivery of both live and pre-recorded video content to a range of different devices.
Support for the integration of content from multiple sources into a single video stream (including "mashup").
Provision of an architecture for personalization of the video stream, based on user profile and preferences, dynamic status data, historical usage data, and other data, whether owned by the subscriber, service provider, or content provider.
Integration of business logic rules, to support advertising based business models and to support flexible bundling (e.g., support for targeted promotions).
Integration of a range of existing video services, including VoD and IPTV services, interactive video services, real-time communication services (such as voice, SMS, text), and session-based conversational services.

This architecture 1600 is designed by identifying the major functional interfaces across which the various entities may provision, interact, or access video services. This has been achieved by defining logical applications and/or players, enabling a clear assignment of ownerships in term of scaling, data privacy, Service Level Agreement, etc.

In the architecture of FIG. 16, the SDP 1602 focuses on service creation, deployment, delivery, and management whereas the IMS 1604 provides standardized control infrastructure architecture. SDP is substantially "services-centric", whereas IMS is more network-centric (control, transport layers).

The various components of the ETSI-TISPAN-based reference architecture 1600 of FIG. 16 are now described in greater detail.

1. Service Delivery Platform (SDP) Components—Service Layer

The SDP service layer 1602 also contains the common functions used in one variant by the other subsystems, such as charging and security. The architecture, by structuring IMS as a subsystem rather than a core component, advantageously allows the use of applications and User Agents (UAs) that are non-IMS aware, as well as those that are IMS-aware, within the same network. This also allows other subsystems to be added as needed (i.e., "modularity"). In fact, for a non-IMS system, IPTV becomes another subsystem on the service layer. Key components of the exemplary implementation of the SDP include:

a. IPTV Engine

The IPTV Engine 1606 of the illustrated embodiment refers to one or more software applications or packages associated with the delivery of IPTV services. It is in one variant embodied as a client-server architecture, with the client part residing on the CPE (e.g., STB) and the server part residing on a network location (e.g., the headend or video server side). The IPTV Engine controls various aspects of the user experience, and defines many aspects of how the subscriber interacts with the service. For example, the user interface and services available (e.g., EPG, broadcast TV, or VOD) are all made available and controlled through the IPTV Engine in the illustrated embodiment. The IPTV Engine also links client and server systems used for CA and/or DRM purposes.

b. Service Control Function (SCF)

The Service Control Function 1608 is a stateful entity that manages user-to-content and content-to-user relationships. It is aware of which user consumes which content, and which content is consumed by which user. Furthermore, the SCF manages the transmission of multimedia streaming sessions (including both live and on-demand) triggered through different IP-based access networks (LAN, WLAN, 4G, HFC) via different transmission schemes such as unicast, multicast, and broadcast.

In one variant, the SCF 1608 is logically integrated as a SIP servlet running on the Service Delivery Platform-SDP (SIP SEE, described in greater detail below). The Session Control Function may be implemented as a single component triggered via a SIP servlet. The SDP provides the SIP functionality for the SCF processes (including all IPTV-related messages and signaling), and relays them to the SCF component via the SIP servlet.

The exemplary architecture of the SCF consists of five core elements (not shown):

1) Session Management Function—The SMF is in effect the "brain" of the SCF. It is the first contact point within the SCF. It creates, controls, and deletes media sessions.
2) Bearer Manager—Provides optimization of all active media sessions regarding the transmission scheme and the access network. The Bearer Manager is intrinsically involved in the monitoring function.
3) TV Session Controller—The TSC drives controlling of all active media/TV sessions.
4) Session Repository—This entity stores all active sessions. It furthermore provides all statistical information about active sessions.
5) Thread Repository—Stores all active content threads. Due to the existence of a single content thread per Content Reference Identifier (CRID), simultaneously requesting processing for different CRIDs is possible.

c. Multimedia Service Control Functions (MSCF)

The MSCF 1610 function handles IPTV related request, and plays a role of the service and session control element for all IPTV services. This component is also responsible for interworking with the IMS core on the service control layer. The service control function in one embodiment includes all functions required for each IPTV service, and therefore is advantageously reusable as specific IPTV application server functions (or as separated functional elements, depending on implementations).

The general functions and tasks of the MSCF include:
1. Session initiation and service control for IPTV applications.
2. Interaction with IMS core and S-CSCF to perform IPTV requests (receive, validate, and perform IPTV service requests from user).
3. Service authorization and validation of a user request for selected content based on user profile information.
4. Select the relevant IPTV media control/delivery functions; perform credit control.

The MSCF may also be configured to use the IPTV "profile" data in order to customize the user experience. For instance, the list of subscribed channels could be used to filter the list of channels presented to the subscriber.

d. IPTV Media Control Function (IMCF)

The purposes of the IMCF 1612 include:
Control the selection of MDFs (described below).
Propagate content to the distribution network.
Manage the distribution of assets between media delivery functions, and also to the user equipment (whether by streaming them or any other means).
Content protection control function (control licensing policy across IMDF, validate user license for specific content).
Apply policy (e.g., according to specific spatial or temporal restriction) of distribution management.
Storage management in the distribution and delivery system.
Map content ID and content location in specific IMDF.
Manage interaction with the UE (e.g., handling of video-recorder commands or IGMP commands).
Manage the capture of live events (network PVR and network time-shift TV).
Collect information of service using statistics collecting and submission.
Generate billing information.

e. IPTV Media Delivery Function (IMDF)

An MDF 1614 is responsible for delivery of media to the user equipment, as well as media delivery functionalities. Specifically, the MDF:
Supports media processing functions including transcoding, transrating, and recording
Provides multimedia content delivery, including content relaying from one input to one or n-outputs
Unicast or multicast support, including:
Linear streaming, or with "trick mode" functions support (VoD)
Content fetching via FTP or HTTP
Control interface for triggering content delivery and media processing via SIP, HTTP and Telnet.
Functions as a representation of TISPAN IPTV Media Functions definitions from Draft ETSI TS 182 027.

IMS Operation—

As noted above, the IMS-based approach relies on a functional architecture centered on the core IMS (i.e., the IMS Call Session Control Functions (CSCFs)). When processing session signaling, as for any other multimedia service supported over the architecture, the Core IMS interacts with the HSS (UPSF, or User Profile Server Function) to download service profile information, and with the RACS (Resource and Admission Control Subsystem) to request and reserve transport resources related to the session.

The exemplary reference architecture defines a series of generic IPTV functions for all service types, including Broadcast and Video on Demand (VOD):

1. Service discovery—identification and location of service providers and offered content.
2. Service selection—selection of a service provider and service from the discovered set.
3. Program guide—information about IPTV channels, content, price, etc.
4. Stream distribution—delivery of the video content to the subscriber.
5. Service and content protection—methods to protect the content, including Digital Rights Management (DRM).

Before initiating a session, the user generally has to proceed to the selection of a service using for example the Service Discovery and Selection (SD&S) procedures. SD&S includes three steps:

1) Retrieval from a Service Discovery Function (SDF) of service providers' server addresses (e.g., addresses of service portals).
2) Connection to these servers (known as Service Selection Functions, SSF) to get information on available services.
3) Retrieval of relevant information (e.g., content identifier, media parameters) required to initiate a session for accessing the selected service.

After a service is selected, the relevant content identifier is inserted in the SIP session initiation message sent towards the IPTV Service Control Function (SCF) that provides access to this service.

IPTV Service Control Functions (SCFs) perform service authorization during session initiation and modification, which includes checking IPTV users' profiles in order to allow or deny access to the service. IPTV Service Control functions may also perform credit control and select the relevant IPTV media functions. They run on the SDP, and act as standard IMS Application Servers, using the ISC interface on the SDP to communicate with the core IMS.

Media flow control is supported in one embodiment by other means, such as using existing protocols: i.e., RTSP for trick mode operation during streaming services, and IGMP for channel changing during broadcast services.

IPTV media functions are in charge of controlling and delivering media flows to the user equipment. They are split into: (i) Media Control Functions (MCF), handling media flow control and managing interaction with the UE (e.g., handling of trick-modes), and (ii) Media Delivery Functions (MDF), sourcing the actual media flows.

For the purpose of implementing combined services, JPTV service control functions may interact with enablers, such as "presence" servers, or with Application Servers hosting the logic of communication services, using. IMS capabilities such as third-party registration, event notification, etc. For example, existing IMS presence capabilities can be enhanced with IPTV-specific information, such as an indication of the "currently watched channel", allowing user's contacts to share experiences, and third party applications to develop specific services based on IPTV presence information.

The IMS user profile data and IPTV user profile data are stored in the HSS (UPSF) and accessed via IMS by the Service Control Function or/and the SDP. Such data have to be available to the SCF, and may also need to be available to the SD&S functions, in order to customize the information they present to the user.

Example of IPTV Service Registration, Discovery and Session Control—

Figure 17:
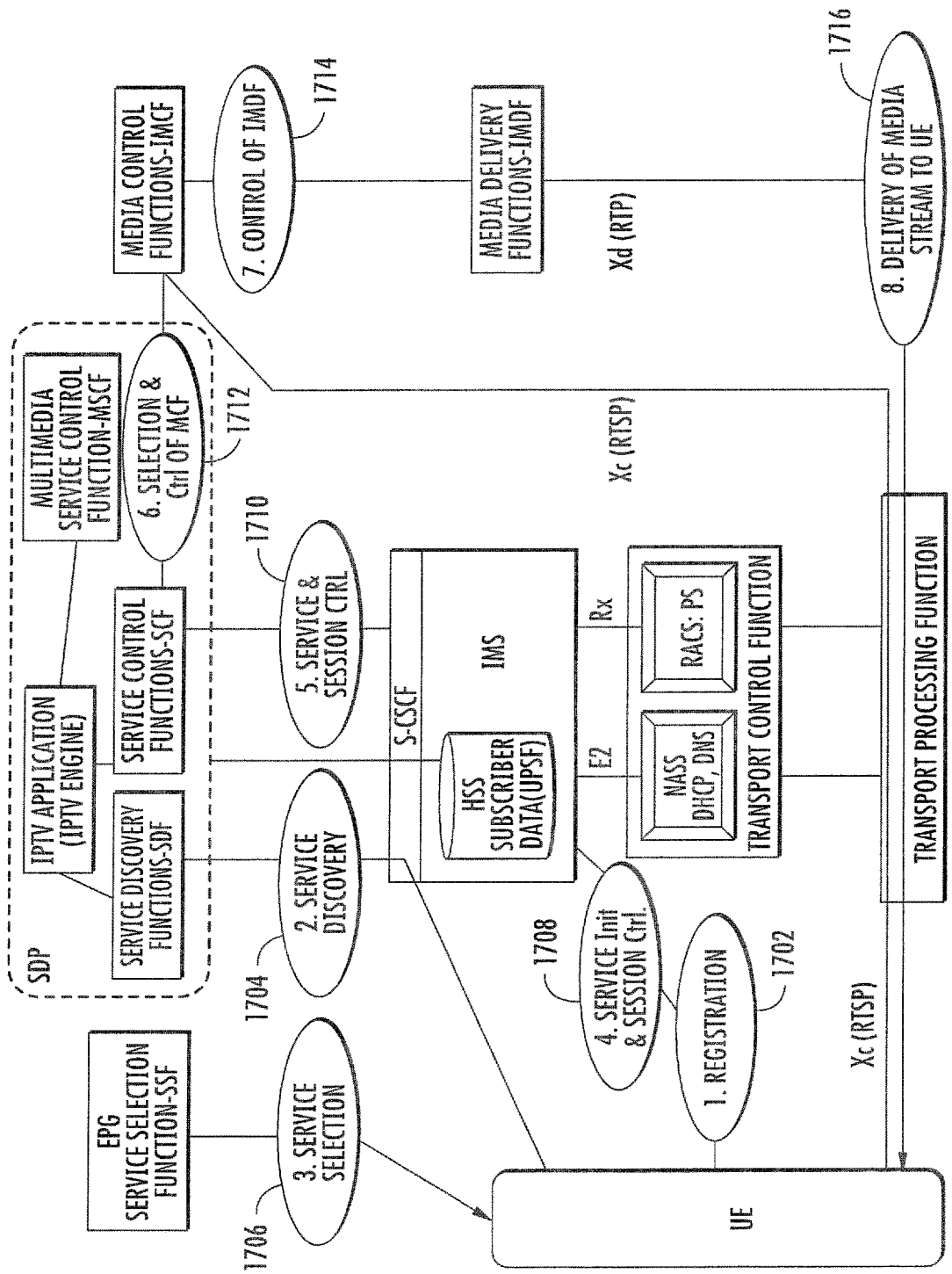
FIG. 17 is a block diagram of an IMS/SDP-based implementation, illustrating the principles of service registration, discovery, and control in the context of a SIP-based UE.

Referring now to FIG. 17, the following example illustrates service registration, discovery, and control in the context of a SIP-based UE within a typical IPTV architecture.

In this exemplary architecture, the IMS is used for IPTV service registration, Service Discovery, and IPTV session control. SIP/SDP is used on the Gm, ISC, and y2 interfaces. HTTP, DVBSTP or FLUTE may be used on the Xa interface, and the protocol on the Ut interface is. HTTP. Streaming control is performed using RTSP/SDP on the Xc interface, and IGMP is used on the Xd interface. Diameter protocol (a computer networking protocol for authentication, authorization and accounting derived from the RADIUS protocol) is used on the e2, Gq', Cx, Sh interfaces of the illustrated embodiment, although other protocols and interfaces may be used with equal success.

The communication between the user equipment and the SDF relies on the Session Initiation Protocol (SIP) SUBSCRIBE and NOTIFY methods. The user equipment can acquire the knowledge of the Service Discovery Function (SDF) address through provisioning, or rely on the IMS to route the SUBSCRIBE request to the appropriate SDF, based on Initial Filter Criteria (IFC) contained in the user profile. It will also be appreciated that in other implementations, HTTP can be used to connect to a specified server address (e.g., TimeWarnerCable.com website). This method will also accommodate Non-SIP base user equipment.

The UE (e.g., set-top-box, PC, mobile or any device with an IPTV client) is booted and achieves network attachment in order to obtain network parameters (e.g., an IP address, P-CSCF address, etc.).

1) After network attachment, the UE initiates the IMS registration process with core MS (step 1702).
2) The UE will perform IPTV service attachment functions, including SIP based service discovery, to perform SDF tasks. The SDF function will return the address of the SSF (EPG). The SDF returns the SSF (EPG) address in the SIP NOTIFY message (step 1704).
3) Then UE is able to initiate the service selection procedures with SSF (EPG) via Xa (using HTTP over Xa, using DVBSTP or FLUTE) per step 1706:
   To get information on available services. In this case, the SSF is the MSO's EPG.
   Retrieval of relevant information (e.g., content identifier, media parameters) required to initiate a session for accessing the selected service.
4) The IMS-based IPTV UE needs to know and use received service selection information to establish appropriate multimedia session by generating SIP INVITE messages during the service initiation procedure (over Gm towards home C-CSCF) and sending via the IMS core to the SCF (step 1708).
5) After a service is selected, the relevant content identifier is inserted in the SIP INVITE message sent towards the IPTV Service Control Function (SCF) that provides access to this service (step 1710).
   Note that IPTV Service Control Functions perform service authorization during session initiation and modification, which includes checking IPTV users' profiles in order to perform credit control and select the relevant IPTV media functions. The SCF is running on the SEE (SDP that act as standard IMS Application Servers, using the ISC interface to communicate with the core IMS).

Also, a SIP based request for service initiation (SIP procedures are applicable also for service termination or termination) is used for broadcast (BC) service, CoD service, or for NPVR Service.

Moreover, the core IMS is able to initiate a resource reservation process for network resources needed by the IPTV streams according to the capabilities of the UE. The resource reservation and allocation is performed using standardized transport control functions of RACS connected to the core IMS.

6) After the successful session initiation, the SCF informs the IMCF via core IMS and the y2 interface (or UE in some cases such as BC) about identification of selected content from the Media Delivery Function (or ECF/EFF, in the case of BC services) to initiate streaming the selected multimedia content (CoD, nPVR) per step 1712.

The Media Control Functions (MCF) handle media flow control and manage interaction with the UE (e.g., RTSP for trick mode operation during streaming services and IGMP for channel "zapping" during broadcast services).

7) The UE may control a CoD media stream over the Xc interface (between the UE and the MCF) to control media delivery with RTSP protocol. The UE may control a BC media stream over the Dj interface (between the UE and the ECF/EFF) to control media delivery with IGMP/MLD protocol (step 1714).

8) The IMDF performs media delivery over the Xd interface, based on UDP/RTP stream delivery and any number of transport variants (step 1716).

Example of IPTV Service Blending—IPTV-Based Call Handling—

Figure 18:
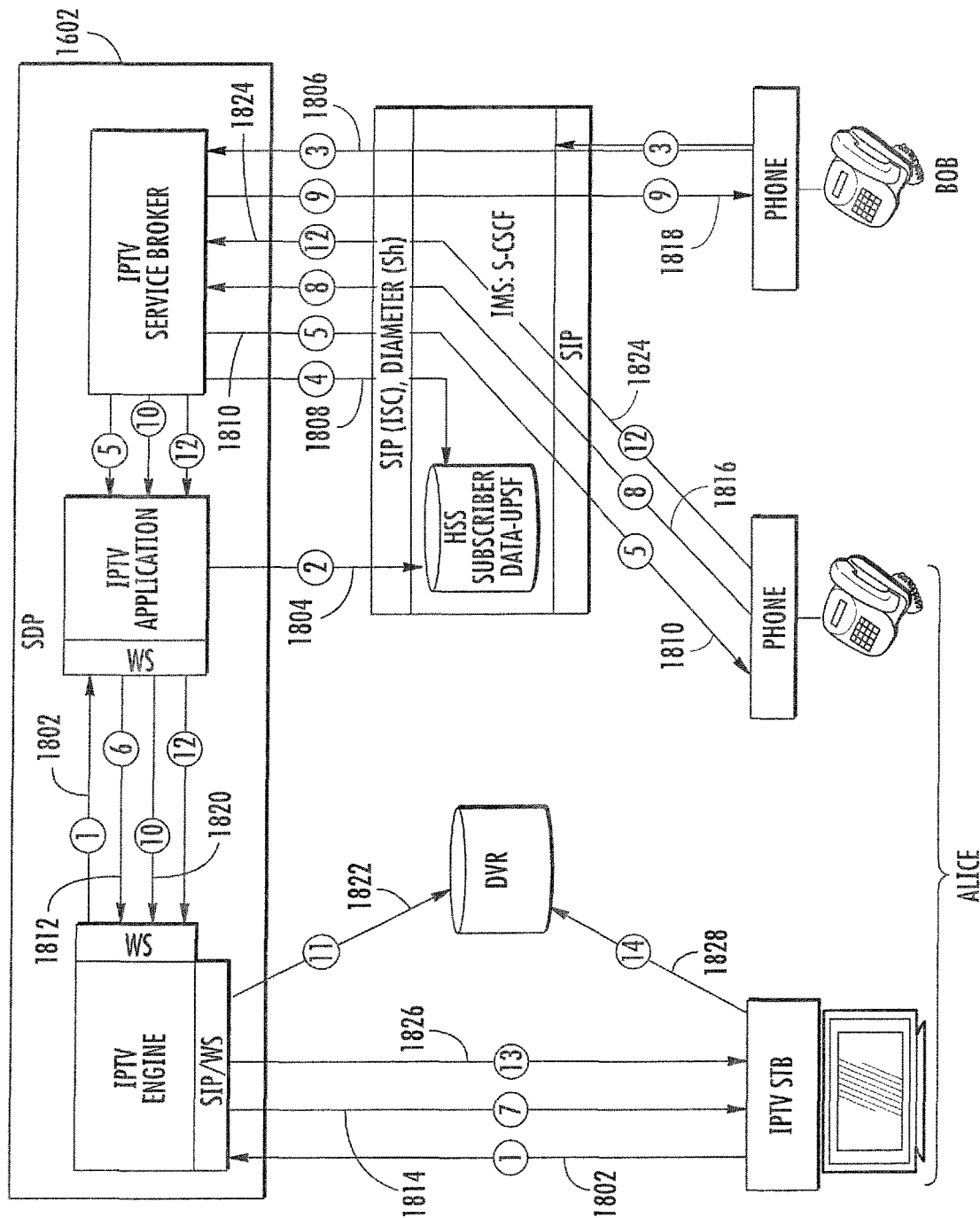
FIG. 18 is a block diagram of an IMS/SDP-based implementation, illustrating an exemplary blended IPTV/telephony application that integrates call delivery and the recording and pausing of TV content during phone calls.

Referring now to FIG. 18, the following example illustrates one blended IPTV/telephony application. This application integrates call delivery and the recording and pausing of TV content during phone calls, as previously described. As shown in FIG. 18:

1) Alice starts watching TV; her STB sends an event to the IPTV Engine, which forwards the event to the IPTV Application (step 1802).
2) This event triggers the IPTV Application to store Alice's status in the HSS (Home Subscriber Server) (step 1804).
3) Bob initiates a call to Alice, and the call event is sent to Alice S-SCCF on the IMS. Because Alice has subscribed to this feature, the call event is passed to the Service Broker running on the SDP (step 1806).
4) The Service Broker queries the HSS and learns that Alice is currently watching TV (step 1808).
5) The Service Broker on the SDP forks the SIP Message through the S-CSCF to Alice's phone and the IPTV Application (step 1810).
6) The IPTV Application acts on the SIP message by sending Bob's caller ID and any associated information (e.g., his picture), as well as a command menu, to the IPTV Engine (step 1812).
7) Bob's caller ID is displayed on Alice's TV (step 1814).
8) If Alice answers the call with her phone, the S-CSCF gives the call receipt to the IPTV Service Broker (step 1816).
9) The IPTV Service Broker forwards the SIP message through the S-CSCF to Bob's phone, establishing the call (step 1818).
10) Meanwhile, the IPTV Service Broker sends a message to the IPTV Application, which instructs the IPTV Engine to remove the call notification information from Alice's TV screen, and to initiate temporary recording of the TV content (step 1820).
11) The IPTV Engine instructs a network DVR or other asset to record the content (step 1822).
12) When Alice hangs up, the call termination event is passed through the S-CSCF to the Service Broker and to the IPTV Application, which informs the IPTV Engine that recording may end (step 1824).
13) The IPTV server alerts Alice that recorded content is available (step 1826).
14) Alice selects a playback option to view the material (step 1828).

Exemplary Implementation of IPTV Architecture—

Figure 19:
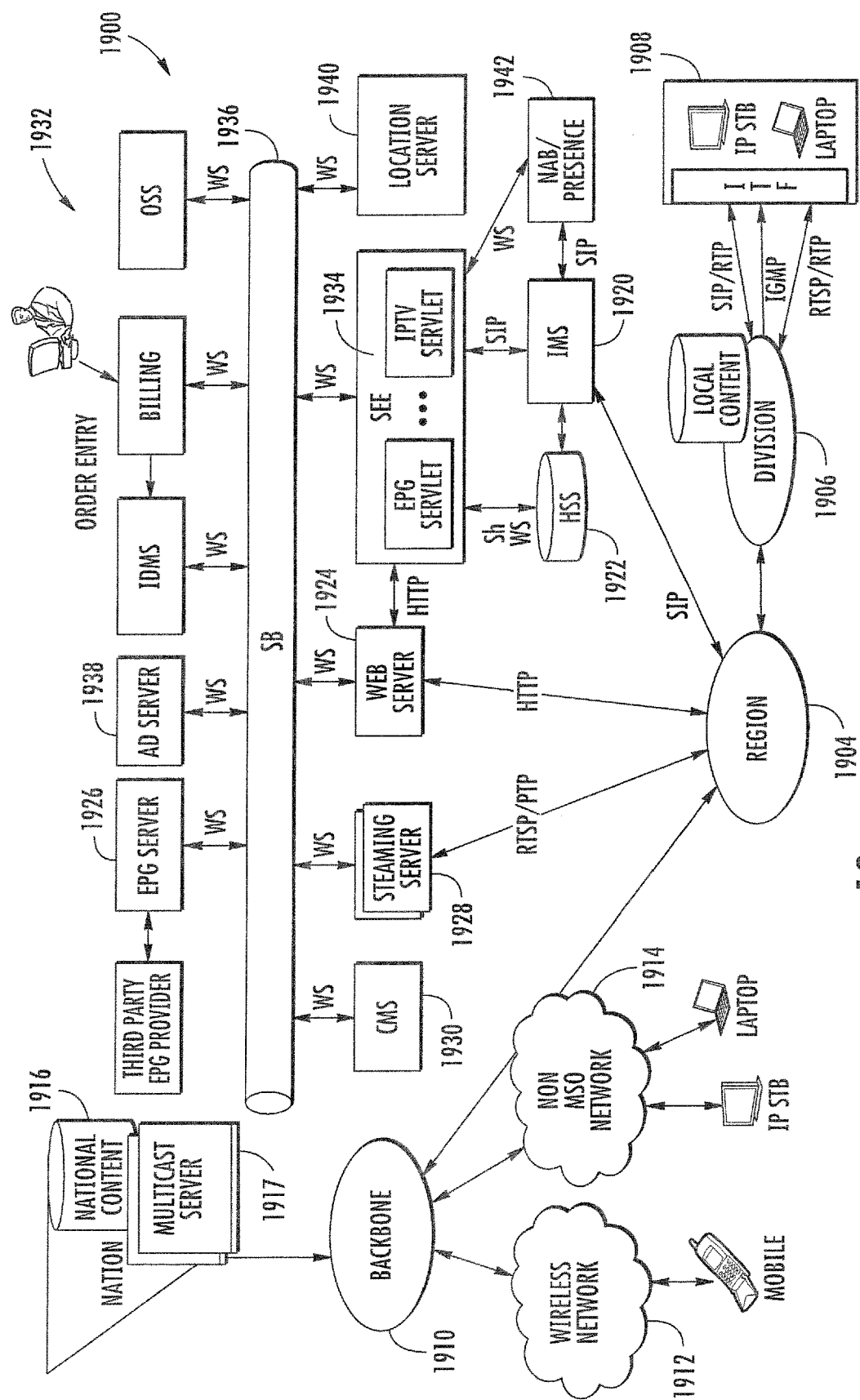
FIG. 19 is a functional block diagram illustrating one particular implementation of an IMS-based content delivery network according to the invention.

Referring now to FIG. 19, one embodiment of a content delivery network system architecture adapted for packetized (e.g., Internet Protocol) transport utilizing the IMS is disclosed.

Server Side Components—

As shown in FIG. 19, the architecture 1900 comprises at least one consolidated headend 1902 (which may be a "super" headend as described previously herein) which communicates with the MSO regional center (s) 1904. The regional center(s) communicates with the MSO division(s) 1906, the latter being substantially at the local level. Each of the divisions 1906 communicates with the relevant MSO subscribers at their premises 1908 ("client side"). The regional center(s) 1904 communicates with the MSO backbone 1910, the latter which interfaces with; (i) one or more wireless networks 1912 (e.g., mobile cellular, Wi-Fi, and/or WiMAX); (ii) non-MSO networks 1914 (e.g., operated by a third party), such as via Internet gateways or the like; and (iii) national level content sources and repositories 1916; e.g., via a multicast server 1917 operated thereby.

Communication with the subscriber premises is conducted in one embodiment using extant MSO infrastructure (e.g., DWDM optical transport ring and other HFC network components including coaxial cable drops to the individual premises, satellite infrastructure, HFCu network, etc.), although the present architecture is also completely compatible with other transport media having sufficient bandwidth (e.g., FTTC/FTTH, WiMAX, etc.).

It will be appreciated that while the illustrated embodiment operates primarily according to an IP (Internet Protocol)-based network layer protocol, other connectionless and/or packet-switched protocols may be used with equal success. It is also appreciated that while a predominantly packet-switched protocol such as IP is utilized in the illustrated architecture, it is not essential that all portions or in fact any of the network be packet-switched in nature. Stated differently, the packetized (encapsulated) data may be carried over "circuit switched" networks, or other types of networks (e.g., ATM, which is circuit-switched and typically "connection oriented" and has characteristics of both).

Exemplary embodiments of the various server side components of the architecture of FIG. 19 are now described in detail.

IMS Core 1920: In the illustrated embodiment, a SIP (IETF standard) based server platform defined by 3GPP standards is utilized, although it will be recognized that other protocols and standards may be used as well. The MSO voice infrastructure may also be IMS-based, or different bases could be used for either video or voice. Use of SIP-based IMS for both provides some economies of scale, such as inter alia obviating the need to support two different standards/implementations.

HSS 1922: The HSS in one embodiment comprises a central location for User Profiles. IPTV subscribers on managed network and unmanaged network are authenticated against the HSS. User's IP Video service profiles may also be stored in the HSS.

Web Server 1924: In one embodiment, the MSO EPG and login site are web-based. All the devices on the unmanaged network will be authenticated against the HSS via the Web Server and Application Server EPG Server 1926: In the illustrated embodiment, the EPG server is consolidated into a few (or even one) region, in contrast to the current EPG server located in every division. This server consolidates information regarding VOD and live video acquired at the NDC, at the local division and from the third party EPG provider. This server is also responsible for presenting the EPG specific to the subscriber, location and network.

Streaming Server 1928: This server supports RTSP, RTP/RTCP according to RFC 2326, RFC 3550, as well as HTTP/MPEG4/H.264/Flash protocols. In addition, it also may be configured to support 3GPP PSS standards (3GPP TS 26.234). One function of the streaming server component is to deliver the actual video to the end points. The Streaming Server can also adapt the content appropriately for user's device and the network condition. This server(s) may also be configured to understand SCTE35 cues.

CMS (Content Management System) 1930: The Content Management System is responsible for keeping track of the content library, interpreting the content metadata, and providing information to the MSO "storefront" (e.g., UI previously described) regarding the content location, permissions, content type, and cost for user to download.

"Back Office" 1932: IP Video infrastructure must interface with Operations, Billing and Provisioning system through SOA interface (discussed elsewhere herein). IDMS functionality may also be available in the HSS.

Service Execution Environment (SEE) 1934: In one embodiment, the SEE comprises a JSR 116/289-compliant SIP/HTTP Application Server that handles low level protocol level interoperability with MS, HSS and Web Server, and invokes the appropriate application(s) to handle a content request. Applications deployed in the SEE are responsible for invoking appropriate functions such as location, EPG and HSS, and consolidating the output of these functions appropriately.

Enterprise Service Bus (SB) 1936: The service bus acts as a data/communication medium between various of the other entities of the architecture. In one variant, the SB comprises an ORACLE Fusion platform located at a technical service group (TSG) of the MSO. Other digital service bus configurations may be used.

Advertisement (Ad) Server 1938: This server is responsible for identifying the advertisement or promotion that should be served to a subscriber in a given location. Such local content may be stored at a local (i.e., division-level) content database or store 1939 as shown, or other location.

Location Server 1940: Based on the location of the user's device, a particular program may not be available for the user, or a different advertisement may be shown to the user. This server is responsible for identifying the location of the user's device at any given time.

NAB/Presence Server 1942: The presence server understands protocols such as XCAP and SIP/SIMPLE, and provides network address book and presence-related data.

Client-Side Architecture—

1. Open IPTV Forum (OIPF) Compliant Terminal

Figure 20:
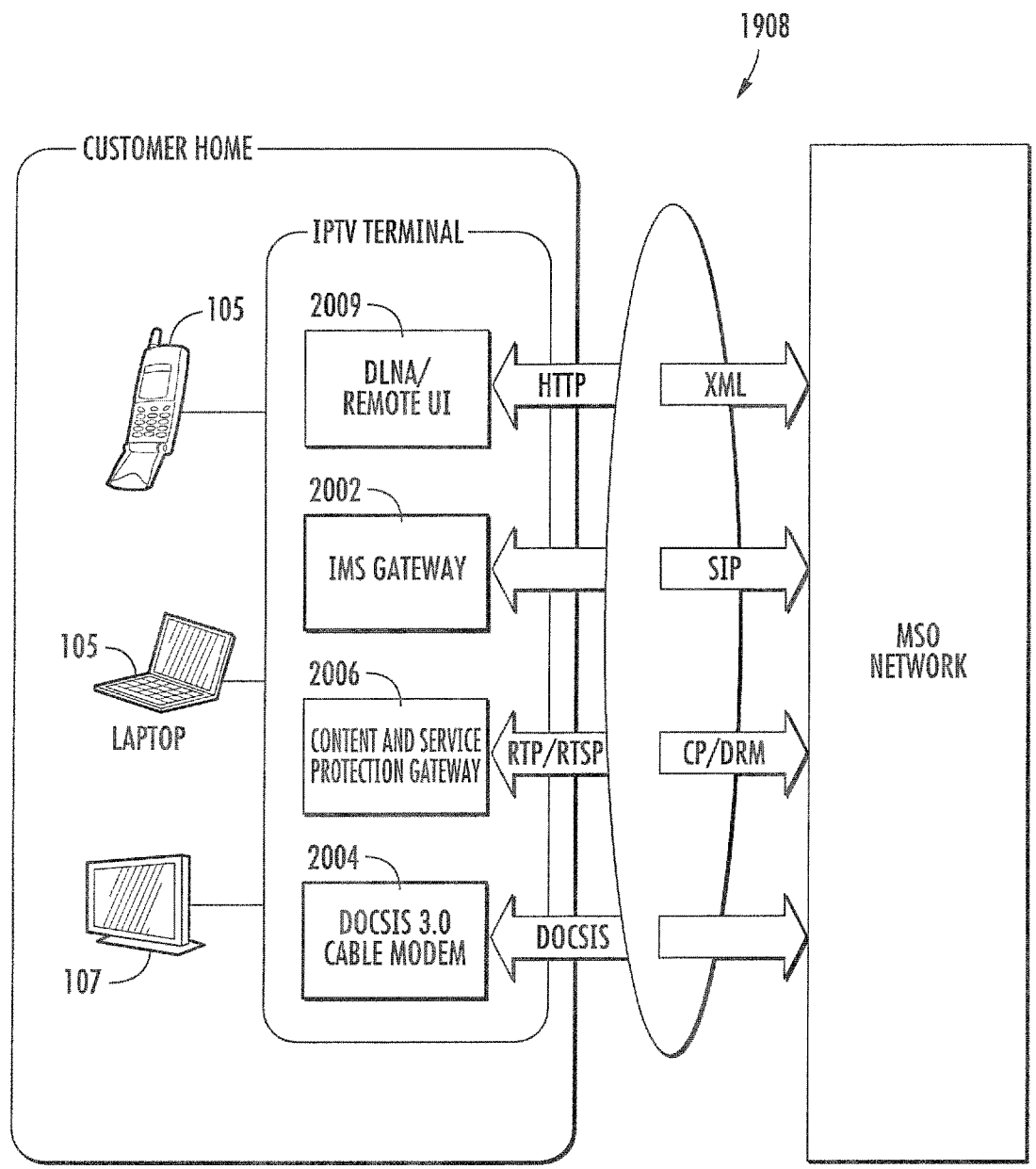
FIG. 20 is a block diagram illustrating one particular implementation of a client-side architecture for use with the IMS-based content delivery network of FIG. 19.

FIG. 20 illustrates one exemplary implementation of a client side-architecture 1908 useful with the IMS-based network implementation of FIG. 19 described above, as well as various protocols that are used to support the various functions (including RTP/RTCP, SIP, DRM protocols, XML, HTTP, DOCSIS, etc.). Components of the exemplary client-side architecture of FIG. 20 include the following:

IMS Gateway 2002: This gateway provides access to MSO IMS core 1420, and associated functions. It is noted that the OIPF (Open IPTV Forum) mandates this feature for all the managed devices, although such functionality is not required for non-OIPF implementations.

WAN Gateway: This is generally a required entity for all premises devices. For MSO in-home devices, this gateway may be for example a DOCSIS modem 2004.

Application Gateway (not shown): This is an optional component which supports application functions. DLNA/UPNP functions may also be part of this gateway function. In addition, operator (e.g., MSO) specific applications may be part of this gateway function.

Content Service Protection Gateway (CSPG) 2006: This is also an optional component in many implementations. This device may be configured to translate MSO-specific DRM solutions into a premises content protection or rights management protocol.

In one variant of the UE, the DVB-IP Phase 1.3 specification requirements of a Home Network End Device (e.g. Set-Top Box) necessary to support IPTV services are implemented in the client-side architecture of the invention. These include:

1. The network configuration of the HNED (IP address) is established using the DHCP protocol.
2. The entry point to get the service discovery information can use a DHCP option or a DNS mechanism.
3. The discovery of live content (list of services, metadata, connections information) is accomplished through the SD&S (Service Discovery & Selection) protocol and metadata. Two modes can be used for the HNED to retrieve this information: (i) pull with HTTP, and/or (ii) push with DVBSTP.
4. The program schedule of broadcast channels and the content made available by Content on Demand services is published by the Broadband Content Guide (BCG), using TV-Anytime metadata. Pull and push modes are available, and an optional "query" mode based on SOAP is also possible.
5. The Real-Time Streaming Protocol (RTSP) is used for control of the delivery of on-demand content, and can optionally be used also for broadcast TV and audio (radio) programs.
6. RTSP profiles for Live Media Broadcast (LMB), Media Broadcast with Trick Modes (MBwTM) and Content on Demand (CoD) are defined.
7. IGMP is used to connect/disconnect to/from multicast streams.
8. RTCP is only allowed as Sender Report messages to inform receivers of transmission statistics and to synchronize multiple multicast streams (for example, for Picture in Picture). No Receiver Report is allowed.
9. The Audio and Video streams and the Service Information are multiplexed into an MPEG-2 Transport Stream. The resulting MPEG-2 packets are encapsulated in UDP or RTP, with DSCP packet markings for quality of service.

2. MSO Client Application—

In addition, an MSO-based client application is used in the exemplary embodiments of the client-side architecture to: (i) support SIP, RTSP, RTP/RTCP, HTTP (either by invoking native clients located on the premises device) for RTSP and HTTP, or by supporting the protocols in the client application itself). This client application in one variant also supports DLNA/UPNP server functionality, such as via a remote DLNA UI 2009.

In another variant, a "thin" client is configured to support inter alia (i) DLNA/UPNP client functionality, (ii) DTCP-IP, and (iii) RTP/RTCP. This thin client is dependent upon DLNA/UPNP Server to serve out UI, and for signaling protocols. This thin client is particularly useful for devices at the premises that are attached to a premises gateway, although not limited to such applications.

Functional Considerations—

1. Service Discovery and Selection

As previously noted, Service Discovery and Selection (SD&S) refers to a set of procedures that a user needs to go through before invoking any IPTV service. This enables the user to discover available services, and retrieve the necessary parameters to activate the selected service. Electronic Program Guides (EPG) and VoD catalogues are part of the service selection information. They can be for example unicasted (e.g., retrieved by the user from a portal or other such mechanism) or multicasted (e.g., received on the user equipment in the form of a specific broadcasted channel).

The service discovery information consists of one or more entry points to Service Selection Applications. The entry points may be in the form of e.g., a URL or other address, and provided by the MSO's SDP.

2. Negotiation of Media Properties

IMS procedures for negotiating media properties during session establishment follow the "offer/answer" model defined in RFC 3264. According to this model, the offerer provides a description of the set of media streams and codecs it wishes to use, while the answerer responds by indicating whether these streams are accepted or not, and which codecs will be used. A stream description in an offer may include a bandwidth attribute, in which case it indicates the desired bandwidth that the offerer is prepared to receive. This model is generally not followed today for streaming services where bandwidth information relates to the bandwidth required to transmit a particular content rather than to the capabilities of the two ends of the communication. Therefore, in one implementation of the invention, the foregoing model is adapted to support the foregoing bandwidth transmission requirements information, as well as endpoint capabilities information.

3. Control of Media Flows

As a practical matter, specific time constraints related to media flows control have to be considered. For example, so-called "channel-hopping" delay is a major constraint for broadcast services. Trick mode operations (e.g., fast forward) in VoD and PVR are also subject to time constraints. To avoid IMS signaling procedures bringing extra delays, it is necessary to draw a clear separation between service/session control performed at the IMS level, and media flow control handled end-to-end between the user equipment and the content servers. The architecture described herein makes use of RTSP for Control of Media flows provided by the SDP to address these issues.

4. Presence Enablers

Presence technology enriches communications by providing real-time information about the status of subscribers. So-called "presence enablers" are already specified in IMS, but in one embodiment of the invention are extended or adapted to include. IPTV-specific information. This is particularly relevant in broadcast services, where the presence feature can be used to publish the channel/program currently watched by the user.

This capability can be required by particular applications combining IPTV features with other IMS services. It may also be used in instant messaging applications, where a user would then be able to see what his/her contacts are watching (akin to some existing instant messaging applications that enable users to publish the music they are currently listening to).

Operational Scenarios—

The following exemplary scenarios illustrate various aspects of the operation of packet-based media subsystem (e.g., IMS 1920) and other components of the architecture 1900 of FIG. 19 described above. It will be appreciated that these scenarios represent only a subset of possible operational scenarios that can be supported by the architecture 1900 of FIG. 19 (and in fact the broader networks described previously herein with respect to FIG. 1, et seq.).

1. Operational Scenario 1—Authentication (Premises with Open IPTV Forum Compliant Terminal)

Initial Condition(s)—
  User has powered up device, and has selected IPTV Service from services menu.

Process Steps—
  IPTV client is displayed on the user's device and the first view is the login prompt if user is logging in for the first time. User's credentials may be cached if he/she has logged in before based on user's configuration.
  User types in username and password. This step can be skipped if user has logged in before and has configured the client to store the username and password. Instead of displaying login prompt, client automatically goes to the next step.
  User's credentials are sent to IMS in response to the challenge.
  (These steps can be modified as defined by the UI designer if desired, such as to permute their order, add/remove steps, occur automatically, etc.)

Architectural Components Utilized—
  Open IPTV Forum Compliant terminal (client side
  IMS 1920
  HSS 1922

Figure 21:
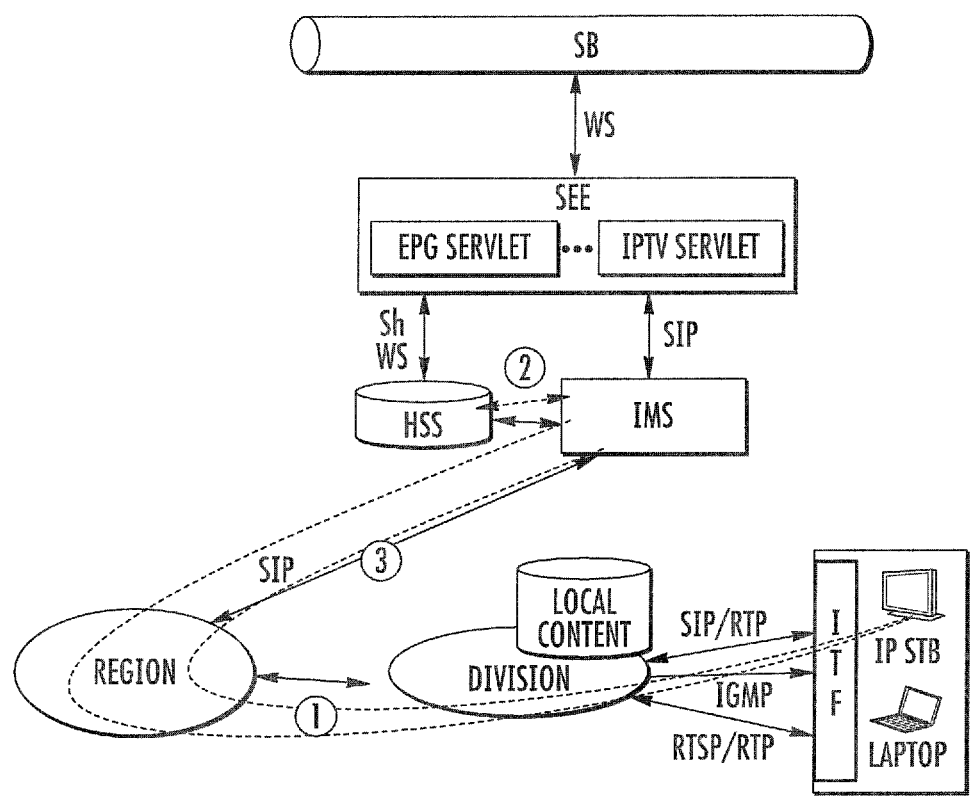
FIG. 21 is a block diagram (in the context of the exemplary architecture of FIG. 19) illustrating a first operational use case.

As shown in FIG. 21, the following methodology is employed in one embodiment of the authentication (OIPF-enabled) function of the invention:

1. IMS client sends a SIP "REGISTER" Request to MSO IMS 1920
  2. IMS Core exchanges diameter messages with HSS 1922 to authenticate the user.
  3. If the user credentials match with the credentials stored in the HSS, a SIP 200 "OK" in response to the REGISTER Message is sent back to the user device at the premises 1908. Otherwise, an error message (e.g., Challenge) is sent to prompt the user for correct credentials, or to invoke other desired actions.

2. Operational Scenario 2—Authentication (Premises without Open IPTV Forum Compliant Client)

Initial Condition(s)—
  User has powered up device and has selected IPTV Service from services menu.

Process Steps
  User uses generic browser and navigates to designated site (e.g., timewarnercable.com; MSO website)
  User logs into website In addition, IDMS also matches the credentials against HSS subscriber profile via auth (authentication) servlet.

After the user is logged in, IPTV Service is listed as one of the services in the main website user interface.

Architectural Components

CLA/IDMS 656 (FIG. 6*c*)

IMS 1920

HSS 1922

Application Server

Auth servlet running on the Application Server

The following methodology is employed in one embodiment of the authentication (non-OIPF) function of the invention:

1. User tries to access one of the MSO Applications from MSO web site. Since this user is not authenticated yet, user is prompted to enter username and password and the credentials are posted to MSO web server
2. User's request is forwarded to CLA/IDMS
3. CLA/IDMS forwards the request to auth servlet
4. Auth servlet establishes the sh connection via SEE 1934 with HSS 1922, and authenticates the user 3. Operational Scenario 3—EPG Consolidation Initial Conditions—

National data centers have acquired national data from satellite, VOD catchers, FTP, and other acquisition mechanisms.

Similarly, local divisions have acquired local data from satellite, VOD catchers, FTP, and other acquisition mechanisms.

National Acquisition systems have stored the acquired data in national storage systems. In the case of live data, national IPTV server has created multicast streams of multiple bit rates.

Process Steps—

National Acquisition system sends metadata files and URLs of stored data to the EPG server In the ease of live video, National data center also sends multicast address. Also, update messages are sent to the EPG Server if number of multicast servers change or URLs change.

EPG Server pulls the metadata and broadcast timings of live broadcast from "tribune" or other such server Local Acquisition system sends metadata files and URLs of stored data to the EPG server In the case of local live video, divisions also send multicast address. Also, update messages are sent to the EPG Server if number of multicast servers change or URLs change.

Architectural Components

National and Local Acquisition Systems 1916

National EPG Server (may be located in multiple regions) 1926

Web Server 1924

Service Bus 1936

Figure 22:
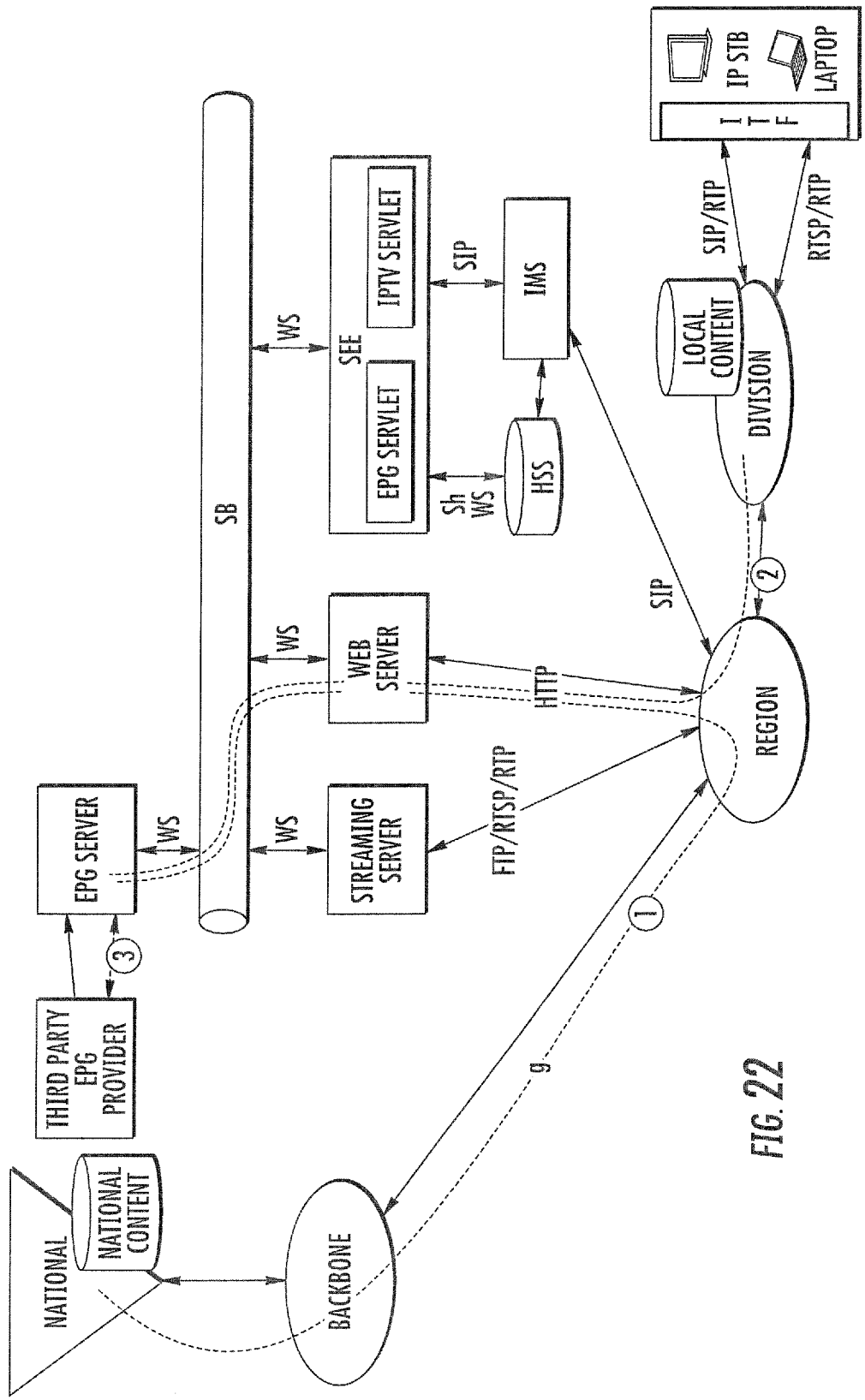
FIG. 22 is a block diagram (in the context of the exemplary architecture of FIG. 19) illustrating a second operational use case.

As shown in FIG. 22, the following methodology is employed in one embodiment of the EPG consolidation function of the invention:

1. National VOD Catcher sends VOD content catalog to all regional EPG Servers.
2. Division VOD Catcher sends local VOD content catalog to all regional EPG Servers.
3. EPG Server retrieves live channel info from one or more third party EPG providers.

4. Operational Scenario 4—EPG (Premises with DOCSIS Cable Modem or Open IPTV Forum Compliant Client)

Initial Condition—

User has powered up device.

User has been authenticated by one of the authentication mechanisms described above User has selected Video over IP service from the service selection menu (e.g., GUI)

Process Steps—

User's client device or Home Gateway sends an HTTP request to receive content and EPG with the location and device capability, to MSO web server 1924.

Web server forwards the request to EPG servlet.

EPG servlet retrieves subscriber information from HSS 1922, and forwards the request to EPG with relevant information—e.g., Subscriber Profile (including viewer preference, age group and subscription), device capability and location.

EPG server invokes the business logic (e.g., "rules engine") analyze the information and prepare a tailored EPG for the viewer. In another variant, the foregoing logic is implemented in the EPG servlet itself.

If client device capability indicates that the device has IMS client, or that the device is connected to an OIPF-enabled Home Gateway, the tailored EPG may be constructed with SIP URLs (e.g., sip://TWCIPTV URL/cnn). If not, the EPG may be constructed with RTSP URLs (e.g., rtsp://TWC IPTV URL/cnn:authstring).

Architectural Components

User device with a browser or other UI application

Web Server 1924

Application Server (EPG Servlet)

EPG Server 1926

Figure 23:
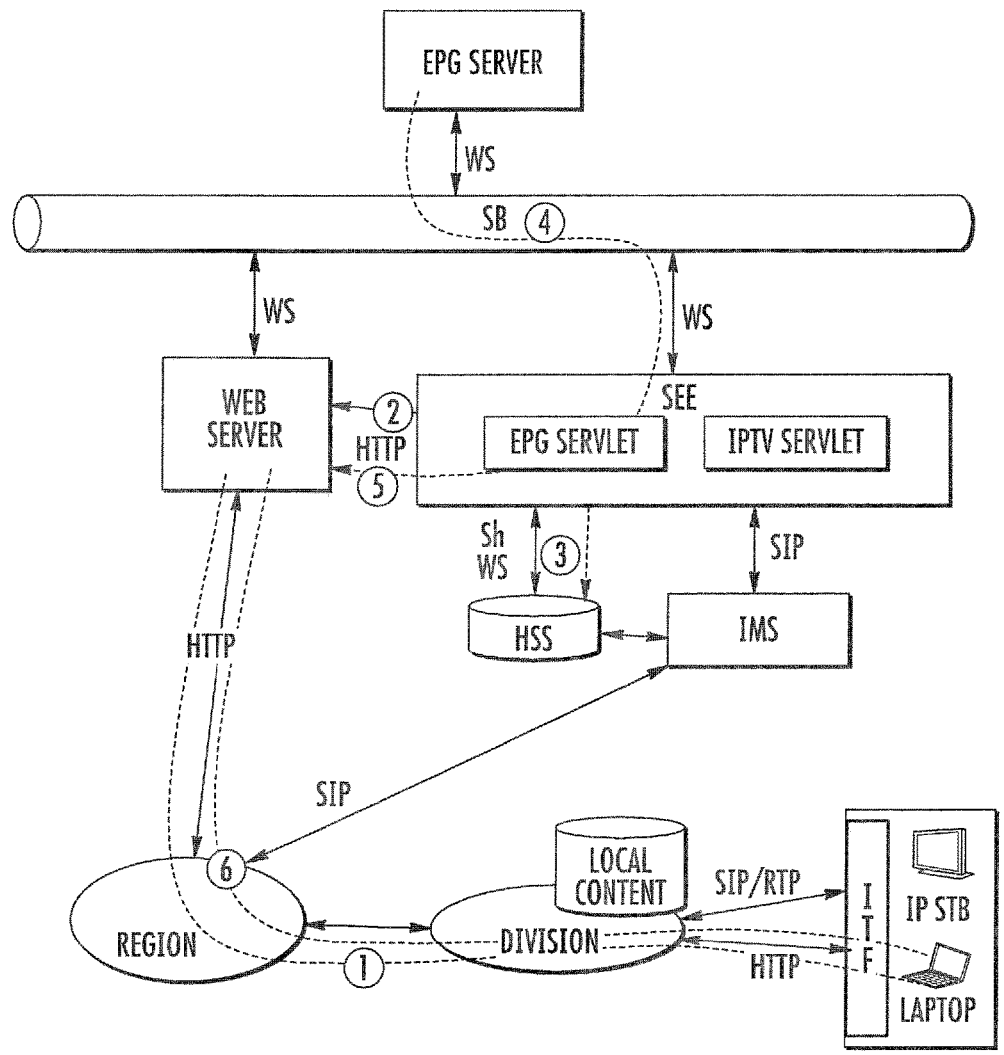
FIG. 23 is a block diagram (in the context of the exemplary architecture of FIG. 19) illustrating a third operational use case.

As shown in FIG. 23, the following methodology is employed in one embodiment of the EPG delivery function of the invention:

1. User clicks on the EPG link on MSO website or other portal, and an HTTP request is sent to the MSO Web Server serving this user's premises.
2. Web Server forwards the HTTP request to EPG Servlet via the SEE
3. EPG Servlet analyzes device capability, and also queries HSS for user's profile and location.
4. Based on the forwarded device capability, user's subscription and location, relevant EPG content is retrieved. The EPG Server prepares a targeted or tailored EPG for that user.
5. The original request is responded to with the targeted EPG.
6. A 200 OK is sent back to the user with the EPG content and formatted to display on user's device.

5. Operational Scenario 5—Live Stream (Premises with Open IPTV Forum Compatible Client)

Initial Conditions—

User has selected a program from the EPG. Since device is attached to OIPF compliant terminal, EPG URLs are SIP URLs (e.g., sip://cnn@streaming.twc.com)

IMS is configured (via trigger) to forward SIP INVITE messages targeted for IPTV to the Application server's hosting IPTV application CMS 1930 has a list of multicast server addresses serving live streams at multiple bit rates Process Steps—

User selects the program to watch, and their IPTV client sends a SIP request to the MSO IMS 1920

MSO IMS forwards the request to the Application Server's hosting IPTV servlet.

IPTV servlet contacts CMS 1930 with client device capability, subscriber profile and network condition to a retrieve multicast address for this device A final response is sent to user's device with the multicast address and media description of the requested stream User's device sends an IGMP "join" message to the multicast server, and starts receiving the stream containing the program content. If this is the first user requesting this stream, multicasting is started at the first request. If it is an existing stream, new request joins the existing multicast stream.

Architectural Components—
User device 107, 105 with a UPnP browser or similar
Open IPTV Forum-enabled Home gateway 812
Application Server (IPTV Servlet)
Multicast Server(s) 1917
CMS 1930
IMS 1920

Figure 24:
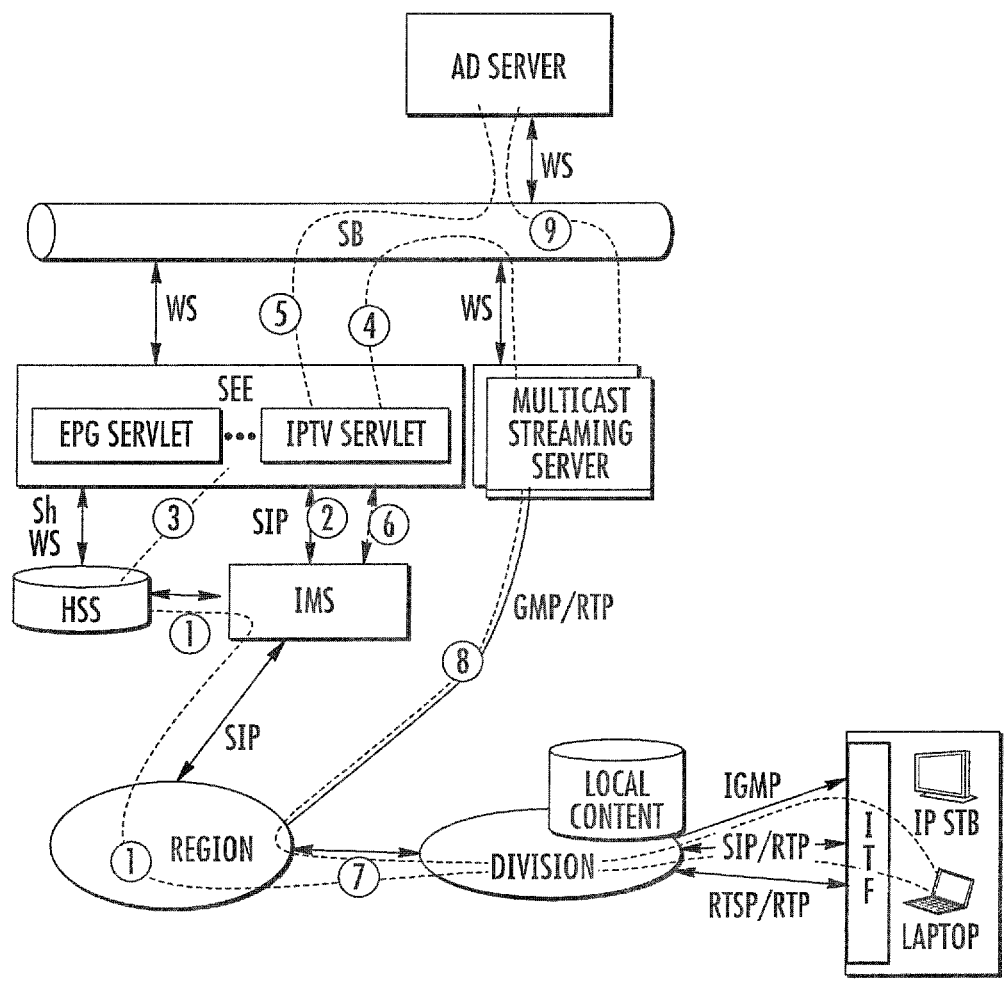
FIG. 24 is a block diagram (in the context of the exemplary architecture of FIG. 19) illustrating a fourth operational use case.

As shown in FIG. 24, the following methodology is employed in one embodiment of the live streaming over IPTV client functionality of the invention:

1. User has selected a program from the EPG on their IPTV Client (e.g., UPnP-enabled client). The client sends a SIP INVITE to the IMS 1920 with the Request URI set (e.g., to sip:cnn@imsiptv.twc.com).
2. The IMS 1920 is configured (via trigger) to forward SIP INVITE messages targeted for IPTV to the Application server hosting the IPTV application.
3. The IPTV Servlet queries the HSS 1922 for a subscriber profile, and to determine the user's location. The IPTV servlet also analyses user's device capability (e.g., via existing profile, or contemporaneously obtained data).
4. The IPTV Servlet determines the multicast server hosting the requested stream, for this device, for this location.
5. The IPTV Servlet sends device capability, stream capability, location and multicast server information to the Ad Server 1938.
6. The IPTV Servlet returns a SIP 200 OK to IMS 1920 in response to the request, with server address and other relevant media information.
7. The IMS 1920 forwards the response to the user device.
8. The user device sends an IGMP "Join" message to the relevant multicast server, and starts receiving the content stream.
9. The Streaming Server encounters cue for inserting Ads, and requests the Ad Server to provide appropriate advertisement(s).

6. Operational Scenario 6—Live Stream (Premises with DOCSIS Cable Modem)

Initial Conditions—
User selects a program from the EPG. Since the user device does not have an IMS client or UPNP client, EPG URLs are RTSP-based (e.g., rtsp urls—rtsp://cnn@streaming1.twc.com:<authstring>).

The streaming server 1928 has a Web Services (WS) interface

CMS 1930 has a list of multicast server addresses serving live streams at multiple bit rates Process Steps—
User's device sends an RTSP request to the streaming server specified in the URL.

The streaming server sends a web service request to the Application Server hosting the IPTV servlet.

The IPTV servlet contacts the CMS 1930 with device capability, subscriber profile and network condition information in order to retrieve a multicast address for this user device A final response is sent to user's device with the relevant multicast address and media description of the requested stream The user's device sends an IGMP "join" message to the relevant multicast server, and starts receiving the stream. If this is the first user requesting this stream, multicasting is started at the first request. If it is an existing stream, new request joins the existing multicast stream.

Architectural Components
User device 107, 105 with an RTSP-enabled client
DOCSIS Modem 2004
Application Server (IPTV Servlet)
Multicast Server(s) 1917
CMS 1930
Streaming server with Webservices interface 1928
HSS 1922

Figure 25:
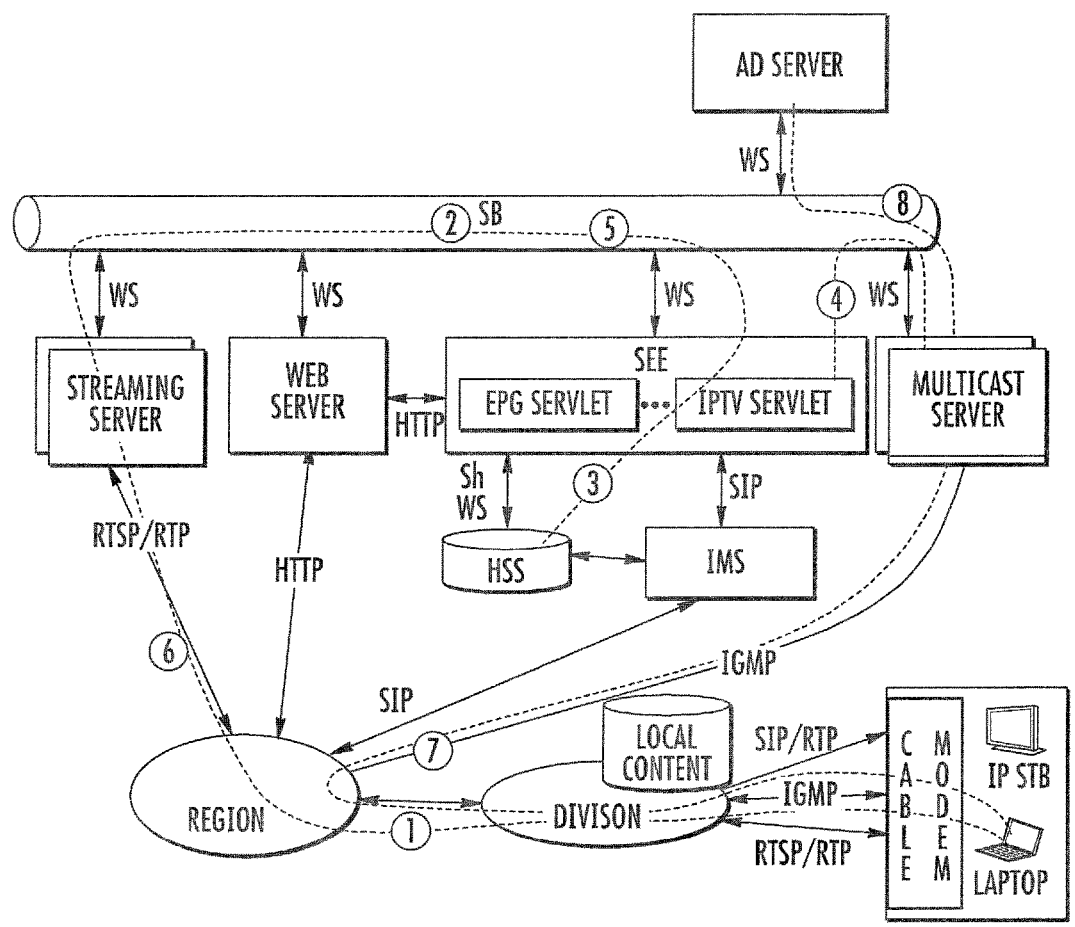
FIG. 25 is a block diagram (in the context of the exemplary architecture of FIG. 19) illustrating a fifth operational use case.

As shown in FIG. 25, the following methodology is employed in one embodiment of the live streaming over DOCSIS function of the invention:

1. User selects a program from the EPG. (in this case, the EPG URLs are RTSP URLs; e.g., rtsp://cnn@streaming1.twc.com:<authstring>.)
2. The streaming server 1928 extracts the auth string, and forwards it to the IPTV servlet.
3. The IPTV servlet looks at the user part of the auth string, and queries the HSS 1922 for the authentication status. The user's location and profile are also retrieved.
4. The IPTV servlet determines the multicast server serving this stream for this location and device.
5. The IPTV servlet sends the address of the relevant multicast server to the streaming server 1928.
6. The streaming server sends a SIP 200 OK to the user device along with the relevant multicast server address.
7. The user's device initiates an IGMP "join" and starts receiving RTP data. Since this user device is on a managed (e.g., MSO) network, QOS is applied as needed for the streamed content.
8. The streaming server encounters a cue for inserting advertisements, and requests the Ad Server 1938 to provide one or more appropriate advertisements.

7. Operational Scenario 7—VOD (Premises with Open IPTV Forum Compatible Client)

Initial Conditions—
User has selected a program from the EPG. Since the user device is going through an OIPF-compatible terminal, the EPG URLs are SIP URLs; e.g., sip://harrypotter@streaming.twc.com.

The IMS 1920 is configured (via trigger) to forward SIP INVITE messages targeted for IPTV to the Application server hosting the IPTV application CMS 1930 has a list of available VOD streaming servers Process Steps—
The OIPF user terminal sends a SIP request to the IMS 1920.

The IMS 1920 forwards the request to the Application Server hosting the IPTV servlet.

The IPTV servlet contacts the CMS 1930 with device capability, subscriber profile and network condition information in order to retrieve a VOD streaming server address for this device at this location.

A final response is sent to the user's device with a streaming server address and media description.

The user's device sends RTSP SETUP and PLAY messages to the streaming server, and starts receiving the stream.

Before setting up the session, the RTSP/VOD streaming server contacts the HSS 1922 via the IPTV servlet to determine if this user's session is authenticated.

Architectural Components—
- User device 107, 105 with a UPNP browser or similar interface
- Open IPTV Forum-enabled premises gateway 812
- Application Server (IPTV Servlet)
- IMS 1920
- VOD Streaming Server(s) 1928
- CMS 1930

Figure 26:
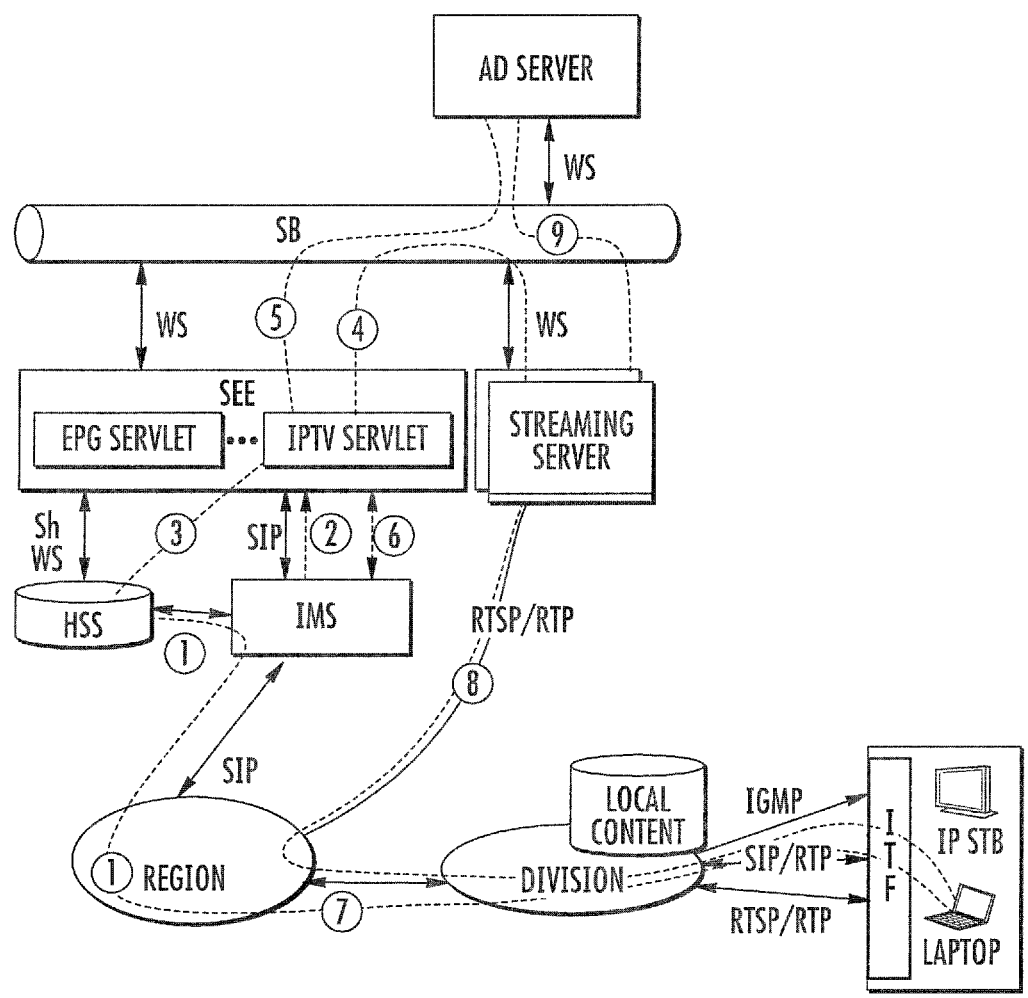
FIG. 26 is a block diagram (in the context of the exemplary architecture of FIG. 19) illustrating a sixth operational use case.

As shown in FIG. 26, the following methodology is employed in one embodiment of the VoD delivery function of the invention:

1. User has selected a program from EPG on MSO IPTV Client (e.g., UPnP client). The client sends a SIP INVITE to the IMS 1920 with the Request URI set to e.g., sip:harrypotter@imsiptv.twc.com.
2. The IMS 1920 is configured (via trigger) to forward SIP INVITE messages targeted for IPTV to the Application server hosting the IPTV application.
3. The IPTV Servlet queries the HSS 1922 for a subscriber profile, and to determine the user's location. The IPTV servlet also analyzes the user's device capability.
4. The IPTV Servlet determines the streaming server responsible for this user's location.
5. The IPTV Servlet sends device capability, stream capability, location and multicast server information to the Ad Server 1938.
6. The IPTV servlet returns a SIP 200 OK message to the IMS 1920 for the request, including the server address and other media information.
7. The IMS 1920 forwards the response to the device.
8. Device sends an RTSP Setup and PLAY to the Streaming Server and starts receiving the content.
9. Streaming Server encounters cue for inserting Ads and requests Ad Server to provide appropriate advertisement.

8. Operational Scenario 8—VOD (Premises with DOCSIS Cable Modem)

Initial Condition
- User selects a program from the EPG. Since device does not have a TWC IMS client, EPG URLs are RTSP URLs—rtsp://cnn@streaming1.twc.com:<authstring>.
- Streaming Server has Web Services interface Steps
- User's device sends an RTSP request to the streaming server specified in the URL.
- Streaming server sends a web service request to Application Server hosting IPTV servlet.
- IPTV servlet contacts HSS to validate this user's authenticated session
- A final response is sent to user's device with media description of the stream
- User's device sends RTSP SETUP and PLAY to streaming server and starts receiving the stream Architectural Components
- User device 107, 105 with an RTSP client
- DOCSIS Modem 2004
- Application Server (IPTV Servlet)
- Streaming Server(s) 1928
- CMS 1930
- Streaming Server with Web Services interface
- HSS 1922

Figure 27:
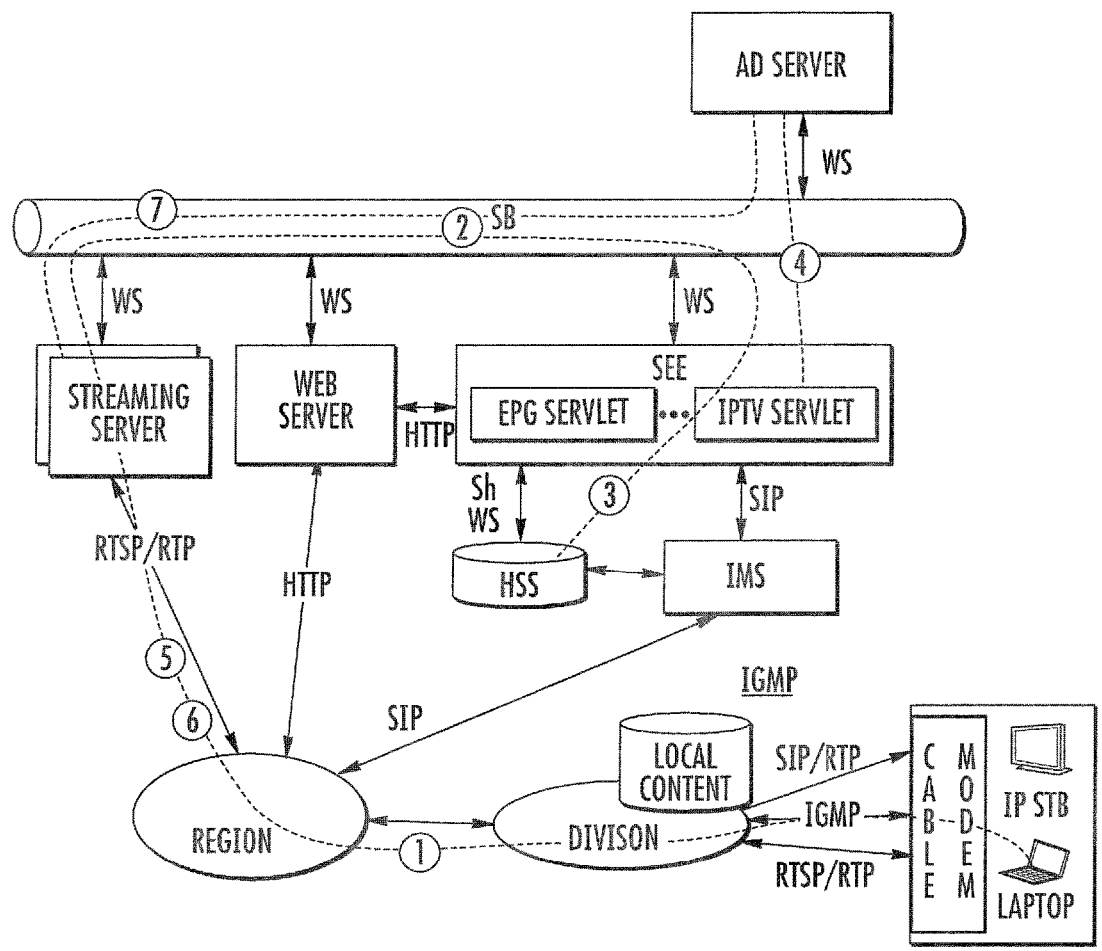
FIG. 27 is a block diagram (in the context of the exemplary architecture of FIG. 19) illustrating a seventh operational use case.

As shown in FIG. 27, the following methodology is employed in one embodiment of the VoD delivery function of the invention:

1. User selects a program from the EPG. EPG URLs in one embodiment are rtsp urls—e.g., rtsp://clipname@streaming1.twc.com:<authstring>
2. Streaming server extracts the auth string and forwards it to the IPTV servlet.
3. IPTV servlet looks at the user part of the auth string, and queries HSS for the authentication status. It also retrieves user's location and profile.
4. IPTV servlet sends user's profile and location to advertisement (Ad) server so that the Ad server is ready with the required ads to be inserted into the stream.
5. Streaming Server sends information regarding the port number and the address to receive the RTP data.
6. User's device initiates an RTP Session, and starts receiving RTP data. Since this user device is on a managed network, QOS for the stream is provided.
7. Streaming Server encounters cue for inserting advertisements, and requests Ad Server to provide appropriate advertisement(s).

9. Operational Scenario 9—"Social" TV (With IMS)

Figure 28:
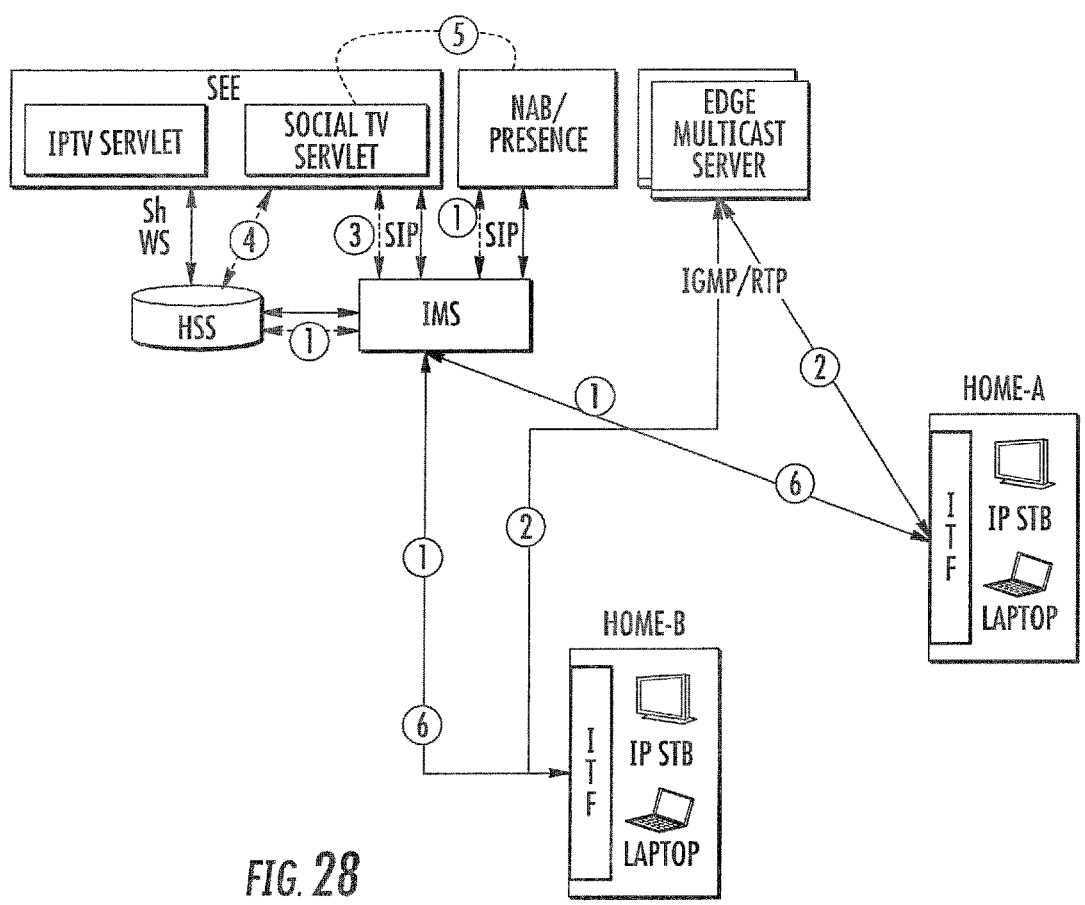
FIG. 28 is a block diagram (in the context of the exemplary architecture of FIG. 19) illustrating an eighth operational use case.

As shown in FIG. 28, the following methodology is employed in one embodiment of the "social TV" function of the invention:

1. Users in Home-A and Home-B register with IMS 1920 and update their presence.
2. Users in Home-A and Home-B setup video session with IMS, and start watching the same channel.
3. IMS 1920 sends the trigger to a Social TV servlet
4. The Social TV Servlet queries the HSS 1922 for subscriber profile.
5. If subscriber profile permits, Social TV servlet updates the Presence Server with channels being watched by that subscriber.
6. Users A and B see that they are watching the same channel, and they start chatting about the show.

10. Operational Scenario 10—Transfer Stream (e.g., TV to Mobile Device).

Figure 29:
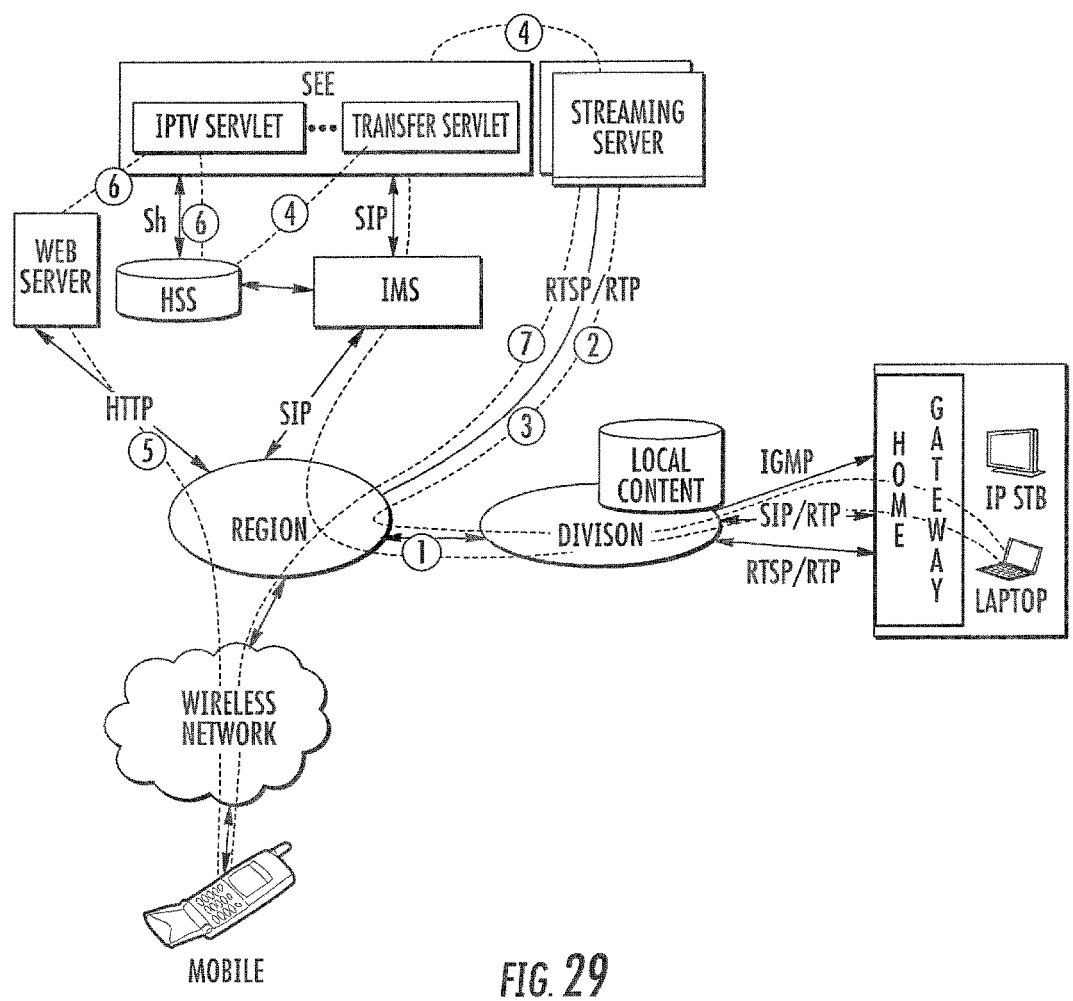
FIG. 29 is a block diagram (in the context of the exemplary architecture of FIG. 19) illustrating a ninth operational use case.

As shown in FIG. 29, the following methodology is employed in one embodiment of the session transfer function of the invention:

1. IPTV client on premises device (e.g., IPTV-enabled DSTB) is registered with IMS, and sets up a video session
2. User is watching a show on TV via the session
3. User pauses the video
4. Streaming Server stores stream state with the current play time in HSS
5. User navigates to "mso.com" or other server link on target mobile device, and selects the IPTV service
6. IPTV servlet checks user status, and retrieves paused session and state, and paused stream is displayed on the target mobile device
7. User clicks on the link or other UI feature, and starts streaming from the saved state (play time) so that none of program is missed.

11. Operational Scenario 11—"American Idol™" (with IMS)

Figure 30:
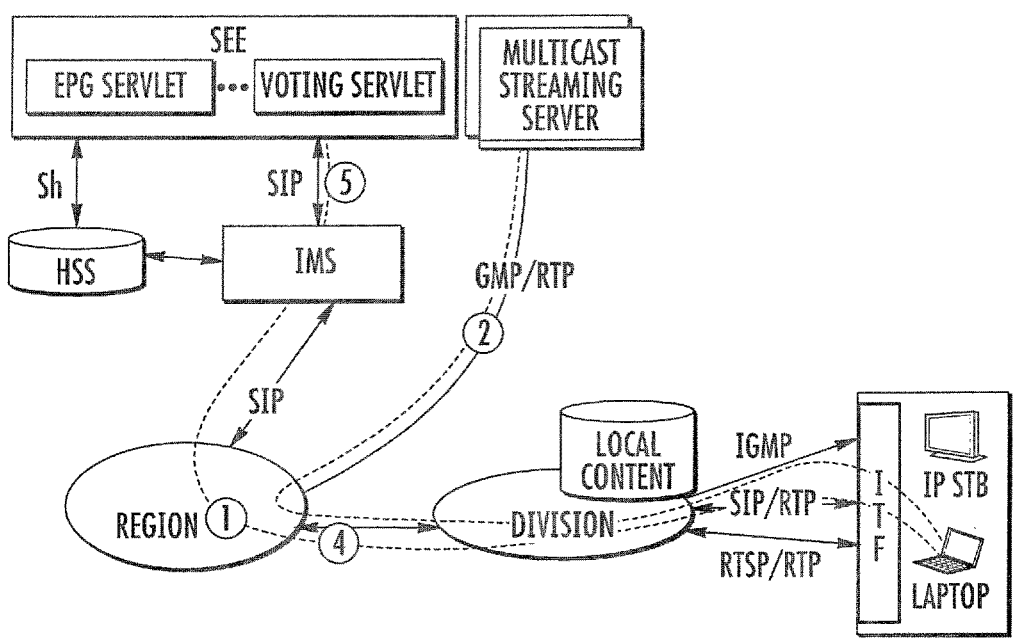
FIG. 30 is a block diagram (in the context of the exemplary architecture of FIG. 19) illustrating a tenth operational use case.

As illustrated in FIG. 30, the following methodology is employed in one embodiment of the interactive services function of the invention.

1. User selects a channel and User's IMS IPTV client sets up a video session with IMS
2. User starts receiving video (e.g., American Idol) on the TV
3. Instead of asking the viewers to send SMS to vote, the show's host says, "if you are an MSO customer, click on 1 . . . to vote for the singer . . . "

4. User clicks a number, and MSO IPTV client sends a SIP INFO message within the existing SIP session. The IMS has a trigger set to forward all the INFO Messages sent within a session of this show to the SEE.
5. The voting servlet receives the INFO message, and retrieves the number in the message body (corresponding to the user's vote), and updates the vote to the singer. At the end of the show (or other desired point in time), the updated count is sent to the content provider.

XII. Exemplary IPTV Implementations and Service Use Cases—

Because of the flexible nature of IP, MSO IPTV services enabled by the methods and apparatus described herein can be offered as multiple screen services to its customers, making sure that they have access to any content and services via any of their TV, PC, mobile, and other devices at any location, at any time desired ("four any's").

A. Implementations—

The following implementation scenarios are illustrative (yet not exhaustive) of the various instances in which network operator (e.g., MSO) subscribers or users would access content.

1. Implementation Scenario 1—"Managed" network-Premises with Open IPTV Forum Compatible Gateway A device connecting to the premises gateway may or may not have an IMS client process. The OIPF-compatible gateway comprises an IMS-enabled gateway 812. If the device has an IMS client, the IMS-enabled gateway acts as a proxy. If not, the gateway translates the UPNP or HTTP request to a SIP request, and forwards the request to the MSO TMS network.

- Live video delivered to a PC or IP-enabled STB 107—MPEG2, MPEG4 and H.264
- Live video to Mobile (connected to gateway over e.g., Wi-Fi)—MPEG4, H.264
- VOD on PC, IP STB 107, Mobile/PMD 105 (including trick-mode play)—Pause, rewind, fast forward (4×, 8× . . . )
- DVR recording on the premises gateway initiated from any device connected to the home network
- DVR playback on any device connected to the premises network
- Targeted EPG-based on subscriber demographic, psychographic, or other profile (e.g., parental control), location, and/or device capability
- Targeted advertisement/promotion—based on subscriber demographic, psychographic, or other profile (parental control), user's preference, location, and/or device capability 2. Implementation Scenario 2—Managed Network-Premises with MSO DOCSIS Cable Modem but no Gateway The MSO DOCSIS cable modem 2004 provides network connectivity and QoS. A device connected to the cable modem may or may not have an MSO IMS client to access the MSO IPTV service.

a. Without IMS Client
- Live video to PC, IP STB—MPEG2 and MPEG4 and H.264
- Live video to Mobile (connected to Cable Modem over Wi-Fi)—MPEG4 and H.264
- VOD on PC, IP STB, Mobile including trick play—Pause, rewind, fast forward (4×, 8× . . . )
- DVR recording on the premises gateway initiated from any device connected to premises network
- DVR play back on any device connected to home network
- Targeted EPG-based on subscriber demographic, psychographic, or other profile (e.g., parental control), location, and/or device capability
- Targeted advertisement/promotion—based on subscriber demographic, psychographic, or other profile (parental control), user's preference, location, and/or device capability b. With IMS Client
- Live video to PC, IP STB—MPEG2 and MPEG4 and H.264
- Live video to Mobile (connected to Cable Modem over Wi-Fi)—MPEG4 and H.264
- VOD on PC, IP STB, Mobile including trick play—Pause, rewind, fast forward (4×, 8× . . . )
- DVR recording on the premises gateway initiated from any device connected to premises network
- DVR play back on any device connected to home network
- Targeted EPG—based on subscriber demographic, psychographic, or other profile (e.g., parental control), location, and/or device capability
- Targeted advertisement/promotion—based on subscriber demographic, psychographic, or other profile (parental control), user's preference, location, and/or device capability 3. Implementation Scenario 3—Unmanaged Network—with IMS Client
- Live video to PC, IP STB—MPEG2 and MPEG4 and H.264
- Live video to Mobile—MPEG4 and H.264
- VOD on PC, IP STB, Mobile including trick play—Pause, rewind, fast forward (4×, 8×, . . . )
- DVR recording initiated remotely—target location of recoded data may be on user's Home Gateway or on a specified STB with DVR capability
- Targeted EPG—based on subscriber demographic, psychographic, or other profile (e.g., parental control), location, and/or device capability
- Targeted advertisement/promotion—based on subscriber demographic, psychographic, or other profile (parental control), user's preference, location, and/or device capability 4. Implementation Scenario 4—Unmanaged Network-without IMS Client
- Live video to PC, IP STB—MPEG2 and MPEG4 and H.264
- Live video to Mobile—MPEG4 and H.264
- VOD on PC, rp STB, Mobile including trick play—Pause, rewind, fast forward (4×, 8× . . . )
- DVR recording initiated remotely—target location of recoiled data may be on user's Home Gateway or on a specified STB with DVR capability
- Targeted EPG—based on subscriber demographic, psychographic, or other profile (e.g., parental control), location, and/or device capability
- Targeted advertisement/promotion—based on subscriber demographic, psychographic, or other profile (parental control), user's preference, location, and/or device capability 5. Implementation Scenario 5—Converged Use Cases (Movement of Streams Between Devices)
- mobile (WiMax/WiFi) to PC with data card
- mobile (WiMax/WiFi) to STB (SD/HD) in the home (with and without Home Gateway).
- mobile (WiMax/WiFi) to PC in the home (with and without Home Gateway)
- PC with data card to mobile (WiMax/WiFi)

PC in the home to STB (SD/HD) in the home (with and without Home Gateway).

STB (SD/HD) in the home (with and without Home Gateway) to Mobile

STB (SD/HD) in the home (with and without Home Gateway) to PC with datacard STB (SD/HD) in the home (with and without Home Gateway) to PC with datacard B. Service Use Cases—

The examples of FIGS. 31-40—provide various examples of possible IPTV services that can be offered to users of the network of the present invention.

Figure 37:
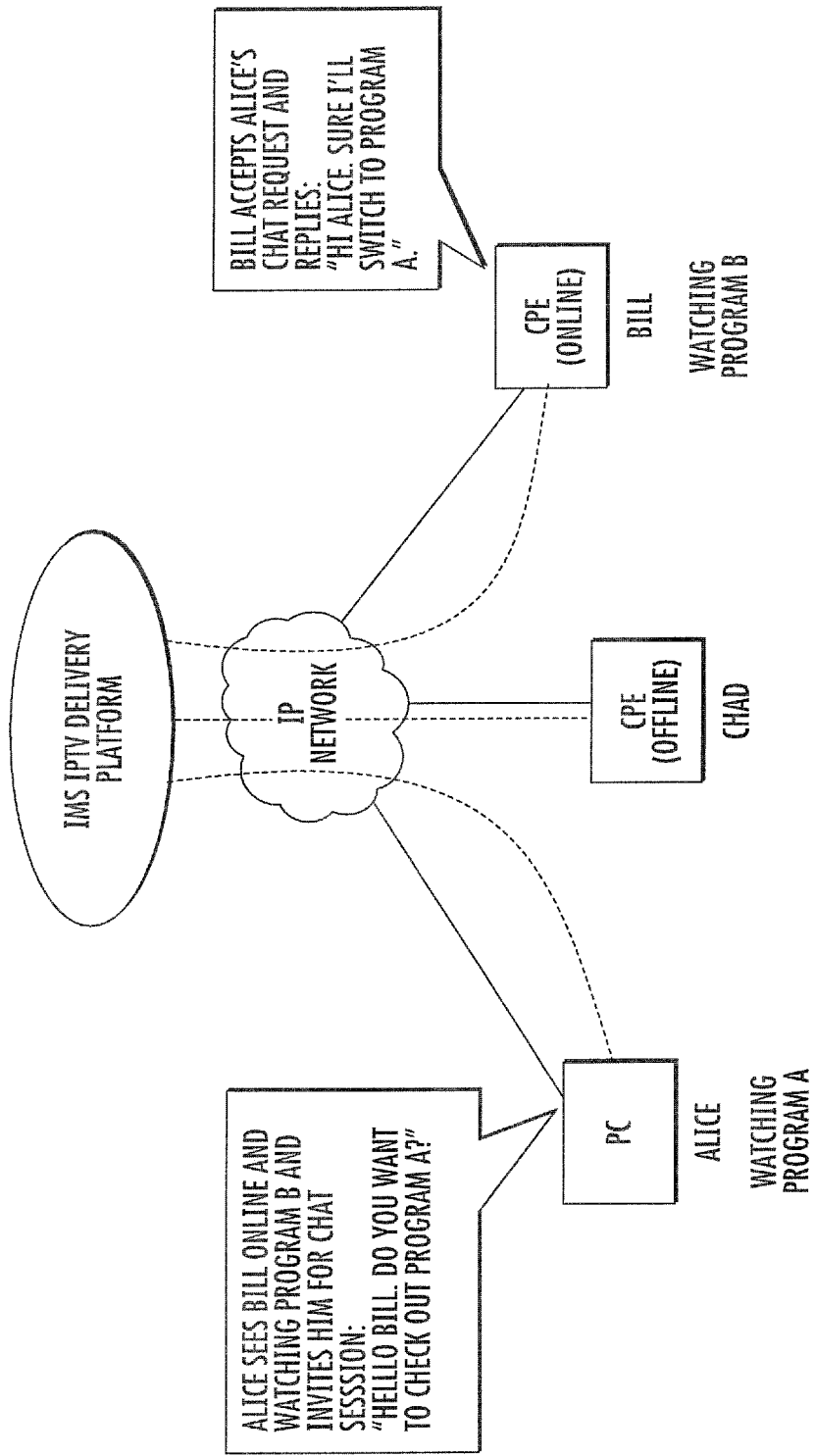
FIG. 37 is a graphical illustration of one exemplary interactive services use case according to the invention (Social TV).

1. Service Use Case 1—IPTV Telephony and Data Services (FIGS. 31-32)
2. Service Use Case 2—Parental Control (FIGS. 33-34)
3. Service Use Case 3—Targeted Advertisements Using IMS (FIGS. 35-36)
4. Service Use Case 4—Social TV As shown in FIG. 37, one use case involves a given subscriber seeing what programs subscriber "buddies" are watching (and which of them are actively online):

Kathleen sends her buddy a watching tip: "Jim, look at channel Outdoor Channel"

Chat or talk (verbally) with buddies while watching TV.

5. Service Use Case 5—Enhanced Communication (FIGS. 38-41)

XIII. Proof-of-Concept Architecture—

Figure 42:
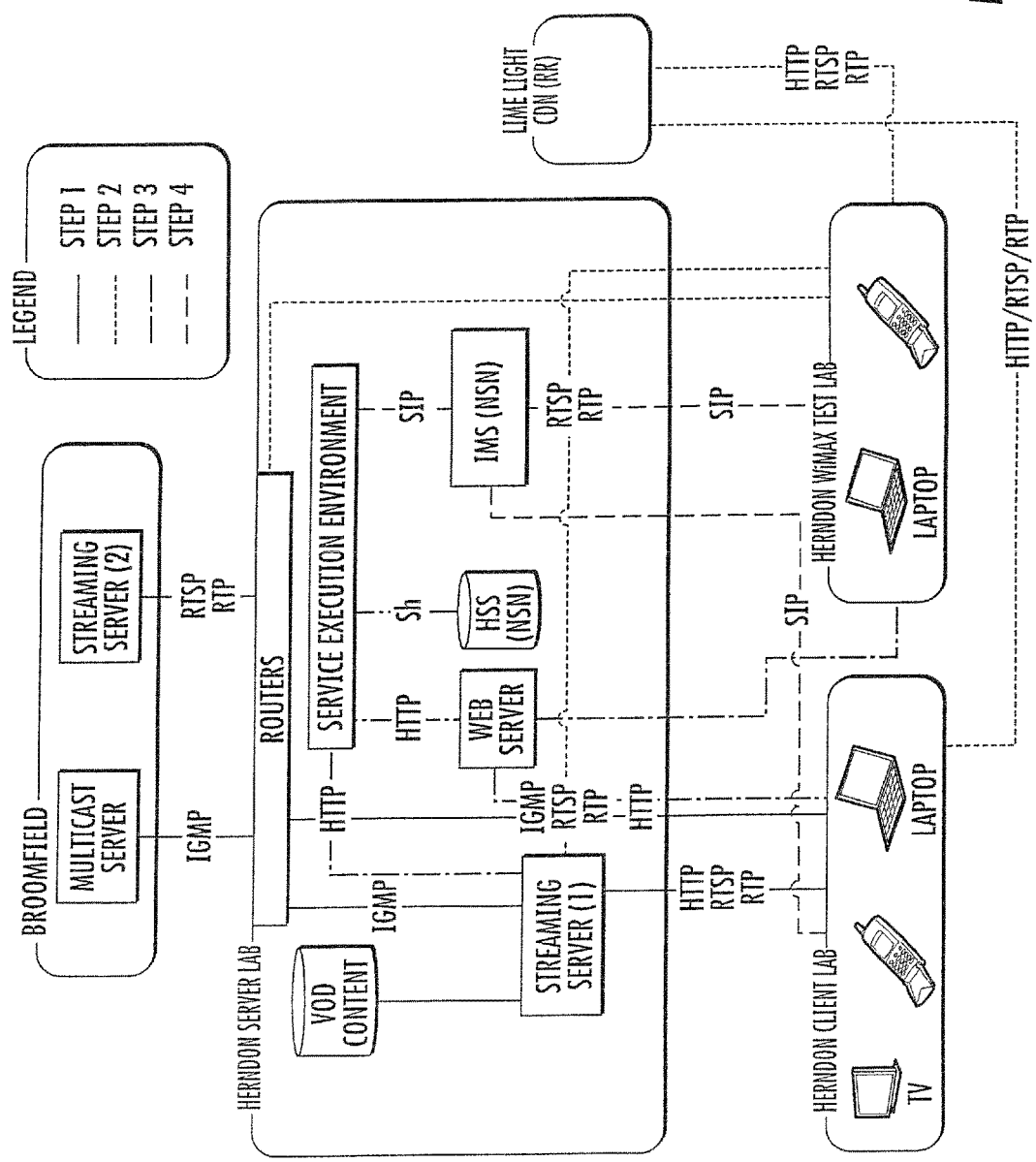
FIG. 42 is a block diagram illustrating a "proof of principles" architecture utilized by the inventors hereof with respect to various aspects of the present invention.

Referring now to FIG. 42, one exemplary embodiment of a "proof-of-concept" architecture 4200 utilized by the inventors hereof with respect to various aspects of the invention is shown. In this architecture, extant facilities of the Assignee hereof were utilized in the illustrated configuration to demonstrate the operability and function of various of the aforementioned aspects of the present invention.

XIV. Business Models—

In another aspect of the invention, various business models and methods are enabled by the various features and functionalities of the invention described above. For example, in one such model, the use of "blended" services as described above (e.g., common control plane affording tightly coupled and integrated services) provides a salient differentiator over services offered by other providers (whether alone or in combination), thereby leading to increased subscriber satisfaction and experience (and hence reducing "churn" and increasing ARPU). Specifically, by substantially unifying and integrating control, billing, and actual service implementation (i.e., by providing more services over a smaller number of devices), the user will be less tempted to make use of other forms of content delivery, such as Internet TV.

As previously noted, the use of a network-based UI also substantially increases service velocity (i.e., the rapidity with which new features or services can be implemented), as well as giving more control and unification of the MSO's "branding". That is, the network-based interface allows the MSO to not only maintain a common and consistent subscriber interface across all services offered by the MSO and devices maintained by the subscriber (thereby making the subscriber associate all of these services and devices with the MSO's "brand"), but also allows for substantial user-specific customization, and even the addition of user-requested or user-generated services or applications in a rapid manner, and without a truck roll or service call.

The foregoing substantially unified and consistent user interface, controls, and preferences across disparate devices, services, and even networks (i.e., "off-net" and "on-net") can also be the basis for an additional charge or fee. For example, the MSO might offer this feature (e.g., "Time Warner Everywhere" service) as part of a premium subscription package. For this additional consideration, the user gets a common interface with common services and controls over each of his/her devices, regardless of where they are and what type of content they request. Moreover, common or unified databases allow for user-specific data (such as NABs, buddy lists, history for recommendation engine input, etc. are all ubiquitous throughout the network(s) and user devices.

In another aspect, the MSO's use of a common service architecture (and common control plane) mitigates capital expenditures (CAPEX) and operating (OPEX) costs, since effectively one change or modification ripples throughout the entire system in a uniform and consistent manner, as opposed to the highly proprietary and mode-specific approach of the prior art (e.g., "stovepipes" each with their own particular issues and requirements). Moreover, additions or changes to the unifies/common service and control architectures can be highly incremental or modular in nature; new services can be added, and old services subtracted, without requiring an evaluation of each supporting component as to changes that will need to be made.

In another business model, the MSO may sell or lease "unified" multi-application devices for on- or off-net use. Under current techniques, a user must have an MSO account for "bundled" services (e.g., voice, video and HSD), a separate wireless account for cellular, and perhaps even another account for mobile broadband. Under the present invention, however, these services (and others) are highly integrated and at least partly under common control, and agnostic to the underlying transport, thereby providing the opportunity for a device which does many or even all functions desired by the user. For instance, a unified device might comprise a mobile computer with Wi-Fi, WiMAX, RF cable interface, mass storage, cellular telephony interface, high resolution display capability, chat/SMS capability, NAB, etc., which obviates the user having to use a dedicated device for each of the different functions (i.e., a cell phone for mobile calls and text/SMS), a PC for broadband access, a settop box for receiving RF cable signals, a personal media device for playing MP3s, etc.). This device could also be coupled to the aforementioned network-based user interface, so that it can be highly personalized and dynamically tailored to the operating mode selected by the user. Hence, the user need only become acclimated to one device and one primary user interface, thereby simplifying their life and user experience.

In another business model, subscribers are provided the ability to develop custom applications particularly tuned to their needs (e.g., via the aforementioned "mashup" capability). The MSO can charge for this service/capability if desired, or provide it as an incentive (e.g., part of a "premium" package). The MSO or a designated third party might also offer a new application development environment product (e.g., akin to a simplified SDK of the type known in the prior art) to aid users in developing their own applications and implementing them (including via the network controlled user interface, thereby obviating any service calls by the MSO or third party).

The foregoing features of the invention also provide significantly enhanced opportunities for targeted advertising and promotion insertion (i.e., on a per-session and hence even per-user basis). The MSO accordingly can bill advertisers, promoters, or other involved parties on a per-impression/matched user basis, since with unicast sessions, the MSO will know exactly who is watching what content, and when. Moreover, with implementation of substantially interactive user applications and services, the MSO can gain an even greater level of assurance on who is watching what when (and determine what their reaction to the content is), based on the interactive "feedback" obtained. The common control plane also affords the opportunity to determine when program streams are paused (e.g., due to a telephone call received), and other user-specific use parameters of possible interest to the MSO, content sources, or advertisers.

In yet another model, the MSO may impose a different rate structure or revenue model for "on-net" versus "off-net" services if desired. For instance, if a user requests off-net content, there may be an additional cost burden for the MSO to provide that content (especially with any "value adds" such as QoS, personalization, etc.). Conversely, certain off-net content may be cheaper to obtain and provide, since it may not carry some of the same value-added features (such as QoS, personalization, enriched metadata, etc.) inherent in on-net content delivered by the MSO.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention. The scope of the invention should be determined with reference to the claims.

APPENDIX I

References

© Copyright 2009-2010 Time Warner Cable, Inc.
All Rights Reserved (Each of the Following Documents is Incorporated Herein by Reference in its Entirety)
1. ETSI TS 182 027 v2.0.0: IPTV Architecture; IPTV functions supported by the IMS Subsystem.
2. ETSI TS 182 028 v2.0.0: IPTV Architecture; Dedicated Subsystem for IPTV functions.
3. ETSI TS 185 009 v2.0.0: Architecture and interfaces of a customer network device for IMS based IPTV services.
4. ETSI ES 282 001 V2.0.0: NGN Functional Architecture; Overall architecture.
5. 3GPP TS 33.220, V8.2.0: Generic Authentication Architecture; Generic bootstrapping architecture (Release 8).
6. OASIS SAML V2.0 Specifications.
7. ATIS-0800002—ATIS IIF, IPTV Architecture Requirements, April 2006.
8 ATIS-PP-1000018—ATIS NGN Architecture, March 2007.
9. ATIS-0800007—IPTV High Level Architecture, March 2007.
10. Open IPTV Forum—Toward an open IPTV standard.
11. 3GPP TS 26.234 V8.1.0 (2008-12)—3GPP Tech Spec. Transparent end-to-end Packet-switched Streaming Service (PSS); Protocols and codecs
12. FG-IPTV deliverable: IPTV architecture—ITU-T FG IPTV TD 296 (PLEN) TD 2 (IPTV-GSI)
13. IPTV Architecture; IPTV Functions supported by the IMS Subsystem—ETSI RTS 182 027 V 2.2.0
14. IMS based IPTV stage 3 specification—ETSI TS 183 063 V 2.1.0
15. Open IPTV Forum—Functional Architecture—V1.1
16. T05-FG.IPTV-DOC-0115 (ITU-T IPTV Focus Group working document)
17. Draft ETSI TISPAN TS 183 063 IMS based IPTV; Stage 3 Specification
18. Open IPTV Forum—Release 1 Specification, Volume 2—Media Formats, V1.0 dated Jan. 6, 2009

What is claimed is:
1. A computerized network server apparatus for use in a content delivery network, said computerized network server apparatus comprising: one or more network interfaces; first apparatus configured to provide, via said one or more network interfaces, delivery of an Internet Protocol (IP)-encapsulated stream comprising digitally rendered video, voice or data content; and second apparatus configured to provide, via said one or more network interfaces, delivery of an Moving Picture Experts Group (MPEG) transport stream comprising at least digitally rendered video content that corresponds to said digitally rendered video content carried on said IP-encapsulated stream; wherein said delivery of said IP-encapsulated stream from said first apparatus occurs contemporaneously with said delivery of said MPEG transport stream from said second apparatus, to at least one common computerized downstream device common to a plurality of subscribers and disposed downstream of said computerized network server apparatus within said content delivery network, said common computerized downstream device comprising at least one of a computerized IP-enabled device or a computerized non-IP-enabled device, and said common computerized downstream device configured to determine which of said IP-encapsulated stream and said MPEG transport stream to utilize, said determination being based at least in part on signaling received from a computerized upstream entity; and wherein said delivery of said IP-encapsulated stream contemporaneously with said MPEG transport stream occurs with at least one Quality-of-Service (QoS) requirement applied.

2. The computerized network server apparatus of claim 1, wherein said computerized network server apparatus comprises an application configured to run a control layer, said control layer being configured to enable blended service offerings or cross-service control functionality.

3. The computerized network server apparatus of claim 1, wherein said delivery of said IP-encapsulated stream contemporaneously with said MPEG transport stream occurring with at least one QoS requirement applied comprises delivery of said IP-encapsulated stream contemporaneously with said MPEG transport stream occurring occurs with at least one bandwidth Quality-of-Service (QoS) requirement applied.

4. The computerized network server apparatus of claim 3, wherein said delivery of said IP-encapsulated stream to said common computerized downstream device is performed using: (i) a session-based protocol, and (ii) sessions that are unique to each of a first plurality of users having computerized IP-enabled client devices.

5. The computerized network server apparatus of claim 4, wherein said IP-encapsulated stream comprises IP-encapsulated digitally rendered video, voice or data having user-specific targeted digitally rendered secondary content inserted therein, said user-specific targeted digitally rendered secondary content being enabled at least in part based on use of said unique sessions.

6. The computerized network server apparatus of claim 5, wherein said user-specific targeted secondary content is based at least in part on IP addresses of respective ones of said computerized IP-enabled client devices, said IP addresses being associated with respective ones of user accounts maintained by an operator of said content delivery network.

7. The computerized network server apparatus of claim 4, wherein said first apparatus is further configured to enable transportability/migration of said sessions, and said sessions are established for said delivery of said IP-encapsulated stream to said first plurality of users having computerized IP-enabled client devices between said computerized IP-enabled client devices and other computerized IP-enabled devices of said first plurality of users.

8. The computerized network server apparatus of claim 1, wherein said one or more network interfaces comprise a radio frequency interface, said radio frequency interface being adapted to transmit said IP-encapsulated stream and said MPEG transport stream over respective one or more Quadrature Amplitude Modulated (QAM) channels.

9. The computerized network server apparatus of claim 8, wherein said respective one or more Quadrature Amplitude Modulated (QAM) channels comprise: (i) a first plurality of QAM channels to carry said IP-encapsulated stream; and (ii) a second plurality of QAM channels to carry said MPEG transport stream.

10. The computerized network server apparatus of claim 9, wherein said IP-encapsulated stream comprises MPEG-4/H.264 encoded, IP-encapsulated digitally rendered content carried within an MPEG transport stream, and said at least digitally rendered video content carried over said MPEG transport stream comprises digitally rendered MPEG-encoded content carried within an MPEG multiplexed transport stream (MPTS).

11. A computerized headend content server apparatus configured to deliver one or more of digitally rendered video, voice, and data to a plurality of subscribers via a content delivery network, said computerized headend content server apparatus comprising: a storage device; at least one networking interface configured to enable transmission over an infrastructure element of said content delivery network; and a digital processor apparatus in data communication with said storage device and said networking interface, said digital processor apparatus configured to execute one or more processes stored on said storage device, said one or more processes comprising a plurality of instructions configured to, when executed, cause said computerized headend content server apparatus to: generate an Internet Protocol (IP)-encapsulated stream of said one or more of said digitally rendered video, voice, and data content; generate an Moving Picture Experts Group (MPEG) transport stream comprising at least one of said digitally rendered video, voice, and data content that corresponds to said digitally rendered video, voice, and data content of said IP-encapsulated stream; and transmit simultaneously, via said infrastructure element, said IP-encapsulated stream via a first Quadrature Amplitude Modulation (QAM) and said MPEG transport stream via a second QAM different than said first QAM, to a computerized device associated with at least one of said plurality of subscribers, said computerized device configured to determine which of said IP-encapsulated stream and said MPEG transport stream to utilize; wherein said one or more of said digitally rendered video, voice, and data content of said IP-encapsulated stream comprises user-specific targeted digitally rendered secondary content inserted therein, said user-specific targeted digitally rendered secondary content being geographically relevant to a geographical region to which said computerized device is associated.

12. The computerized headend content server apparatus of claim 11, wherein said transmission of said IP-encapsulated stream comprises transmission on a first transport layer over said infrastructure element; and wherein said transmission of said MPEG transport stream comprises transmission on a second transport layer over said infrastructure element.

13. The computerized headend content server apparatus of claim 12, wherein said first transport layer comprises a packet-switched protocol; and wherein said second transport layer comprises a circuit-switched protocol.

14. A computerized headend network server apparatus for use in a content delivery network, said computerized headend network server apparatus configured to distribute one or more digitally rendered content items to a plurality of subscribers, said computerized headend network server apparatus comprising:
a plurality of networking interfaces;
first apparatus configured to provide, via at least one of said plurality of networking interfaces, delivery of an Internet Protocol (IP)-encapsulated stream comprising digitally rendered video, voice or data; and
second apparatus configured to provide, via at least one of said plurality of networking interfaces and over one or more Quadrature Amplitude Modulated (QAM) channels broadcast to a service group of said plurality of subscribers, delivery of an Moving Picture Experts Group (MPEG) transport stream comprising at least digitally rendered video content that is substantially identical to said digitally rendered video content carried on said IP-encapsulated stream;
wherein said first and second apparatus each comprise circuit-switched apparatus;
wherein said first apparatus is configured to deliver said IP-encapsulated stream contemporaneously with said delivery of said MPEG transport stream from said second apparatus to a computerized downstream device associated with at least one of said plurality of subscribers, said computerized downstream device disposed downstream in said content delivery network relative to said computerized headend network server apparatus;
wherein said computerized headend network server apparatus causes said computerized downstream device to determine which of said IP-encapsulated stream and said MPEG transport stream to utilize; and
wherein said contemporaneous delivery of said IP-encapsulated stream and said MPEG transport stream to said computerized downstream device is performed using: (i) a session-based protocol, and (ii) sessions that are unique to each of a plurality of users having computerized IP-enabled client devices.

15. The computerized headend network server apparatus of claim 14, wherein said delivery of said IP-encapsulated stream contemporaneously with said delivery of said MPEG transport stream to said computerized downstream device occurs with at least one Quality-of-Service (QoS) requirement applied.

16. The computerized headend network server apparatus of claim 15, wherein said delivery of said IP-encapsulated stream to said computerized downstream device comprises IP-encapsulated digitally rendered video, voice or data having user-specific targeted digitally rendered secondary content inserted therein, said user-specific targeted digitally rendered secondary content being enabled at least in part based on a use of said unique sessions.

17. The computerized headend network server apparatus of claim 16, wherein said user-specific targeted secondary content is based at least in part on IP addresses of respective ones of said computerized IP-enabled client devices, said IP addresses being associated with respective ones of user accounts maintained by an operator of said content delivery network.

18. The computerized headend network server apparatus of claim 15, wherein said first apparatus is further configured to enable transportability/migration of one or more user sessions established for said delivery of said IP-encapsulated stream to said plurality of users having computerized IP-enabled client devices between said computerized IP-enabled devices and other computerized IP-enabled devices of said plurality of users.

19. The computerized headend network server apparatus of claim 14, wherein said one or more network interfaces comprise a radio frequency interface, said radio frequency interface being adapted to transmit said IP-encapsulated stream over respective ones of said one or more QAM channels.

20. The computerized headend network apparatus of claim 19, wherein said one or more QAM channels comprise: (i) a first plurality of QAM channels to carry said IP-encapsulated stream; and (ii) a second plurality of QAM channels to carry said MPEG transport stream.

21. The computerized headend network apparatus of claim 20, wherein said IP-encapsulated stream comprises MPEG-4/H.264 encoded, IP-encapsulated digitally rendered content, and said at least digitally rendered video content carried over said MPEG transport stream comprises MPEG-encoded digitally rendered content carried within an MPEG multiplexed transport stream (MPTS).

22. A computerized method for operating a content delivery network, said computerized method comprising:
   causing delivery, by a computerized server apparatus, of an Internet Protocol (IP)-encapsulated stream comprising digitally rendered video, voice or data content;
   causing delivery of an Moving Picture Experts Group (MPEG) transport stream comprising at least digitally rendered video content that corresponds to said digitally rendered video content carried on said IP-encapsulated stream, said delivery of said IP-encapsulated stream occurring contemporaneously with said delivery of said MPEG transport stream, to at least one common computerized downstream device utilized by a plurality of subscribers and disposed within the content delivery network closer to an edge thereof relative to the said computerized server apparatus, said at least one common computerized downstream device comprising at least one of a computerized IP-enabled device or a computerized non-IP-enabled device; and
   transmitting at least one signal to said at least one common computerized downstream device, said at least one signal causing said at least common computerized downstream device to determine which of said IP-encapsulated stream and said MPEG transport stream to utilize.

23. The computerized method of claim 22, wherein said delivery of said Internet Protocol (IP)-encapsulated stream comprises implementation of one or more quality-of-service (QoS) policies relating to said IP-encapsulated stream.

24. The computerized method of claim 22, wherein said IP-encapsulated stream comprises IP-encapsulated digitally rendered video, voice or data having user-specific targeted digitally rendered secondary content inserted therein, said user-specific targeted digitally rendered secondary content being enabled at least in part based on a use of sessions that are unique to one or more of said plurality of subscribers.

25. A computerized method for delivering at least digitally rendered video content to a plurality of subscribers via a content delivery network, said computerized method comprising:
   causing delivery, via a first quadrature amplitude modulated (QAM) channel and by a computerized server apparatus, of an Internet Protocol (IP)-encapsulated stream comprising first data corresponding to the at least digitally rendered video content; and
   causing delivery, via one or more second QAM channels broadcast to a service group of said plurality of subscribers, of an Moving Picture Experts Group (MPEG) transport stream comprising at least second data corresponding to the at least digitally rendered video content;
   wherein said delivery of said IP-encapsulated stream occurs contemporaneously with said delivery of said MPEG transport stream, to a computerized downstream device common to said plurality of subscribers and disposed downstream relative to the computerized server apparatus in the content delivery network, said common computerized downstream device comprising computerized logic configured to, when executed by a processor apparatus, determine which one of said IP-encapsulated stream and said MPEG transport stream to utilize for delivery of the at least digitally rendered video content; and
   wherein said contemporaneous delivery of said IP-encapsulated stream and said MPEG transport stream to said common computerized downstream device is performed using: (i) a session-based protocol, and (ii) sessions that are unique to one or more of said plurality of subscribers, said plurality of subscribers having respective computerized IP-enabled client devices.

26. The computerized method of claim 25, wherein the determination by the computerized logic, when executed by the processor apparatus comprises determination of which of the first data or second data can be decoded and rendered by the common computerized downstream device.

27. The computerized method of claim 25, wherein the determination by the computerized logic, when executed by the processor apparatus comprises determination of whether the common computerized downstream device comprises an IP-enabled protocol stack.

* * * * *